US012698189B2

(12) United States Patent
Brulo et al.

(10) Patent No.: US 12,698,189 B2
(45) Date of Patent: Aug. 4, 2026

(54) SOLAR PANEL INSTALLATION SYSTEM

(71) Applicant: Oshkosh Corporation, Oshkosh, WI (US)

(72) Inventors: Gregory Brulo, Oshkosh, WI (US); Guido Ritelli, Farmington Hills, MI (US); Ignacy Puszkiewicz, Oshkosh, WI (US); Jihong Hao, Greencastle, PA (US)

(73) Assignee: Oshkosh Corporation, Oshkosh, WI (US)

( * ) Notice: Subject to any disclaimer, the term of this patent is extended or adjusted under 35 U.S.C. 154(b) by 438 days.

(21) Appl. No.: 18/223,410

(22) Filed: Jul. 18, 2023

(65) Prior Publication Data

US 2024/0025714 A1 Jan. 25, 2024

Related U.S. Application Data

(60) Provisional application No. 63/523,226, filed on Jun. 26, 2023, provisional application No. 63/510,284, (Continued)

(51) Int. Cl.
*B66F 9/065* (2006.01)
*B25J 9/16* (2006.01)
(Continued)

(52) U.S. Cl.
CPC ........... *B66F 9/0655* (2013.01); *B25J 9/1664* (2013.01); *B25J 9/1679* (2013.01); *B60P 1/5466* (2013.01);
(Continued)

(58) Field of Classification Search
CPC .... B25J 15/0616; B25J 5/005; B25J 19/0054; B25J 9/1697; B25J 13/006; B25J 13/087
See application file for complete search history.

(56) References Cited

U.S. PATENT DOCUMENTS 4,103,795 A 8/1978 Miller
5,700,047 A 12/1997 Leitner et al.
(Continued)

FOREIGN PATENT DOCUMENTS

EP 3 152 149 B1 4/2017
WO WO-2021/252427 A1 12/2021
WO WO-2023/107411 A1 6/2023

OTHER PUBLICATIONS https://pv-magazine-usa.com/2020/01/17/dan-shugar-nextracker-ceo-on-solar-trackers-in-wind-and-the-terror-of-torsional-galloping/.
Invitation to Pay Additional Fees issued in connection with PCT Appl. No. PCT/US2023/028080 dated Nov. 21, 2023.

*Primary Examiner* — Kaitlin S Joerger
(74) *Attorney, Agent, or Firm* — Foley & Lardner LLP

(57) ABSTRACT

A solar panel installation machine includes a chassis, a body coupled to the chassis, a plurality of tractive elements coupled the chassis, a boom coupled to the body, and an implement coupled to an end of the boom. The implement includes a track, a robotic arm coupled to and translatable along the track, the robotic arm including a plurality of linkages, and a grabber assembly coupled to the robotic arm, the grabber assembly configured to selectively engage with and facilitate picking up a solar panel to provide the solar panel to an installation location where the respective solar panel can be secured to a solar panel support.

20 Claims, 75 Drawing Sheets

Related U.S. Application Data filed on Jun. 26, 2023, provisional application No. 63/523,282, filed on Jun. 26, 2023, provisional application No. 63/523,271, filed on Jun. 26, 2023, provisional application No. 63/390,537, filed on Jul. 19, 2022, provisional application No. 63/390,562, filed on Jul. 19, 2022, provisional application No. 63/390,566, filed on Jul. 19, 2022, provisional application No. 63/390,490, filed on Jul. 19, 2022.

(51) Int. Cl.

| | |
|---|---|
| *B60P 1/54* | (2006.01) |
| *B60P 1/64* | (2006.01) |
| *B66F 9/18* | (2006.01) |
| *H02S 20/10* | (2014.01) |
| *H02S 20/32* | (2014.01) |

(52) U.S. Cl.
CPC .............. *B60P 1/6472* (2013.01); *B66F 9/18* (2013.01); *H02S 20/10* (2014.12); *H02S 20/32* (2014.12)

(56) References Cited

U.S. PATENT DOCUMENTS

| | | | |
|---|---|---|---|
| 6,161,664 A | 12/2000 | Brevart et al. | |
| 7,219,769 B2 | 5/2007 | Yamanouchi et al. | |
| 10,069,455 B2 | 9/2018 | Corio et al. | |
| 10,421,609 B2 | 9/2019 | Otto et al. | |
| 10,997,802 B2 | 5/2021 | Koga et al. | |
| 11,042,750 B2 | 6/2021 | Wildgrube et al. | |
| 11,118,353 B2 | 9/2021 | Stearns et al. | |
| 11,245,353 B2 * | 2/2022 | Di Stefano | H02S 20/23 |
| 11,319,147 B2 | 5/2022 | Maroney et al. | |
| 11,679,970 B2 | 6/2023 | Iotti | |
| 12,145,827 B2 | 11/2024 | Faimali et al. | |
| 12,292,075 B2 | 5/2025 | Stephan et al. | |
| 12,473,736 B2 | 11/2025 | Haddock et al. | |
| 12,483,185 B2 | 11/2025 | Moss et al. | |
| 2006/0087152 A1 | 4/2006 | Kuriakose | |
| 2006/0239790 A1 | 10/2006 | Earle et al. | |
| 2009/0250580 A1 | 10/2009 | Strizki | |
| 2013/0133172 A1 * | 5/2013 | Kiener | B60P 1/5433 414/539 |
| 2015/0183066 A1 | 7/2015 | Lippert et al. | |
| 2017/0248966 A1 | 8/2017 | Lutz et al. | |
| 2017/0291802 A1 | 10/2017 | Hao et al. | |
| 2017/0291805 A1 | 10/2017 | Hao et al. | |
| 2018/0123505 A1 | 5/2018 | Prat et al. | |
| 2018/0162704 A1 | 6/2018 | Hao et al. | |
| 2019/0071291 A1 | 3/2019 | Puszkiewicz et al. | |
| 2019/0119088 A1 | 4/2019 | Puszkiewicz et al. | |
| 2019/0185301 A1 | 6/2019 | Hao et al. | |
| 2019/0210663 A1 | 7/2019 | Binley | |
| 2019/0250003 A1 | 8/2019 | Muta et al. | |
| 2019/0322512 A1 | 10/2019 | Puszkiewicz et al. | |
| 2019/0352157 A1 | 11/2019 | Hao et al. | |
| 2020/0031641 A1 | 1/2020 | Puszkiewicz et al. | |
| 2020/0139804 A1 | 5/2020 | Holmes et al. | |
| 2020/0140249 A1 | 5/2020 | Hackenberg et al. | |
| 2020/0317256 A1 | 10/2020 | Hao et al. | |
| 2020/0317480 A1 * | 10/2020 | Shankar | B66F 11/044 |
| 2020/0317486 A1 | 10/2020 | Puszkiewicz et al. | |
| 2020/0317488 A1 | 10/2020 | Bafile et al. | |
| 2020/0317491 A1 | 10/2020 | Bafile et al. | |
| 2021/0001763 A1 | 1/2021 | Soonthornwinate | |
| 2021/0002112 A1 | 1/2021 | Puszkiewicz et al. | |
| 2021/0039934 A1 | 2/2021 | Hackenberg et al. | |
| 2021/0070561 A1 | 3/2021 | Mcvicar et al. | |
| 2021/0070595 A1 | 3/2021 | Holmes et al. | |
| 2021/0155463 A1 | 5/2021 | Hao et al. | |
| 2021/0206003 A1 * | 7/2021 | Zhou | B25J 19/021 |
| 2021/0276841 A1 | 9/2021 | Borofka et al. | |
| 2021/0276848 A1 | 9/2021 | Miller et al. | |
| 2021/0325899 A1 | 10/2021 | Grambihler et al. | |
| 2021/0379757 A1 * | 12/2021 | Schneider | B25J 9/046 |
| 2021/0395058 A1 | 12/2021 | Hao et al. | |
| 2022/0069770 A1 * | 3/2022 | Shelton | H02S 20/00 |
| 2022/0103122 A1 | 3/2022 | Carter | |
| 2022/0134946 A1 | 5/2022 | Brulo | |
| 2022/0194769 A1 | 6/2022 | Kobel et al. | |
| 2022/0198905 A1 | 6/2022 | Brulo et al. | |
| 2022/0234873 A1 | 7/2022 | Miller et al. | |
| 2022/0371864 A1 | 11/2022 | Shankar et al. | |
| 2023/0106572 A1 | 4/2023 | Allen et al. | |
| 2023/0159313 A1 | 5/2023 | Holmes et al. | |
| 2023/0183050 A1 | 6/2023 | Puszkiewicz et al. | |
| 2023/0192425 A1 | 6/2023 | Aitto-Oja | |
| 2023/0202552 A1 | 6/2023 | Williams et al. | |
| 2023/0234456 A1 | 7/2023 | Messina et al. | |
| 2023/0234462 A1 | 7/2023 | Messina et al. | |
| 2023/0234821 A1 | 7/2023 | Messina et al. | |
| 2023/0238912 A1 | 7/2023 | Campbell et al. | |
| 2023/0256849 A1 | 8/2023 | Messina et al. | |
| 2023/0264932 A1 | 8/2023 | Puszkiewicz | |
| 2023/0271816 A1 | 8/2023 | Jihong et al. | |
| 2023/0286570 A1 | 9/2023 | Hao et al. | |
| 2023/0286571 A1 | 9/2023 | Hao et al. | |
| 2023/0294528 A1 | 9/2023 | Messina et al. | |
| 2023/0322537 A1 | 10/2023 | Puszkiewicz et al. | |
| 2023/0356402 A1 | 11/2023 | Brulo et al. | |
| 2023/0356992 A1 | 11/2023 | Brulo et al. | |
| 2024/0025490 A1 * | 1/2024 | Brulo | F16B 2/065 |
| 2024/0030863 A1 * | 1/2024 | Brulo | F24S 80/00 |
| 2024/0190009 A1 * | 6/2024 | Asmari | B25J 15/0616 |
| 2025/0102007 A1 | 3/2025 | Graboski | |
| 2025/0260363 A1 | 8/2025 | Urbanek et al. | |
| 2026/0019029 A1 | 1/2026 | Ganshaw | |

* cited by examiner

200

202

22/460

22/460

5200

(A) — 5300

ADV RECEIVES COMMAND, ROUTE AND OTHER PARAMETERS FROM CLOUD

FIRST ADV IS DISPATCHED FROM BUFFER AREA

ENABLE MESSAGE RECEIVED BY CLOUD. THE CLOUD DECIDES WHICH ADV IS LOADED FIRST

YARD FOREMAN    YARD TECHNICIAN

PARTIES ENABLE THE ADV FLEET TO BE LOADED. I.E. THEY ARE PERMITTED TO LEAVE THE BUFFER AREA (ASSUMED TO BE WITHIN LOADING YARD) AND DRIVE TO THE LOADING POINT (B)

CLOUD COMMUNICATES TO ADV WHETHER IT IS PERMITTED TO LEAVE YARD AND SHARES PARAMETERS DESCRIBING HOW TO NAVIGATE TO POINT OF INSTALLATION

ADV AUTONOMY PACKAGE NAVIGATES TO INSTALLATION POINT

ADV ARRIVES AT LOCATION FOR FIRST PANEL OF FIRST ROW INSTALLATION. SENDS ARRIVAL NOTIFICATION TO CLOUD

BEGINNING: ASSUME VEHICLES ARE DELIVERED TO JOBSITE, ASSEMBLED, CALIBRATED, TESTED, ETC. READY TO OPERATE. THE CLOUD ALREADY KNOWS THE ENGINEERING DATA FOR THE JOBSITE AND HAS HIGH LEVEL INSTALLATION PLAN

YARD FOREMAN SELECTS LOADING POINT, WAITING AREA, KEEP OUT AREAS AND OTHER PARAMETERS RELATING TO THE LOADING YARD. YARD FOREMAN ENABLES EACH ADV

CLOUD RECEIVES THESE PARAMETERS FROM YARD FOREMAN

CLOUD PROPOSES DIFFERENT ADV TRAVEL PATHS WITHIN THE YARD TO THE YARD FOREMAN

YARD FOREMAN CONFIRMS AND ENABLES SELECT PATHS WITHIN THE YARD

CLOUD PROPOSES DIFFERENT ADV TRAVEL PATHS WITHIN THE SOLAR FARM TO CARRY PANELS FROM YARD TO AWV.

INSTALLATION FOREMAN CONFIRMS AND ENABLES SELECT PATHS WITHIN THE SOLAR FARM

FIG. 94

SOLAR PANEL INSTALLATION SYSTEM

CROSS-REFERENCE TO RELATED PATENT APPLICATIONS

This application claims the benefit of and priority to U.S. Provisional Application No. 63/390,562, filed on Jul. 19, 2022, U.S. Provisional Application No. 63/390,566, filed on Jul. 19, 2022, U.S. Provisional Application No. 63/390,490, filed on Jul. 19, 2022, U.S. Provisional Application No. 63/390,537, filed on Jul. 19, 2022, U.S. Provisional Application No. 63/523,271, filed on Jun. 26, 2023, U.S. Provisional Application No. 63/523,282, filed on Jun. 26, 2023, U.S. Provisional Application No. 63/523,226, filed on Jun. 26, 2023, and U.S. Provisional Application No. 63/510,284, filed on Jun. 26, 2023, the entire disclosures of which are hereby incorporated by reference herein.

BACKGROUND

The present disclosure relates generally to solar panels. More specifically, the present disclosure relates to the installation of solar panels.

SUMMARY

At least one embodiment relates to a solar panel installation machine includes a chassis, a body coupled to the chassis, a plurality of tractive elements coupled the chassis, a boom coupled to the body, and an implement coupled to an end of the boom. The implement includes a track, a robotic arm coupled to and translatable along the track, the robotic arm including a plurality of linkages, and a grabber assembly coupled to the robotic arm, the grabber assembly configured to selectively engage with and facilitate picking up a solar panel to provide the solar panel to an installation location where the respective solar panel can be secured to a solar panel support.

Another embodiment relates to a solar panel installation machine including a body coupled to the chassis and configured to rotate relative the chassis, a plurality of tractive elements coupled the chassis, a telescoping boom coupled to the body, an implement coupled to an end of the telescoping boom, the telescoping boom configured to adjust a height of the implement. The implement includes a track, a robotic arm coupled to and translatable along the track, the robotic arm including a plurality of linkages, a grabber assembly coupled to the robotic arm, the grabber assembly configured to selectively engage with and facilitate picking up a solar panel to provide the solar panel to an installation location where the respective solar panel can be secured to a solar panel support, and a wireless communications interface configured to facilitate wireless communications between (a) the solar panel installation machine and (b) another machine proximate the solar panel installation machine and a remote server.

Another embodiment relates to a solar panel installation machine including a chassis, a body coupled to the chassis via a turntable, a mechanical lock positioned to engage with the turntable to selectively prevent rotation of the turntable, a plurality of tractive elements coupled the chassis, a telescoping boom coupled to the body, and an implement coupled to an end of the telescoping boom. The implement includes a track, a robotic arm coupled to and translatable along the track along, the robotic arm including a plurality of linkages, and a grabber assembly coupled to the robotic arm, the grabber assembly configured to selectively engage with and facilitate picking up a solar panel to provide the solar panel to an installation location where the respective solar panel can be secured to a solar panel support. The vehicle includes a wireless communications interface configured to facilitate wireless communications between the solar panel installation machine and another machine proximate the solar panel installation machine.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Figure 1:
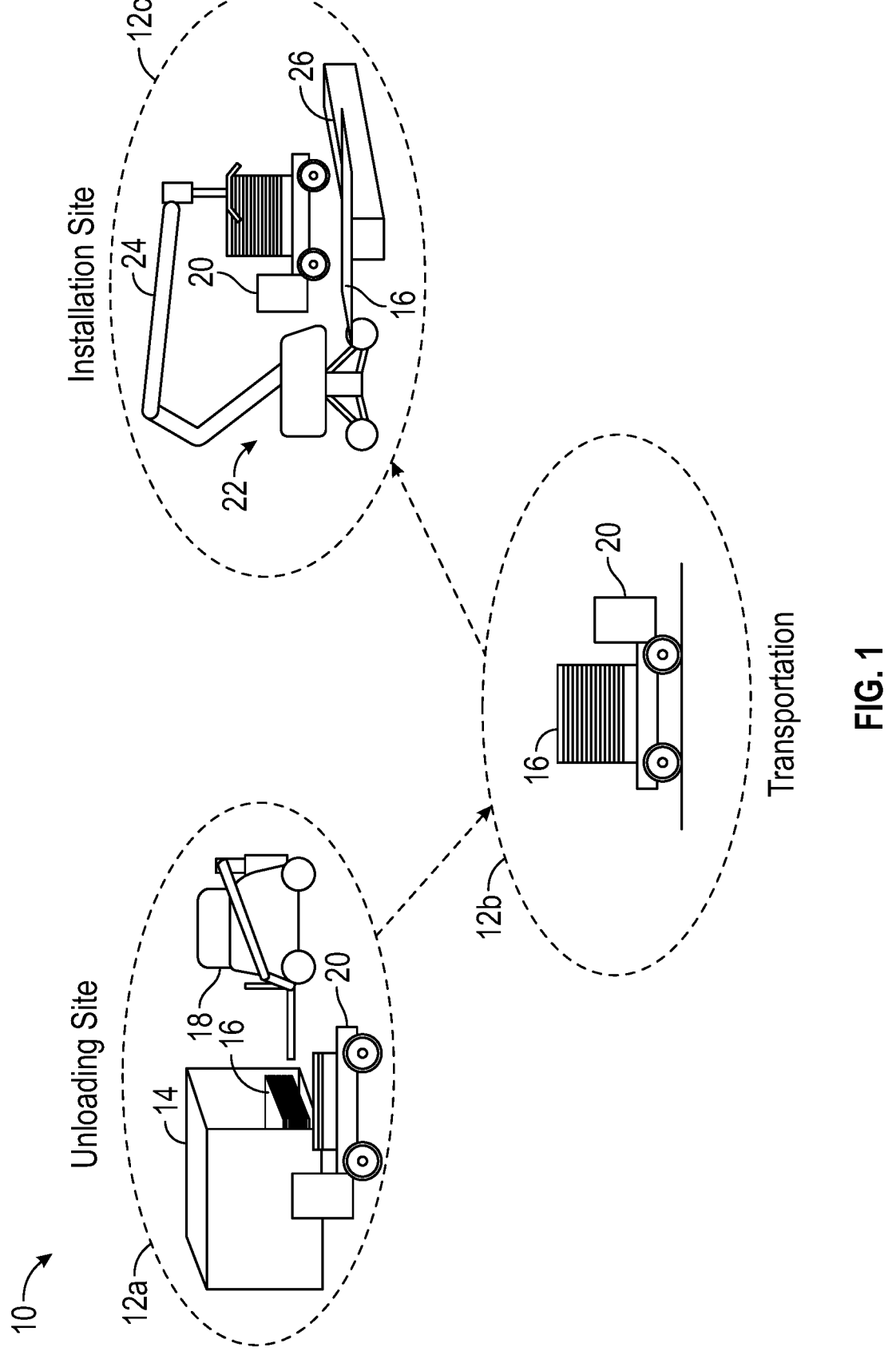
FIG. 1 is a diagram illustrating removal of solar panels from a shipping container, transportation of the solar panels to an installation site, and installation of the solar panels at the installation site, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, an installation system includes a support structure, a series of solar panels configured to be coupled to the support structure, and an installation vehicle configured to translate relative to the support structure, the installation vehicle including a platform configured to support the series of solar panels, an implement coupled to the platform and configured to selectively couple to at least one of the series of solar panels, rotate about a first axis relative to the platform while coupled to the at least one of the series of solar panels, transport the at least one of the series of solar panels to a desired location relative to the support structure, and selectively decouple from the at least one of the series of solar panels in response to the at least one of the series of solar panels being coupled to the support structure.

According to various embodiments, the installation vehicle includes an axel coupled to a first wheel and a second wheel such that the support structure is positioned between the first when and the second wheel as the installation vehicle translates relative to the support structure. According to various embodiments, the implementation is configured to rotate about a second axis that is perpendicular to the first axis. According to various embodiments, the implementation is configured to translate along the first axis to adjust a height difference between the platform and the implement. According to various embodiments, the implementation comprises a cantilever beam coupled to the platform proximate a first end of the cantilever beam such that a second end of the cantilever beam is unsupported. According to various embodiments, the implementation comprises a tower and a guy wire coupled to the tower and the cantilever beam between the first end and the second end of the cantilever beam. According to various embodiments, the installation system further includes an alignment device coupled to the platform and the support structure, the alignment device being configured to translate along the support structure and receive the at least one of the series of solar panels within a central cavity from the implementation. According to various embodiments, the installation system further comprising a series of mounting brackets configured to individually secure the at least one of the series of solar panels to the support structure, wherein the implement is configured to secure at least one of the series of mounting brackets to the support structure. According to various embodiments, the support structure includes a torque tube comprising a flat portion configured to support the at least one of the series of solar panels. According to various embodiments, the installation system further includes a delivery vehicle coupled to the installation vehicle via a tether having a fixed length.

According to various embodiments, the installation vehicle is configured to transport one or more solar panels to a desired position with respect to the support structure. According to various embodiments, the installation vehicle is configured to secure one or more mounting brackets to the support structure. According to various embodiments, the installation vehicle is configured to secure one or more solar panels to the one or more mounting brackets. According to various embodiments, the installation vehicle translates along one side of the support structure. According to other embodiments, the installation vehicle straddles the support structure and translates over the support structure. According to various embodiments, the installation vehicle includes one or more sensors configured to detect the support structure and at least one of the series of solar panels. According to various embodiments, a controller is communicably coupled to the one or more sensors. According to various embodiments, the controller causes the installation vehicle to autonomously transport one or more solar panels to a desired location. According to various embodiments, the controller causes the installation vehicle to autonomously secure the one or more solar panels to the support structure. According to various embodiments, the installation vehicle is communicably coupled to the delivery vehicle such that an operator of the delivery vehicle may control the installation vehicle from the delivery vehicle.

According to an exemplary embodiment, a delivery vehicle includes a chassis, one or more tractive elements coupled to the chassis, a battery module laterally provided relative to the chassis, and a carrier laterally provided relative to the chassis. The delivery vehicle may be configured to transport solar panels between a hub and a jobsite. Upon reaching the jobsite, the solar panels may be unloaded via an installation vehicle. In one example, the delivery vehicle may continuously drive next to the installation vehicle, where the installation vehicle may unload one or multiple solar panels at a time.

In some embodiments, the solar panels may be oriented vertically, horizontally, inverted, upright, etc., where the solar panels are oriented for easy loading and unloading. In still some embodiments, the carrier may include a motion device that is configured to reorient or move the carrier to put the solar panels into a different orientation.

According to an exemplary embodiment, an autonomous, semi-autonomous, or manually operated vehicle include an implement assembly for removing pallets of solar panels from a shipping container. The implement assembly may include a vision system including a camera and a distance sensor to determine a relative position and orientation of the implement assembly relative to the shipping container. A control system uses the relative position and orientation of the implement assembly to facilitate autonomous, semi-autonomous, or manual operation of the vehicle to unload the solar panels from the shipping container.

Overall Installation Process

Figure 2:
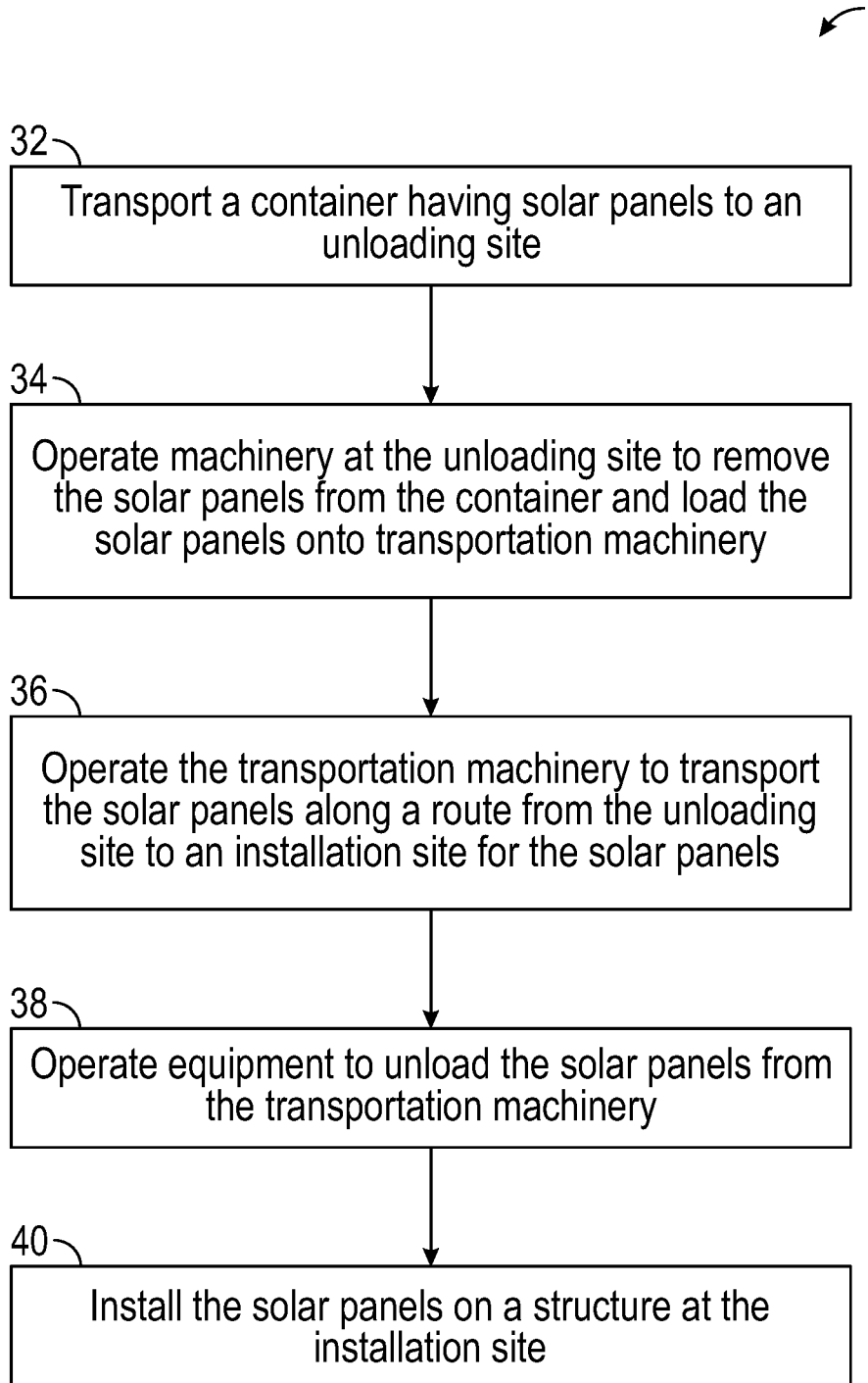
FIG. 2 is a flow diagram of a process for transporting and installing solar panels at an installation site, according to an exemplary embodiment.
Figure 3:
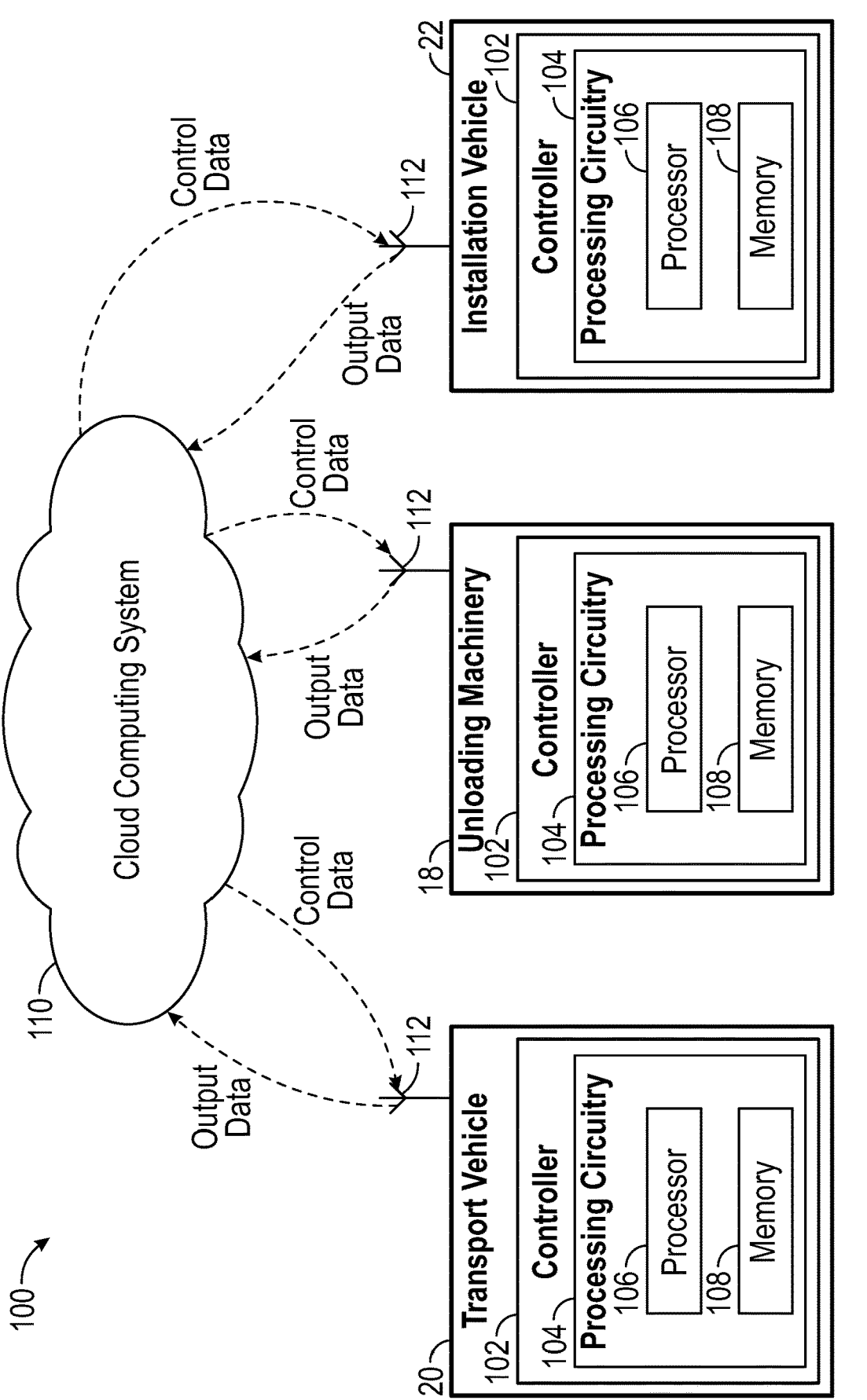
FIG. 3 is a block diagram of a control system having a cloud computing system for autonomously operating various machinery to autonomously transport and install solar panels, according to an exemplary embodiment.

Referring to FIGS. 1-3, solar panels 16 may be removed from a shipping container 14, transported to an installation site, and installed at the installation site. Other systems include manually removing, operating machinery, and installing the solar panels by hand using vehicles which are not specifically tailored for handling solar panels. These systems may result in a time-consuming installation process, and the solar panels may be damaged during the process of installation. The systems and methods described herein provide various embodiments that facilitate autonomous or semi-autonomous unloading, transportation, and/or installation of solar panels using machinery that is specifically designed to handle solar panels. The machinery may be controlled remotely (e.g., by a cloud computing system) or locally (e.g., at a solar farm) to facilitate operation of the system.

Referring to FIG. 1, a solar panel installation system 10 is shown according to an exemplary embodiment. The solar panel installation system 10 handles processing (e.g., transportation and installation) of solar panels 16 from an unloading site 12a to an installation site 12c, according to an exemplary embodiment. The shipping container 14 within which the solar panels 16 are located is positioned at the unloading site 12a (e.g., by a semi truck, by a crane, by a boat, etc.). The shipping container 14 may be a shipping container or trailer (e.g., an ISO container, a flatbed trailer, a lowboy trailer, a step deck trailer, an enclosed or box trailer, etc.). The shipping container 14 may be enclosed or open to the surrounding environment. After the solar panels 16 are unloaded from inside the shipping container 14, the solar panels 16 may undergo transportation operations along a route 12b until the solar panels 16 arrive at the installation site 12c where the solar panels 16 are to be installed.

When the shipping container 14 first arrives at the unloading site 12a (e.g., at a side of a road, at a bay, at an unloading area, in a hanger, in a garage, an edge of a field, etc.) that is within a certain distance of the installation site 12c (e.g., within a distance of several miles), the shipping container 14 may be opened (e.g., by operating doors) to allow access to the solar panels 16. Unloading machinery 18 (e.g., a vehicle, equipment, an unloading apparatus, a transportation vehicle, a processing vehicle, etc.) may operate to unload the solar panels 16 from the shipping container 14 (e.g., removably coupling with a pallet of multiple of the solar panels 16), and load the solar panels 16 onto a transportation vehicle 20. The unloading machinery 18 may repeat the steps of unloading solar panels 16 from the shipping container 14, and loading the transportation vehicle 20 until the transportation vehicle 20 is loaded to a full or desired capacity.

Once the transportation vehicle 20 is loaded to a desired capacity, the transportation vehicle 20 may operate to transport from the unloading site 12a to the installation site 12c along the route 12b. In some embodiments, the transportation operations performed by the transportation vehicle 20 are performed autonomously or semi-autonomously. In some embodiments, the transportation vehicle 20 is an all-terrain vehicle that is configured to transport across bumpy or uneven terrain (e.g., through a field or an off-road environment).

Once the transportation vehicle 20 arrives at the installation site 12c, the transportation vehicle 20 may travel proximate a frame 26 onto which the solar panels 16 are to be installed. An installation vehicle 22 (e.g., a vehicle, a machine, machinery, a robot, robotic equipment, equipment, etc.) includes an implement 24 (e.g., a robotic arm, an articulable arm, connected linkages, grabbers, claws, etc.) that is configured to grasp (e.g., removably couple with) one of the solar panels 16, and place the solar panel 16 onto the frame 26 for installation. In some embodiments, the implement 24 is also configured to couple the solar panel 16 onto the frame 26. In some embodiments, the installation vehicle 22 is configured to cooperate with one or more local or installation devices at the installation site 12c that operate to secure (e.g., insert fasteners, apply interlocking members, etc.) the solar panels onto the frame 26.

Referring to FIG. 2, a flow diagram of a process 30 or method for the shipping, transportation, and installation of solar panels at a field (e.g., a solar farm) or area of land includes steps 32-40, according to an exemplary embodiment. In some embodiments, the process 30 may be performed to autonomously or semi-autonomously process solar panels (e.g., from a factory) to final installation on a frame in a solar field.

The process 30 includes transporting a container having solar panels to an unloading site (step 32), according to an exemplary embodiment. In some embodiments, step 32 includes transporting a shipping container to an unloading site that is at a field or area of land where a solar farm is located, or is to be located once all the solar panels are installed. The step 32 may be performed by shipping (e.g., via a semi-truck) the container from a factory, a distribution plant, etc., to the unloading site. In some embodiments, step 32 is performed by a truck that transports the shipping container 14.

The process 30 also includes operating machinery at the unloading site 12a to remove the solar panels 16 from the shipping container 14 and load the solar panels 16 onto transportation machinery (step 34), according to an exemplary embodiment. In some embodiments, step 34 includes operating the unloading machinery 18 to remove the solar panels 16 from the shipping container 14 and load the solar panels 16 onto the transportation vehicle 20. In some embodiments, the step 34 is performed autonomously or semi-autonomously by the unloading machinery 18.

The process 30 also includes operating the transportation machinery to transport the solar panels 16 along a route 12b from the unloading site 12a to an installation site 12c for the solar panels 16 (step 36), according to an exemplary embodiment. In some embodiments, step 36 includes autonomously, semi-autonomously, or manually operating the transportation vehicle 20 to transport the solar panels 16 to the installation site 12c. In some embodiments, step 36 includes driving the transportation machinery along an off-road route to a specific location where solar panels 16 are being installed on a frame member.

The process 30 also includes operating equipment to unload the solar panels 16 from the transportation machinery (step 38) and installing the solar panels 16 on a structure at the installation site (step 40), according to an exemplary embodiment. In some embodiments, step 38 and/or step 40 is/are performed by the installation vehicle 22. In some embodiments, step 40 includes securing the solar panels 16 onto a frame member (e.g., the frame 26). Step 40 may be performed manually (e.g., by a crew) or semi-autonomously by use of an implement (e.g., a crane, the implement 24, etc.).

Referring to FIG. 3, a control system 100 for any of the vehicles or machinery shown in FIGS. 1 and 2 includes a cloud computing system 110 (e.g., including one or more servers) that is configured to communicate with any of the transportation vehicles 20, the unloading machinery 18, and/or the installation vehicle(s) 22, according to an exemplary embodiment. In some embodiments, any of the transport vehicle(s) 20, the unloading machinery 18, and the installation vehicle(s) 22 each include a controller 102 and a wireless transceiver 112 that are configured to communicate with the cloud computing system 110. The cloud computing system 110 may obtain output data (e.g., sensor data, operational data, engine control unit data, transmission control unit data, global positioning system data, etc.) from any of the transportation vehicles 20, the unloading machinery 18, and the installation vehicles 22. In some embodiments, the cloud computing system 110 is configured to orchestrate control of the transportation vehicles 20, the unloading machinery 18, and/or the installation vehicles 22 by providing control data. The transportation vehicles 20, the unloading machinery 18, and/or the installation vehicles 22 are configured to obtain the control data from the cloud computing system 110 via their wireless transceivers 112 and perform actions associated with the control data (e.g., driving, moving implements, etc.) to autonomously or semi-autonomously perform the process 30 as illustrated in FIG. 1.

The controllers 102 of the transportation vehicles 20, the unloading machinery 18, and the installation vehicles 22 each include processing circuitry 104 including a processor 106 and memory 108. The processing circuitry 104 may be communicably connected to a communications interface such that the processing circuitry 104 and the various components thereof may send and receive data via the communications interface. The processor 106 may be implemented as a general purpose processor, an application specific integrated circuit (ASIC), one or more field programmable gate arrays (FPGAs), a group of processing components, or other suitable electronic processing components.

The memory 108 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. The memory 108 may be or include volatile memory or non-volatile memory. The memory 108 may include database components, object code components, script components, or any other type of information structure for supporting the various activities and information structures described in the present application. According to an exemplary embodiment, the memory 108 is communicably connected to the processor 106 via the processing circuitry 104 and includes computer code for executing (e.g., by the processing circuitry 104 and/or the processor 106) one or more processes described herein.

In some embodiments, the controller 102 is implemented within a single computer (e.g., one server, one housing, etc.). In various other embodiments, controller 102 may be distributed across multiple servers or computers (e.g., that may exist in distributed locations). Accordingly, the controller 102 may refer to one or more computing devices that may be collocated or positioned remote from one another.

The cloud computing system 110 may similarly include the processing circuitry 104, a processor 106, and a memory 108, but may implement the processing circuitry 104 in a distributed manner. In some embodiments, the cloud computing system 110 is configured to provide a graphical user interface (GUI) (e.g., on a user device, such as a table, smartphone, or laptop computer) to an administrator of any of the vehicles or machinery that are used to process, transport, unload, and install the solar panels 16 so that the administrator may view operational characteristics or data of any of the vehicles. The cloud computing system 110 may also plan and provide route data to the transportation vehicle 20 so that the transportation vehicle 20 autonomously or semi-autonomously transports between the unloading site 12a and the installation site 12c.

Solar Panel Station

Figure 4:
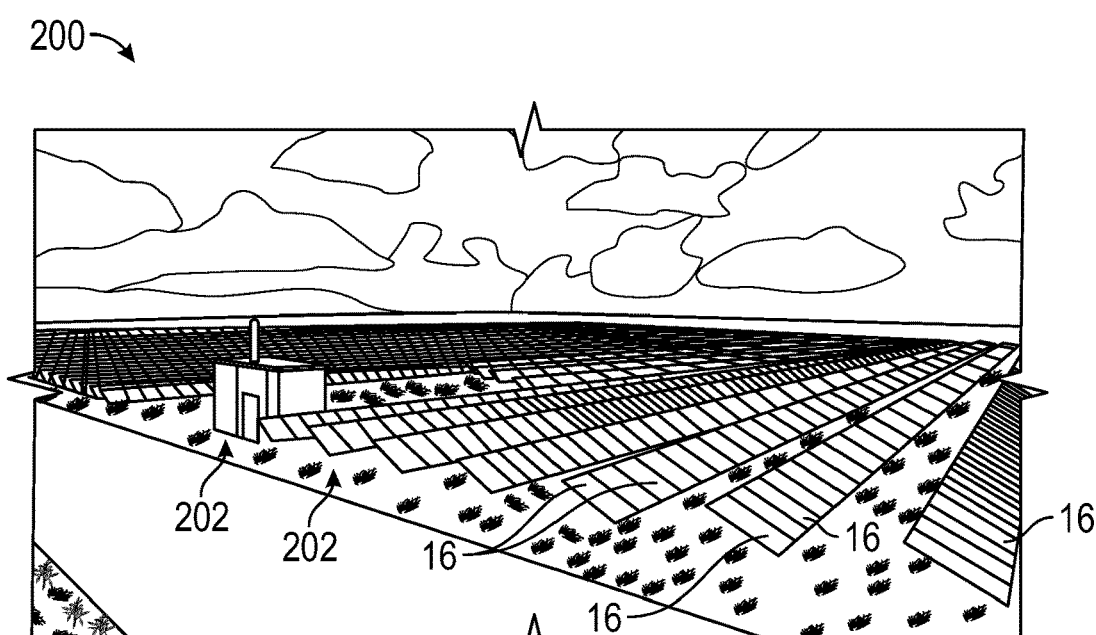
FIG. 4 is a perspective view of a system of solar panel stations, according to an exemplary embodiment.

Referring now to FIG. 4, a system of solar panel stations 200 (e.g., a solar farm, photovoltaic power station, a solar power plant, a solar park, etc.) is shown, according to an example embodiment. As shown, each of the solar panel stations 200 includes a series of rows of solar panel stations 202. Each of the solar panel stations 202 includes a series of solar panels 16 individually coupled to a support structure. According to various embodiments, each solar panel 16 may be configured to rotate about the support structure such that the solar panel is at a desired angle relative to the ground.

Figure 5:
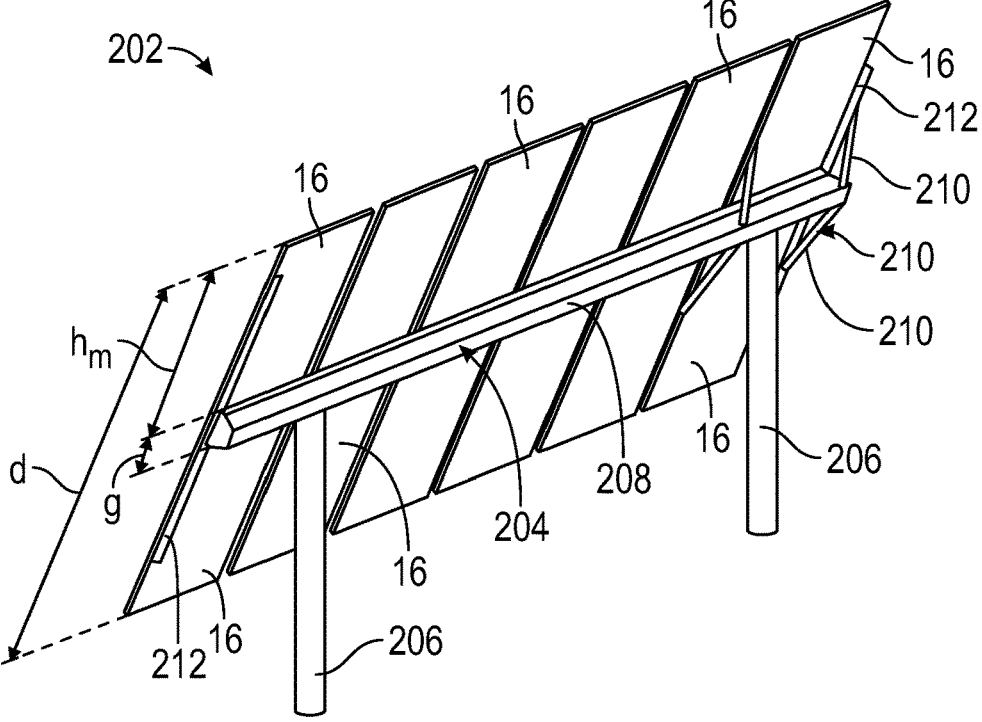
FIG. 5 is a perspective view of a solar panel station, according to an exemplary embodiment.

Referring now to FIG. 5, a perspective view of the solar panel station 202 is shown, according to an exemplary embodiment. As shown, the solar panel station 202 includes a series of solar panels 16 coupled to a support structure 204 (e.g., a frame). For example, each solar panel 16 may be coupled to the support structure 204 through a strut 210 and a purlin 212. As shown, the support structure 204 includes two posts 206 coupled to a torque tube 208 that extends along a first axis between the two posts 206. As shown, the torque tube 208 includes a flat portion configured to couple with the purlin 212 to support each solar panel 16. According to various embodiments, the solar panels 16 are configured to rotate about the torque tube 208 (e.g., rotate about the first axis).

Figure 6:
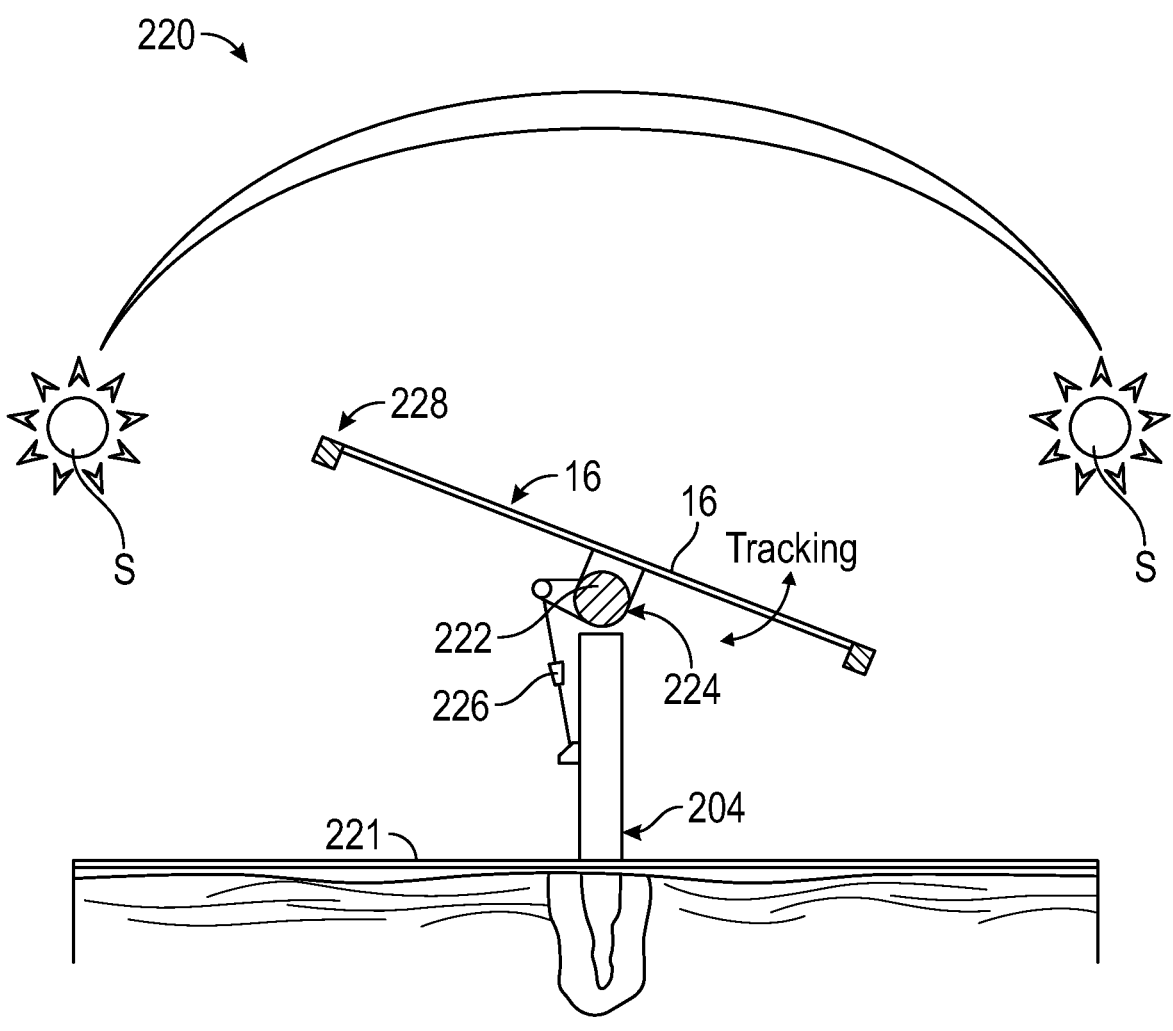
FIG. 6 is a side view of another solar panel station, according to an exemplary embodiment.

Referring now to FIG. 6, a side view of another solar panel station 220 is shown, according to an exemplary embodiment. As shown, a pair of solar panels 16 are coupled to a pair of framing members 228 and to a torque tube 222. The solar panel station 220 includes a drive mechanism 224 (e.g., a motor) coupled to the solar panels 16 and configured to change an orientation (e.g., an angle formed with the ground 221) of the solar panels 16. The solar panel station further includes a damper 226 configured to dampen the rotational speed of the solar panels 16. The drive mechanism 224 may facilitate the solar panel station 220 tracking the sun S by rotating the solar panels 16 to face the sun S as the sun S moves throughout the sky over time.

Solar Panel Installation Systems

Figure 7:
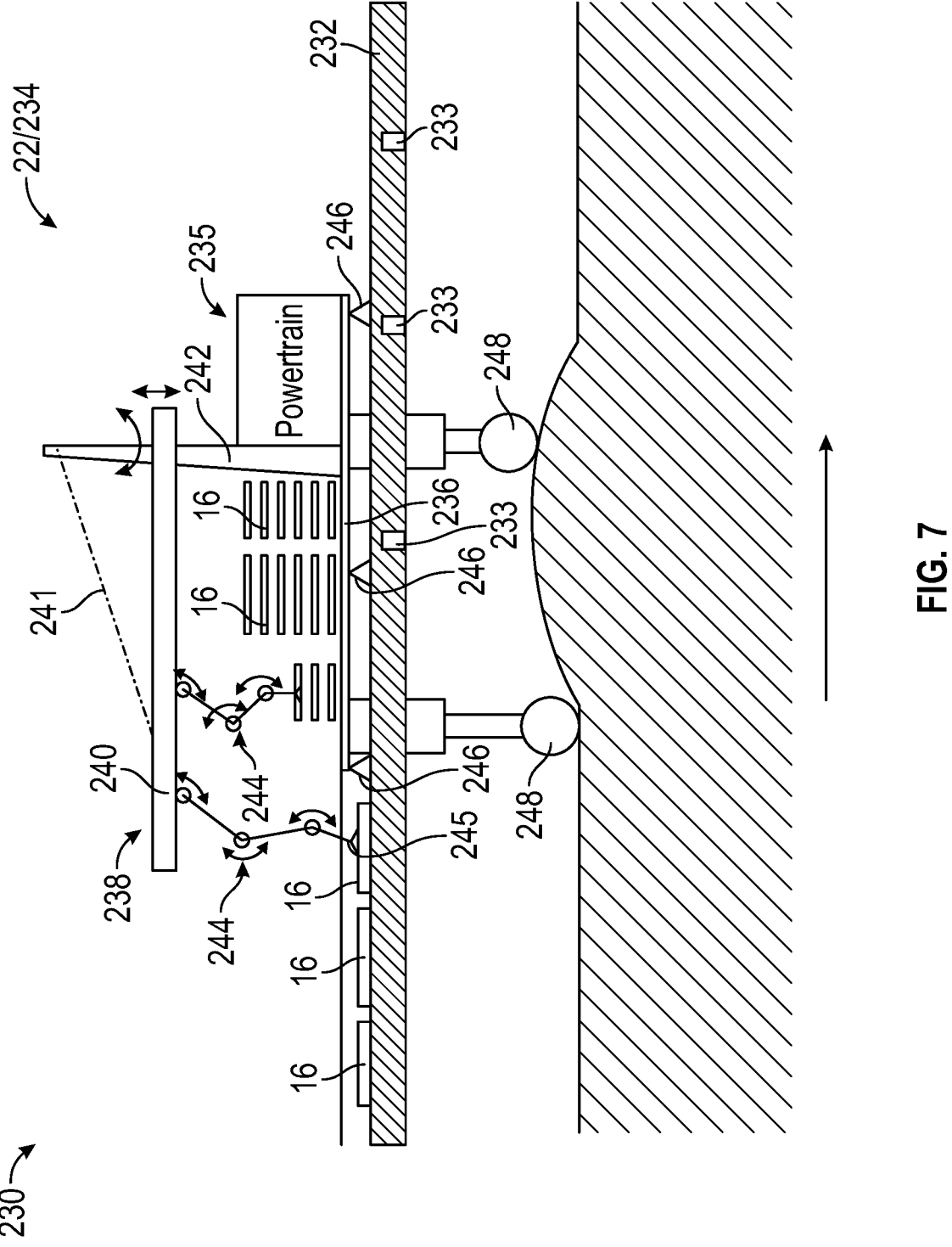
FIG. 7 is a side schematic view of an installation system, according to an exemplary embodiment.
Figure 8:
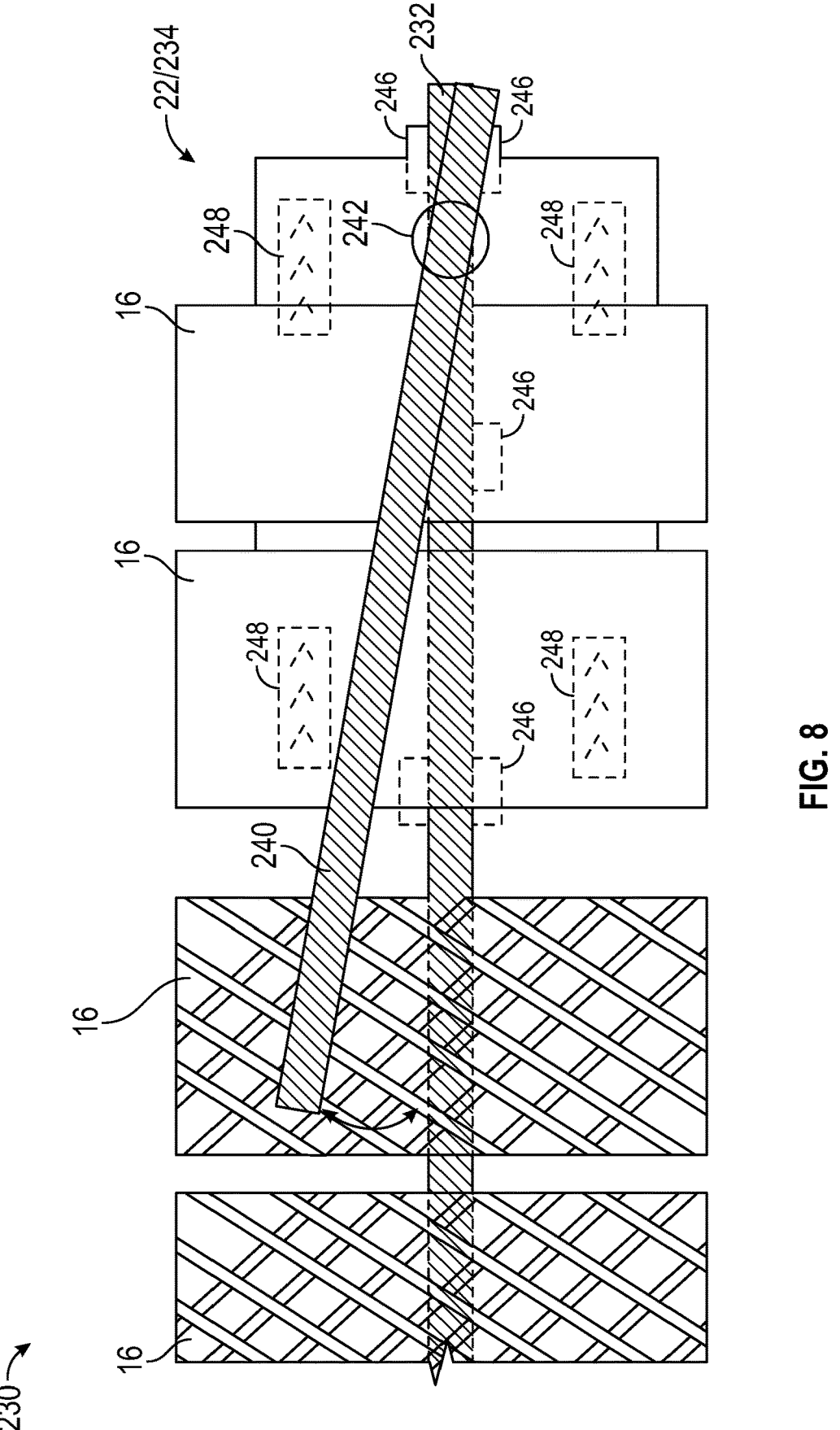
FIG. 8 is a top schematic view of the installation system of FIG. 7.

Referring now to FIGS. 7 and 8, a side schematic view and a top schematic view of an installation system 230 are shown, respectively, according to an exemplary embodiment. The installation system 230 is configured to position a solar panel 16 in a desired position with respect to a support structure 232 (e.g., a torque tube). For example, the installation system 230 may position each solar panel 16 such that the solar panel 16 may be manually secured in place or secured in place by another device/vehicle (e.g., manually or automatically). According to various embodiments, the installation system 230 may be configured to position and secure each solar panel 16 to the support structure 232. It should be appreciated that the installation system 230 may share one or more characteristics as any of the other installation systems 230 described herein.

As shown, the installation system 230 includes an installation vehicle 234 configured to translate relative to the support structure 232 such that the installation vehicle 234 may position each solar panel 16 in a desired location. For example, the installation vehicle 234 includes a power train 235 configured to drive the installation vehicle 234. Since the power train 235 is supported by the ground, and not a support structure 232, less stress is applied to the support structure 232 while installing the solar panels 16. The installation vehicle 234 includes a platform 236 configured to support a series of solar panels 16. The installation vehicle 234 further includes an implement 238 coupled to the platform 236. The implement 238 is configured to transport one or more solar panels 16 from the platform 236 to a desired position relative to the support structure 232. According to various embodiments, the implement 238 is adjustable. In the example shown in FIG. 7, the implement 238 includes a support beam 240 configured adjust vertically along a support pole 242 (e.g., as controlled by an electric or hydraulic linear actuator). The support beam 240 may be a cantilever beam that is supported at a first end (e.g., proximate the support pole 242). Further, the support beam 240 may be coupled to a guy wire 241, which is also coupled to the support pole 242. Further, the implement 238 is configured to rotate about the support pole 242 (e.g., about a vertical axis centered about the support pole 242). As shown, the implement 238 includes a series of robotic arms 244 configured to selectively couple to a solar panel 16 and transport the solar panel 16 to a desired location. As shown, the robotic arms 244 include a series of linkages configured to be controlled (e.g., via a controller within the installation vehicle 234, remotely, etc.) to position the solar panel 16 in a desired location. For example, the robotic arms 244 may be configured to provide six degrees of freedom of control of the solar panels 16. Further, according to various embodiments, each robotic arm 244 is configured to translate along the support beam 240 (e.g., to retrieve solar panels 16 positioned on the platform 236). By way of example, movement of the robotic arm 244 (e.g., engagement of an interface 245 such as a claw or suction cup at the end of the robotic arm 244, articulation of the robotic arm 244, movement of the robotic arm 244 along the support beam 240) may be effected by one or more electric motors.

As shown, the installation vehicle 234 includes one or more sensors 246. The sensors 246 may be configured to detect the location of one or more objects. For example, the sensors 246 may detect a distance between the ground and the sensor 246, the distance between the support structure 232 and the sensor 246, and/or the distance between the sensor 246 and one or more solar panels 16. According to various embodiments, the support structure 232 may include one or more indicia 233 (e.g., indicators or markings) configured to be captured one or more sensors 246. For example, the sensors 246 may include a camera configured to capture images of the indicia 233. For another example, the sensors 246 may include hall effect sensors, the indicia 233 may include permanent magnets, and the hall effect sensors may detect the presence of the magnetic field associated with each indicia 233. The indicia 233 may be spaced at predetermined increments such that the implement 238 may perform various functions in response to a sensor 246 detecting an indicia 233. For example, the implement 238 may grab a solar panel 16 from the platform 236 in response to a first indicia 233 being detected and place a solar panel 16 proximate the support structure 232 in response to a second indicia 233 being detected. In this sense, a portion of the solar panel installation process may be autonomous, and the installation vehicle 234 may automatically place the solar panels 16 at regular, predetermined intervals along the length of the support structure 232. According to various embodiments, the sensors 246 may be used to determine a location of one or more objects (e.g., using sensor readings from two or more sensors and performing triangulation calculations).

As shown, the installation vehicle 234 includes a series of tractive elements, shown as wheels 248. The height of each wheel 248 (e.g., the distance between the platform 236 and the center of the wheel 248) may be adjusted to keep the platform 236 parallel with the support structure 232. For example, the height of the wheels 248 may be adjusted in response to a change in the ground (e.g., a change in shape or incline) as detected by the one or more sensors 246. Further, the one or more sensors 246 may include load sensors (e.g., strain gauges), and the height of the wheels 248 may be adjusted to balance the loads, as desired.

As shown in FIG. 8, the installation vehicle 234 may straddle the support structure 232. For example, a first set of wheels 248 may be coupled via a first axle and a second set of wheels 248 may be coupled via a second axle, and each of the first set of wheels 248 and the second set of wheels 248 may include a wheel 248 on both sides of the support structure 232.

Figure 9:
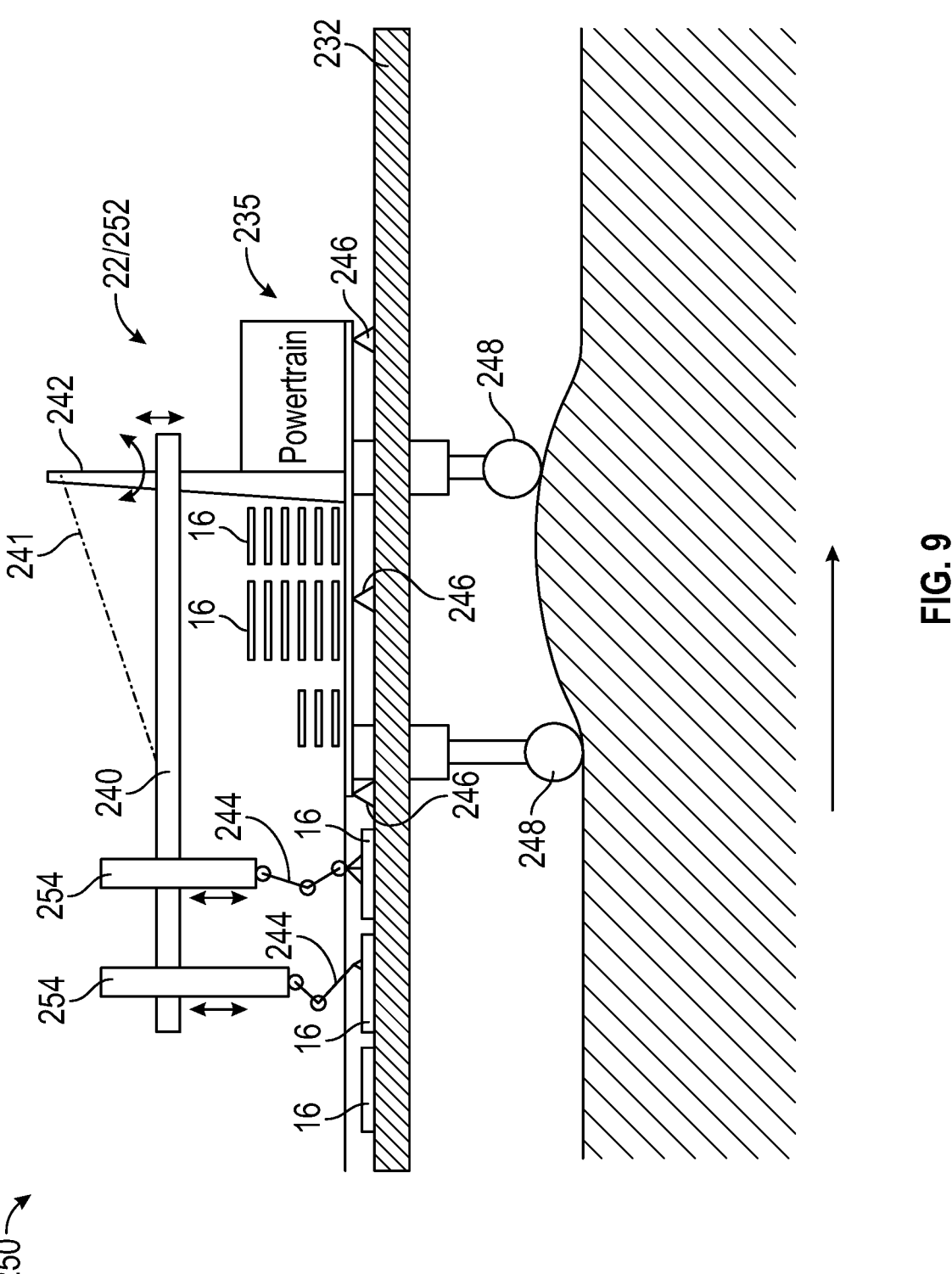
FIG. 9 is a side schematic view of another installation system, according to an exemplary embodiment.

FIG. 9 is a side schematic view of another installation system 250, according to an exemplary embodiment. Unless otherwise specified, the installation system 250 may share one or more characteristics with any of the other installation systems described herein. For example, the installation system 250 includes an installation vehicle 252 configured to straddle a support structure 232 during the installation of solar panels 16.

As shown, the installation vehicle 252 includes a series of robotic arms 244. Each robotic arm is coupled to the support beam 240 by a track 254. Each track 254 may move longitudinally along the length of the support beam 240 (e.g., as controlled by an electric motor). According to various embodiments, the robotic arms 244 are configured to translate (e.g., vertically) along the tracks 254 (e.g., as controlled by one or more electric motors) such that the height of the robotic arms 244 may be adjusted for increased maneuverability.

Figure 10:
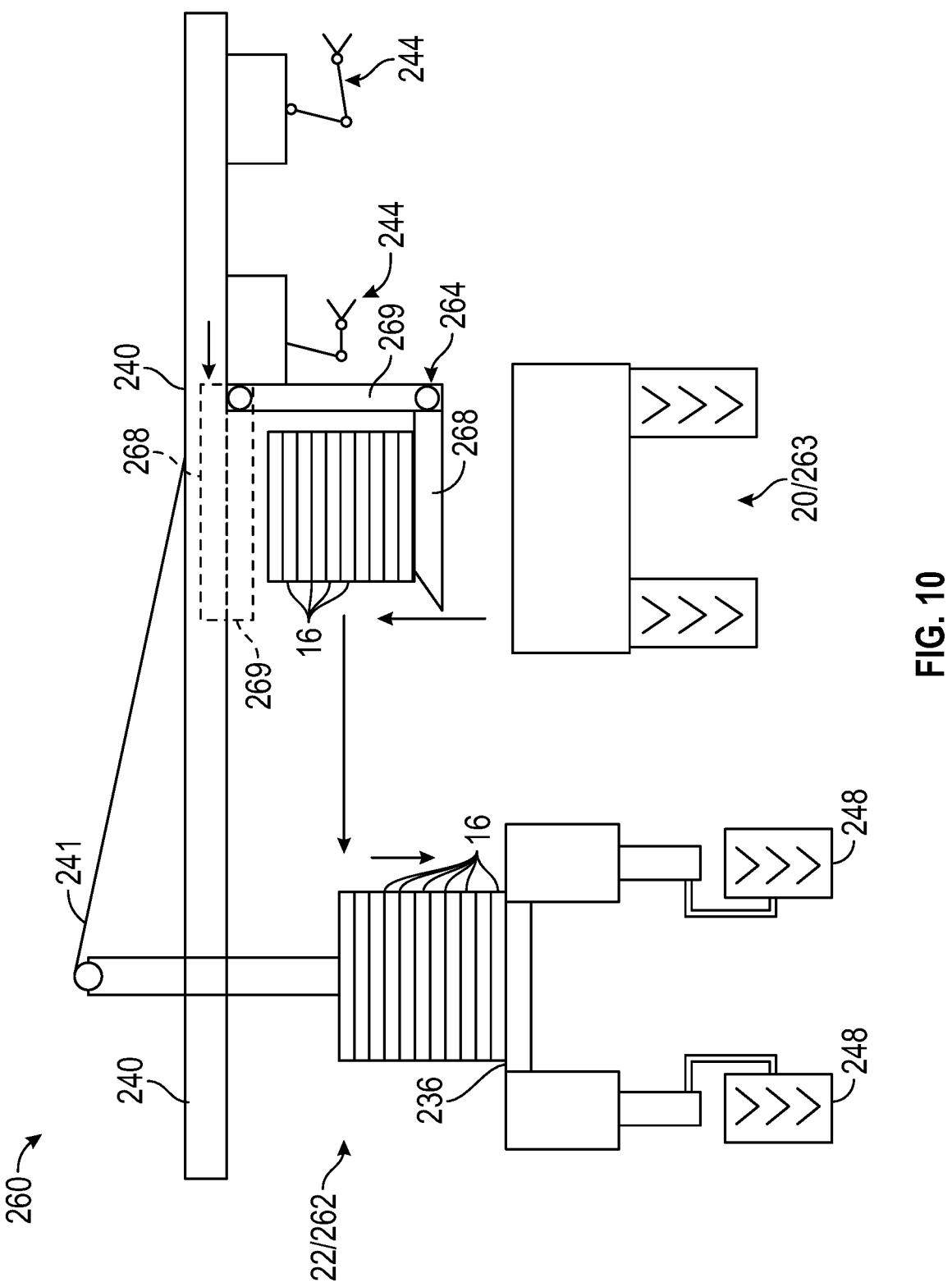
FIG. 10 is a rear schematic view of an installation system, according to an exemplary embodiment.

Referring now to FIG. 10, a rear schematic view of another installation system 260 is shown, according to an exemplary embodiment. Unless otherwise specified, the installation system 260 may share one or more characteristics with any of the other installation systems described herein. For example, the installation system 260 includes an installation vehicle 262 configured to straddle a support structure (e.g., the support structure 232) during the installation of solar panels 16.

As shown, the installation vehicle 262 includes a solar panel interface, shown as lifting mechanism 264, coupled to a support beam 240. The lifting mechanism 264 includes a pair of forks 268 rotatably coupled to a linkage 269. The linkage 269 is rotatably coupled to the support beam 240. According to various embodiments, the lifting mechanism 264 may fold up (e.g., from an active position shown in solid lines in FIG. 10) and be stowed away (e.g., in a stowed position shown in dashed lines in FIG. 10) when not in use. The lifting mechanism may include one or more actuators (e.g., electric linear actuators) that control the folding and unfolding of the forks 268 and the linkage 269. Further, the lifting mechanism 264 may translate along the support beam 240 (e.g., under the power of an electric motor). For example, when retrieving a solar panel 16, or a pallet of solar panels 16, from a delivery vehicle 263 (e.g., a transportation vehicle 20), the support beam 240 may be positioned over the delivery vehicle 263 (e.g., rotated into a desired location), the forks 268 may be deployed and coupled to (e.g., positioned beneath) one or more solar panels 16, and the lifting mechanism 264 may then translate along the support beam 266 to place the one or more solar panels 16 onto a platform 236 on the installation vehicle 262.

Figure 11:
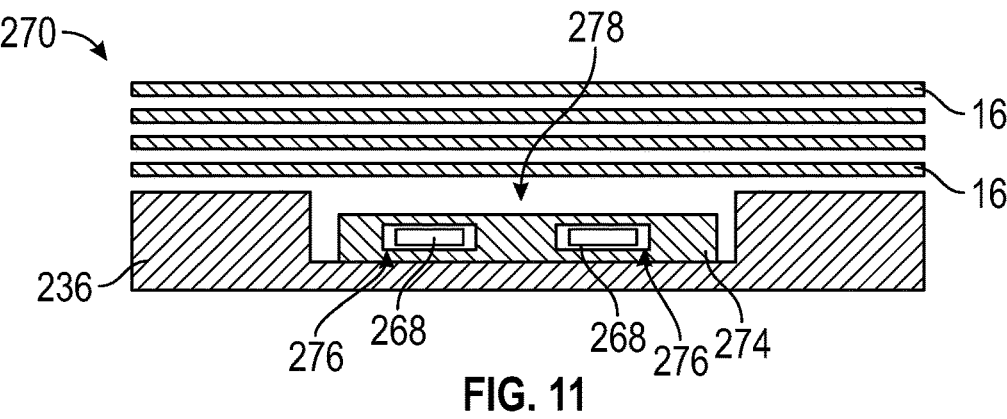
FIG. 11 is a side schematic view of a storage device, according to an exemplary embodiment.

Referring now to FIG. 11, a side schematic view of a storage device 270 is shown, according to an exemplary embodiment. The storage device 270 may be utilized by any of the installation vehicles disclosed herein. As shown, the storage device 270 includes a pallet 274 positioned within a central cavity or recess 278 of the platform 236. According to various embodiments, the storage device 270 may be used to transport one or more solar panels 16 from an offsite location to a desired location. The pallet 274 may be used to transfer the solar panels 16 from a delivery vehicle onto the platform 236. The pallet 274 loaded with solar panels 16 may be placed within the recess 278 and lowered until the solar panels are supported by the platform 236 of the installation vehicle. The pallet 274 may then be removed from the platform 236. As shown, the pallet 274 includes a pair of openings 276 each configured to receive a fork 268 to engage the pallet 274 with the installation vehicle.

Figure 12:
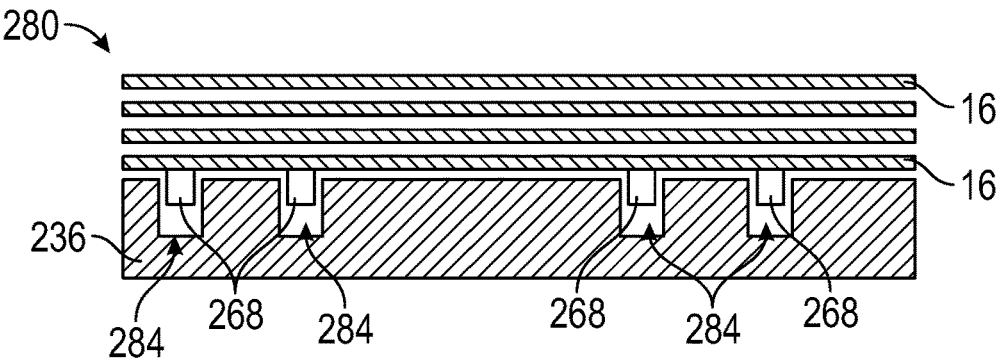
FIG. 12 is a side schematic view of another storage device, according to an exemplary embodiment.

Referring now to FIG. 12, a side schematic view of a storage device 280 is shown, according to an exemplary embodiment. The storage device 280 may represent an alternative embodiment of the storage device 270. As shown, in the storage device 280, the platform 236 defines a series of openings or recesses 284 that each open upward toward an upper surface of the pallet 282. Each of the recesses 284 is configured to receive a fork 268 such that the forks 268 may be used to lift and transport the solar panels 16 directly without transporting a pallet. The recesses 284 may provide clearance for the forks 268 when setting the solar panels 16 on the platform 236.

Figure 13:
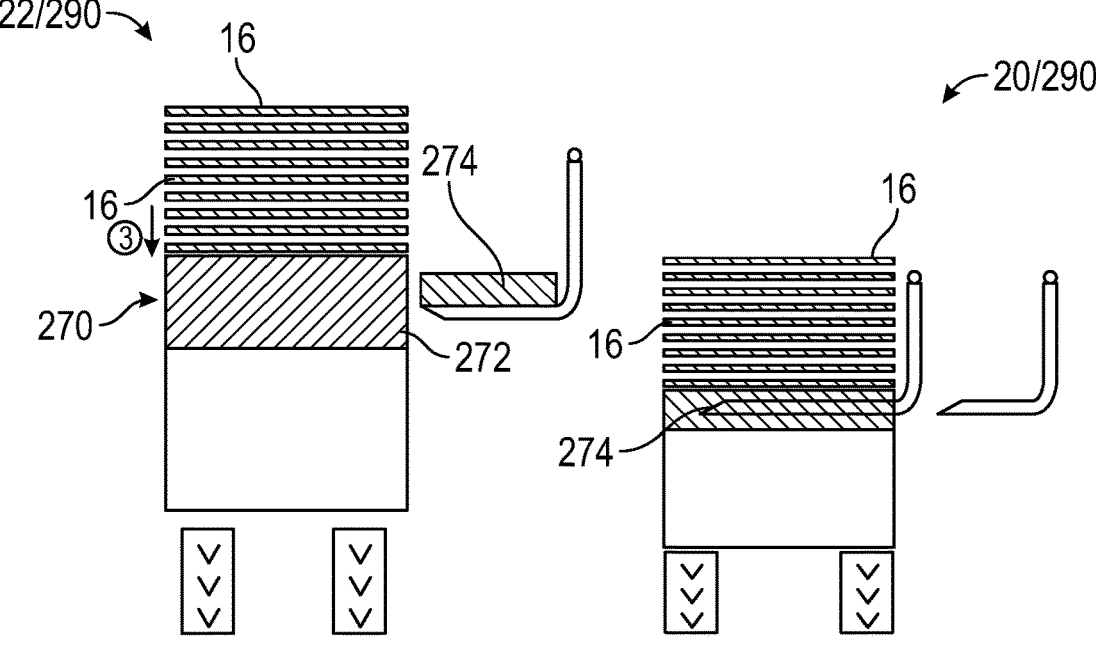
FIG. 13 is a schematic view of an installation vehicle, a delivery vehicle, and the storage device of FIG. 11, according to an exemplary embodiment.

Referring now to FIG. 13 is a schematic view of an interaction between an installation vehicle 290 and a delivery vehicle 292 using the storage device 270 of FIG. 11 is shown, according to an exemplary embodiment. The installation vehicle 290 may represent any of the installation vehicles described herein. The delivery vehicle 292 may represent any of the delivery vehicles described herein. According to various embodiments, to begin unloading the solar panels 16 from the delivery vehicle 292, forks 268 of the installation vehicle 290 may be inserted into the pallet 274 while the pallet 274 is positioned on top of the delivery vehicle 292 and beneath a stack of solar panels 16. The pallet 274 may then be lifted and delivered to the installation vehicle 290. The pallet 274 may be placed within the recess 278 of the platform 236, and the forks 268 may be lowered until the solar panels 16 are fully supported by the platform 236. Subsequently, the pallet 274 may be removed from the recess 278 while the solar panels 16 remain on the platform 236.

Figure 14:
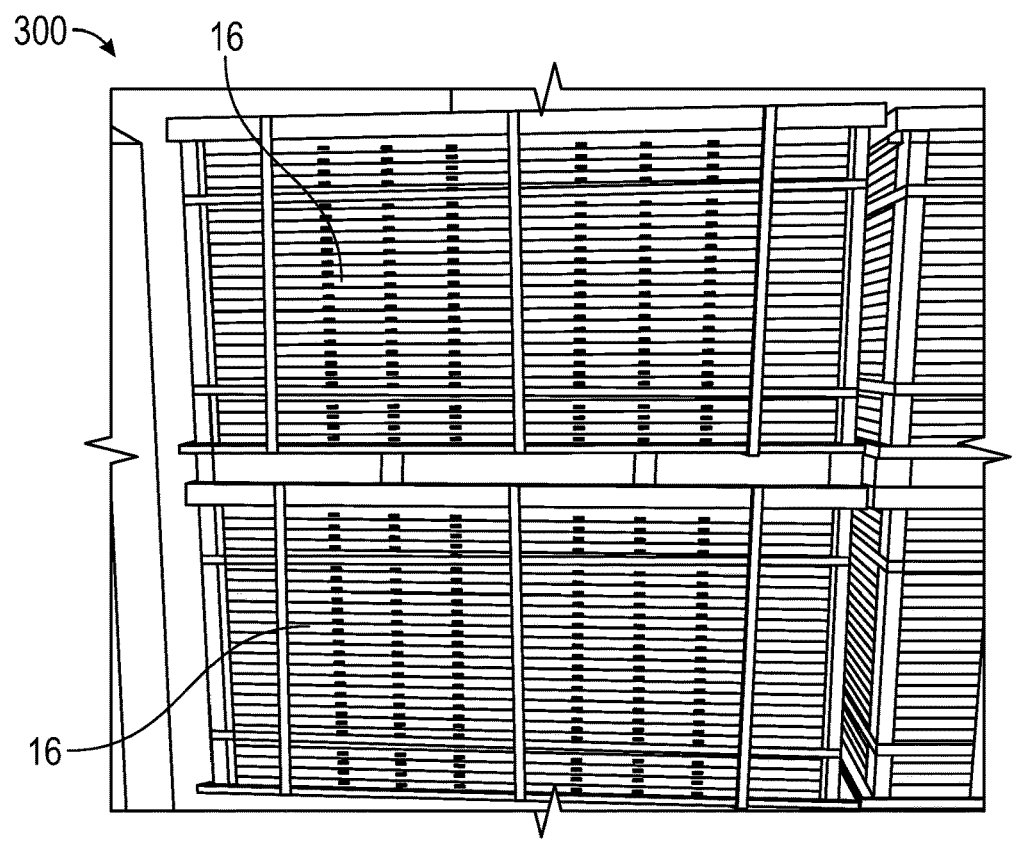
FIG. 14 is a perspective view of a storage device, according to an exemplary embodiment.
Figure 15:
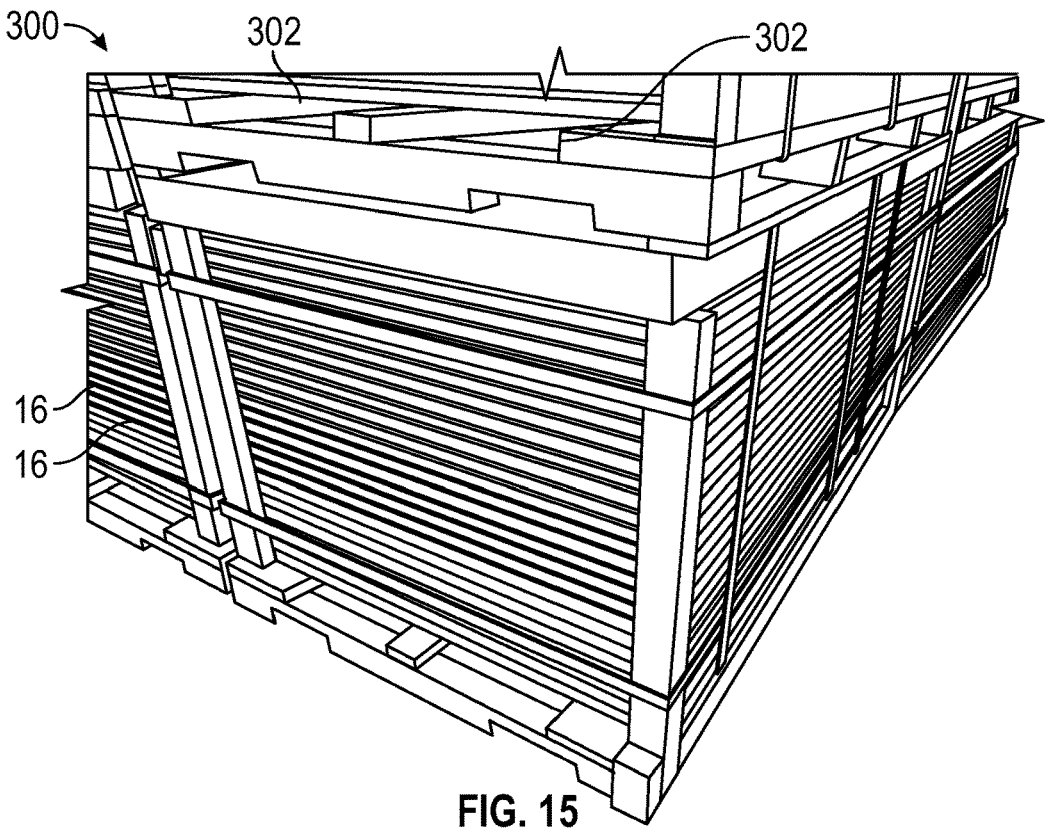
FIG. 15 is another perspective view of the storage device of FIG. 14.

Referring now to FIGS. 14 and 15, perspective views of a storage device 300 are shown, according to an example embodiment. The storage device 300 may be used to protect the solar panels 16 during transportation. As shown in FIG. 15, the storage device 300 includes openings between the solar panels 16 and the frame of the storage device 300 thereby allowing a fork to lift the solar panels 16 off the base without carrying the entire storage device 300.

Figure 16:
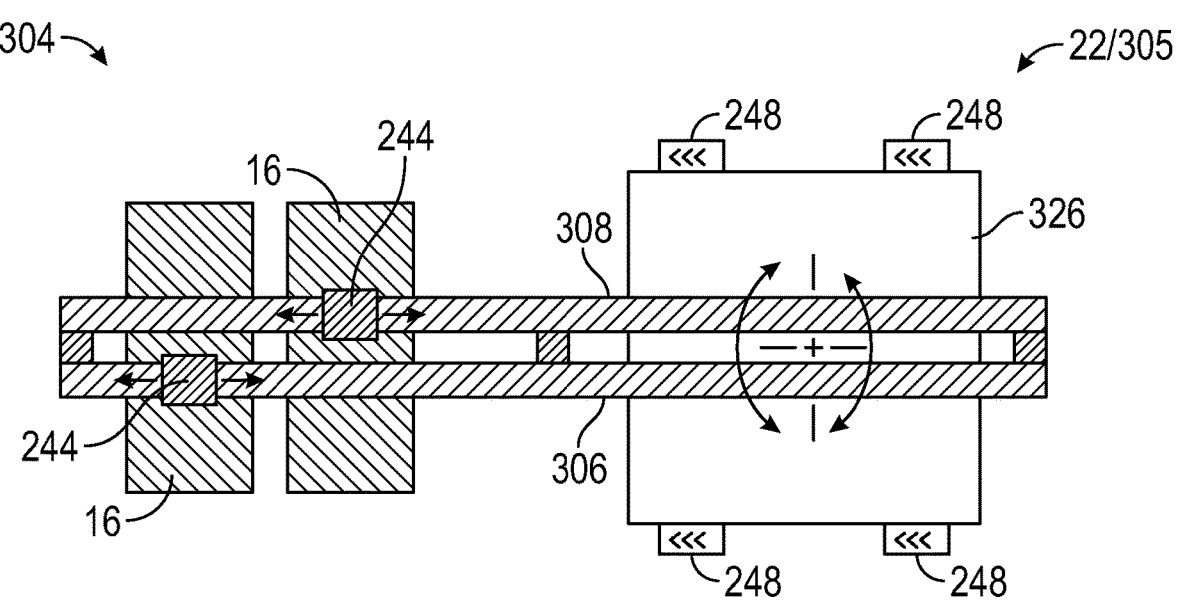
FIG. 16 is a top schematic view of another installation system, according to an exemplary embodiment.

Referring now to FIG. 16, a top schematic view of another installation system 304 is shown, according to an exemplary embodiment. Unless otherwise specified, the installation system 304 may share one or more characteristics with any of the other installation systems described herein. For example, the installation system 304 includes an installation vehicle 305 configured to straddle a support structure 232 during the installation of solar panels 16. As shown, the installation vehicle 305 includes a first support beam 306 and a second support beam 308 configured to rotate relative to the platform 236 of the installation vehicle 305. Further, the installation vehicle 305 includes a pair of robotic arms 244 configured to selectively couple to the solar panels 16. As shown, the robotic arms 244 may translate along the first support beam 306 and the second support beam 308, respectively.

Figure 17:
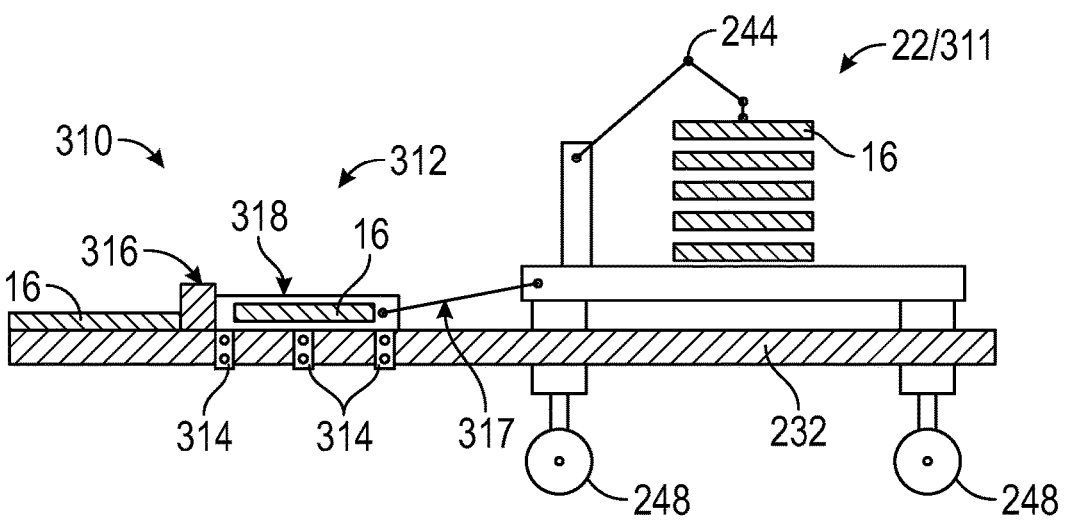
FIG. 17 is a side schematic view of another installation system, according to an exemplary embodiment.

Referring now to FIG. 17, a side schematic view of another installation system 310 is shown, according to an exemplary embodiment. Unless otherwise specified, the installation system 310 may share one or more characteristics with any of the other installation systems described herein. For example, the installation system 310 includes an installation vehicle 311 configured to straddle a support structure 232 during the installation of solar panels 16.

As shown, the installation system 310 includes an alignment device, shown as a sled 312, coupled to the installation vehicle 311 via a linkage 317. The linkage 317 may limit longitudinal movement of the sled 312 relative to the installation vehicle 311 while permitting vertical and lateral movement of the sled 312, causing the sled 312 to move with the installation vehicle 311 while permitting the sled 312 to ride the support structure 232. According to various embodiments, the sled 312 is supported by the support structure 232 and configured to translate along the support structure 232. For example, the sled 312 includes a series of rollers that engage the support structure 232, coupling the sled 312 to the support structure 232. According to various embodiments, the installation vehicle 311 is configured to transport or deposit one or more solar panels 16 into a cavity 318 within the sled 312, such that the solar panels 16 may be coupled to the support structure 232 through the sled 312. The sled 312 further includes a series of attachment mechanisms 316 configured to secure the solar panel 16 to the support structure 232. By way of example, the attachment mechanism 316 may install (e.g., by turning or pressing) one or more fasteners to secure solar panels 16 to the support structure 232. As the installation vehicle 311 and the sled 312 move along the length of the support structure 232, the installation vehicle 311 supplies solar panels 16 to the sled 312, the attachment mechanism 316 installs the solar panels 16, and the sled 312 releases the solar panels 16 once installed. This process may be repeated to install multiple solar panels 16 along the length of the support structure 232.

In an alternative embodiment, the rollers 314 are omitted, and the sled 312 rests directly on the support structure 232 when in use. The sled 312 aligns and installs the solar panels 16 on the support structure 232. Once installed, the linkage 317 lifts (e.g., using one or more actuators) the sled 312 off of the support structure 232 to provide clearance between the sled 312 and the support structure 232 as the installation vehicle 311 moves along the support structure 232.

Figure 18:
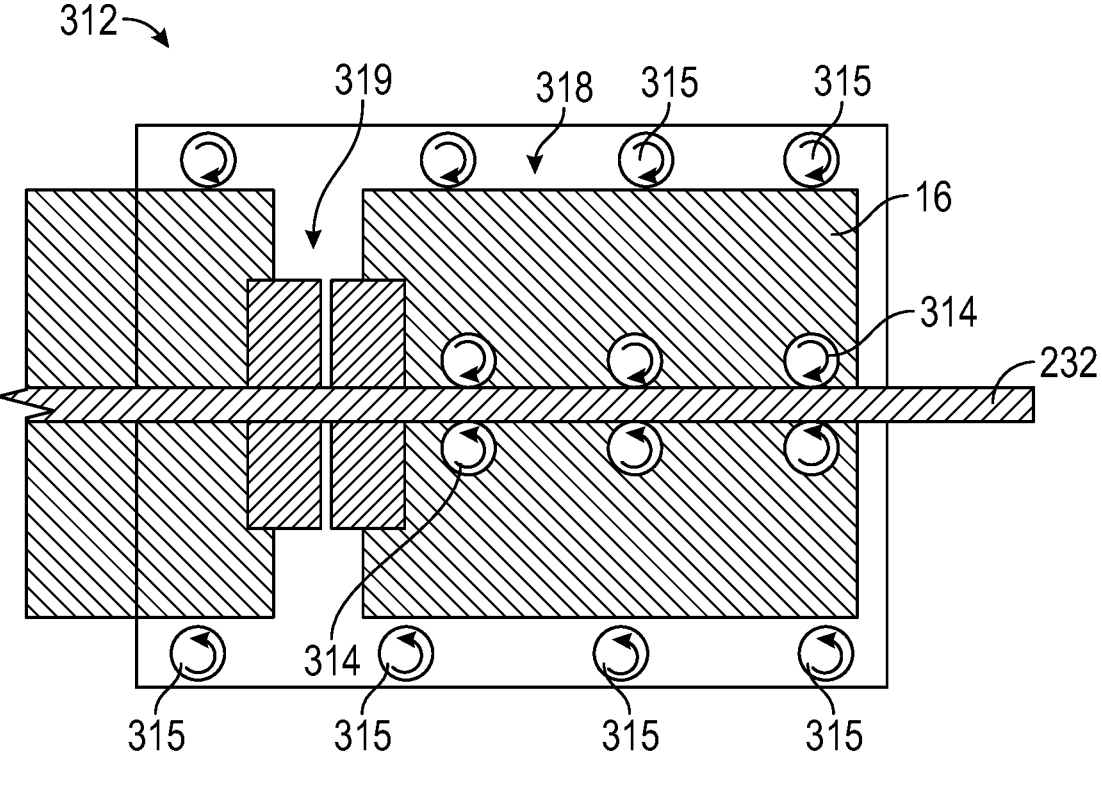
FIG. 18 is a top schematic view of the alignment tool of FIGS. 16 and 17.

Referring now to FIG. 18, a top schematic view of the sled 312 of FIG. 17 is shown. As shown, the sled 312 includes a series of actuators, shown as advancement rollers 315. Each of the advancement rollers 315 is configured to engage a side surface of one of the solar panels 16 (e.g., such that each solar panel 16 is held between at least two advancement rollers 315) and rotate to cause the solar panel 16 to translate relative to the sled 312 and the support structure 232. By way of example, the installation vehicle 311 may supply the solar panels 16 individually at the right side of the sled 312, and the advancement rollers 315 may index the solar panels 16 leftward as shown in FIG. 18. Once each solar panel 16 is in a desired location, a securing mechanism 319 (e.g., a clamp) is used to secure the solar panel 16 to the support structure 232. The securing mechanism 319 may be engaged manually or by the attachment mechanism 316.

Figure 19:
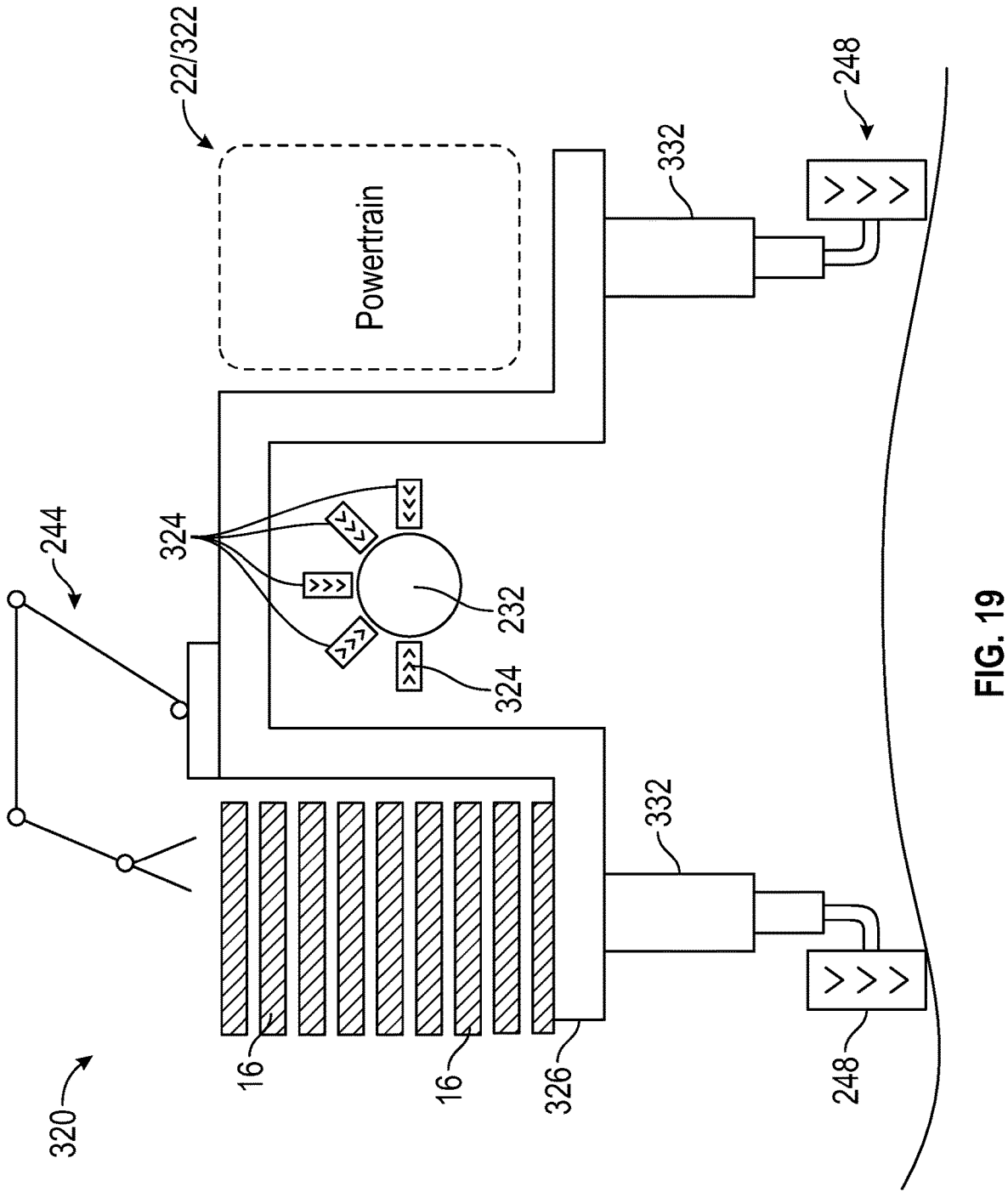
FIG. 19 is a front schematic view of another installation system, according to an exemplary embodiment.
Figure 20:
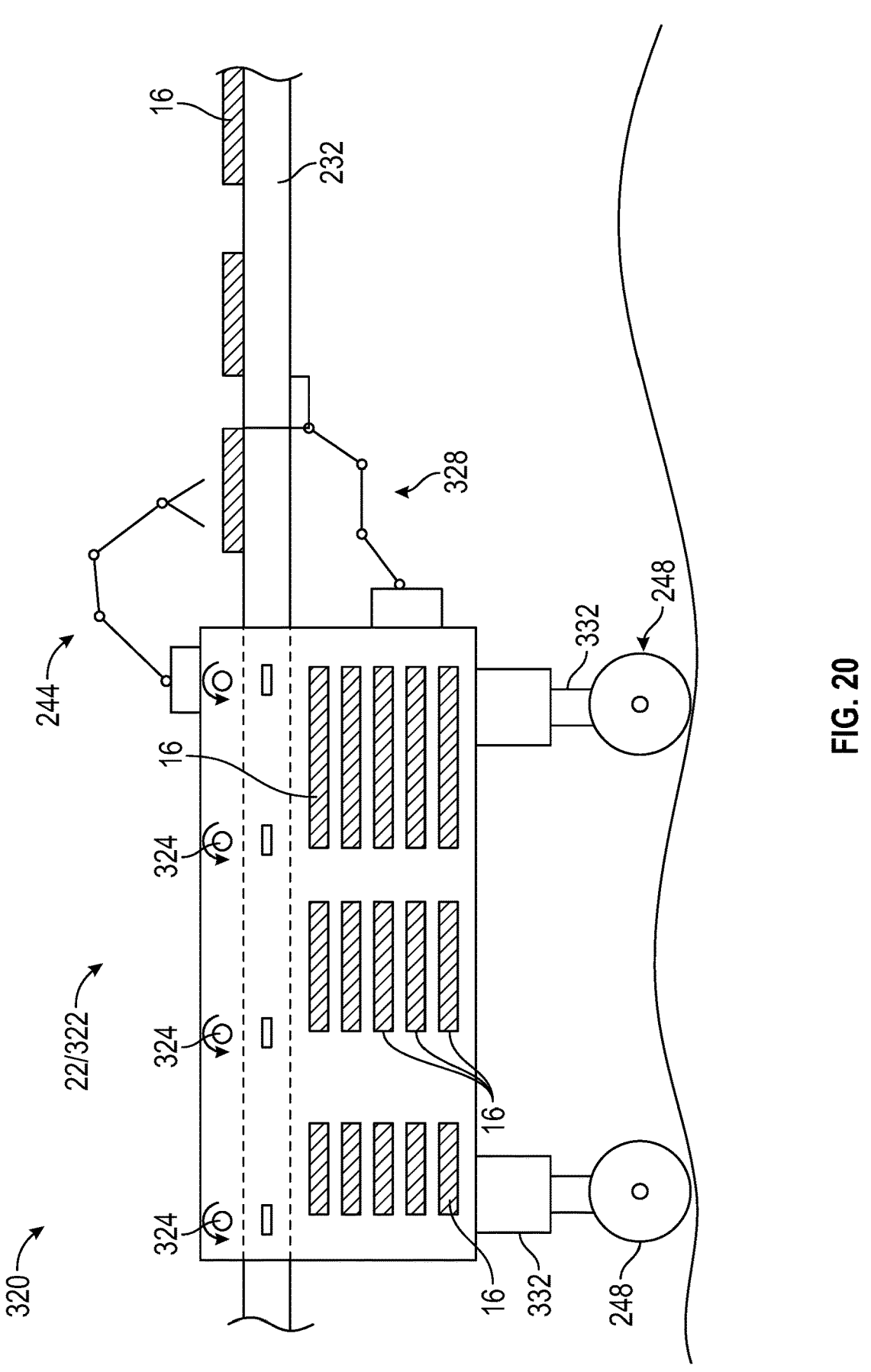
FIG. 20 is a side schematic view of the installation system of FIG. 19.

Referring now to FIGS. 19 and 20, a front schematic view and a side schematic view of another installation system 320 are shown, respectively, according to an exemplary embodiment. Unless otherwise specified, the installation system 320 may share one or more characteristics with any of the other installation systems described herein. For example, the installation system 320 includes an installation vehicle 322 configured to straddle a support structure 232 during the installation of solar panels 16. As shown, the installation vehicle includes a platform 236 and one or more robotic arms 244 configured to transport solar panels 16 from the platform 236 into a desired location proximate the support structure 232.

As shown, the installation vehicle 322 includes a centering device or centering assembly, shown as rollers 324, configured to cause the installation vehicle 322 to remain centered on the support structure 232. The rollers 324 are rotatably coupled to the platform 236. As shown, the rollers 324 are arranged along the upper half of the circumference of the support structure 232. Accordingly, the rollers 324 limit downward movement and lateral movement of the platform 236 relative to the support structure 232. The rollers 324 may be powered or unpowered.

The installation vehicle 322 includes a series of tractive elements, shown as wheels 330, each coupled to the platform 236 by a suspension element 332 (e.g., a spring and/or damper). One or more sensors (e.g., force sensors, load sensors, etc.) may be configured to detect a minimum threshold force being applied to one or more of the rollers 324. This force may indicate a portion of the weight of the installation vehicle 322 that is supported by the support structure 232. In response, a controller (e.g., the controller 102) may cause the suspension elements 332 to adjust the height of each wheel 330 (e.g., the vertical position of the wheel 330 relative to the platform 236) to maintain a desired position of the installation vehicle 322 proximate the support structure 232. According to alternative embodiments, the centering device may include one or more sensors configured to detect a distance between the installation vehicle 322 and the support structure 232. In response to a deviation from a desired distance being detected, the controller may cause the suspension elements 332 and/or steering of the installation vehicle 322 to be adjusted to maintain a desired position of the installation vehicle 322 proximate the support structure 232.

Figure 21:
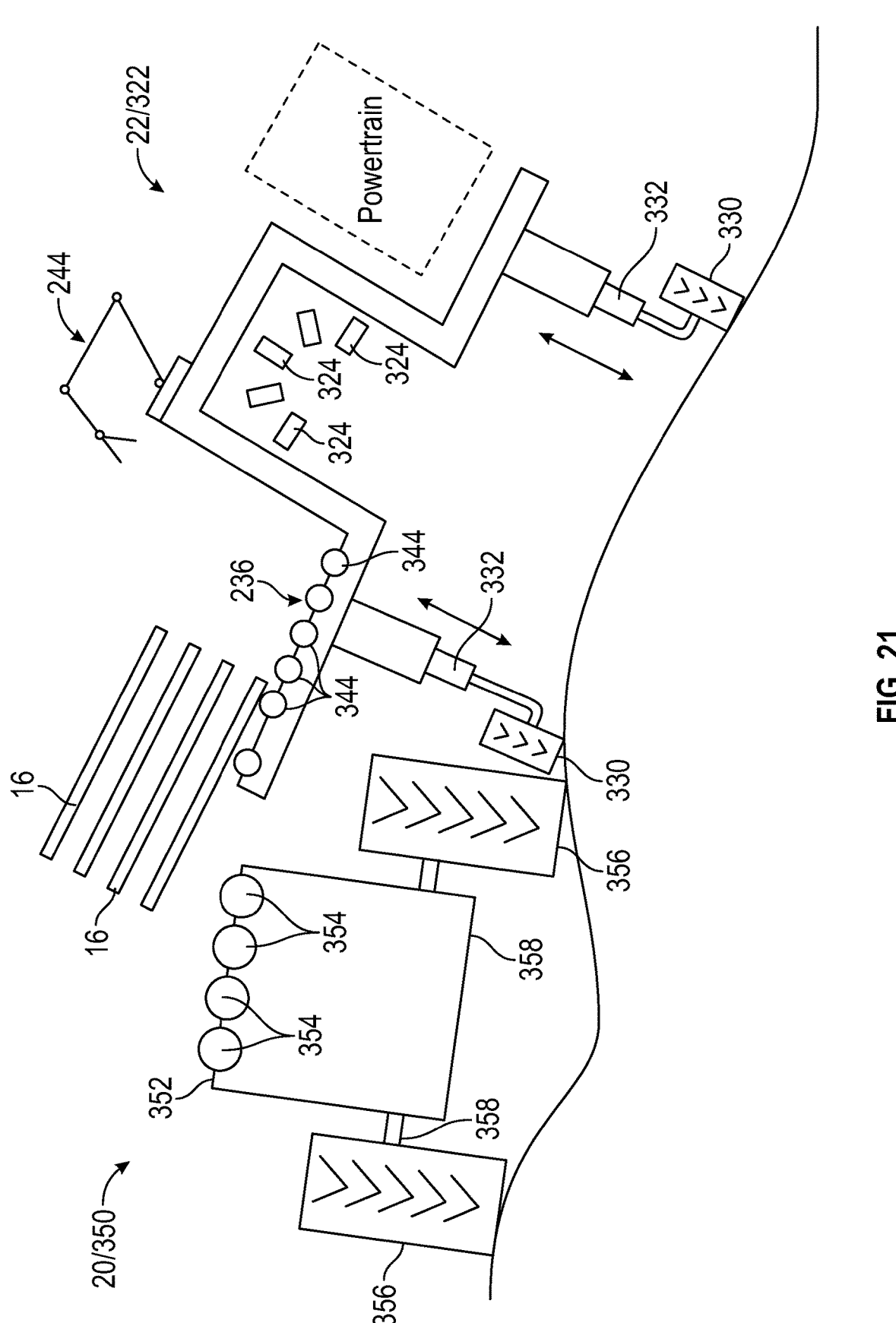
FIG. 21 is a front schematic view of the installation vehicle of FIG. 19 and a delivery vehicle, according to an exemplary embodiment.

Referring now to FIG. 21, an interaction between the installation vehicle 322 and a delivery vehicle 350 is shown, according to an exemplary embodiment. The delivery vehicle 350 may be substantially similar to any of the other delivery vehicles disclosed herein, except as otherwise specified. As shown, the delivery vehicle 350 includes a platform 352 configured to support one or more solar panels 16 for transportation. As shown, the delivery vehicle 350 includes a series of rollers 354 configured to interface with the solar panels 16 (e.g., by supporting the solar panels 16 from below). According to various embodiments, the rollers 354 may be driven (e.g., by an electric motor). For example, a motor may cause the rollers 354 to rotate (e.g., individually, in unison, etc.) such that the solar panels 16 translate (e.g., laterally) relative to the platform 352 in response to the rollers 354 rotating. In this sense, the solar panels 16 may be transferred from atop the delivery vehicle 350 toward the installation vehicle 322.

As shown, the installation vehicle 322 includes a series of rollers 344 positioned on the platform 236 and configured to interface with the solar panels 16 (e.g., by supporting the solar panels 16 from below). According to various embodiments, the rollers 344 may be driven. For example, a motor may cause the rollers 344 to rotate (e.g., individually, in unison, etc.) such that the solar panels 16 translate (e.g., laterally) relative to the platform 342 in response to the rollers 344 rotating.

According to various embodiments, the delivery vehicle 350 includes a series of tractive elements, shown as wheels 356, each coupled to the platform 352 by an adjustable suspension component, shown as suspension element 358 (e.g., a spring and/or damper). According to various embodiments, the adjustable suspension 358 is configured to adjust the tire height of the delivery vehicle 350 (e.g., the vertical position of each wheel 356). According to various embodiments, the tire height may be individually adjusted to create a desired angle between the platform 352 and the ground. According to various embodiments, the tire heights of the installation vehicle 322 may be individually adjusted to create a desired angle between the platform 236 and the ground. For example, the suspension elements 358 of the delivery vehicle 350 may cause the platform 352 to rotate towards the installation vehicle 322 such that the solar panels 16 roll off the platform 352 and onto the platform 236. According to various embodiments, the installation vehicle 322 may adjust the suspension elements 332 to match the angle of the platform 236 to the platform 352 of the delivery vehicle 350 and/or place the platform 236 inline with the platform 352 to facilitate transfer of the solar panels 16 from the delivery vehicle 350 to the installation vehicle 340.

Figure 22:
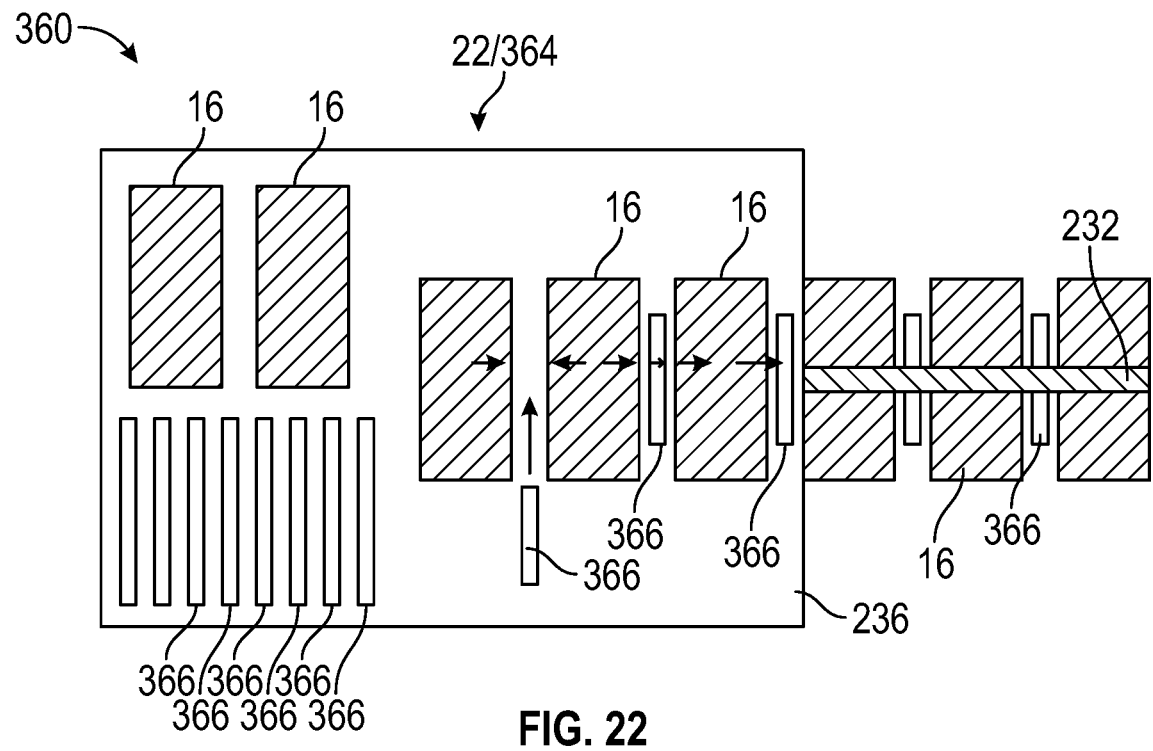
FIG. 22 is a top schematic view of an installation system, according to an exemplary embodiment.
Figure 23:
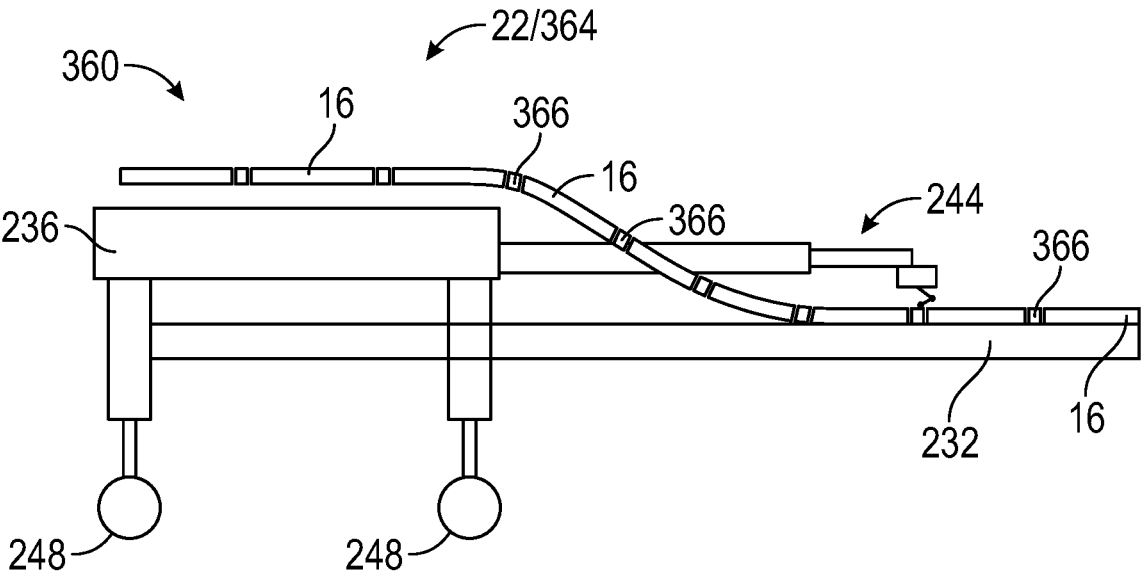
FIG. 23 is a side schematic view of the installation system of FIG. 22.

Referring now to FIGS. 22 and 23, a top schematic view and a side schematic view of an installation system 360 are shown, respectively, according to an exemplary embodiment. Unless otherwise specified, the installation system 360 may share one or more characteristics with any of the other installation systems described herein. For example, the installation system 360 includes an installation vehicle 364 configured to straddle a support structure 232 during the installation of solar panels 16.

As shown, the installation system 360 includes a series of connectors 366 (e.g., couplers, clamps, fasteners, subframes, etc.). According to various embodiments, the connectors 366 are configured to couple a first solar panel 16 to a second solar panel 16. As shown, the connectors 366 may be used to couple a series of solar panels 16 together while at least one of the solar panels 16 is positioned on the platform 362. The robotic arm 368 may then position the chain of solar panels 16 and connectors 366 in a desired location with respect to the support structure 232. The installation vehicle 364 may pay out the preassembled chain onto the support structure 232 (e.g., as controlled by the robotic arm 244), and the solar panels 16 may be fixed to the support structure 232. By preassembling the chain, the relative positions of the solar panels 16 may be constrained prior to the solar panels 16 exiting the installation vehicle 364.

Figure 24:
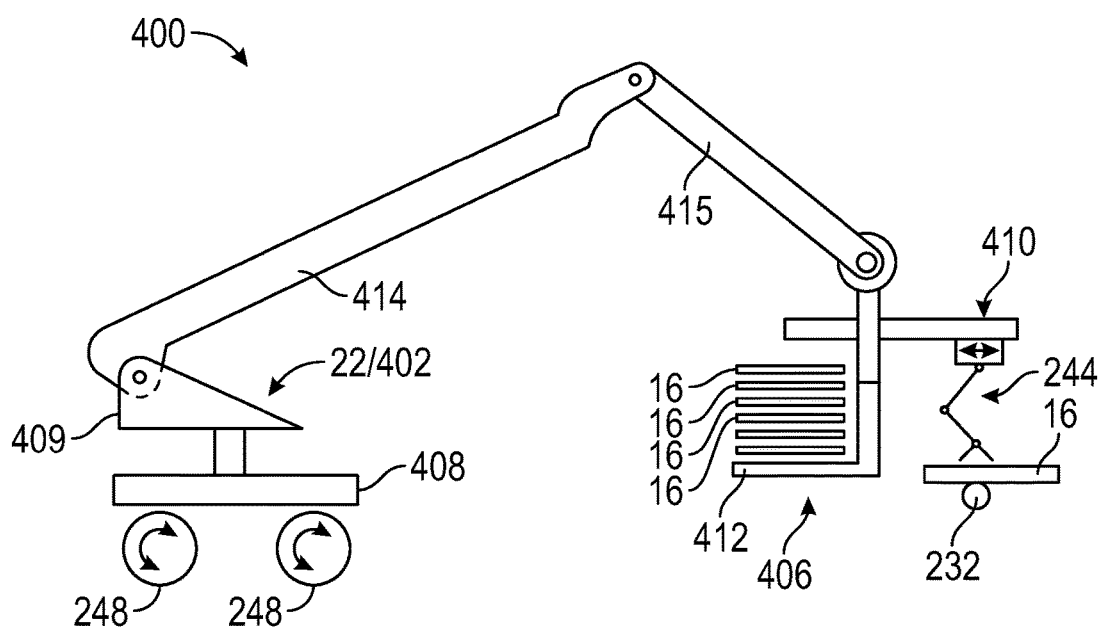
FIG. 24 is a side schematic view of another installation system, according to an exemplary embodiment.
Figure 25:
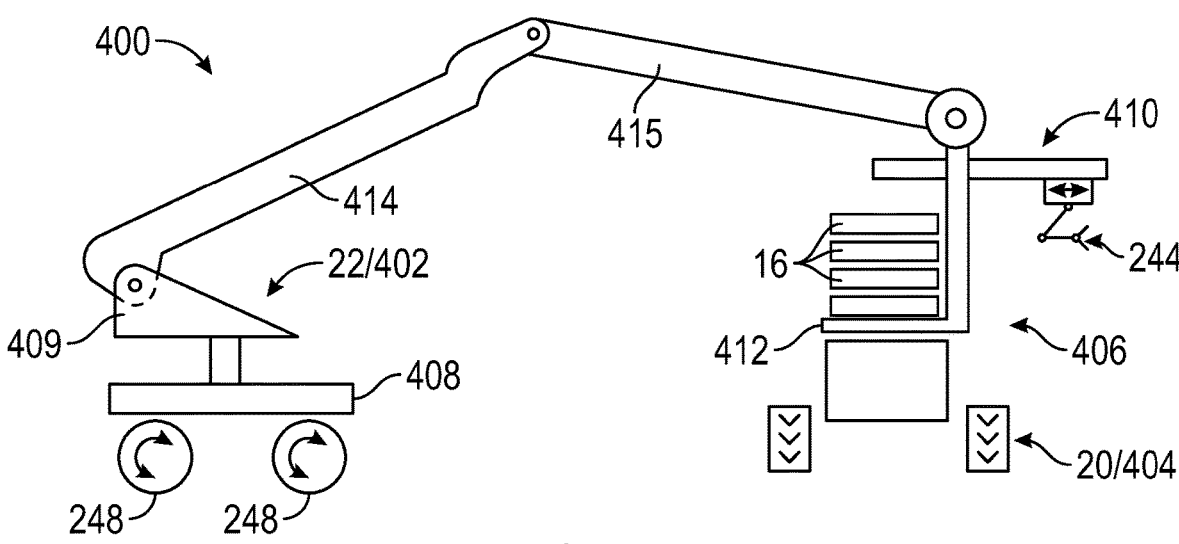
FIG. 25 is a side schematic view of another installation system, according to an exemplary embodiment.

Referring now to FIGS. 24 and 25, side schematic views of another installation system 400 are shown, according to an exemplary embodiment. Unless otherwise specified, the installation system 400 may share one or more characteristics with any of the other installation systems described herein. For example, the installation system 400 includes an installation vehicle 402 configured to position solar panels 16 in a desired location with respect to the support structure 232 during the installation of solar panels 16. Further, the installation system 400 includes a delivery vehicle 404 configured to transport one or more solar panels 16 to an installation site such that the installation vehicle 402 may position the solar panels 16 in a desired location proximate the support structure 232.

As shown, the installation vehicle 402 includes a base 408 coupled to the wheels 248 and turntable 409 rotatably coupled to the base 408. The installation vehicle 402 further includes a boom including a series of linkages or boom sections, shown as base boom section 414 and fly boom section 415. A proximal end of the base boom section 414 is pivotably coupled to the turntable 409. A proximal end of the fly boom section 415 is pivotably coupled to a distal end of the base boom section 414. The installation vehicle 402 further includes a platform assembly 406 rotatably coupled to a distal end of the fly boom section 415. As shown, the platform assembly 406 is configured to support one or more solar panels. The platform assembly 406 includes a horizontal support portion, shown as platform 412, that may be inserted below the solar panels 16 while the solar panels 16 are positioned on the delivery vehicle 404 such that the platform assembly 406 may lift the solar panels 16 off the delivery vehicle 404. As shown, the platform assembly 406 includes a robotic arm 244 coupled to the platform 412 via a rail 410. The rail 410 is configured to allow the robotic arm 244 to translate longitudinally along the rail 410. The robotic arm 244 is configured to selectively couple to one or more solar panels 16 and transport the one or more solar panels 16 from the platform 412 to a desired location (e.g., on the support structure 232).

Figure 26:
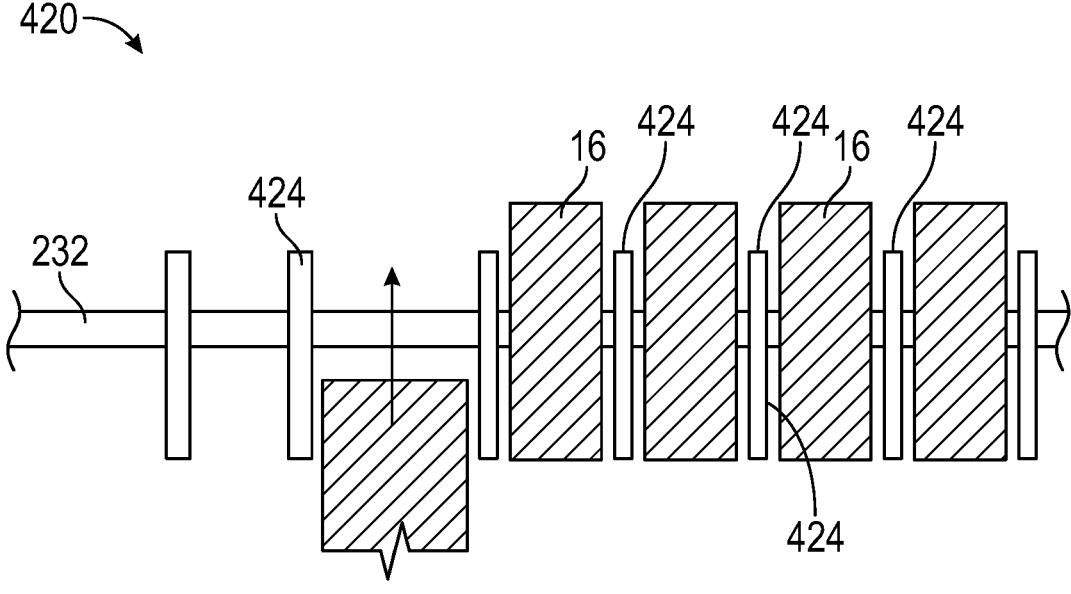
FIG. 26 is a top schematic view of another installation system, according to an exemplary embodiment.
Figure 27:
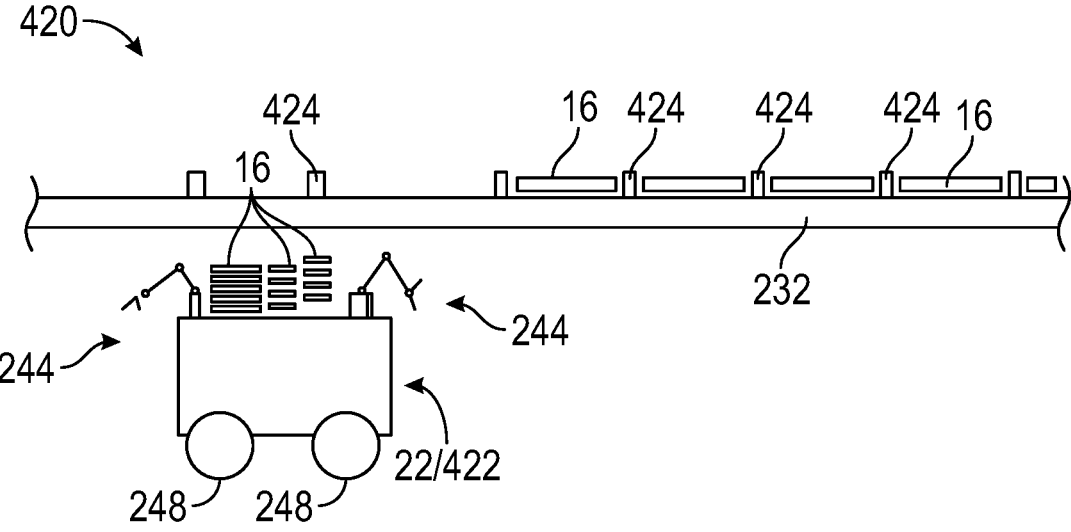
FIG. 27 is a side schematic of the installation system of FIG. 26, according to an exemplary embodiment.

Referring now to FIGS. 26 and 27, a top schematic view and a side schematic view of another installation system 420 are shown, respectively, according to an exemplary embodiment. Unless otherwise specified, the installation system 420 may share one or more characteristics with any of the other installation systems described herein. For example, the installation system 420 includes an installation vehicle 422 configured to position solar panels 16 in a desired location with respect to the support structure 232 during the installation of solar panels 16.

As shown, the installation vehicle 422 includes a series of robotic arms 244. According to various embodiments, at least one of the robotic arms 244 is configured to secure a bracket 424 (e.g., a coupler, a clamp, a fixture) to the support structure 232. By way of example, one of the robotic arms 244 may engage a clamp of the bracket 424 with the support structure 232. According to various embodiments, at least one of the robotic arms 244 is configured to selectively couple to one or more solar panels 16 and secure the solar panel to one or more brackets 424. By way of example, one of the robotic arms 244 may engage a fastener of a solar panel 16 with a bracket 424. In some embodiments, the brackets 424 are secured to the support structure at predetermined increments such that the brackets 424 may engage the solar panels 16 and secure the solar panels 16 to the support structure 232 at the predetermined intervals. In this example embodiment, at least one of the robotic arms may slide a solar panel 16 between two brackets 424 such that the brackets 424 secure the solar panel 16 to the support structure 232.

Figure 28:
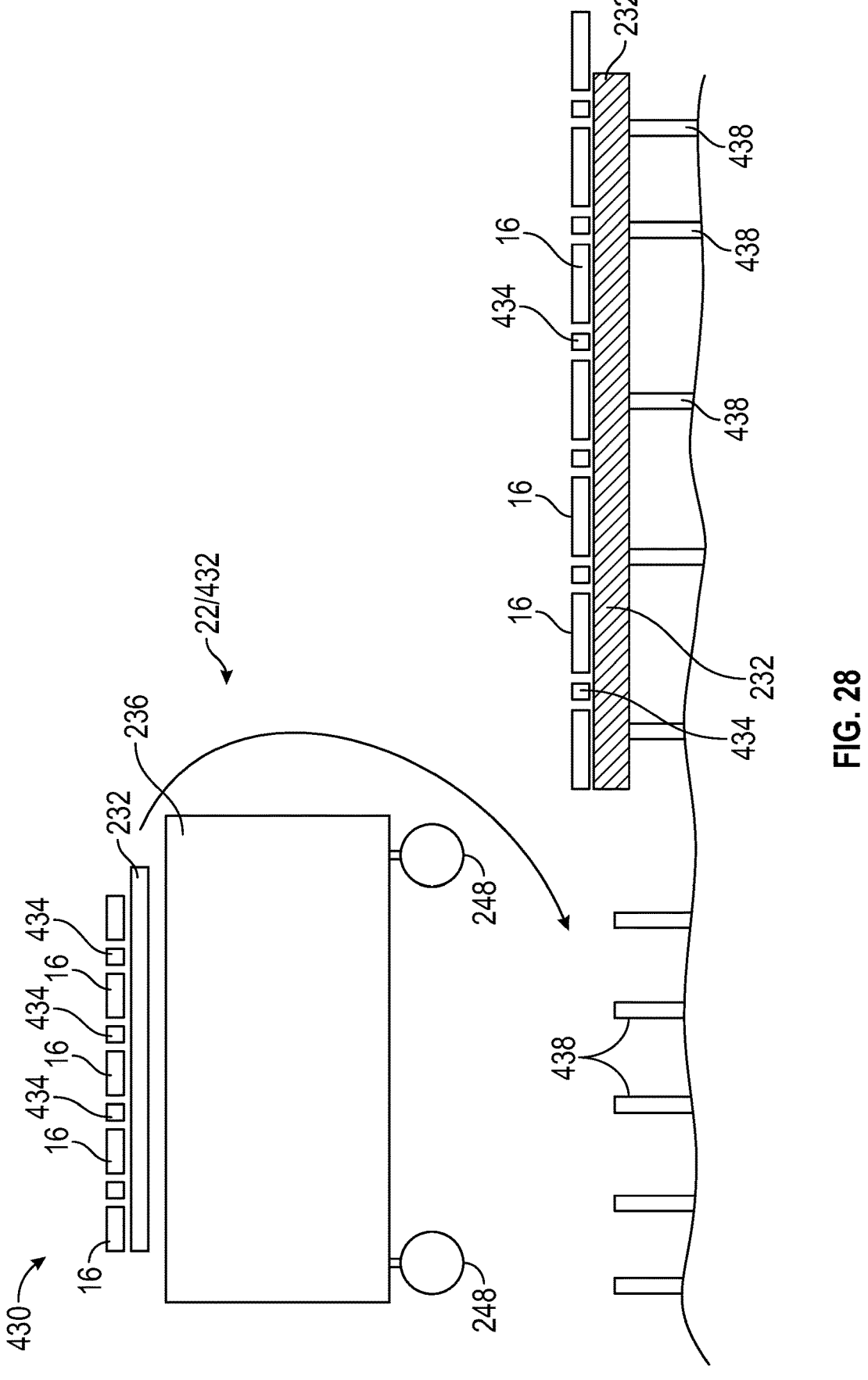
FIG. 28 is a side schematic view of another installation system, according to an exemplary embodiment.

FIG. 28 is a side schematic view of another installation system 430, according to an exemplary embodiment. Unless otherwise specified, the installation system 430 may share one or more characteristics with any of the other installation systems described herein. For example, the installation system 430 includes an installation vehicle 432 configured to position solar panels 16 in a desired location with respect to the support structure 232 during the installation of solar panels 16.

As shown, the installation vehicle 432 includes a platform 236 configured to support a support structure 232, a series of mounting devices 434 (e.g., the brackets 424), and a series of solar panels 16. According to various embodiments, the mounting devices 434 are configured to couple the series of solar panels to the support structure 232. According to various embodiments, a panel assembly 436 including the solar panels 16 mounted to the support structure 232 by the mounting devices 434 is supported by the platform 236. The panel assembly 436 may be preassembled prior to being supplied to the installation vehicle 432, or the installation vehicle 432 may form the panel assembly 436 from the individual subcomponents (e.g., using one or more robotic arms 244). The installation vehicle 432 transports the panel assembly 436 to a series of vertical supports 438 that are coupled to the ground. The installation vehicle 432 moves the panel assembly 436 from the platform 236 to the support structure 232 (e.g., with one or more robotic arms 244) to facilitate coupling the panel assembly 436 to the vertical supports 438.

Figure 29:
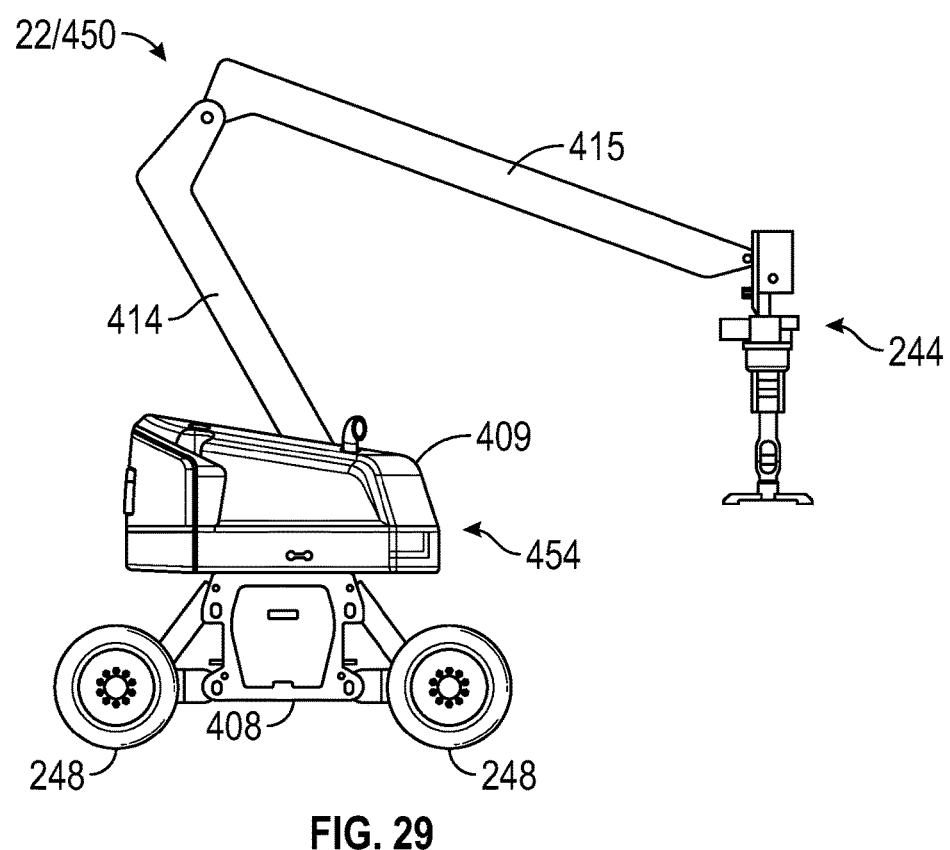
FIG. 29 is a side view of another installation vehicle, according to an exemplary embodiment.
Figure 30:
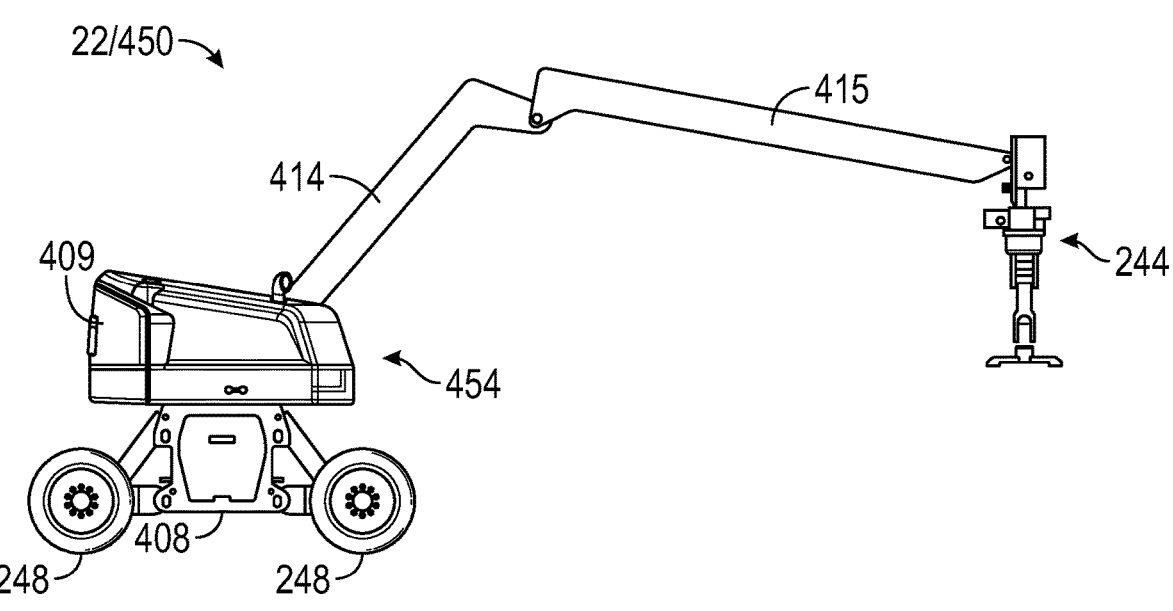
FIG. 30 is another side view of the installation vehicle of FIG. 29.

Referring now to FIGS. 29 and 30, side views of another installation vehicle 450 are shown, according to an exemplary embodiment. The installation vehicle 450 may be substantially similar to the installation vehicle 402, except the platform assembly 406 is replaced with a robotic arm 244. As shown, the installation vehicle 450 includes a boom including a base boom section 414 coupled to a fly boom section 415. The boom may be controlled to provide up to six degrees of freedom of movement.

Figure 31:
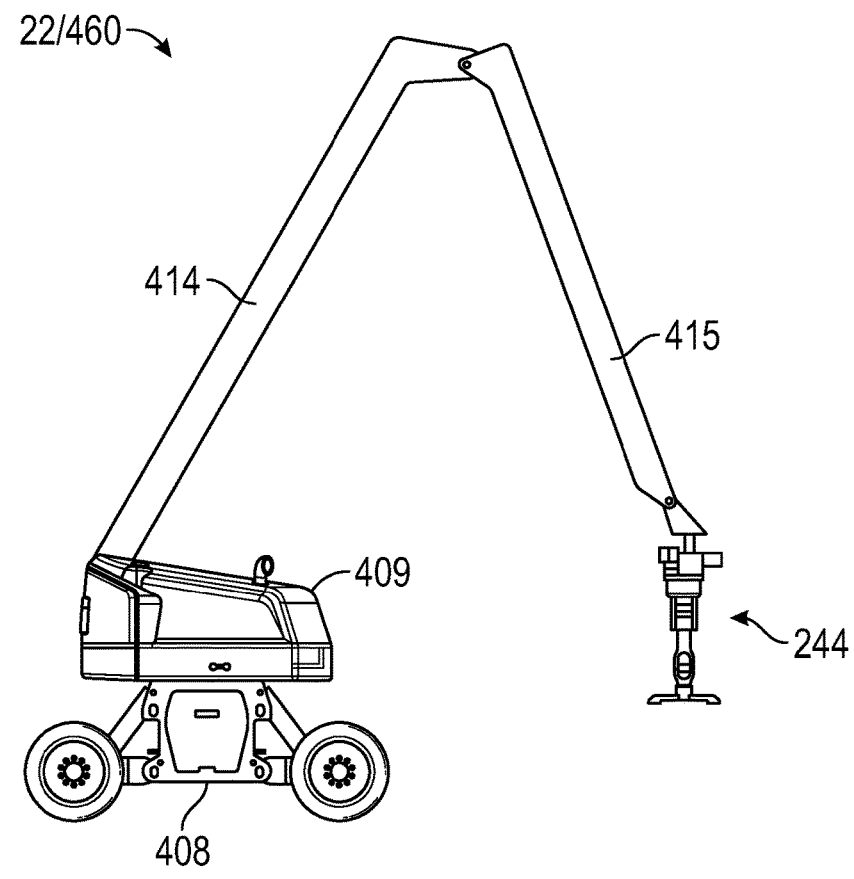
FIG. 31 is a side view of another installation vehicle, according to an exemplary embodiment.
Figure 32:
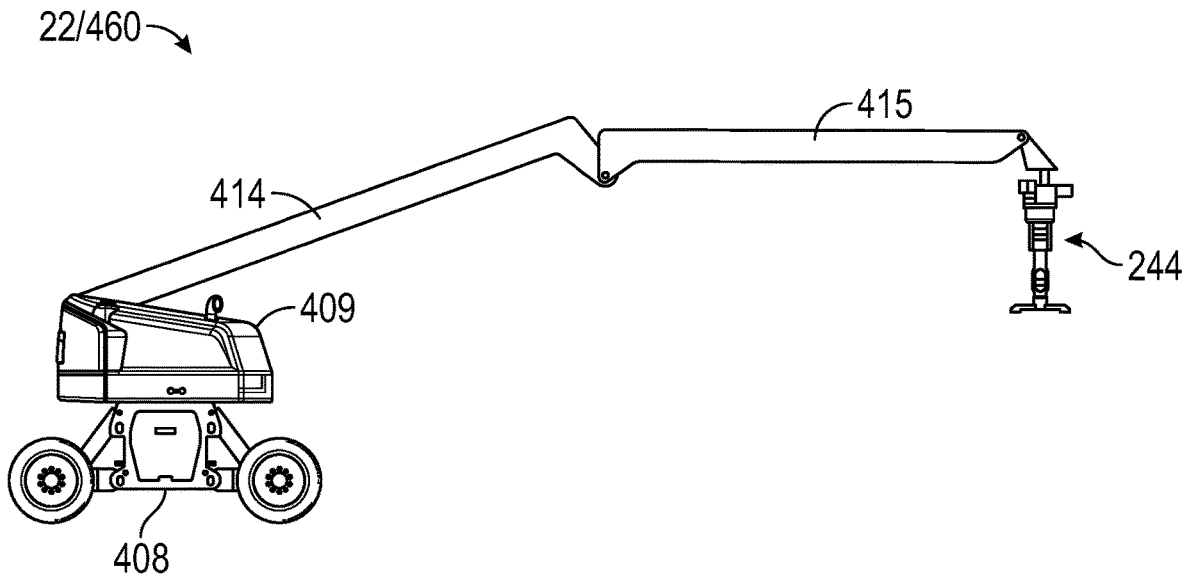
FIG. 32 is another side view of the installation vehicle of FIG. 31.

Referring now to FIGS. 31 and 32, side views of another installation vehicle 460 are shown, according to an exemplary embodiment. Unless otherwise specified, the installation vehicle 460 may be substantially similar to the installation vehicle 450. As shown, the installation vehicle 460 includes a boom including a base boom section 414 coupled to a fly boom section 415. The boom may be controlled to provide up to six degrees of freedom of movement. The lengths of the base boom section 414 and the fly boom section 415 may different from the lengths of the corresponding boom sections of the other installation vehicles described herein. Throughout the range of motion of the boom, the base boom section 414 may not extend beyond a vertical orientation (i.e., may not go over center).

Figure 33:
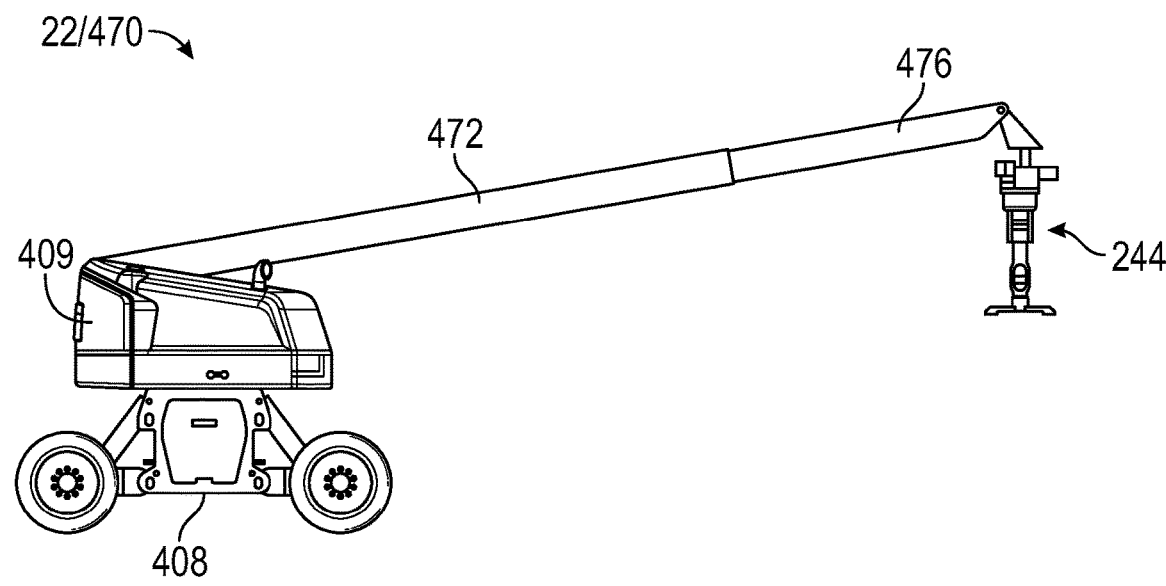
FIG. 33 is a side view of another installation vehicle, according to an exemplary embodiment.
Figure 34:
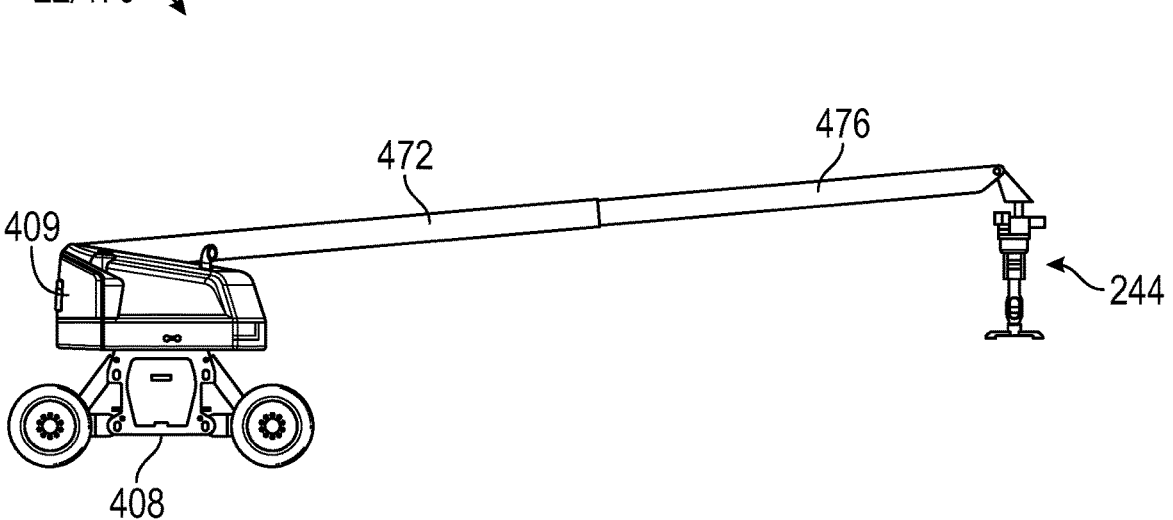
FIG. 34 is another side view of the installation vehicle of FIG. 33.

Referring now to FIGS. 33 and 34, side views of another installation vehicle 470 are shown, according to an exemplary embodiment. The installation vehicle 470 may be substantially similar to the installation vehicle 460 except as otherwise specified herein. As shown, the installation vehicle 470 includes a telescoping boom assembly including a base boom section 472 rotatably coupled to a turntable 409 of the installation vehicle 470. The installation vehicle 470 further includes a fly boom section 476 configured to translate within (e.g., in a telescoping manner, slidably coupled to, etc.) the base boom section 472. As shown, the installation vehicle 470 further includes a robotic arm 244 coupled to the fly boom section 476 and configured to selectively couple to one or more solar panels 16.

Figure 35:
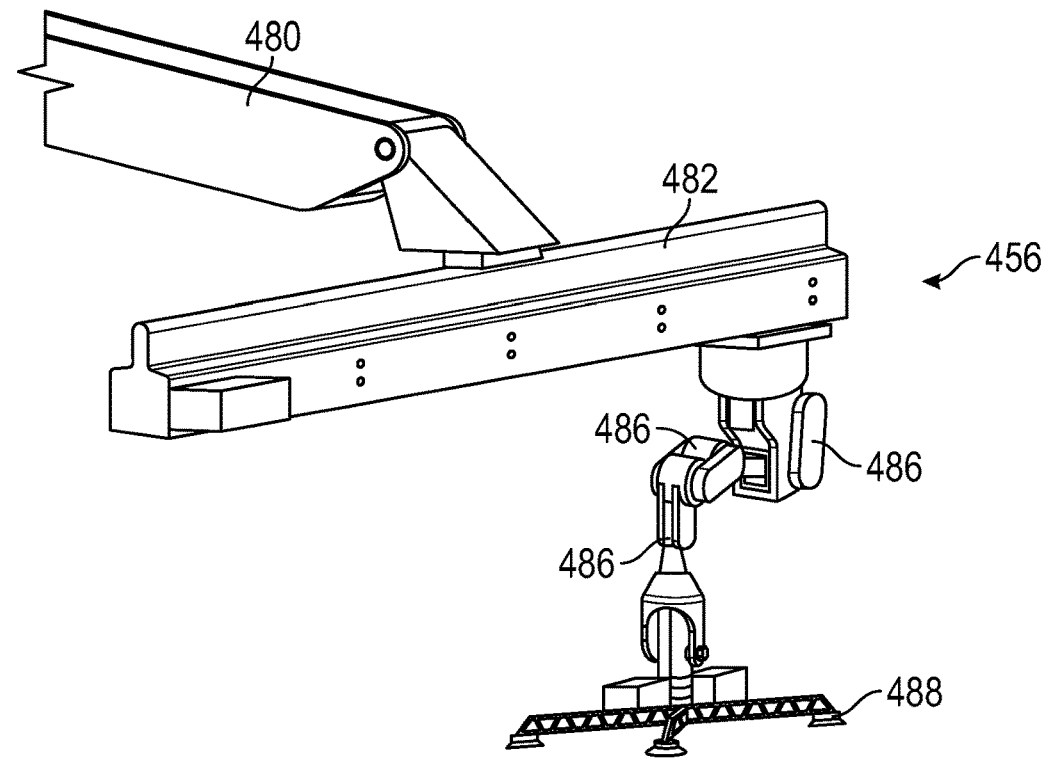
FIG. 35 is a perspective view of an implement, according to an exemplary embodiment.
Figure 36:
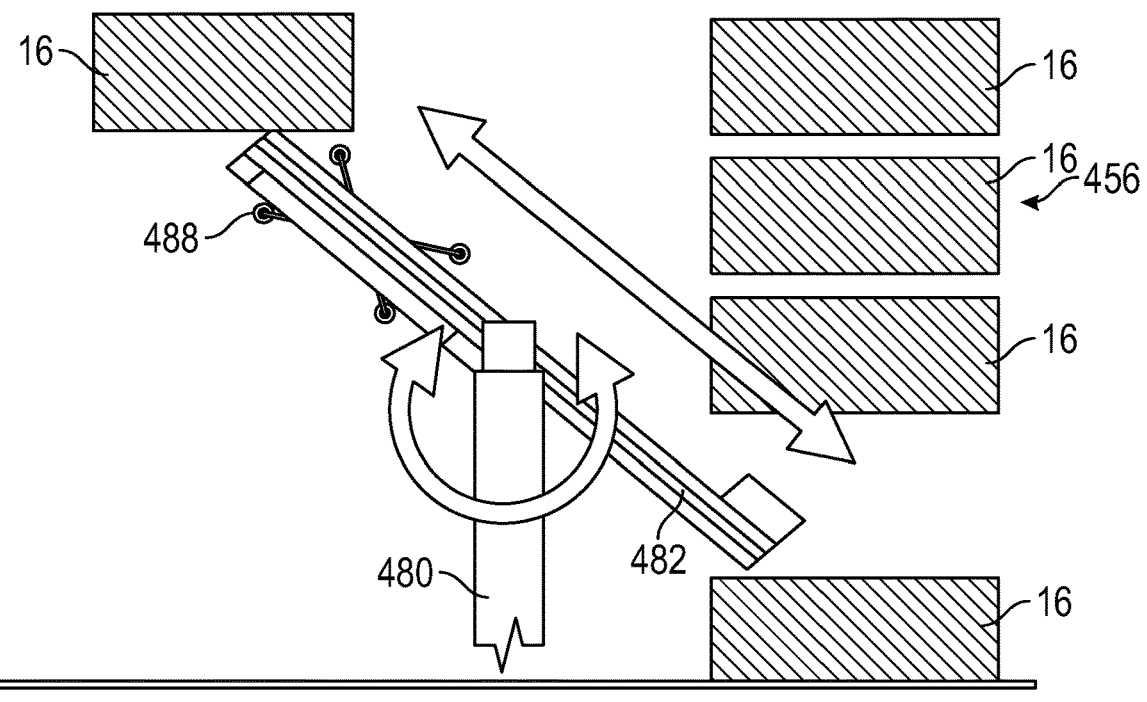
FIG. 36 is a top view of the implement of FIG. 35.

Referring now to FIGS. 35 and 36, a perspective view and top view of an implement, shown as robotic arm 456, according to an exemplary embodiment. The robotic arm 456 may represent one exemplary embodiment of the robotic arm 244. The robotic arm 456 is configured to selectively couple to one or more solar panels 16 and transport the solar panel 16 to a desired location. As shown, the robotic arm 456 is pivotably coupled to a distal end of and configured to rotate about a linkage 480. According to various embodiments, the linkage 480 may be a part of an installation vehicle (e.g., the fly boom section 415, the fly boom section 476, etc.). As shown, the robotic arm 456 is coupled to the linkage 480 via a linear guide, shown as track 482. According to various embodiments, the robotic arm 456 may translate along the track 482 (e.g., under power of an electric motor). The track 482 may be rotatably coupled to the linkage 480, such that the track 482 is rotatable relative to the linkage 480 about a substantially vertical axis (e.g., under power of an electric motor). As shown, the robotic arm 456 includes a series of linkages 486 and an attachment mechanism 488 (e.g., an end effector, a grabber, an interface, etc.) configured to couple the robotic arm 456 to one or more solar panels 16. Each linkage 486 may be pivotally coupled to an adjacent component. By way of example, a first linkage 486 may be rotatable relative to track 482 and a second linkage 486. The second linkage 486 may be rotatable relative to the first linkage 486 and a third linkage 486. The third linkage 486 may be rotatable relative to the second linkage 486 and the attachment mechanism 488.

Figure 37:
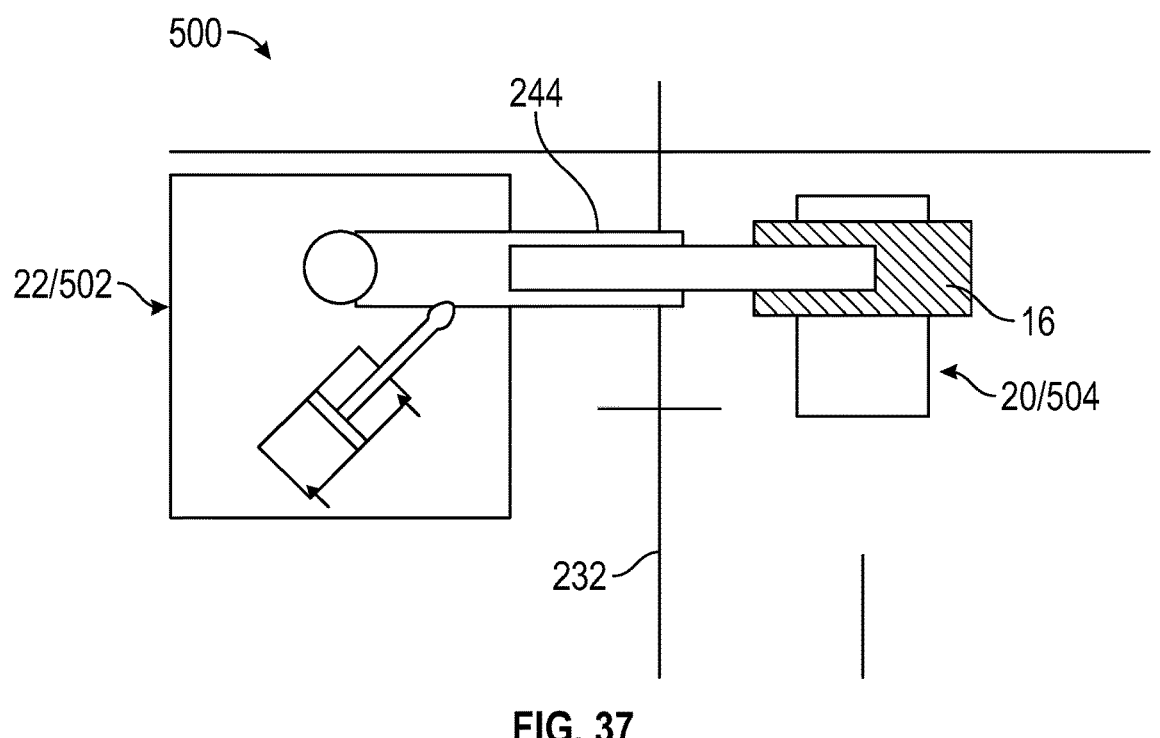
FIG. 37 is a top schematic view of another installation system, according to an exemplary embodiment.

Referring now to FIG. 37, a top schematic view of another installation system 500 is shown, according to an exemplary embodiment. The installation system 500 includes an installation vehicle 502 and a delivery vehicle 504. The installation vehicle includes a robotic arm 244 configured to transport solar panels 16 from the delivery vehicle 504 to the support structure 232. This robotic arm 244 may extend in length (e.g., to the right as shown in FIG. 37) and rotate about a substantially vertical axis (e.g., clockwise as shown in FIG. 37, as powered by a cylinder). As shown, during the installation process, the installation vehicle 502 and the delivery vehicle 504 are on opposite side of the support structure 232 such that the installation vehicle 502 and the delivery vehicle 504 may both move along the support structure 232 during the installation process.

Figure 38:
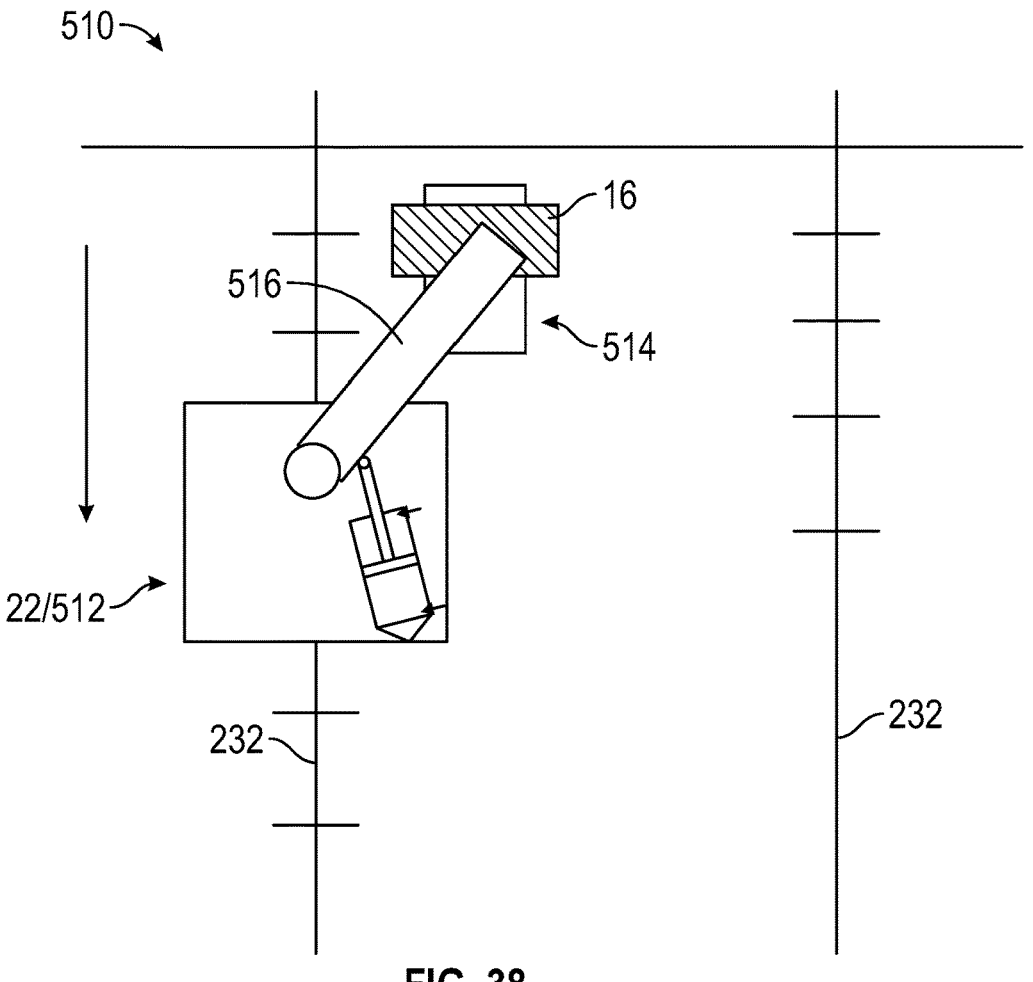
FIG. 38 is a top schematic view of another installation system, according to an exemplary embodiment.

Referring now to FIG. 38, a top schematic view of another installation system 510 is shown, according to an exemplary embodiment. The installation system 510 includes an installation vehicle 512 and a delivery vehicle 514. The installation vehicle 512 includes a robotic arm 244 configured to transport solar panels 16 from the delivery vehicle 514 to the support structure 232. This robotic arm 244 may rotate about a substantially vertical axis (e.g., clockwise as shown in FIG. 38, as powered by a cylinder). As shown, during the installation process, the installation vehicle 512 straddles the support structure 232 while the delivery vehicle 504 is positioned to the side of the support structure 232.

Figure 39:
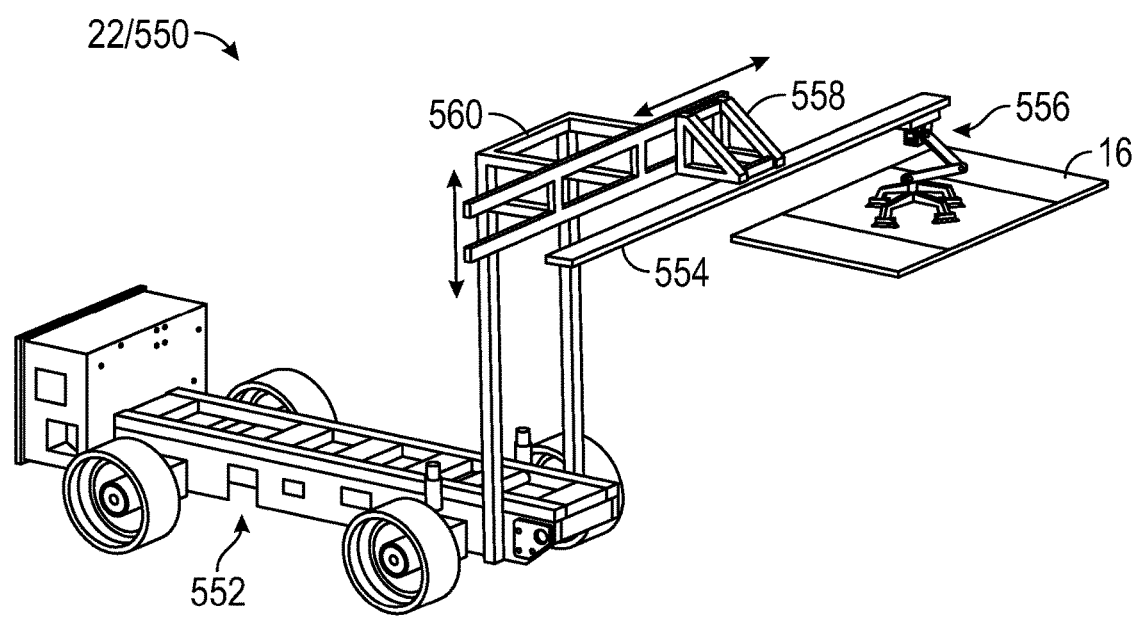
FIG. 39 is a perspective view of an installation vehicle, according to an exemplary embodiment.

Referring now to FIG. 39, a perspective view of an installation vehicle 550 is shown, according to an exemplary embodiment. As shown, the installation vehicle 550 includes a robotic arm 244 that is configured to selectively couple to one or more solar panels 16 and transport the solar panel to a desired location. A base portion 552 or chassis of the installation vehicle 550 may be configured to hold a series of solar panels 16 such that the robotic arm 244 may access the series of solar panels 16 and transport the solar panels 16 as desired. As shown, the robotic arm 244 is coupled to and configured to rotate relative to the base portion 552. The robotic arm 244 is coupled to the base portion 552 by a lift assembly or rectangular translation assembly including a support stand 560 or lift, a linkage 558 or lateral actuator, and a track 554. As shown, the robotic arm 244 is coupled to the track 554 and configured to rotate relative to the track 544. The robotic arm 556 may translate laterally along the track 554 (e.g., under power of an electric motor). As shown, the track 554 is coupled to the support stand 560 by the linkage 558. According to various embodiments, the track 554 is configured to translate laterally relative to the linkage 558 (e.g., under power of an electric motor). According to various embodiments, the linkage 558 is configured to vertically translate with respect to the support stand 560 (e.g., under power of an electric motor).

Figure 40:
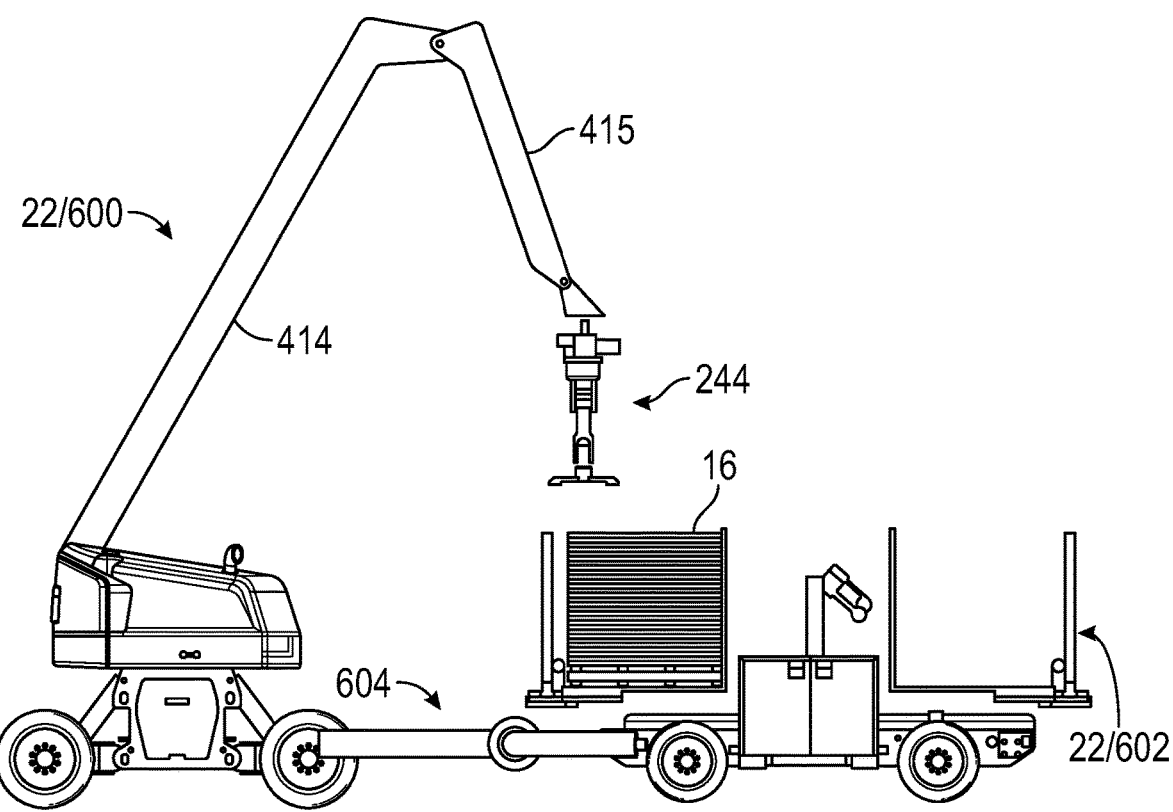
FIG. 40 is a side view of another installation vehicle and delivery vehicle, according to an exemplary embodiment.

Referring now to FIG. 40, a side view of another installation vehicle 600 and delivery vehicle 602 is shown, according to an exemplary embodiment. As shown, the installation vehicle 600 is selectively coupled to the delivery vehicle 602 via a linkage 604. By way of example, the installation vehicle 600 may include a hydraulic cylinder or other actuator that selectively moves the linkage 604 into engagement with a frame of the delivery vehicle 602. Alternatively, the linkage 604 may be part of the delivery vehicle 602 and selectively engage the installation vehicle 600. According to various embodiments, the linkage 604 has a predetermined length, such that the installation vehicle 600 remains a constant distance from the delivery vehicle 602 during the installation process while the linkage 604 is engaged. This may provide a constant, predetermined spacing between the delivery vehicle 602 and the installation vehicle 600, such that the installation vehicle 600 can easily predict the positions of the solar panels 16 on the delivery vehicle 602 during retrieval and installation. According to various embodiments, a transmission of the delivery vehicle 602 may be reconfigured into a neutral mode during the installation process such that the installation vehicle 600 drives the delivery vehicle, controlling motion of both vehicles together with a single controller. Alternatively, a transmission of the installation vehicle 600 may reconfigured into a neutral mode such that the delivery vehicle 602 controls propulsion of both vehicles.

Figure 41:
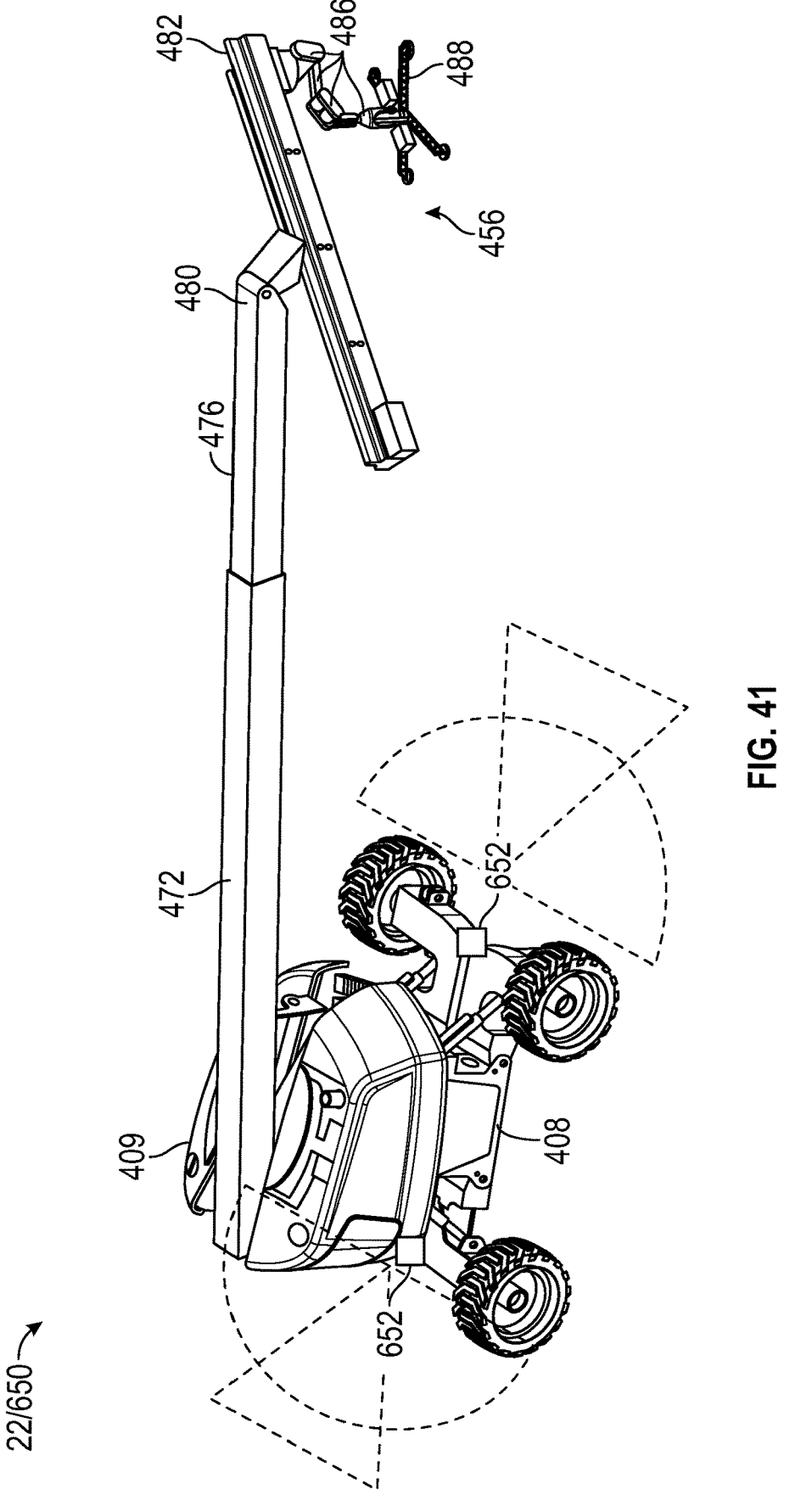
FIG. 41 is a perspective view of an installation vehicle, according to an exemplary embodiment.

FIG. 41 is a perspective view of an installation vehicle 650, according to an exemplary embodiment. As shown, the installation vehicle 650 includes a series of sensors 652. The sensors 652 may facilitate autonomous installation of solar panels 16. For example, the sensors 652 may detect support structures, delivery vehicles, obstacles, and/or other objects during the installation process.

Autonomous Working Vehicle

Figure 42:
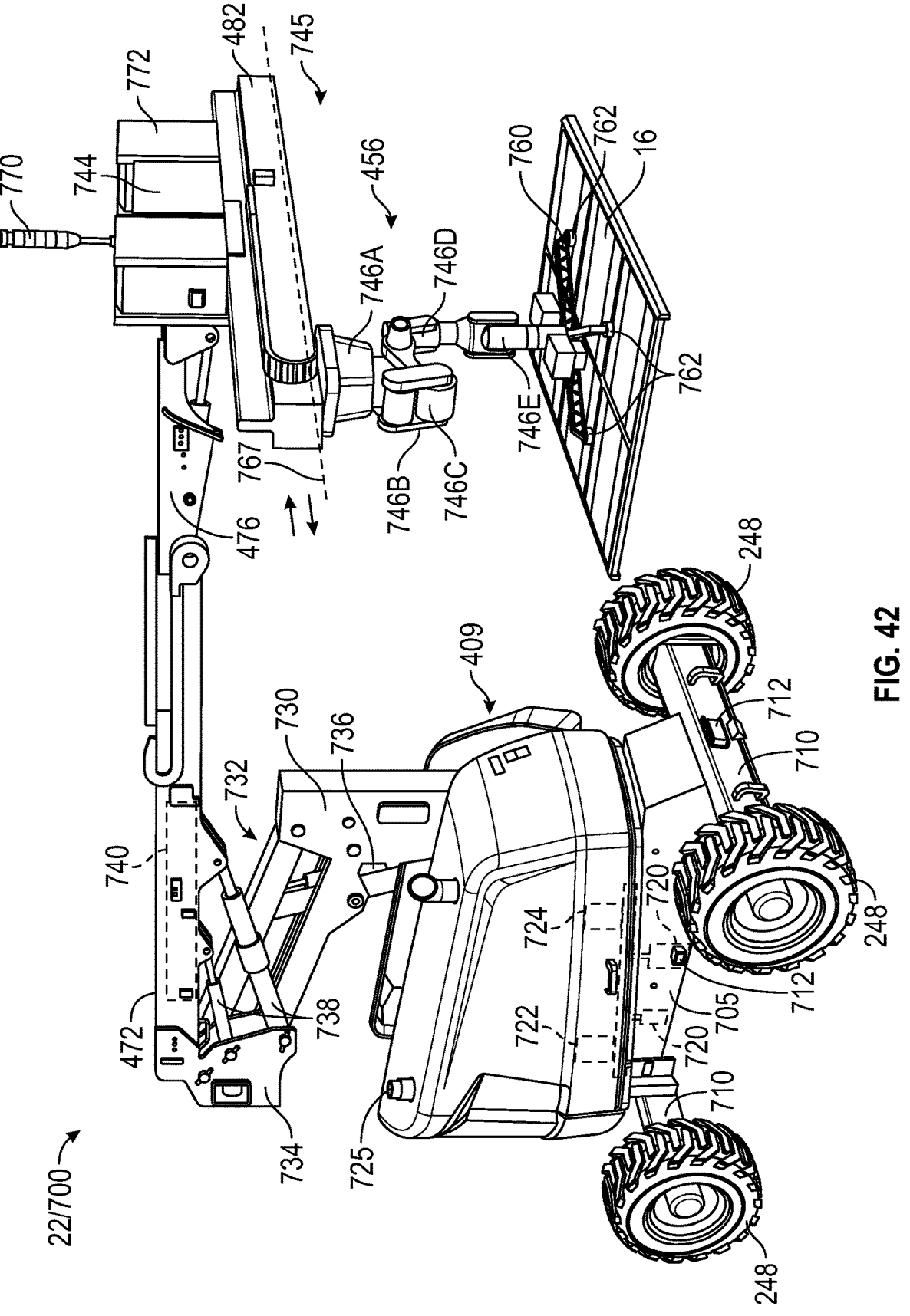
FIG. 42 is a perspective view of an autonomous working vehicle, according to an exemplary embodiment.

FIG. 42 is a perspective view of an Autonomous Working Vehicle (AWV) 700, according to an exemplary embodiment. The AWV 700 may represent the installation vehicle 22 or any of the other installation vehicles described herein. Accordingly, any description with respect to the other installation vehicles may apply to the AWV 700 unless otherwise specified. For example, the AWV 700 may be substantially similar to the installation vehicle 650. The AWV 700 may include the controller 102. As shown, the AWV includes a base 408, a turntable 409, a boom assembly 702, and a robotic arm 456.

The base 408 includes a body 705, a pair of axles 710, and a sensor 712. The body 705 may include at least one of a chassis, a cab, a vehicle frame, and/or a vehicle support structure, and the body 705 provides structure to supports other elements of the base 408. Each axle 710 is coupled to an opposing side of the body 705 (e.g., a front side and a rear side, respectively) and is positioned near an underside of the body 705. In some embodiments, the axles 710 are movable relative to the body 705 (e.g., about a substantially longitudinal axis, as controlled by a vehicle suspension, etc.). The axles 710 may move in unison or independent from another. A wheel 248 is rotatably coupled to each end of each axle 710 (e.g., such that the front axle is directly coupled to two front wheels 248, and the rear axle 710 is directly coupled to two rear wheels 248). The wheels 248 may be powered (e.g., to rotate) by a prime mover (e.g., an actuator such as an engine, a battery, a motor, etc.) to propel and steer the AWV 700. By way of example, one actuator may power all of the wheels 248, or each wheel 248 may be independently powered by a different actuator.

The sensors 712 (e.g., environment sensors) may be disposed and/or located at various locations and/or positions of the AWV 700. For example, a sensor 712 is shown positioned on front-facing surface of a front axle 710, and another sensor 712 is shown along a right-facing surface of the body 705. In some embodiments, other sensors 712 are positioned along the other surfaces of the body 705 (e.g., along a rear-facing surface, along a left-facing surface, etc.). The sensors 712 may provide sensor data characterizing the AWV 700 and/or the environment surrounding the AWV 700. By way of example, the sensors 712 may include at least one of cameras, proximity sensors, tracking devices, position sensors, gyroscopes, location devices (e.g., a GPS), and/or among various other possible sensors. The sensors 712 may track, detect, and/or monitor a position of the AWV 700, a position of a specific component of the AWV 700, or a position of an object in the surrounding environment (e.g., a building, an obstacle, another vehicle, solar panels 16, etc.). For example, the sensors 712 may track a position of the turntable 409 (e.g., a position relative to the body 705). The sensors 712 may also track a position of the AWV 700 (e.g., GPS coordinates, XYZ coordinates, grid coordinates, etc.).

Figure 43:
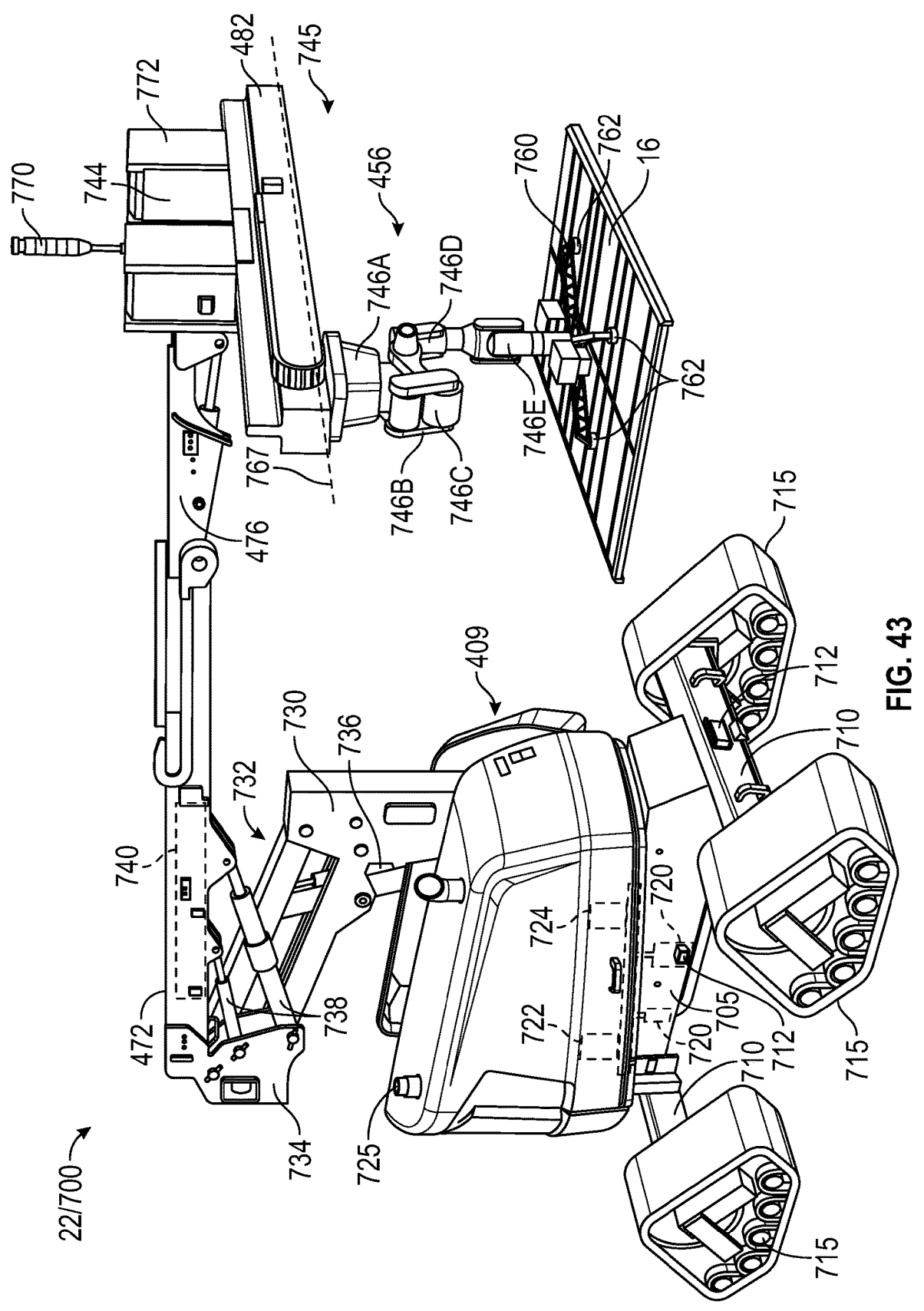
FIG. 43 is a perspective view of the autonomous working vehicle illustrated in FIG. 41, according to an exemplary embodiment.

The AWV 700 may include wheels 248 or another type of tractive element, such as tires, treads, tracks, and/or other tractive elements. In the embodiment of FIG. 42, the wheels 248 include a V-shaped tread suitable for hard surfaces such as concrete, packed dirt, or asphalt. In other embodiments, the shape of the tread on the wheels 248 may be modified (e.g., the wheels 248 may be exchanged for different wheels 248) to better accommodate different surfaces (e.g., a tread having horizontally-extending grooves may be suitable for sand or turf). FIG. 43 is a perspective view of an alternative embodiment of the AWV 700, which includes tractive elements, shown as tracks 715, in place of the wheels 248. The tracks 715 may provide and/or otherwise produce a larger surface area for the AWV 700 relative to the wheels 248. Accordingly, the tracks 715 may be suitable for use on relatively soft surfaces, such as mud or sand.

The turntable 409 includes an interface device 725 and a frame 730 that is pivotably coupled to the boom assembly 702. The frame 730 is rotatably coupled to the body 705 and configured to rotate relative to the body 705 about a substantially vertical axis that passes through the center of the turntable 409 (e.g., to adjust a position or orientation of the boom assembly 702). In some embodiments, the turntable 409 includes one or more actuators (e.g., electric motors, hydraulic motors, etc.), shown as turntable actuators 720, that drive rotation of the turntable 409 relative to the body 705. By way of example, the turntable actuators 720 may be coupled to the body 705, and each turntable actuator 720 may include a pinion gear that engages a ring gear coupled to the frame 730. By turning the pinion gears, the ring gear is driven to rotate the turntable 409. In some embodiments, the turntable 409 includes two turntable actuators 720, such that the AWV 700 includes two swing drive systems (e.g., two systems that are independently capable of driving rotation of the turntable 409. By including two swing drive systems, overall backlash in the turntable 409 is reduced. By way of example, the rotation range of the turntable 409 having backlash from the first turntable actuator 720 may not exactly overlap the rotation range of the turntable 409 having backlash from the second turntable actuator 720. As long as at least one of the turntable actuators 720 is not experiencing backlash (e.g., is engaged with the ring gear of the turntable), the position of the turntable 409 may desirably be fixed when the turntable actuators 720 are stationary.

As shown, the turntable 409 further includes a braking system, shown as friction brake 722. The friction brake 722 may be coupled to at least one of the frame 730 or the body 705. The friction brake 722 may be selectively engaged (e.g., hydraulically, electrically, pneumatically, etc.) to oppose (e.g., prevent) rotation of the turntable 409. By way of example, the friction brake 722 may engage a friction element (e.g., a brake pad) directly with the spur gear of the turntable 409 to oppose movement of the turntable 409. By way of another example, a pinion gear may constantly be in engagement with the ring gear of the turntable 409. The friction brake 722 may engage a friction element (e.g., a clutch) with the pinion gear to limit rotation of the pinion gear and thereby limit rotation of the turntable 409. The controller 102 may automatically engage the friction brake 722 whenever the turntable actuators 720 are not operating in order to hold the turntable 409 in the current position and reduce or eliminate turntable backlash.

As shown, the turntable 409 includes a locking assembly, shown as turntable lock 724. The turntable lock 724 may be coupled to at least one of the frame 730 or the body 705. The turntable lock 724 may be selectively engaged (e.g., hydraulically, electrically, pneumatically, etc.) to prevent rotation of the turntable 409. By way of example, the turntable lock 724 may include a pin that, when the turntable lock 724 is engaged, enters an aperture defined by the ring gear of the turntable 409 and acts as a hard stop. In some embodiments, the turntable lock 724 has one predetermined lock position (e.g., such that the boom assembly 702 faces straight forward). By way of example, the ring gear may define a single aperture that is configured to receive the pin of the turntable lock 724. In other embodiments, the turntable lock 724 has multiple predetermined lock positions. By way of example, the ring gear may define a series of apertures each offset 15 degrees from one another, each of the apertures corresponding to a different lock position. In other embodiments, one or more of the lock positions are adjustable. By way of example, the turntable lock 724 may be selectively repositionable relative to the body 705 to adjust the location of the lock positions.

The interface device 725 may include at least one of a network device, a communication interface, a communication module, a communication device, a transceiver, a transmitter, a receiver, a transponder, and/or among various other possible devices. The interface device 725 may interface with, interact with, and/or communicate with at least one of the various systems, devices, and/or components described herein. For example, the interface device 725 may communicate with the cloud computing system 110. By way of another example, the interface device 725 may communicate directly with a transportation vehicle 20 and/or another installation vehicle 22. The interface device 725 may also communicate with the sensors 712. For example, the sensors 712 may provide position information to the interface device 725, and the interface device 725 may communicate sensor data (e.g., indicative of a current position of the AWV 700) to the cloud computing system 110.

The boom assembly 702 includes a first boom section, shown as four bar linkage 732. The four bar linkage 732 includes a pair of links each pivotally coupled to the frame 730 at a first end and to a boom subframe 734 at an opposing second end. Each end of each link is configured to rotate about a substantially horizontal, lateral axis such that the four bar linkage 732 permits vertical movement of the boom subframe 734 relative to the frame 730. Motion of the four bar linkage 732 is controlled by a linear actuator (e.g., an electric linear actuator, a hydraulic cylinder, etc.), shown as lift cylinder 736.

The boom assembly 702 further includes a telescoping assembly including a base boom section 472 and a fly boom section 476. A proximal end of the base boom section 472 is pivotably coupled to the boom subframe 734. The base boom section 472 is rotatable relative to the boom subframe 734 about a substantially horizontal, lateral axis. Motion of the base boom section 472 relative to the boom subframe 734 is controlled by a pair of linear actuators (e.g., electric linear actuators, hydraulic cylinders, etc.), shown as lift cylinders 738. The fly boom section 476 is slidably coupled to the base boom section 472 and movable along a longitudinal axis that extends along the length of the base boom section 472. Motion of the fly boom section 476 relative to the base boom section 472 is controlled by a linear actuator (e.g., an electric linear actuator, a hydraulic cylinder, etc.), shown as extension cylinder 740.

The AWV 700 further includes an implement assembly or solar panel manipulator, shown as implement 745, coupled to a distal end of the fly boom section 476. The implement 745 includes a track 482, a robotic arm 456, and a grabbing mechanism, shown as grabber assembly 760. The track 482 is pivotally coupled to a distal end of the fly boom section 476. The track 482 is configured to rotate about a substantially horizontal, lateral axis. Motion of the track 482 about this lateral axis is controlled by a linear actuator (e.g., an electric linear actuator, a hydraulic cylinder, etc.), shown as tilt cylinder 742.

The track 482 is further configured to rotate relative to the fly boom section 476 about an axis that extends substantially perpendicular to the track 482. An actuator (e.g., a hydraulic motor, an electric motor, etc.), shown as track rotation motor 744, is configured to control rotation of the track 482 about this axis.

The robotic arm 456 (e.g., a manipulator assembly) is coupled to the track 482. The track 482 moves the robotic arm 456 relative to the track 482. For example, the robotic arm 456 may move along an axis 767 that extends along a length of the track 482. The track 482 may include an actuator (e.g., an electric motor, a hydraulic motor, etc.) that causes this movement.

The robotic arm 456 includes a series of linkages, shown as arm sections. Each arm section is pivotally coupled to at least one adjacent arm section and includes an actuator (e.g., an electric motor, a hydraulic motor, etc.) that is configured to control relative rotation of the arm sections. The actuators may cause the arm sections to rotate about axes that extend parallel to the arm section, perpendicular to the arm section, or about another axis. Accordingly, the arm sections facilitate precise, controlled manipulation of solar panels 16.

As shown in FIG. 42, the robotic arm 456 includes an arm section 746A rotatably coupled to the track 482, an arm section 746B pivotably coupled to the arm section 746A, an arm section 746C pivotably coupled to the arm section 746B, an arm section 746D pivotably coupled to the arm section 746C, and an arm section 746E rotatably coupled to the arm section 746D. The arm section 746A is configured to rotate about an axis that extends substantially perpendicular to the track 482 and along a length of the arm section 746A. The arm section 746B is configured to rotate about an axis that extends substantially perpendicular to the arm section 746B. The arm section 746C is configured to rotate about an axis that extends substantially perpendicular to the arm section 746C. The arm section 746D is configured to rotate about an axis that extends substantially perpendicular to the arm section 746D. The arm section 746E is configured to rotate about an axis that extends along the length of the arm section 746E.

The robotic arm 456 further includes a grabber assembly 760 (e.g., an end effector, an interface, a coupler, etc.) coupled to the arm section 746E. The grabber assembly 760 is configured to engage a solar panel 16 to selectively couple the solar panel 16 to the robotic arm 456. By way of example, the grabber assembly 760 may include a series of vacuum interfaces, shown as suction cups 762, configured to engage the solar panel 16. A vacuum pump may selectively introduce a negative pressure field at each suction cup 762 to cause the solar panel 16 to selectively couple to the grabber assembly 760. By way of another example, the grabber assembly 760 may include a claw or pinching interface that clamps onto the solar panel 16 to selectively couple the solar panel 16 to the grabber assembly 760.

During operation, the grabber assembly 760 is selectively coupled to (e.g., attached to, secured to, mounted with, and/or otherwise affixed to) a solar panel 16. The robotic arm 456, the boom assembly 702, and/or the turntable 409 may move, pivot, swing, and/or otherwise adjust the position of the solar panel 16 relative to the base 408. Accordingly, the robotic arm 456, the boom assembly 702, and/or the turntable 409 may locate, position, place, and/or otherwise facilitate installation of the solar panel 16.

Figure 44:
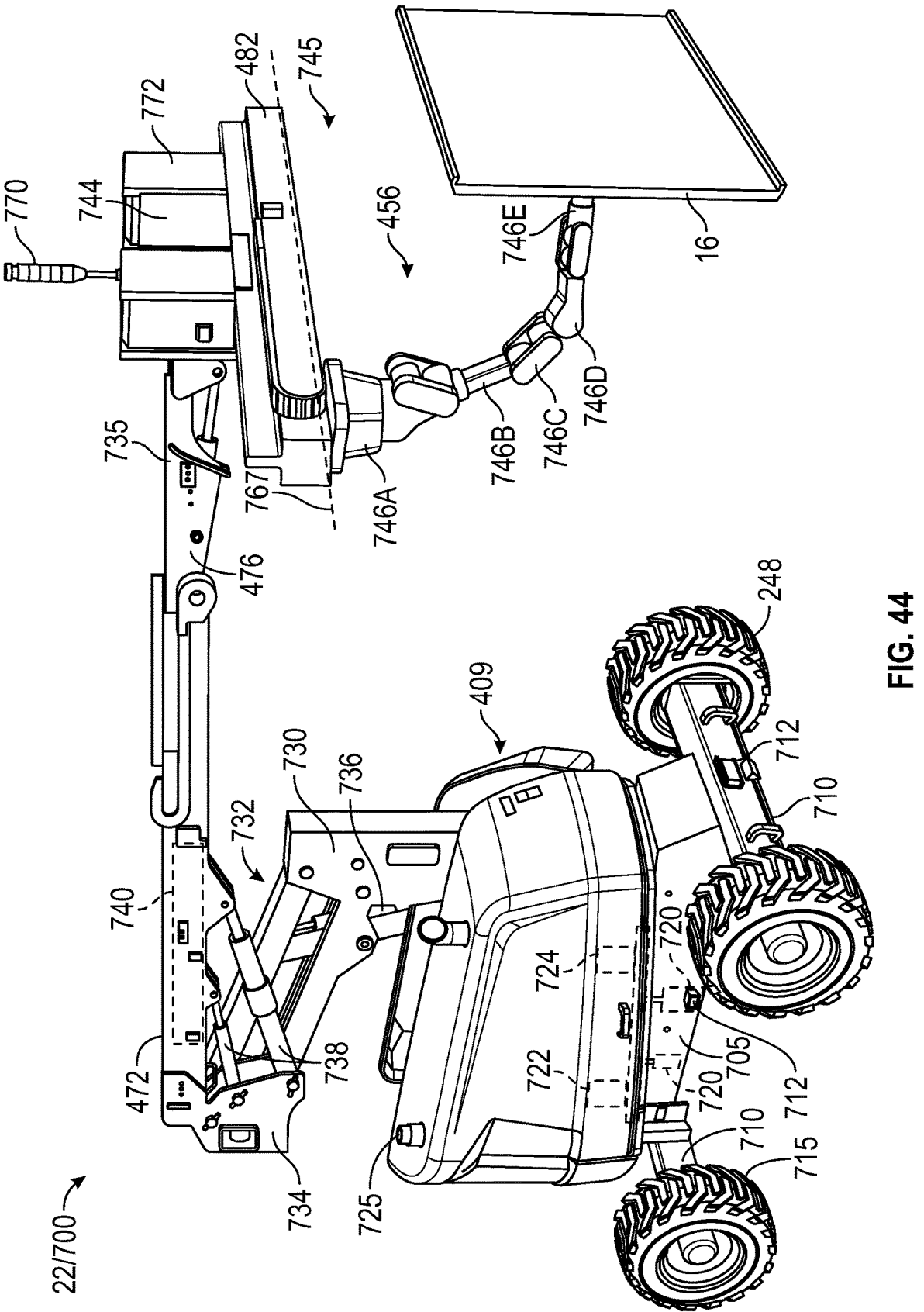
FIG. 44 is a perspective view of the autonomous working vehicle illustrated in FIG. 41, according to an exemplary embodiment.

FIG. 44 is a perspective view of the AWV 700, according to an exemplary embodiment. The arm 752 is shown to have rotated and/or otherwise moved relative to the AWV 700. For example, the arm sections of the robotic arm 456 may rotate the grabber assembly 760 from a horizontal position (e.g., the position shown in FIG. 42) to a vertical position (e.g., the position shown in FIG. 44). In some embodiments, the controller 102 may provide signals to the robotic arm 456, and the signals may cause the robotic arm 456 to move. For example, the controller 102 may transmit signals to the robotic arm 456 that cause the robotic arm 456 to move from a first position to a second position.

The AWV 700 further includes at least one tracking device 770 and at least one controller 772. The tracking device 770 may monitor, track, and/or detect a position of the implement 745 (e.g., at least one of the arm sections of the track 482, the robotic arm 456, and/or the grabber assembly 760). For example, the tracking device 770 may track a position of an arm section relative to the turntable 409. The data from the tracking device 770 may be provided to the controller 772. The controller 772 may control operation of the implement 745. In some embodiments, the controller 772 controls operation of the implement 745, and the controller 102 controls operation of the other components of the AWV 700. In other embodiments, one controller controls operation of the entire AWV 700.

Figure 45:
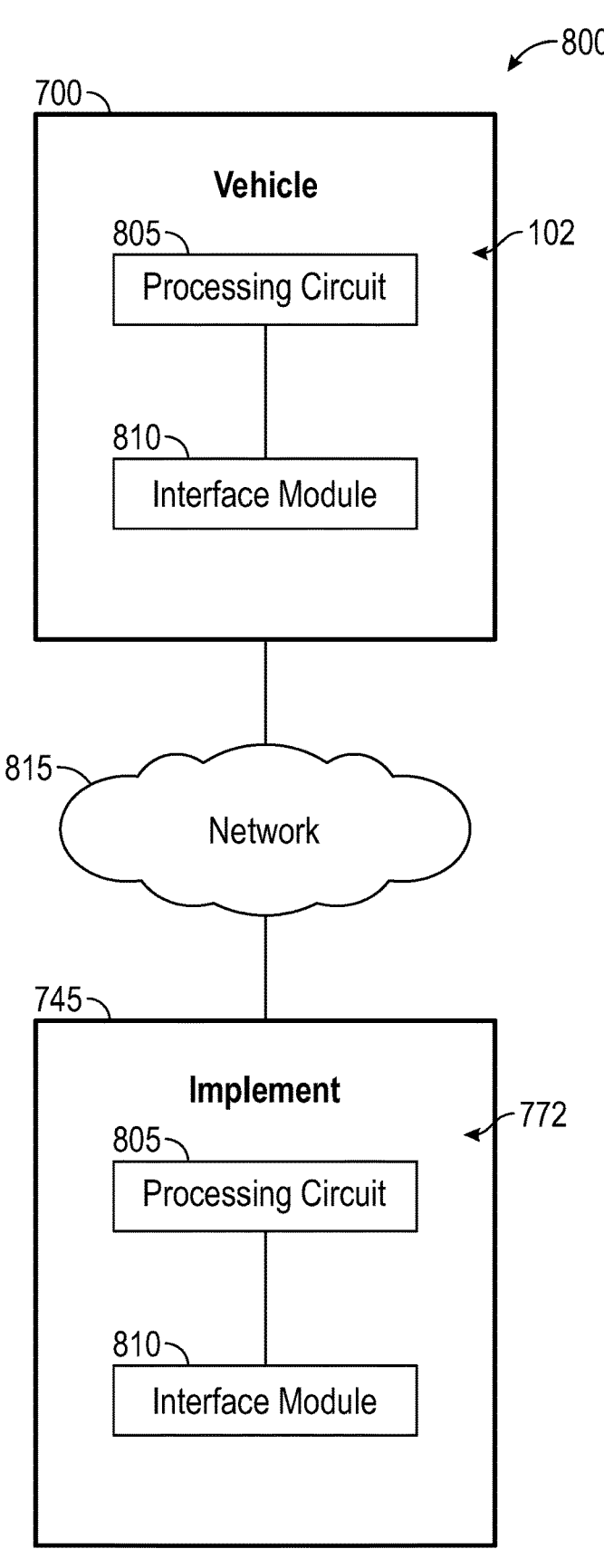
FIG. 45 is a block diagram of a system including the autonomous working vehicle illustrated in FIG. 42 and a robotic arm, according to an exemplary embodiment.
Figure 46:
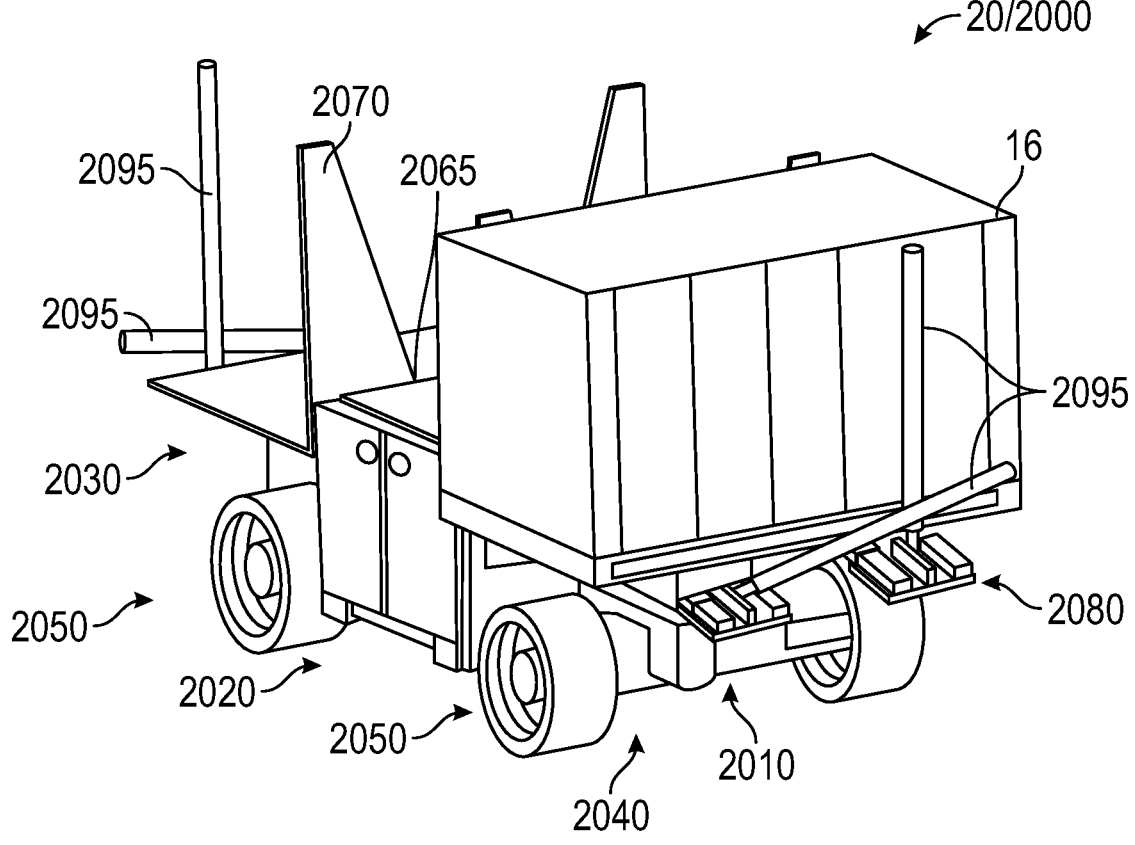
FIG. 46 is a perspective view of a delivery vehicle, according to an exemplary embodiment.
Figure 47:
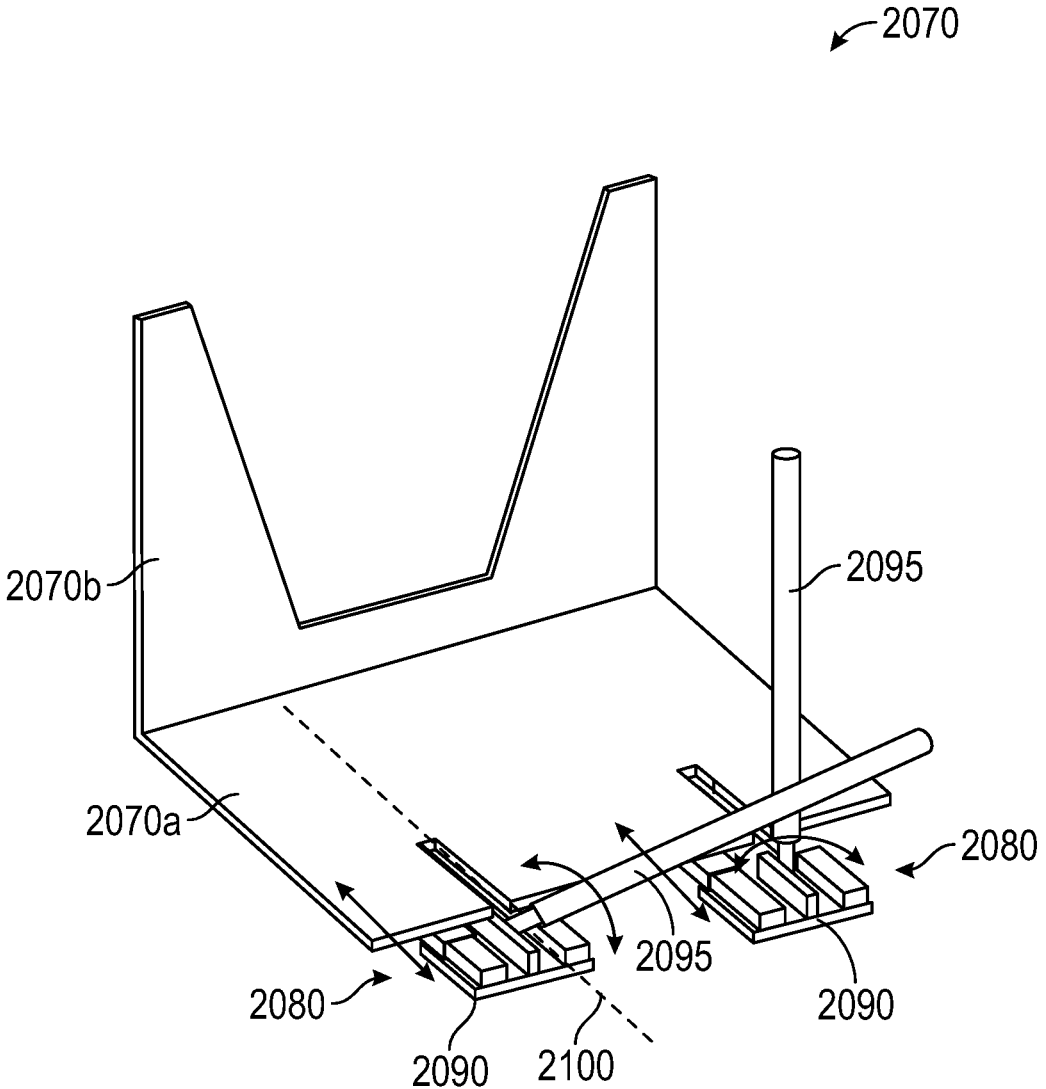
FIG. 47 is a perspective view of a carrier for use in the delivery vehicle of FIG. 46, according to an exemplary embodiment.
Figure 48:
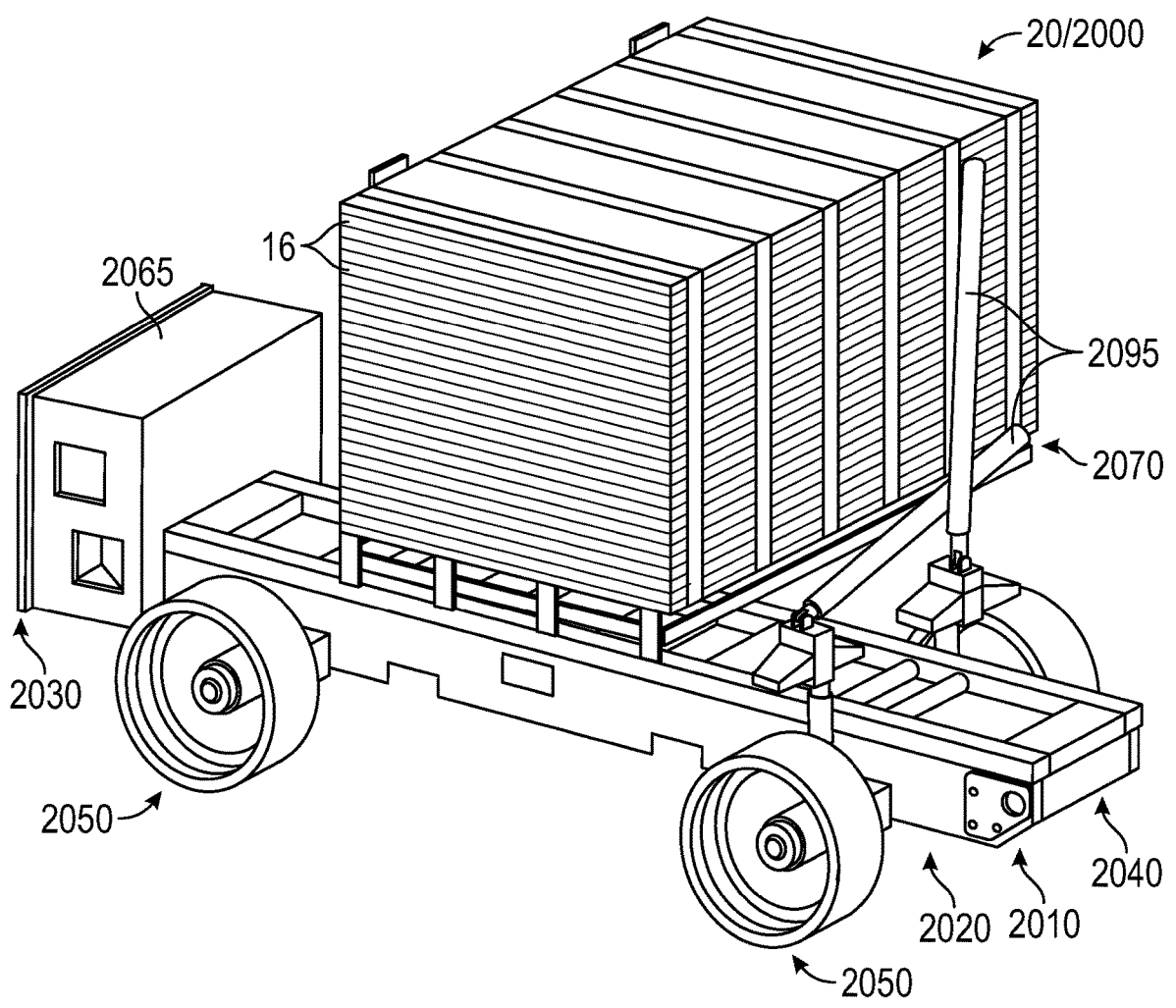
FIG. 48 is a perspective view of a delivery vehicle, according to an exemplary embodiment.

FIG. 45 is a block diagram of a system 800, according to an exemplary embodiment. The system 800 may include the vehicle 700 (e.g., the AWV 700), the implement 745, and at least one network 815. The vehicle 700 and the implement 745 may interface with, interact with, and/or otherwise communicate with one another via the network 815. For example, the network 815 may include a Controller Area Network (CAN) and the controller of the AWV 700 may communicate with the controller 772 via the CAN. The network 815 may include at least one of a local area network (LAN), wide area network (WAN), telephone network (such as the Public Switched Telephone Network (PSTN)), CAN, wireless link, intranet, the Internet, a cellular network and/or combinations thereof.

The implement 745 (e.g., the controller 772) and the AWV 700 (e.g., the controller 102) may each include at least one processing circuit 805 and at least one network interface 810 or interface module. The processing circuits 805 may include various electrical components and/or devices described herein. For example, the processing circuits 805 may include the processing circuitry 104. The processing circuits 805 may perform similar functionality to that of the various devices described herein. For example, the processing circuits 805 may control at least one of the various vehicles described herein.

The network interfaces 810 may include at least one network interface 810. The network interfaces 810 may include at least one of a network communication devices, network interfaces, and/or other possible communication interfaces. The network interface 810 may include wired or wireless communications interfaces (e.g., jacks, antennas, transmitters, receivers, transceivers, wire terminals, etc.) for conducting data communications between the AWV 700 and the implement 745. The network interfaces 810 may also communicate with the various components of the AWV 700 and/or the arm 752. For example, the sensors 712 may communicate with the network interfaces 810. The network interfaces 810 may communicate directly (e.g., local wired or wireless communications) and/or via a communications network (e.g., the network 130). For example, the network interfaces 810 may include an Ethernet card and port for sending and receiving data via an Ethernet-based communications link or network. The network interfaces 810 may also include a Wi-Fi transceiver for communicating via a wireless communications network (e.g., the network 815). The network interfaces 810 may include a power line communications interface. The network interfaces 810 may include an Ethernet interface, a USB interface, a serial communications interface, and/or a parallel communications interface. The network interfaces 810 may interface with, interact with and/or otherwise communicate with at least one of various systems and/or components described herein.

Delivery Vehicle

Referring to FIGS. 46-57, a delivery vehicle 2000 (e.g., the transportation vehicle 20) is shown, according to an exemplary embodiment. The delivery vehicle 2000 may be configured to transport solar panels 16 between a hub and a job site (e.g., final installation site, etc.). The delivery vehicle 2000 includes a chassis 2010 configured to facilitate receiving, transporting, and delivering solar panels to a job site via the delivery vehicle 2000. The chassis 2010 includes a frame 2020 that extends from a front end 2030 to a rear end 2040 of the delivery vehicle 2000. Tractive elements 2050 are coupled to the frame 2020 via axles, and moveably support the frame 2020 above a ground surface or road. The axles may be one or two oscillating axles capable of accommodating increased loading or components. The tractive elements 2050 may be a wheel or an engaging motive member (e.g., track, etc.). In some embodiments, the chassis 2010 includes hydraulic components (e.g., valves, filters, pipes, hoses, etc.) coupled thereto that facilitate operation and control of a hydraulic circuit including a drum drive pump and/or an accessory pump. The frame 2020 provides a structural base for supporting solar panels 16. In some embodiments, the frame 2020 includes a widened front portion that extends over and about the tractive elements 2050 positioned at the front end 2030 of the chassis 2010 to simultaneously support the solar panels 16 and serve as a fender for the tractive elements 2050 positioned at the front end 2030 of the chassis 2010. The frame 2020 may include lift eyes or other structures that facilitate lifting along the chassis 2010 such that the chassis 2010 may be manipulated as a subassembly for assembly and/or maintenance of the delivery vehicle 2000. One or more components may be coupled to the chassis 2010 using isolating mounts made of a compliant material, such as rubber. The isolating mounts may be configured to reduce the transfer of vibrations between the components and the chassis 2010.

The frame 2020 may include a pair of frame rails coupled with intermediate cross members, according to an exemplary embodiment. The frame rails extend in a generally horizontal and longitudinal direction (e.g., extend within 10 degrees of perpendicular relative to a vertical direction, extend within ten degrees of parallel relative to a ground surface when the delivery vehicle 2000 is positioned on flat ground, etc.) between the front end 2030 and the rear end 2040. The frame rails may be elongated "C-channels" or tubular members, according to various exemplary embodiments. In other embodiments, the frame rails include another type of structural element (e.g., monocoque, a hull, etc.). In still other embodiments, the frame rails include a combination of elongated C-channels, tubular members, a monocoque element, and/or a hull element. A first frame rail of the frame rails may be disposed along a first lateral side and a second frame rail may be disposed along a second lateral side, respectively, of the delivery vehicle 2000. By way of example, the first lateral side of the chassis 2010 may be a left side of the delivery vehicle 2000 and the second lateral side of the chassis 2010 may be a right side of the delivery vehicle 2000.

The delivery vehicle 2000 may include an energy storage device, shown as battery module 2065. The battery module 2065 may be positioned laterally above the chassis 2010. In one example, the battery module 2065 may be positioned proximate the front end 2030. In another example, the battery module 2065 may be positioned proximate the rear end 2040. In still another example, the battery module 2065 may be positioned between the front end 2030 and the rear end 2040. The battery module 2065 may be configured to provide energy to the tractive elements 2050 to drive the delivery vehicle 2000. Additionally or alternatively, the delivery vehicle 2000 may include a fuel cell (e.g., a hydrogen fuel cell) that provides electrical energy to power the delivery vehicle 2000. In other embodiments, the delivery vehicle 2000 may include an internal combustion engine (ICE) that is powered via a fuel source (e.g., gas, diesel, etc.).

The delivery vehicle 2000 may include a carrier 2070 (e.g., a solar panel support or solar panel storage portion). The carrier 2070 is laterally provided above the chassis 2010. In other embodiments, the carrier may be longitudinally provided relative to the chassis 2010. The carrier 2070 includes a first portion 2070*a* (e.g., a base assembly or base) extending in a direction parallel to the chassis 2010 and a second portion 2070*b* (e.g., a headboard assembly or headboard) extending in a direction perpendicular to the first portion 2070*a*. The carrier 2070 is configured to secure one or more solar panels 16. By way of example, the solar panels 16 may be positioned on pallets, referred to herein as pallets of solar panels 16, but may also be individual solar panels 16. That is, the carrier 2070 is configured as a support for the solar panels 16 to be positioned on, where the carrier 2070 includes one or more hinge mechanisms 2080 (e.g., hinges) that secure the solar panels 16 into a transit position. Specifically, the carrier 2070 defines a stowage area configured to receive the solar panels 16. The transit position may be a position in which the solar panels 16 are secured and ready for transportation to the job site. The solar panels 16 may be positioned in either a horizontal, vertical, inverted, upright, etc. relative to the first portion 2070*a*. In some embodiments, the solar panels 16 may be positioned in a combination of the positions. Each hinge mechanism 2080 may include a bracket 2090 and an elongated member 2095 extending from the bracket 2090. The bracket 2090 may be slidably coupled to the first portion 2070*a* of the carrier 2070 along a first axis 2160. By way of example, the bracket 2090 may slide along the first axis 2160 to change a width of the carrier 2070. As may be appreciated, the carrier 2070 may be positioned into a first position to position the solar panels 16 onto the first portion 2070*a*, and then positioned into a second position to be proximate an end of the solar panels 16.

The elongated member 2095 may extend outward from the hinge mechanism 2080. Additionally or alternatively, the elongated member 2095 may be pivotable between a first position and a second position. The first position may be a vertically oriented position or deployed barrier position, where the elongated member 2095 extends substantially parallel to the second portion 2070*b*. The second position may be a horizontally oriented position or stowed position, where the elongated member 2095 extends substantially parallel to the first portion 2070*a*. The elongated member 2095 may extend at or above a height of the solar panels 16.

That is, the top solar panel 16 may abut the elongated member 2095 to secure the solar panels 16. In some embodiments, the solar panels 16 may be positioned above the elongated member 2095. By way of example, the carrier 2070 may include two hinge mechanisms 2080, offset one another. In other embodiments, the hinge mechanisms 2080 may be positioned along different sidewalls of the carrier 2070. As may be appreciated, the hinge mechanisms 2080 are independently actuated relative to one another.

To unload the solar panels 16, the delivery vehicle 2000 may drive next to an installation vehicle (e.g., installation vehicle 22), where the solar panels 16 are unloaded by the installation vehicle. The installation vehicle may take the solar panel 16 off of the carrier 2070 as needed to install the solar panels 16. In one example, the installation vehicle is stationary, where the delivery vehicle 2000 is stopped, parked, or otherwise not in motion next to the installation vehicle. In another example, the installation vehicle is in motion, where the delivery vehicle 2000 is in motion at a substantially similar speed as the installation vehicle.

In one example, the installation vehicle may grab one solar panel 16 at a time. In such an example, the installation vehicle may include a device capable of grabbing the solar panel 16 from the delivery vehicle. For example, the device may include an attachment feature (e.g., the implement 745) that interfaces with a single solar panel 16 at a time. In another example, the installation vehicle may grab multiple solar panels 16 at a time. In such an example, the installation vehicle may include a device capable of grabbing the solar panel 16 from the delivery vehicle. For example, the device may include an attachment feature that interfaces with multiple solar panels 16 at a time. In yet another example, the installation vehicle may grab the pallet of solar panels 16. In such an example, the installation vehicle may include an assembly capable of receiving, and holding, the pallet of solar panels 16.

In still another example, the delivery vehicle 2000 may become a tether by mechanically coupling to the installation vehicle. Upon arriving at the jobsite, the delivery vehicle 2000 may be coupled to the installation vehicle via a tether. Accordingly, the delivery vehicle 2000 may be operably coupled to the installation vehicle via the tether, where status information may be provided between the vehicles. In some embodiments, the installation vehicle may be a master vehicle and the delivery vehicle 2000 may be a slave vehicle.

The delivery vehicle 2000 may be configured to reorient the solar panels 16. In one example, the delivery vehicle 2000 reorients the solar panels 16 by moving the delivery vehicle 2000. In such an example, the delivery vehicle 2000 may determine a position of the installation vehicle and a position of the jobsite. In response to receiving the position data, the delivery vehicle 2000 may determine the best position of the solar panels 16 for the installation vehicle. Accordingly, the delivery vehicle 2000 may reposition into the best position. In another example, the carrier 2070 reorients the solar panels 16. In such an example, the carrier 2070 may include an actuator that is configured to rotate about an axis or pivot about an axis to reposition the carrier into the best position for the installation vehicle. As may be appreciated, positioning the delivery vehicle 2000 into the best position for the installation vehicle advantageously positions the solar panels 16 into a position for the installation vehicle to grab the solar panels 16.

The delivery vehicle 2000 may be an autonomous delivery vehicle. In other embodiments, the delivery vehicle 2000 may include an operator ride-on station. In other embodiments, the delivery vehicle 2000 may include a wireless or tether remote control. In still other embodiments, the delivery vehicle 2000 may be teleoperated. In still other embodiments, the delivery vehicle 2000 may include a combination thereof. As discussed above, the delivery vehicle 2000 includes processing circuitry 104 to control actuation of the delivery vehicle 2000. The delivery vehicle 2000 may then travel down a predetermined path or map of the jobsite. In one embodiment, the delivery vehicle 2000 may have a jobsite map loaded into the processing circuitry 104. In another embodiment, the delivery vehicle 2000 may receive the predetermined path via a communication device (e.g., wireless, telecommunication, Bluetooth, satellite, etc.).

Figure 49:
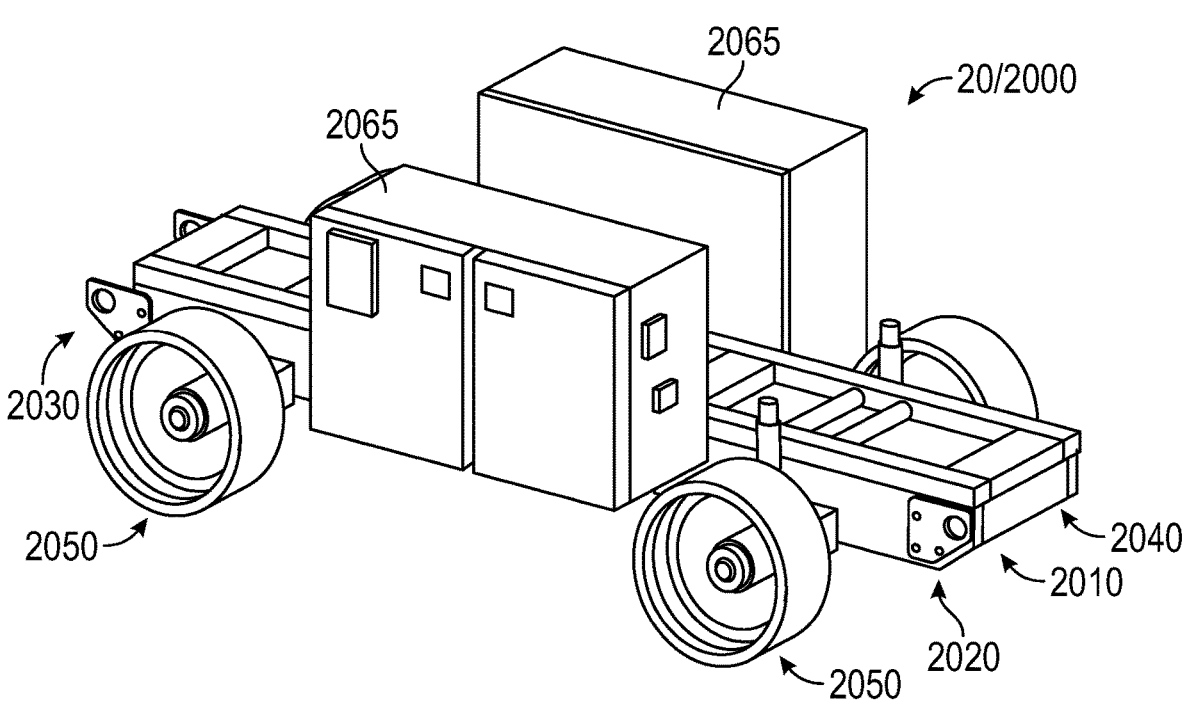
FIG. 49 is a perspective view of a delivery vehicle, shown without any solar panels, according to an exemplary embodiment.
Figure 50:
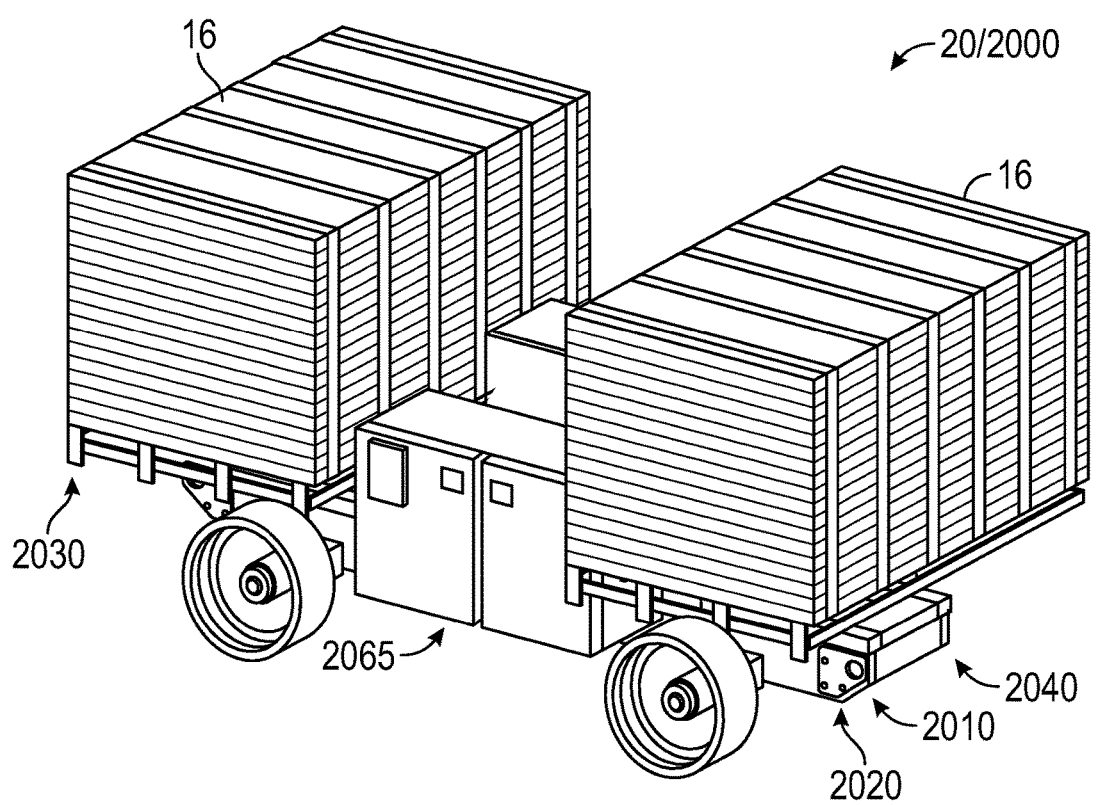
FIG. 50 is a perspective view of the delivery vehicle of FIG. 49, shown with solar panels, according to an exemplary embodiment.

Referring now to FIGS. 49 and 50, the delivery vehicle 2000 is shown according to an alternative embodiment. The delivery vehicle 2000 of FIGS. 49 and 50 may be substantially similar to the delivery vehicle 2000 of FIG. 46 except as otherwise specified. As shown in FIGS. 49 and 50, the delivery vehicle 2000 does not include a carrier 2070 and instead includes a platform provided in a horizontal position above the chassis 2010. The platform may be configured to support the solar panels 16 (e.g., as shown in FIG. 50). The delivery vehicle 2000 may include two platforms provided on opposite sides of the battery module 2065. Additionally or alternatively, the delivery vehicle 2000 may include multiple battery modules 2065. The battery modules 2065 may be associated with independent chassis 2010. Additionally or alternatively, one of the battery modules 2065 may be configured as a main battery module and the other battery module may be configured as a secondary battery module 2065.

Figure 51:
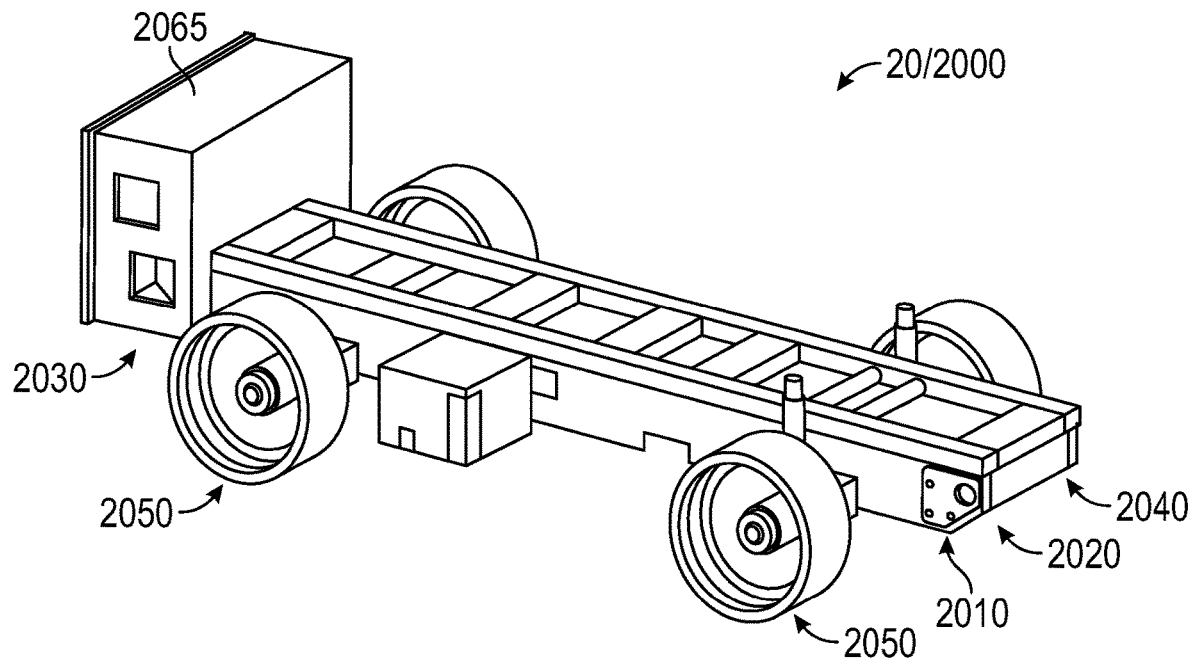
FIG. 51 is a perspective view of a delivery vehicle, shown without any solar panels, according to an exemplary embodiment.
Figure 52:
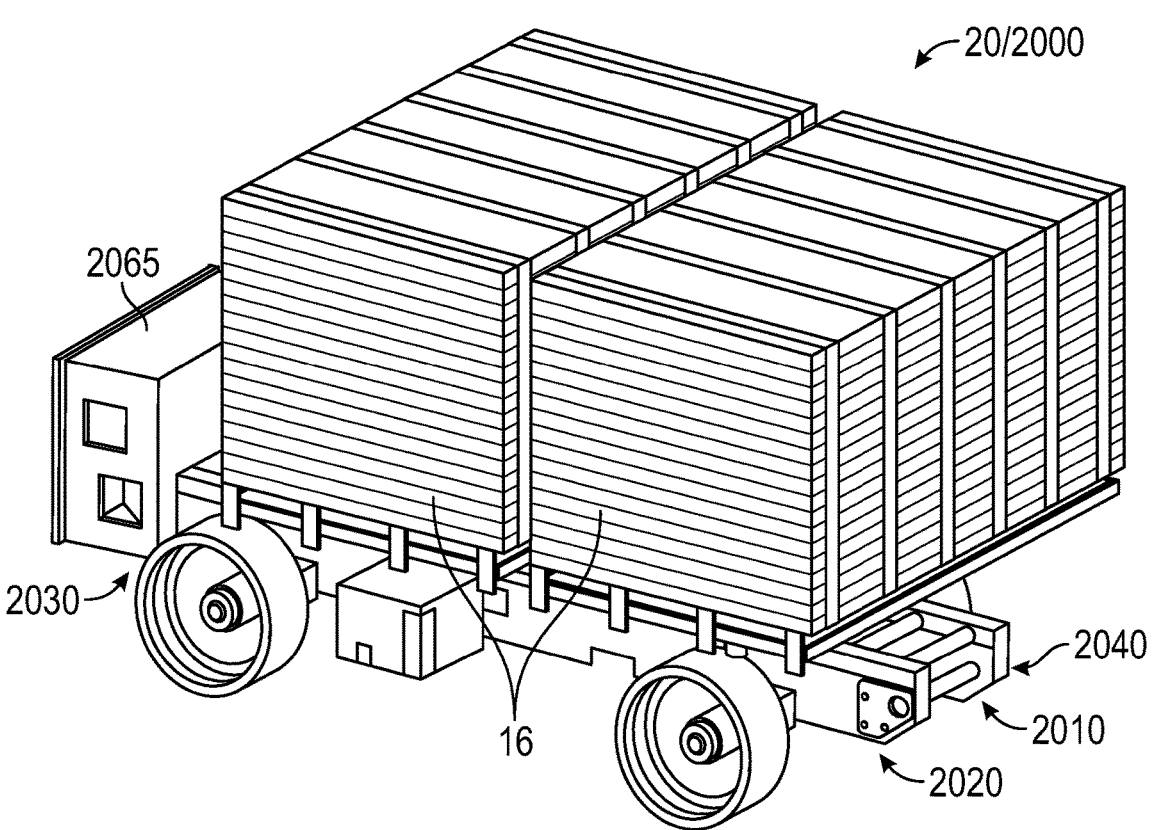
FIG. 52 is a perspective view of the delivery vehicle of FIG. 51, shown with solar panels, according to an exemplary embodiment.

Referring now to FIGS. 51 and 52, the delivery vehicle 2000 is shown according to another alternate embodiment. The delivery vehicle 2000 of FIGS. 51 and 52 may be substantially similar to the delivery vehicle 2000 of FIG. 46 except as otherwise specified. As shown in FIGS. 51 and 52, the delivery vehicle 2000 does not include a carrier 2070 and instead includes a platform provided in a horizontal position above the chassis 2010. The platform may be configured to support the solar panels 16 (e.g., as shown in FIG. 52). The delivery vehicle 2000 may include two platforms provided proximate one another.

Figure 53:
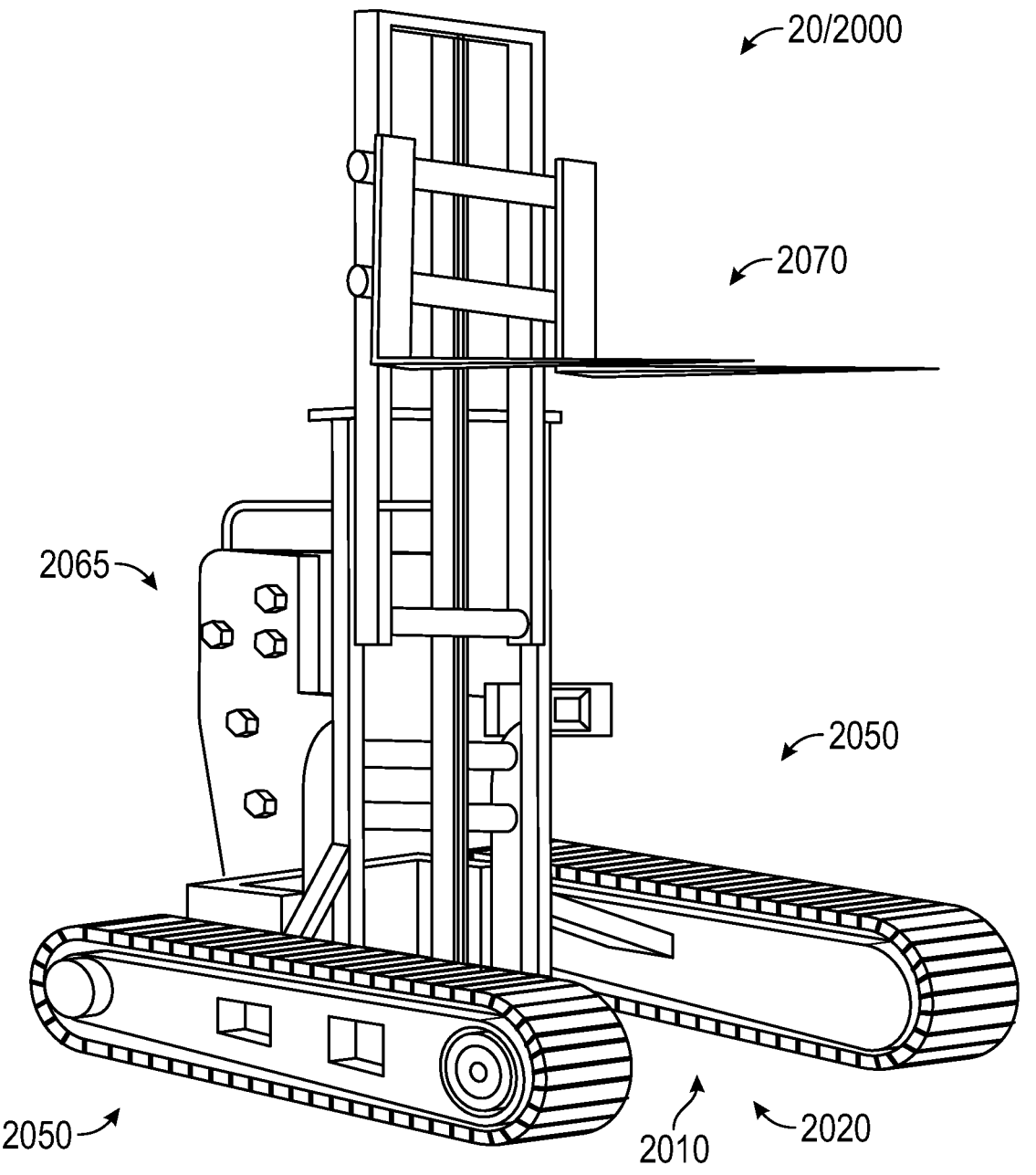
FIG. 53 is a perspective view of a delivery vehicle, shown without any solar panels and tracks, according to an exemplary embodiment.

Referring now to FIG. 53, the delivery vehicle 2000 is shown according to another alternate embodiment. The delivery vehicle 2000 of FIG. 53 may be substantially similar to the delivery vehicle 2000 of FIG. 46 except as otherwise specified. As shown in FIG. 53 the delivery vehicle 2000 has tracks as tractive elements 2050. As may be appreciated, the tracks allow the delivery vehicle 2000 to have improved terrainability for traveling through jobsites or varying road conditions. The delivery vehicle 2000 may include a lift system (e.g., forks coupled to a vertical lift etc.) that is configured to receive a pallet of solar panels 16. In one example, the delivery vehicle 2000 may drop the pallet of solar panels 16 at the jobsite. In another example, the delivery vehicle 2000 may follow the installation vehicle, where the installation vehicle grabs solar panels 16 from the delivery vehicle 2000.

Figure 54:
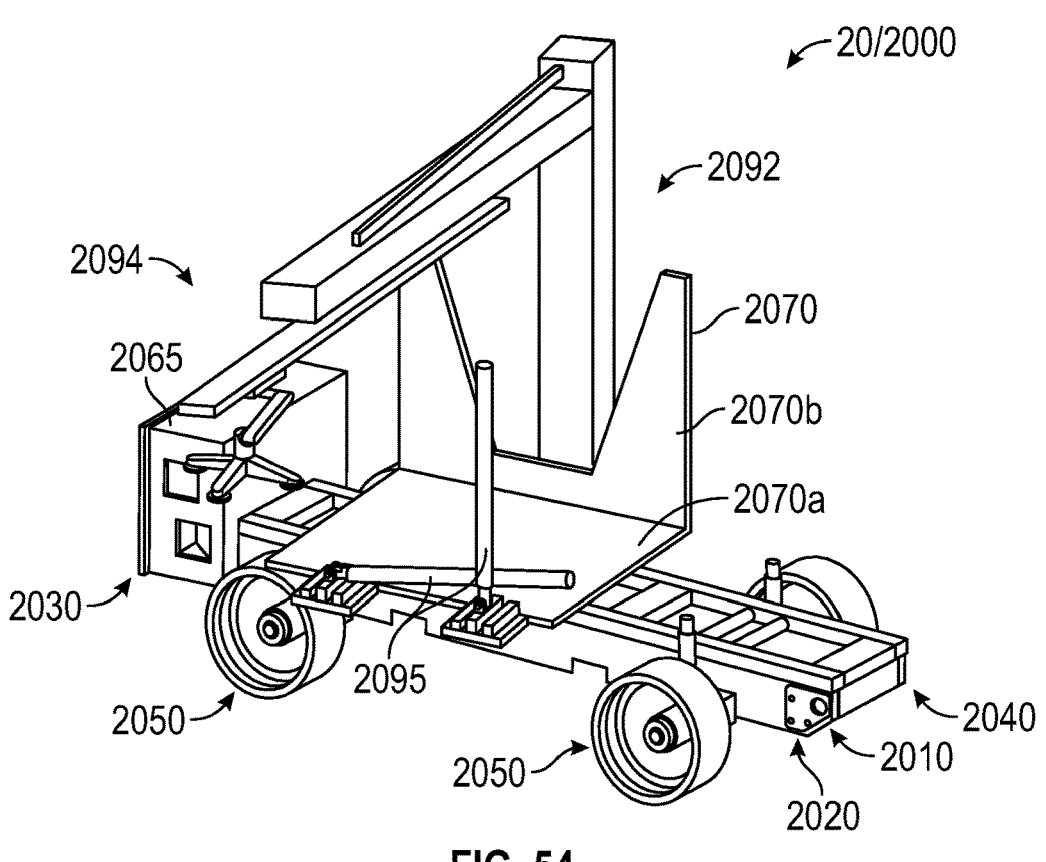
FIG. 54 is a perspective view of a delivery vehicle, shown without any solar panels, according to an exemplary embodiment.
Figure 55:
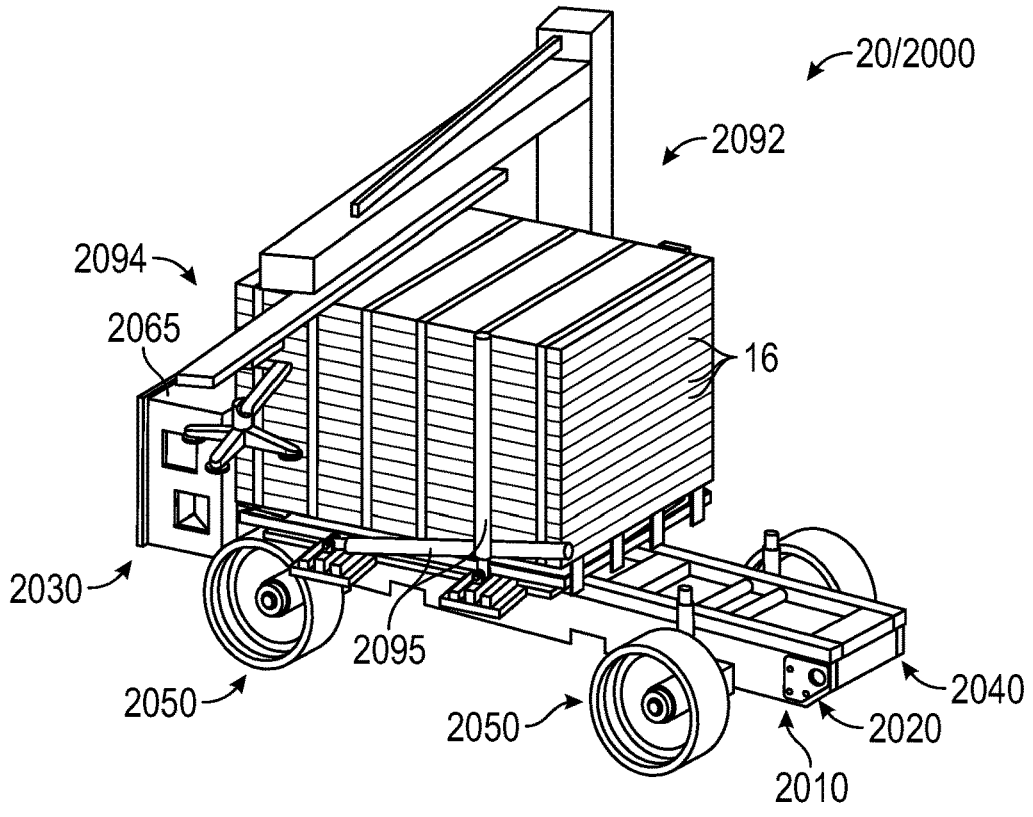
FIG. 55 is a perspective view of the delivery vehicle of FIG. 54, shown with solar panels, according to an exemplary embodiment.

Referring now to FIGS. 54 and 55, the delivery vehicle 2000 is shown according to another alternate embodiment. The delivery vehicle 2000 of FIGS. 54 and 55 may be substantially similar to the delivery vehicle 2000 of FIG. 46 except as otherwise specified. The delivery vehicle 2000 may be defined as an autonomous work vehicle (AWV). The AWV may include a frame assembly 2092 extending laterally from a side of the delivery vehicle 2000. The frame assembly 2092 may include an attachment assembly, shown as implement 2094, that is configured to interface with the pallet of solar panels 16 or individual solar panels 16 to install or orient the solar panels 16 in the jobsite. By way of example, the implement 2094 may include a robotic arm similar to the implement 745. Accordingly, the implement 2094 may be rotatably coupled to the frame assembly 2092, where the implement 2094 may rotate to position the solar panels 16 in a better position for installation.

Figure 56:
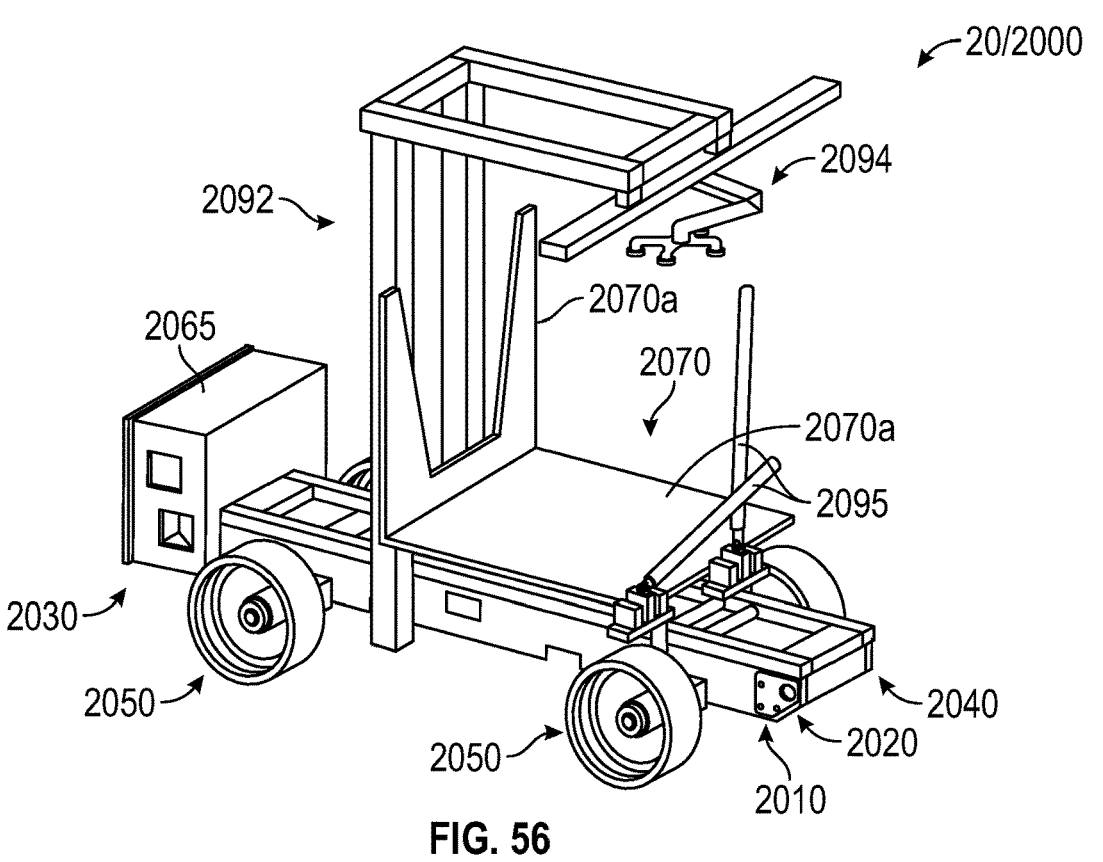
FIG. 56 is a perspective view of a delivery vehicle, shown without any solar panels, according to an exemplary embodiment.
Figure 57:
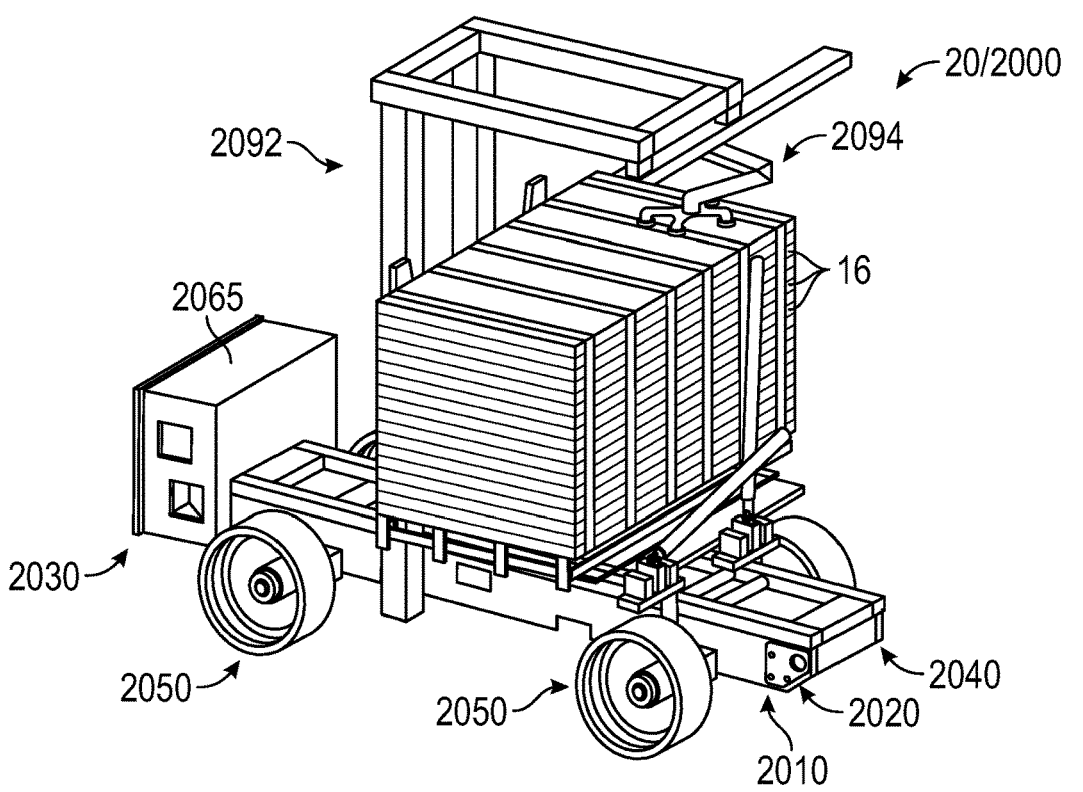
FIG. 57 is a perspective view of the delivery vehicle of FIG. 56, shown with solar panels, according to an exemplary embodiment.

Referring now to FIGS. 56 and 57, the delivery vehicle 2000 is shown according to another alternate embodiment. The delivery vehicle 2000 of FIGS. 56 and 57 may be substantially similar to the delivery vehicle 2000 of FIGS. 54 and 55 except as otherwise specified. The delivery vehicle 2000 may be defined as an autonomous work vehicle (AWV). The AWV may be include a frame assembly 2092 extending laterally from a rear of the delivery vehicle 2000. The frame assembly 2092 may include an attachment assembly, shown as implement 2094, that is configured to interface with the pallet of solar panels 16 or individual solar panels 16 to install or orient the solar panels 16 in the jobsite. Accordingly, the implement 2094 may be rotatably coupled to the frame assembly, where the attachment assembly may rotate to position the solar panels 16 in a better position for installation. As may be appreciated, the delivery vehicle 2000 may be capable of installing solar panels 16 on either side of the delivery vehicle 2000 by rotating the frame assembly 2092 to the associated side.

Modular Solar Panel Carrier

In some embodiments, at least one vehicle described herein may include a solar panel carrier. For example, the transportation vehicle 20 (e.g., the delivery vehicle 2000) may include the solar panel carrier. Some solar panels 16 may be carried, transported, supported, and/or otherwise held by the solar panel carrier described herein. Solar panels 16 may have various shapes, dimensions, designs, and/or configurations. The solar panel carrier may include one or more components and the components may be modular and/or configurable to store, hold, keep, and/or otherwise carry solar panels of various configurations. The modularity and/or configurability of the solar panel carrier may provide a seamless mode of transportation for solar panels. For example, the size and/or area of at least one portion of the solar panel carrier may easily be adjusted and/or changed to accommodate solar panels having various different sizes.

Some of the technical solutions described herein include adjustable and/or reconfigurable components that may be included in the solar panel carrier. For example, the solar panel carrier may include a post assembly. The post assembly may include at least one post and the posts may be coupled to a moveable and/or adjustable structural element. For example, the posts may be coupled to a beam (e.g., a structural element) and the beam may move and/or otherwise change locations to dispose the posts in various locations of the carrier. In some embodiments, the beam may rest within, insert into, slide into, and/or otherwise fit into at least one recess and/or opening of a component disposed on the carrier. For example, the solar panel carrier may include one or more structural elements that include at least one of a hollow body, an opening, an aperture, a recess, a slot, and/or among other possible spaces and/or areas that may receive the posts (e.g., the structural element coupled to the posts).

The repositioning and/or rearrangement of the post assembly (e.g., adjusting the location and/or placement of the structural element) may result in a change and/or adjustment in an orientation of the post. For example, the post assembly may be coupled with the solar panel carriers in a first location and a second location. The posts may have a first orientation and a second orientation. For example, the post may have a vertical orientation and a horizontal orientation. The orientation of the posts may be based on a given component of the solar panel carrier. For example, the posts may have the first orientation when the posts are coupled with a first component of the solar panel carrier and the posts may have the second orientation when the posts are coupled with a second component.

Figure 58:
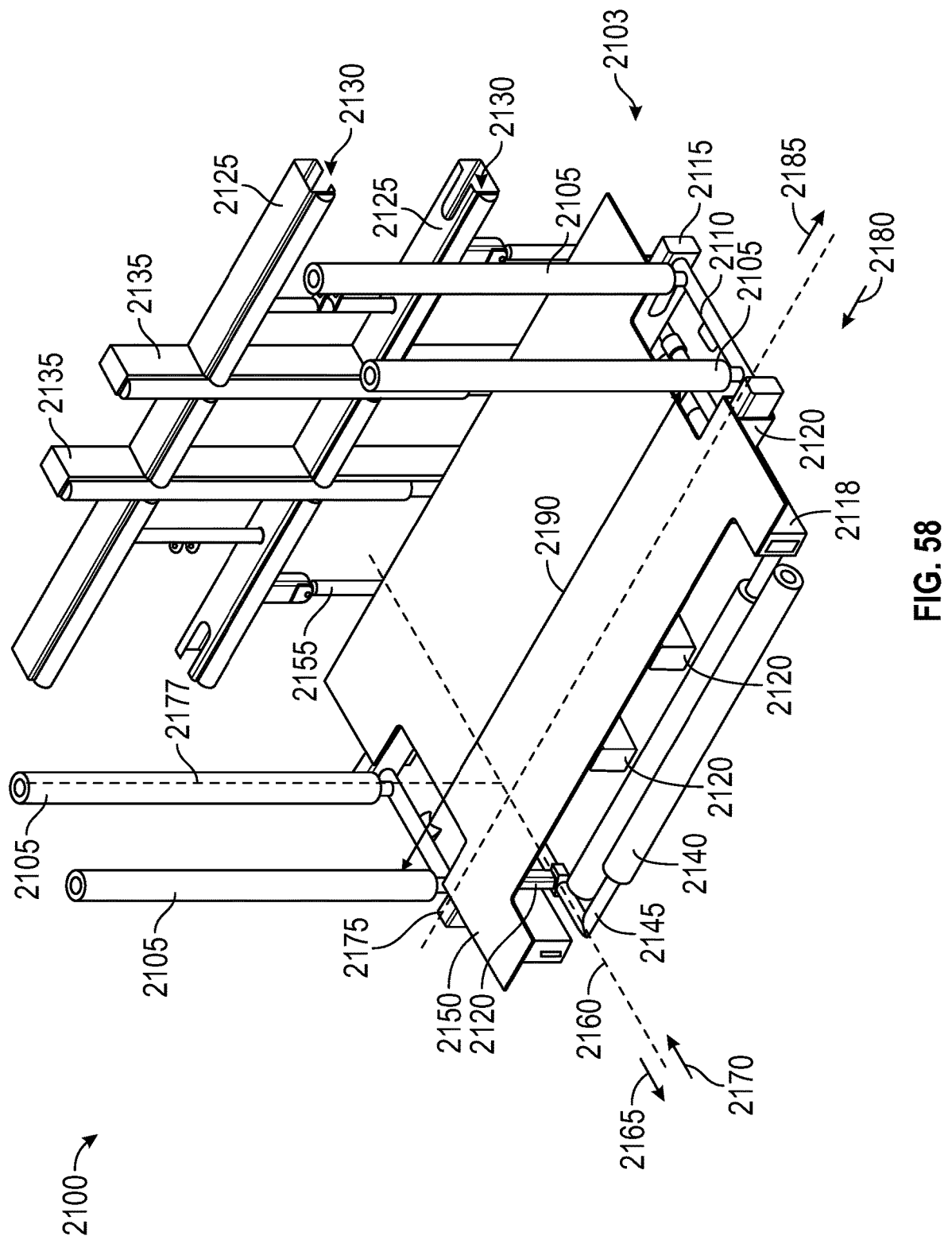
FIG. 58 is a perspective view of a carrier, according to an exemplary embodiment.

FIG. 58 depicts a perspective view of a carrier 2100, according to an exemplary embodiment. The carrier 2100 may be and/or include the solar panel carrier described herein. The carrier 2100 includes at least one post assembly 2103 (e.g., a pair of post assemblies 2103 on opposing sides of the carrier 2100 forming a first side support assembly or first side support and a second side support assembly or second side support, respectively), at least one body 2118, at least one structural element 2125, at least one structural element 2135, at least one post 2140 (e.g., two posts 2140 forming a barrier assembly or barrier), at least one surface 2150, and at least one actuator 2155. The body 2118 may be disposed beneath the surface 2150 (e.g., the body 2118 may form a base assembly defining the surface 2150). For example, the surface 2150 may be coupled with the body 2118 and the surface 2150 may be disposed on top of and otherwise above the body 2118. The body 2118 may be disposed between the surface 2150 and a ground surface. For example, the body 2118 may be located between the surface 2150 and a road. The body 2118 may include at least one portion 2120. The portions 2120 may be and/or include at least one of body structures, body elements, body members, and/or body framing. For example, the portions 2120 may be at least one of a shaft and/or a rod with an opening, a hollow beam, a bracket, a support structure, a receiver channel, a slot, a recess, a void, a channel, a hollow body, an aperture, and/or a joint receiver.

The post assembly 2103 (e.g., a side support assembly) may be and/or include the post assembly described herein. The post assembly 2103 may include at least one post 2105, at least one member 2110, and at least one member 2115. The posts 2105 may be and/or include the posts described herein. The member 2110 may be and/or cross-members. The cross-members 2110 may couple one or more posts 2105 with another. For example, a first post 2105 and a second post 2105 may be coupled with the cross-member 2110 and the cross-member 2110 may couple the first post 2105 with the second post 2105. The cross-members 2110 may be and/or include at least one of a bar, a railing, a bracket, a membrane, a linkage, and/or among other possible elements. The members 2115 may be and/or include structural elements. The structural elements 2115 may be and/or include at least one of a bar, a beam, a joist, a strut, a board, and/or among other possible elements. The structural element 2115 may rest within, insert into, slide into, and/or otherwise enter a portion and/or a component of the carrier 2100 (e.g., the portions 2120). FIG. 58 depicts an example of the structural elements 2115 resting within a receiver channel (e.g., a portion 2120).

The structural elements 2115 may removably couple the post assembly 2103 with the carrier 2100. For example, the post assembly 2103 may be coupled with the carrier 2100 when the structural elements 2115 are resting within the portions 2120 and the post assembly 2103 may be decoupled from the carrier 2100 responsive to the structural elements 2115 leaving and/or otherwise exiting the portions 2120. The posts 2105 may have at least one orientation. For example, the posts 2105 may have at least one of a vertical orientation, a horizontal orientation, an upright orientation, a sideways orientation, a lateral orientation, and/or among other possible orientations. In some embodiments, the posts 2105 may define and/or extend along an axis 2177 when the posts 2105 are in a vertical orientation. FIG. 58 depicts an example of the posts 2105 extending along the axis 2177.

The orientations of the posts 2105 may be and/or include at least one a placement, a direction, a location, an alignment, a bearing, an arrangement, and/or among various possible combinations. The orientations of the posts 2105 may be based on and/or impacted by the structural elements 2115. For example, the posts 2105 may have a first orientation (e.g., vertical) with the structural elements 2115 inserted into a first portion of the carrier 2100 and the posts 2105 may have a second orientation (e.g., horizontal) with the structural elements 2115 inserted into a second portion of the carrier 2100. For example, the orientation of the posts 2105 may change responsive to the structural elements 2115 decoupling, from a first position, the post assembly 2103 with the carrier 2100 and then recouping, in a second position, the post assembly 2103 with the carrier.

The post assembly 2103 may be movably coupled with the carrier 2100. For example, the post assembly 2103 may be coupled with an actuator and the actuator may adjust, extend, retract, lengthen, shorten, and/or otherwise move the post assembly 2103. In some embodiments, the carrier 2100 may include a first post assembly 2103 and a second post assembly 2103. The first post assembly 2103 and the second post assembly 2103 may have at least one length and/or distance between them (e.g., how close and/or far apart the post assemblies 2103 are from each other). The length between the post assemblies 2103 may be adjusted. For example, the post assemblies 2103 may have a first distance between them when the actuators and/or the post assemblies 2103 are in a retracted position and the post assemblies 2103 may have a second distance between them when the actuators and/or the post assemblies 2103 are in an extended position. The distance between the post assemblies 2103 may adjust, change, adjust, and/or otherwise define a boundary and/or a border for the surface 2150. For example, the distance between the post assemblies 2103 may define an amount of available and/or useable area of the surface 2150.

The post assemblies 2103 may slide, adjust, and/or otherwise move along an axis 2175. The axis 2175 may define at least one direction and movement path. For example, the axis 2175 may define a side to side and/or a left to right direction. FIG. 58 depicts the movement directions as directions 2180 and 2185. In some embodiments, the movement of the post assemblies 2103 in the direction 2180 may be and/or include moving towards the left and the movement of the post assemblies 2103 in the direction 2185 may be and/or include moving towards the right. In some embodiments, the post assemblies 2103 may move independent from one another. For example, a first post assembly 2103 may move in the direction 2185 and a second post assembly 2103 may move in the direction 2185.

In some embodiments, the posts 2105 may extend along a given axis when the posts 2105 have a first orientation. For example, the posts 2105 may extend along the axis 2177 when the posts 2105 are in a vertical orientation. Similarly, the posts 2105 may extend along a second given axis when the posts 2105 have a second orientation. For example, the posts 2105 may extend along axis 2160 when the posts 2105 are in a horizontal orientation.

The structural elements 2125 may be and/or include at least one element, component, and/or member described herein. For example, the structural elements 2125 may be and/or include a beam. The structural elements 2125 may extend along the axis 2175. For example, the structural elements 2125 may have a horizontal orientation extending along the axis 2175. The structural elements 2125 may include openings 2130 and/or channels 2130. The openings 2130 may receive and/or otherwise accept the structural elements 2115. For example, the structural elements 2115 may insert into and/or otherwise rest within the structural elements 2125 via the openings 2130. The structural elements 2115 may couple the post assemblies 2103 with the carrier 2100 responsive to the structural elements inserting into the openings 2130.

In some embodiments, the structural elements 2115 may retreat and/or otherwise exit the portion 2120 to decouple the post assembly 2103 from the carrier 2100 and the structural elements 2115 may enter and/or otherwise rest within the openings 2130 to recouple the post assembly 2103 with the carrier 2100. The decoupling and then recoupling of the post assembly 2103 may change, adjust, and/or otherwise switch the orientation of the posts 2105. For example, the posts 2105 may have a first orientation, with the post assembly 2103 coupled with the portions 2120, and the posts 2105 may have a second orientation with the post assembly 2103 coupled with the openings 2130.

The post 2140 may include at least one element 2145 or linkage. The element 2145 may be and/or include at least one of a bar, a rod, a shaft, a joint, a rail, and/or among other possible elements. The post 2140 may be coupled with the carrier 2100. In some embodiments, the element 2145 may be coupled with the portions 2120. For example, the portions 2120 may be a shaft with an opening and the element 2145 may insert into and/or otherwise enter the opening to couple the post 2140 with the carrier 2100. The posts 2140 may be movably coupled with the actuators 2155. The actuators 2155 may rotate, spin, adjust, and/or other move the posts 2140 about an axis 2160. For example, the posts 2140 may spin or rotate about the axis 2160 to move from a first position (e.g., a deployed barrier position shown in FIG. 64) to a second position (e.g., a stowed position shown in FIG. 59). The actuators 2155 may also move the posts 2140 along the axis 2160 to adjust a depth of the stowage area (e.g., measured parallel to the axis 2160). For example, the actuators 2155 may include a linear actuator 2155 and a rotational actuator 2155. The linear actuator 2155 may move the posts 2140 along the directions 2165 and/or 2170 that are defined by the axis 2160.

The surface 2150 may hold, support, and/or carry at least one object. For example, the surface 2150 may hold solar panels. The post assemblies 2103 may extend and/or lengthen to provide a first amount of area of the surface 2150. For example, a first post assembly 2103 may move in the direction 2180 and a second post assembly 2103 may move in the direction 2185 to create a first distance between the post assemblies 2103. The first distance may be and/or include a lengthen position. To continue this example the first post assembly 2103 may move in the direction 2185 and the second post assembly 2103 may move in the direction 2180 to create a second distance between the post assemblies 2103. The second distance may be and/or include a retracted position. In some embodiments, the first distance between the post assemblies 2103 may be larger than the second distance between post assemblies 2103. For example, the post assemblies 2103 may be further apart from each other when they are in the lengthened position in comparison to the retracted position. FIG. 58 depicts an example of the post assemblies 2103 in the extended position and an example of the posts 2105 being a distance 2190 from each other. In some embodiments, the distance 2190 may define and/or otherwise establish the amount of useable and/or available area for the surface 2150.

The structural elements 2135 and 2125 may define and/or otherwise establish at least one side of the carrier 2100 (e.g., a headboard assembly). For example, the structural elements 2135 and 2125 may define a rear and/or back side of the carrier 2100. The back side may define a rearmost portion of the surface 2150. For example, the solar panels may be placed on the surface 2150 but cannot extend and/or be located beyond the structural elements 2135 and 2125. The posts 2140 may define and/or otherwise establish at least one side of the carrier 2100. For example, the posts 2140 may define a front side of the carrier 2100. The front side may define a frontmost portion of the surface 2150. The post assemblies 2103 may define at least one side of the carrier 2100. For example, the post assemblies 2103 may define left side of the carrier 2100. The left side may define a leftmost portion of the carrier 2100.

Figure 59:
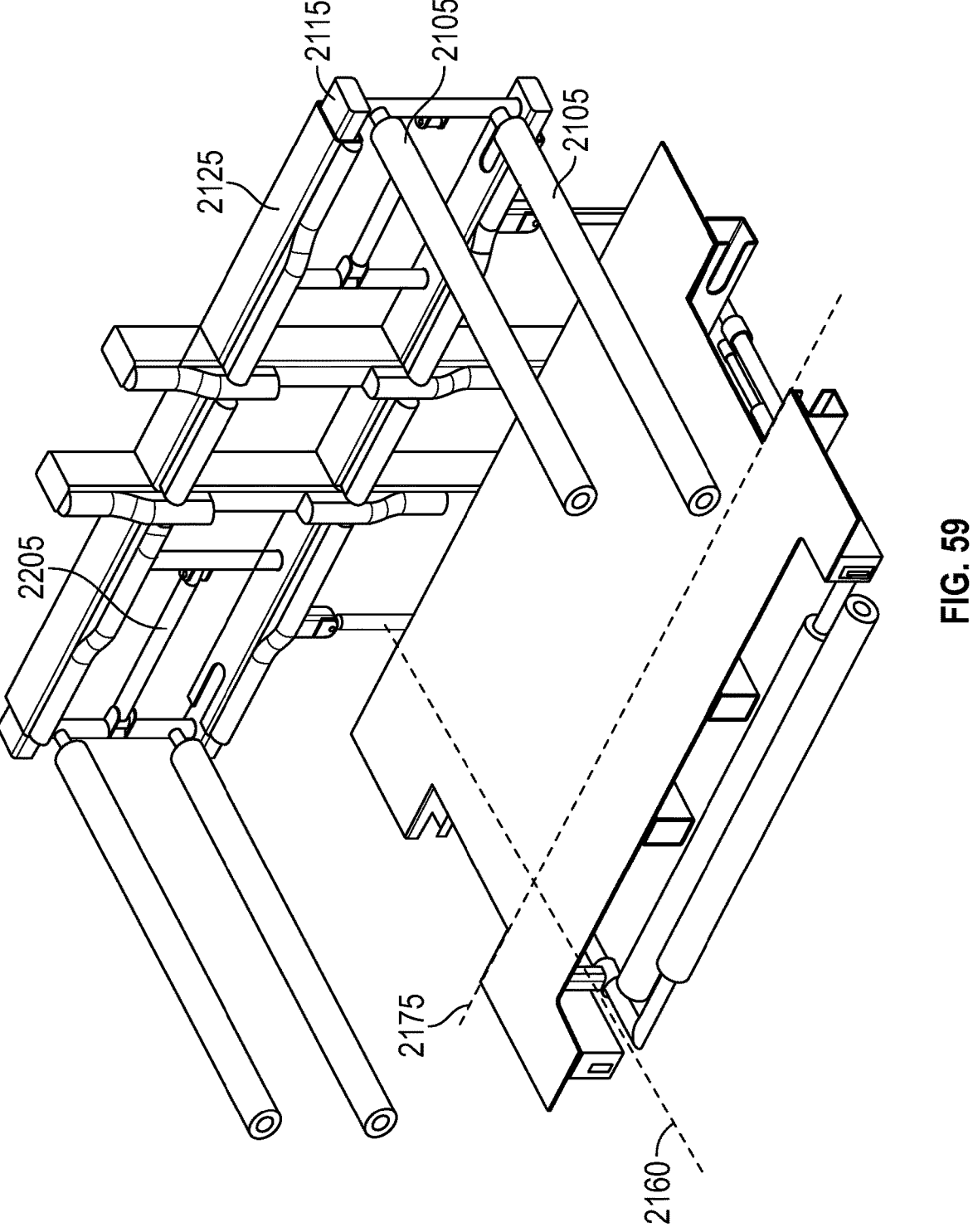
FIG. 59 is a perspective view of the carrier illustrated in FIG. 58, according to an exemplary embodiment.

FIG. 59 depicts a perspective view of the carrier 2100. The post assemblies 2103 may be coupled with the carrier 2100. For example, the structural elements 2115 may be inserted into the openings 2130 to couple the post assemblies 2103 with the elements 2125. The posts 2105 are shown to have a horizontal orientation. For example, the posts 2105 may extend along the axis 2160 and the posts 2105 extending along the axis 2160 may define the horizontal orientation for the posts 2105. The cross-member 2110 may be coupled with an actuator 2205 (e.g., at a first interface). An opposing end of the actuator 2205 may be coupled to the body 2118 or the structural elements 2125 and 2135 (e.g., at a second interface). The actuator 2205 may be and/or include at least one of the actuators described herein. For example, the actuator 2205 may be a linear actuator and the actuators 2205 may move, lengthen, retract, and/or extend the post assemblies 2103 along the axis 2175. The actuator 2205 may move the post assemblies 2103 to support and/or release at least one object. For example, a solar panel array (e.g., a collection of solar panels) may be place on the surface 2150 and the actuator 2205 may retract the post assemblies 2103 to have the posts 2105 support, contact, and/or hold the solar panel array in place. To continue this example, the actuators 2205 may extend the post assemblies 2103 to have the posts 2105 release (e.g., no longer make contact with) the solar panel array. The actuators 205 may facilitate holding the solar panels in place (e.g., by clamping the solar panels between the posts 105) and/or expanding the distance between the posts 105 (e.g., the distance 710) to accommodate wider solar panels.

In some embodiments, the posts described herein (e.g., the posts 2105 and the posts 2140) may include an outer layer and/or an outer structure. For example, the posts 2105 may have a rod disposed between and/or within a cavity defined by hollow cylinder (e.g., the outer structure). In this example, the outer structure may be and/or include padding, cushion material, foam material, and/or otherwise absorptive material. For example, the posts 2105 may include a rod surrounded by a pad (e.g., the outer layer). The outer layer may provide an absorption factor for the posts 2105. For example, the absorption factor may result in the posts 2105 contacting and/or support the solar panel arrays while providing a barrier (e.g., the outer layer) between the posts 2105 and the solar panel arrays. In some embodiments, various components of the carrier 2100 may include outer structures. For example, the elements 2125 may include an outer foam layer.

Figure 60:
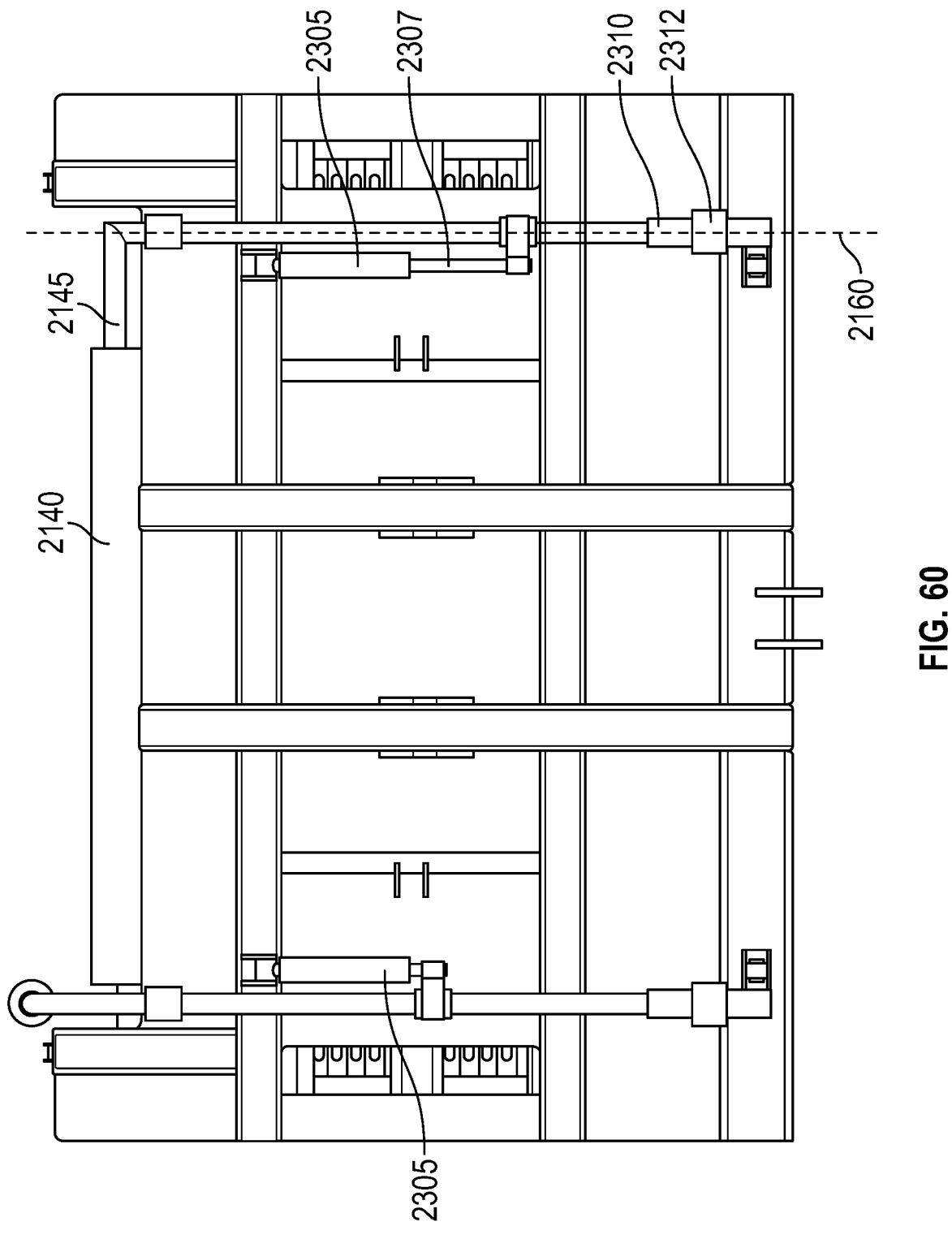
FIG. 60 is a perspective bottom view of the carrier illustrated in FIG. 58, according to an exemplary embodiment.

FIG. 60 depicts a perspective bottom view of the carrier 2100. The carrier may include at least one actuator 2305 and at least one opening 2312. The actuator 2305 may be and/or include at least one actuator described herein. For example, the actuator 2305 may a linear actuator. The actuator 2305 may include at least one tube 2307. The tube 2307 may be coupled with the element 2145 at a first interface and with the body 2118 at a second interface. For example, the tube 2307 may include an eye and/or opening and the element 2145 may be inserted though the opening to couple the tube 2307 with the element 2145. The actuator 2305 may move the post 2140. For example, the actuator 2305 may move the post 2140 along the axis 2160. The post 2140 may include at least one shaft 2310. The shaft 2310 may be coupled with the element 2145. The shaft 2310 may also be coupled with the opening 2312. The opening 2312 may be and/or include the portions 2120. The shaft 2310 may insert through the opening 2312 and the shaft 2310 may couple with an actuator (e.g., the actuator 2155). For example, the shaft 2310 may include a pivoting arm and the pivoting arm may couple with the actuator 2155. The actuator 2155 may move the pivoting arm to rotate the posts 2140 about the axis 2160.

Figure 61:
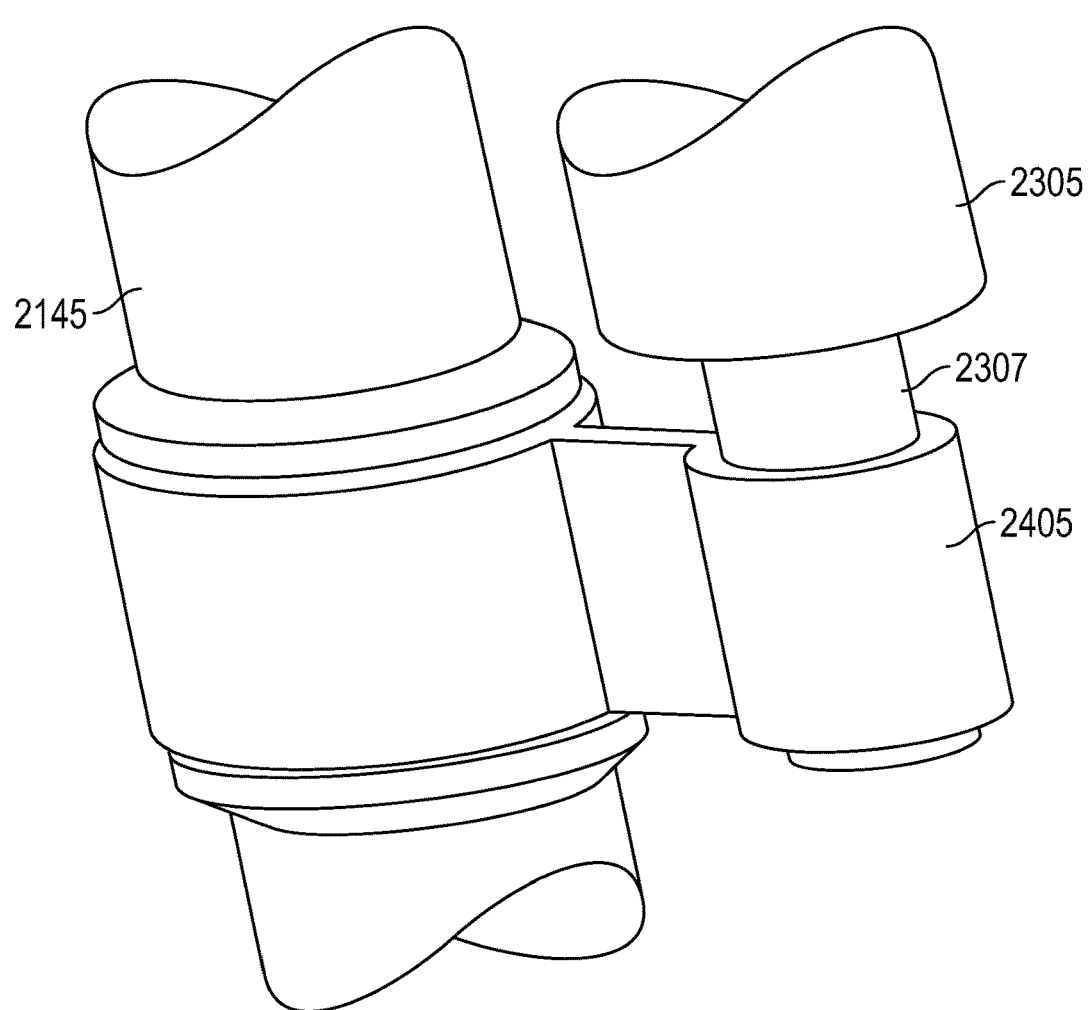
FIG. 61 is a perspective view of components of the carrier illustrated in FIG. 58, according to an exemplary embodiment.

FIG. 61 depicts a perspective view of components of the carrier 2100. The actuator 2305 is shown coupled with the element 2145 via linkage 2405. The linkage 2405 may be and/or include at least one of a shaft with two openings, a bracket with two openings, and/or other possible linkage elements. The two openings may include at least one opening for the element 2145 and at least one opening for the tube 2307.

Figure 62:
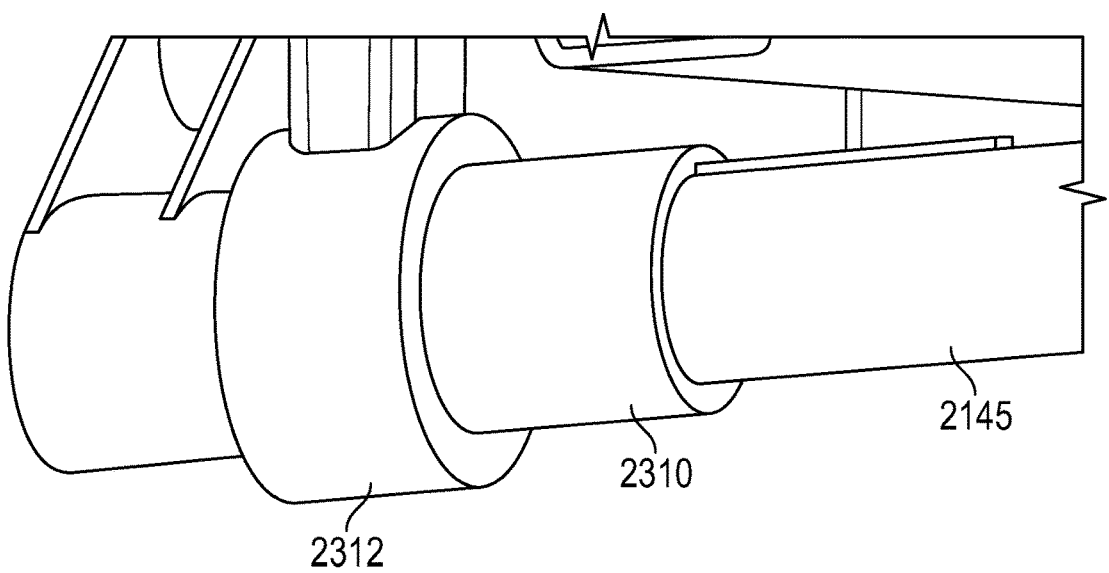
FIG. 62 is a perspective view of components of the carrier illustrated in FIG. 58, according to an exemplary embodiment.

FIG. 62 depicts a perspective view of components of the carrier 2100. The element 2145 is shown coupled with the shaft 2310 and the shaft 2310 is shown extending through the opening 2312. The opening 2312 may couple the shaft 2310 with the carrier 2100. For example, the shaft 2310 extending through the opening 2312 may couple the shaft 2310 with the body 2118 of the carrier 2100. At least one end of the shaft 2310 may be coupled with an actuator. For example, a first end of the shaft 2310 may be coupled with the element 2145 and a second end of the shaft 2310 may be coupled with the actuator.

Figure 63:
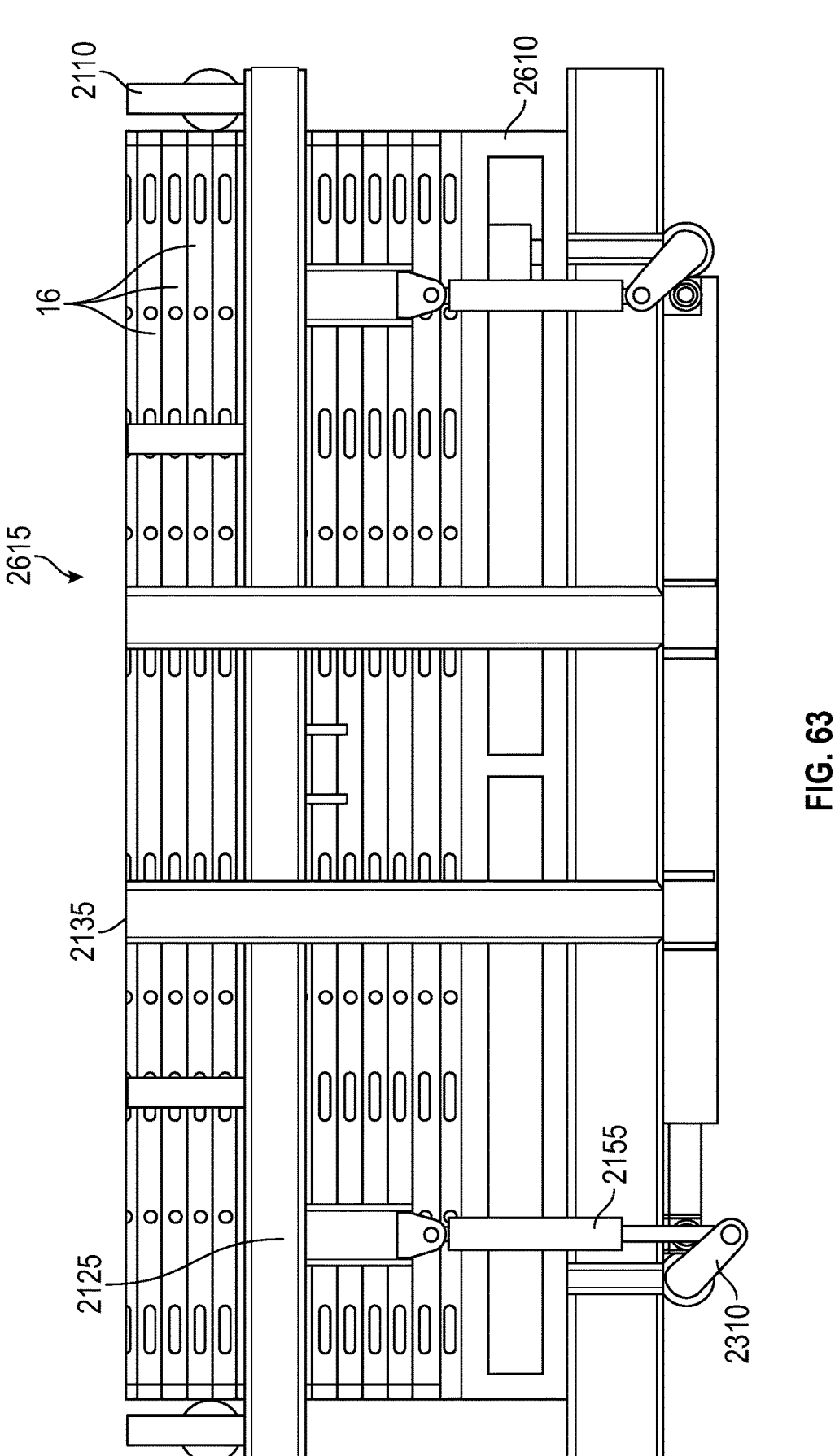
FIG. 63 is a perspective rear view of the carrier illustrated in FIG. 58, according to an exemplary embodiment.

FIG. 63 depicts a perspective rear view of the carrier 2100. The actuators 2155 may be coupled with the shaft 2310 at a first interface and with a structural element 2125 at a second interface. The actuators 2155 may move, pivot, swing, and/or otherwise move the shaft 2310. The actuators 2155 moving the elements 2145 may cause the posts 2140 to rotate about the axis 2160. The carrier 2100 may hold at least one solar panel array 2615. For example, the solar panel arrays 2615 may be placed on a pallet 2610 and the pallet 2610 may rest on the surface 2150. The solar panel arrays 2615 may include at least one solar panel 16. The solar panels 16 may be stacked and/or otherwise positioned on top of each other. The post assemblies 2103 may be in a retracted position. For example, the post assemblies 2103 may move towards one another, along the axis 2175, to decrease a distance between the post assemblies 2103. The posts 2105 may hold the solar panels 16 with the post assemblies 2103 in the retracted position. The posts 2105 holding the solar panels 16 support, secure, and/or otherwise affix the solar panels 16 with the carrier 2100.

Figure 64:
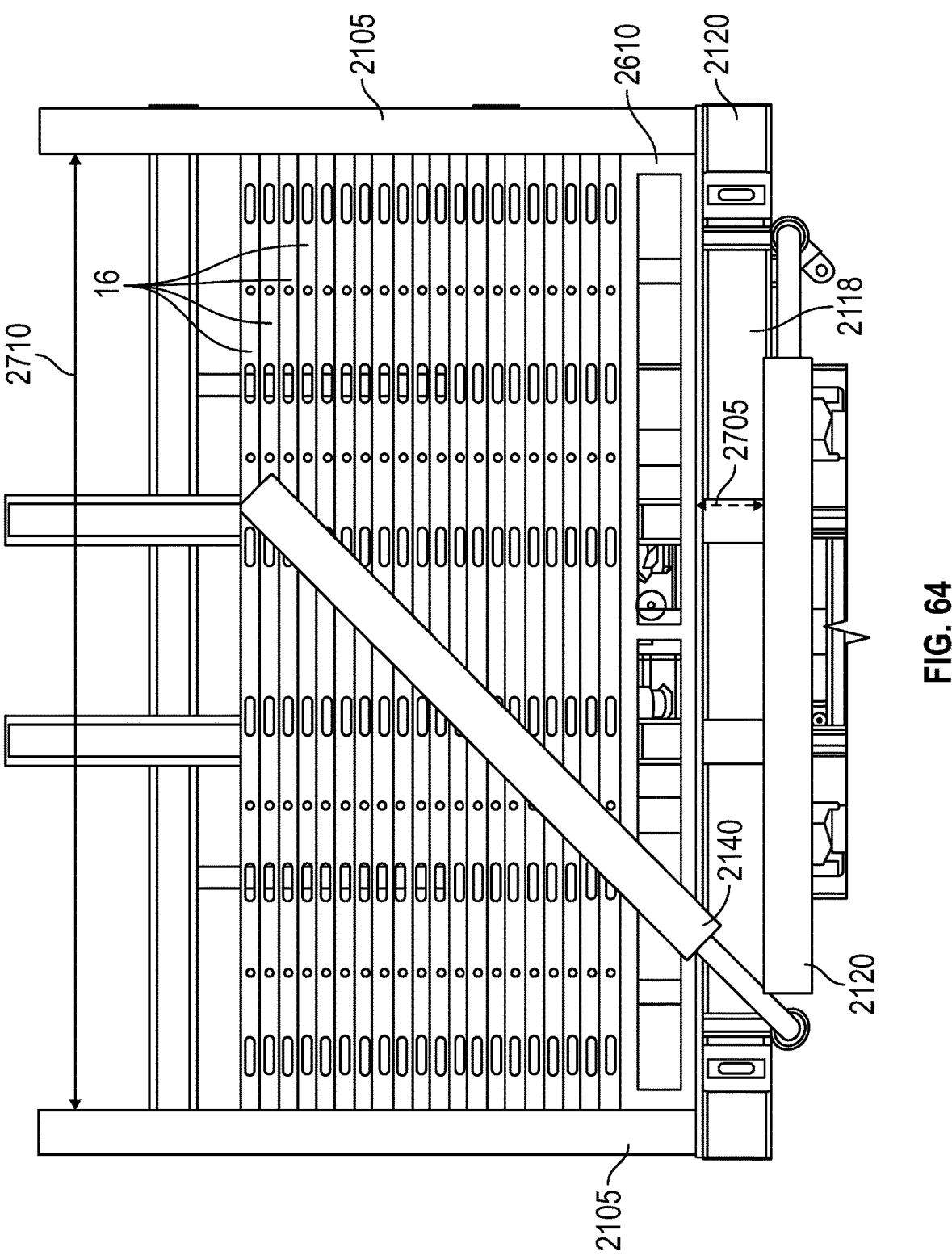
FIG. 64 is a perspective view of the carrier illustrated in FIG. 58, according to an exemplary embodiment.

FIG. 64 depicts a perspective view of the carrier 2100. The posts 2140 may rotate, swing, pivot, and/or otherwise move between positions. For example, the posts 2140 may move about the axis 2160 to move from a first position to a second position. The posts 2140 moving between respective positions (e.g., moving from the first position to the second position) may provide access to respective solar panels 16. For example, the posts 2140 may secure the solar panels 16 while in the first position (e.g., the posts 2140 may provide and/or create an obstruction to prevent the solar panels from moving in the direction 2165). To continue this example, the posts 2140 may provide access to a respective solar panel 16 (e.g., a top solar panel) responsive to the posts 2140 moving from the first position to the second position (e.g., the posts 2140 is no longer providing an obstruction to the top solar panel). The posts 2140 may also prevent access to a second respective solar panel 16 while in the second position. For example, the posts 2140 may provide an obstruction to a solar panel 16 disposed beneath and/or under the top solar panel 16).

The posts 2140 may move from at least one vertical position to at least one horizontal position. For example, the posts 2140 may extend along the axis 2177 while in a vertical position and the posts 2140 may extend along the axis 2175 while in a horizontal position. The posts 2140 may be disposed at least partially above the surface 2150. For example, the posts 2140 may be disposed at least partially above the surface 2150 with the posts 2140 in a position that is providing an obstruction to at least one solar panel 16. FIG. 64 depicts an example of a first post 2140 disposed at least partially above the surface 2150. The posts 2140 may be disposed at least partially between the surface 2150 and a ground surface. For example, the posts 2140 may be disposed between the surface 2150 and the ground surface with the posts extending along the axis 2175. FIG. 64 depicts an example of a second post 2140 disposed beneath the surface 2150. The second posts 2140 extending along the axis 2175 is shown to provide and/or otherwise define a distance 2705 between the surface 2150 and the second post 2140. The distance 2705 may provide, create, and/or otherwise establish an access point for at least one of the pallet 2610 and/or the solar panel arrays 2615. For example, the distance 2705 between the posts 2140 and the surface 2150 may provide room for the solar panel arrays 2615 to be placed, located, and/or otherwise positioned on the surface 2150.

The posts 2105 may support the solar panels 16. For example, the post assemblies 2103 may move to a retreated position (e.g., the post assemblies 2103 may move towards each other) to move the posts 2105 towards the solar panels 16. The posts 2105 may hold, keep, and/or otherwise secure the solar panels 16. The post assemblies 2103 in the retracted position may define a distance 2710. The distance 2710 may a distance between the posts 2105 of respective post assemblies 2103. The distance 2710 may be less than the distance 2190 (e.g., the post assemblies 2103 in the retracted position defining the distance 2710 are closer to one another in comparison to the post assemblies in the extended position defining the distance 2190).

In some embodiments, the carrier 2100 may be mounted, secured, attached, placed, and/or otherwise coupled with at least one vehicle. For example, the carrier 2100 may be coupled to a frame and/or a rearward portion of a cab of a truck. The carrier 2100 may hold the solar panel arrays 2615 and the truck may transport, move, and/or otherwise deliver the solar panel arrays 2615 to at least one location. For example, the truck may transport the solar panel arrays 2615 from a supply site to a construction site.

Autonomous Delivery Vehicle

In some embodiments, the various vehicles described herein may be and/or implemented as autonomous vehicles. In other embodiments the vehicles are partially autonomous or entirely operator-controlled. For example, the delivery vehicle 2000 may include a controller (e.g., the controller 102) and the controller may provide signals to various elements and/or components of the delivery vehicle 2000 to move and/or otherwise control the delivery vehicle 2000. For example, the controller 102 may provide signals to the tractive elements 2050 to move the delivery vehicle 2000 from a location to a second location.

In some embodiments, the controller 102 may receive information pertaining to a jobsite (e.g., a solar panel installation site, a construction site, a residential location, a warehouse, a commercial building, and/or among other possible sites) and the controller 102 may use the information pertaining to the jobsite to controller the delivery vehicle 2000. For example, the controller 102 may receive, from the cloud computing system 110, a location of a jobsite and the controller 102 may use the location of the jobsite to generate a travel route for the delivery vehicle 2000. The controller 102 may control the delivery vehicle 2000 to travel from a current location (e.g., the location of the delivery vehicle 2000) to the location of the jobsite based on the travel route.

Figure 65:
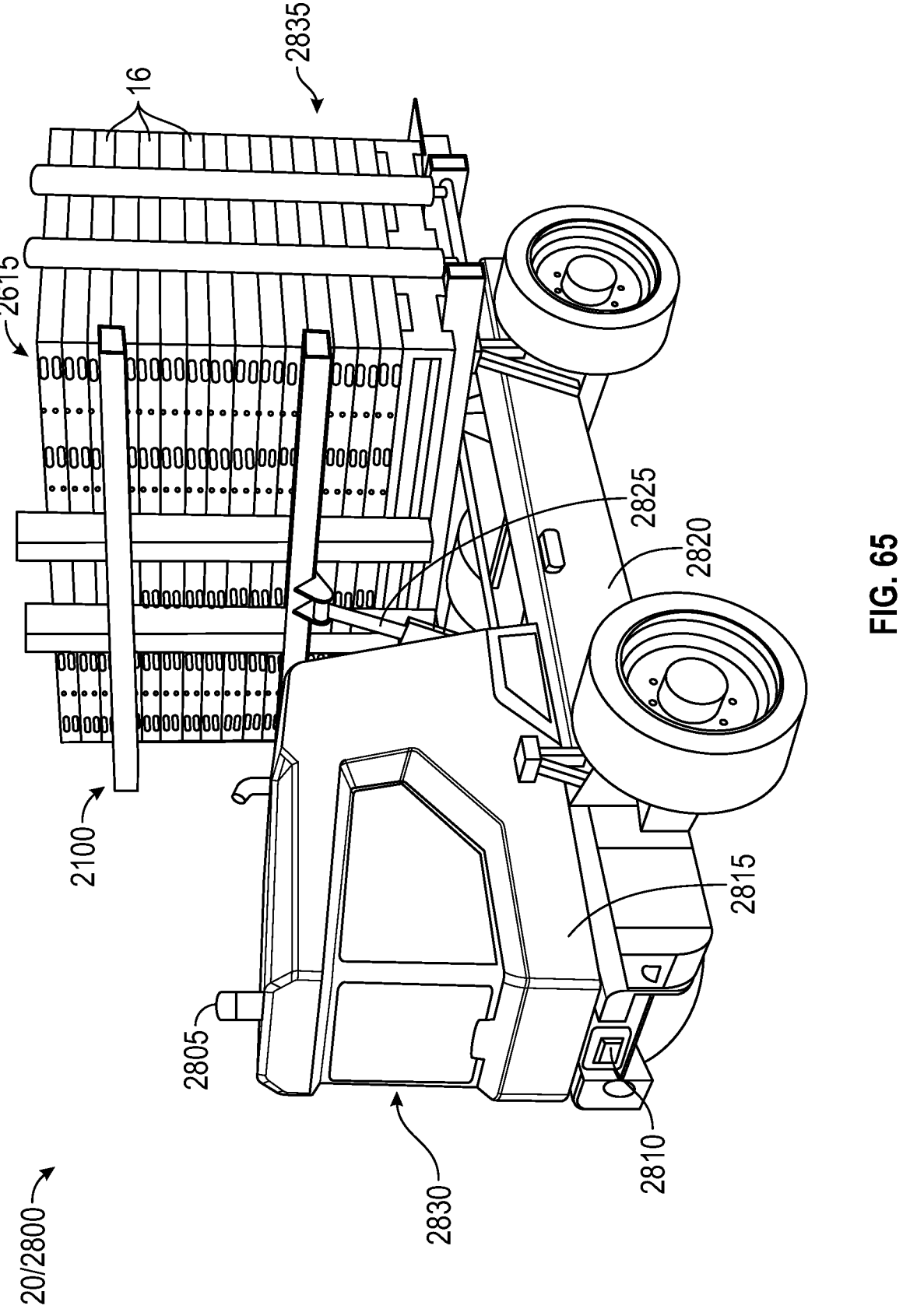
FIG. 65 is a perspective view of an autonomous delivery vehicle, according to an exemplary embodiment.

FIG. 65 depicts a perspective view of an Autonomous Delivery Vehicle (ADV) 2800, according to an exemplary embodiment. The ADV 2800 may be and/or include at least one vehicle described herein. For example, the ADV 2800 may be the transportation vehicle 20. In some embodiments, the various vehicles described herein may be implemented as, carried out as, executed as, and/or otherwise applied as the ADV 2800. For example, the delivery vehicle 2000 may be implemented as the ADV 2800. In some embodiments, the ADV 2800 may perform similar functionality to that of the various vehicles described herein. For example, the ADV 2800 may perform similar functionality to that of the transportation vehicle 20. In some embodiments, the ADV 2800 may include similar components to that of the various vehicles described herein. For example, the ADV 2800 may include the controller 102 and/or the processing circuitry 104.

Figure 68:
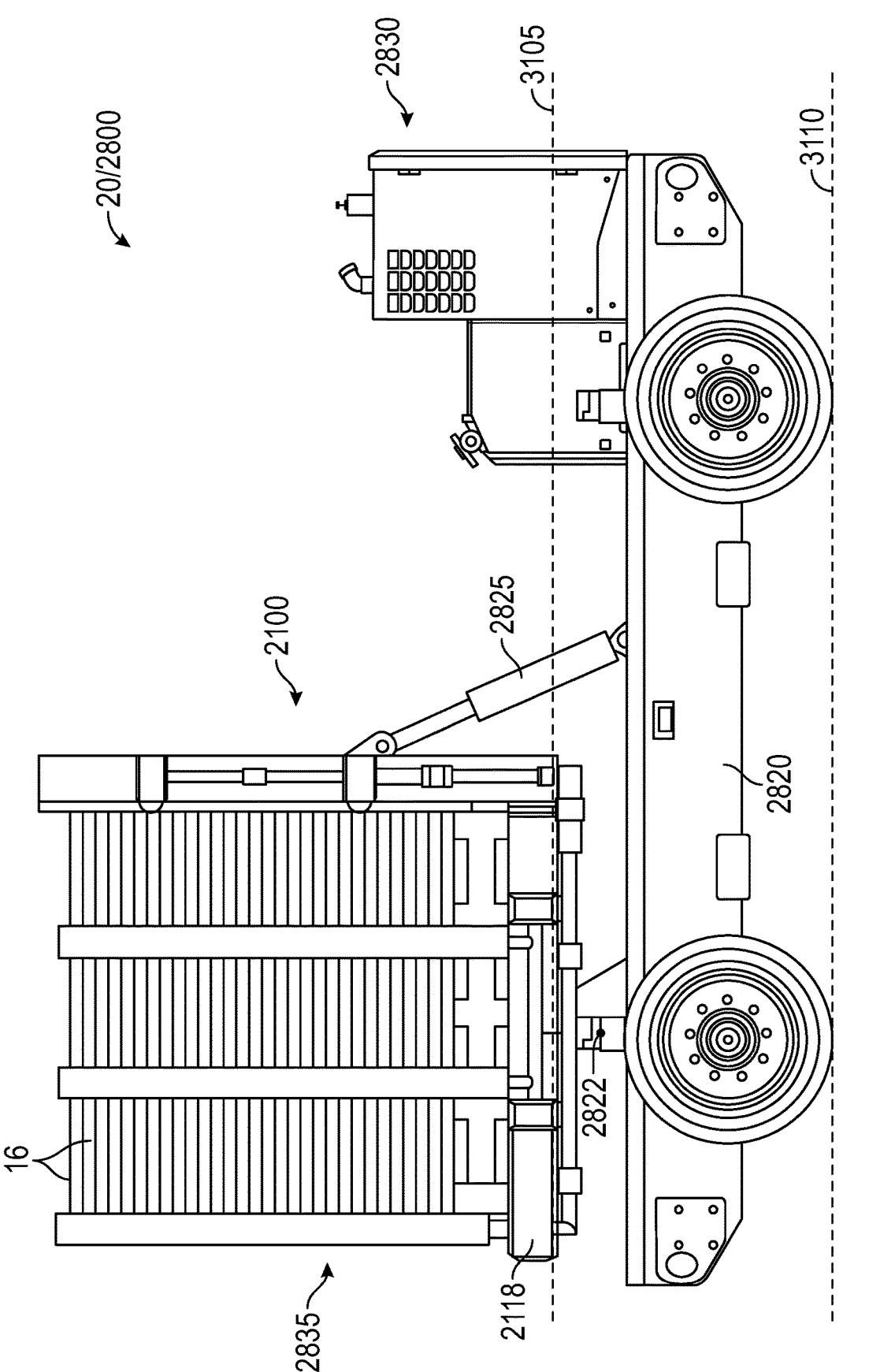
FIG. 68 is a perspective side view of the autonomous delivery vehicle illustrated in FIG. 65, according to some embodiment.
Figure 69:
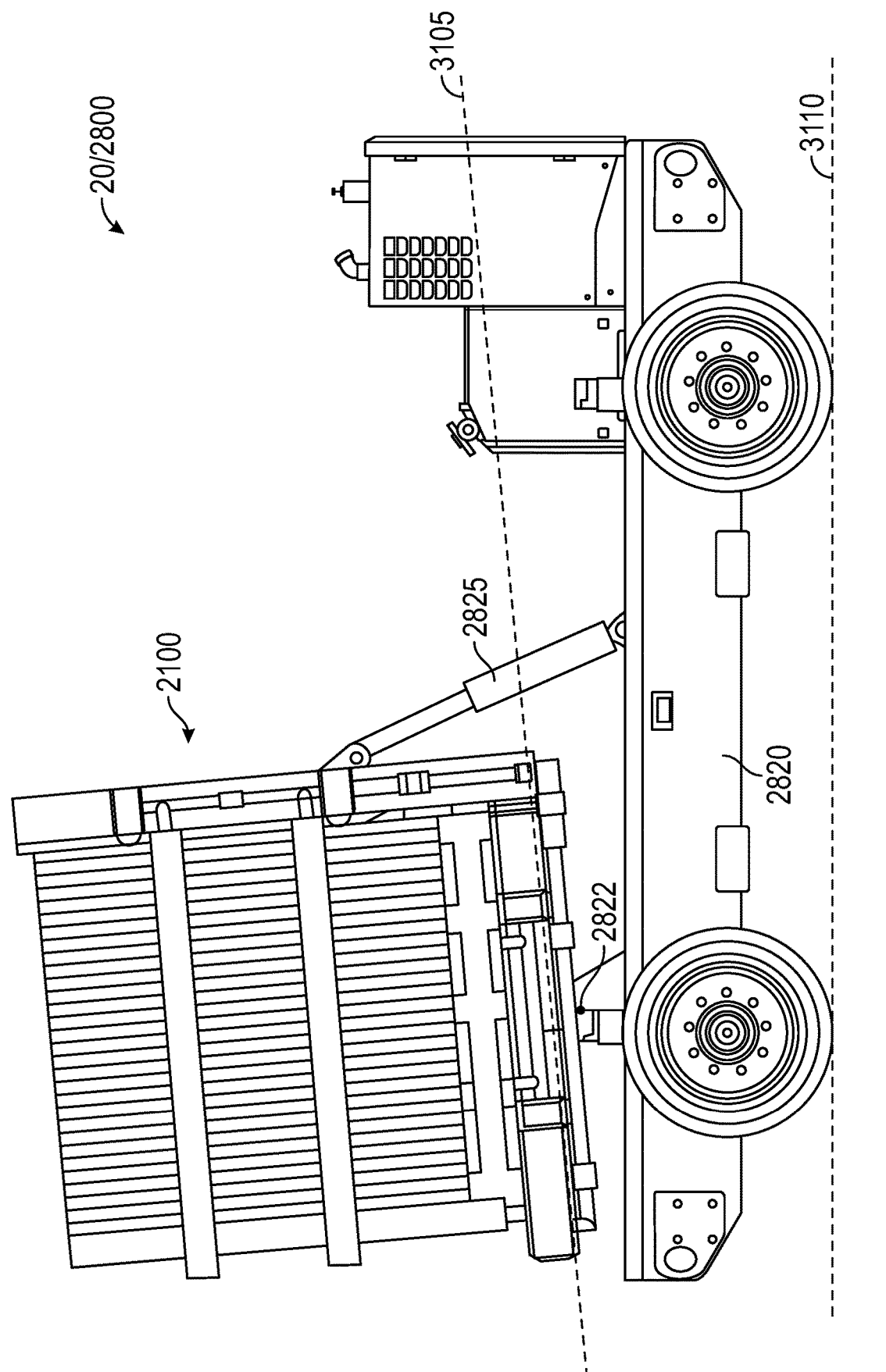
FIG. 69 is a perspective side view of the autonomous delivery vehicle illustrated in FIG. 65, according to some embodiment.
Figure 70:
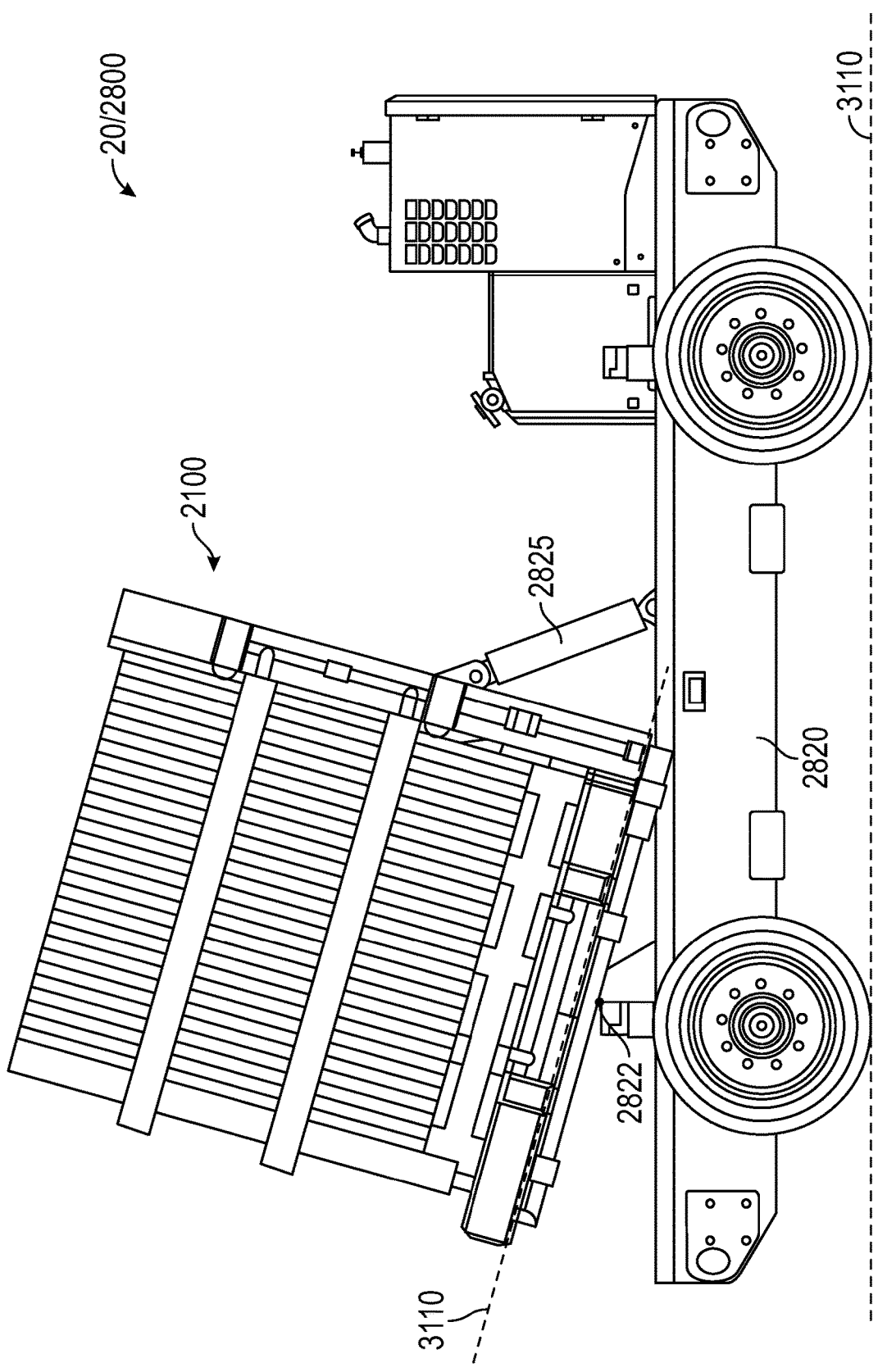
FIG. 70 is a perspective side view of the autonomous delivery vehicle illustrated in FIG. 65, according to some embodiment.

The ADV 2800 may include at least one tracking device 2805, at least one sensor 2810, at least one housing 2815, at least one chassis 2820, and at least one actuator 2825. The ADV 2800 is shown to include and/or define at least one back side 2830 and at least one front side 2835. In some embodiments, the housing 2815 may be coupled with the chassis 2820 at a rear portion of the ADV 2800 (e.g., the back side 2830). The carrier 2100 may be coupled with the chassis 2820 at a front portion of the ADV 2800 (e.g., the front side 2835). Specifically, as shown in FIG. 68, the carrier 2100 is pivotably coupled to the chassis 2820 at a pivot point 2822. The carrier 2100 is rotatable about a lateral axis extending through the pivot point 2822 (e.g., as shown in FIGS. 68-70). The housing 2815 may define, establish, created, and/or otherwise provide a body to enclose various components of the ADV 2800. For example, the housing 2815 may enclose and/or otherwise cover a battery module that powers the ADV 2800. The housing 2815 may also define a surface for which the tracking device 2805 may be coupled with the ADV 2800. For example, FIG. 65 depicts an example of the tracking device 2805 coupled with a top surface of the housing 2815.

The tracking device 2805 may interface with, interact with, and/or otherwise communicate with the various systems and/or devices described herein. For example, the tracking device 2805 may be and/or include a network interface and the tracking device 2805 may communicate with the cloud computing system 110. The tracking device 2805 may provide location information (e.g., GPS coordinate, vehicle bearings, vehicle positional metrics, etc.) to the cloud computing system 110. The tracking device 2805 may be and/or include at least one of a communication component, a transceiver, a receiver, a transceiver, a transponder, a navigation device, a data pusher, a data puller, and/or among various possible communication and/or network devices. The tracking device 2805 may interact with, interface with, and/or otherwise communicate with the various components of the ADV 2800. For example, the tracking device 2805 may receive operational information from the sensors 2810.

Figure 66:
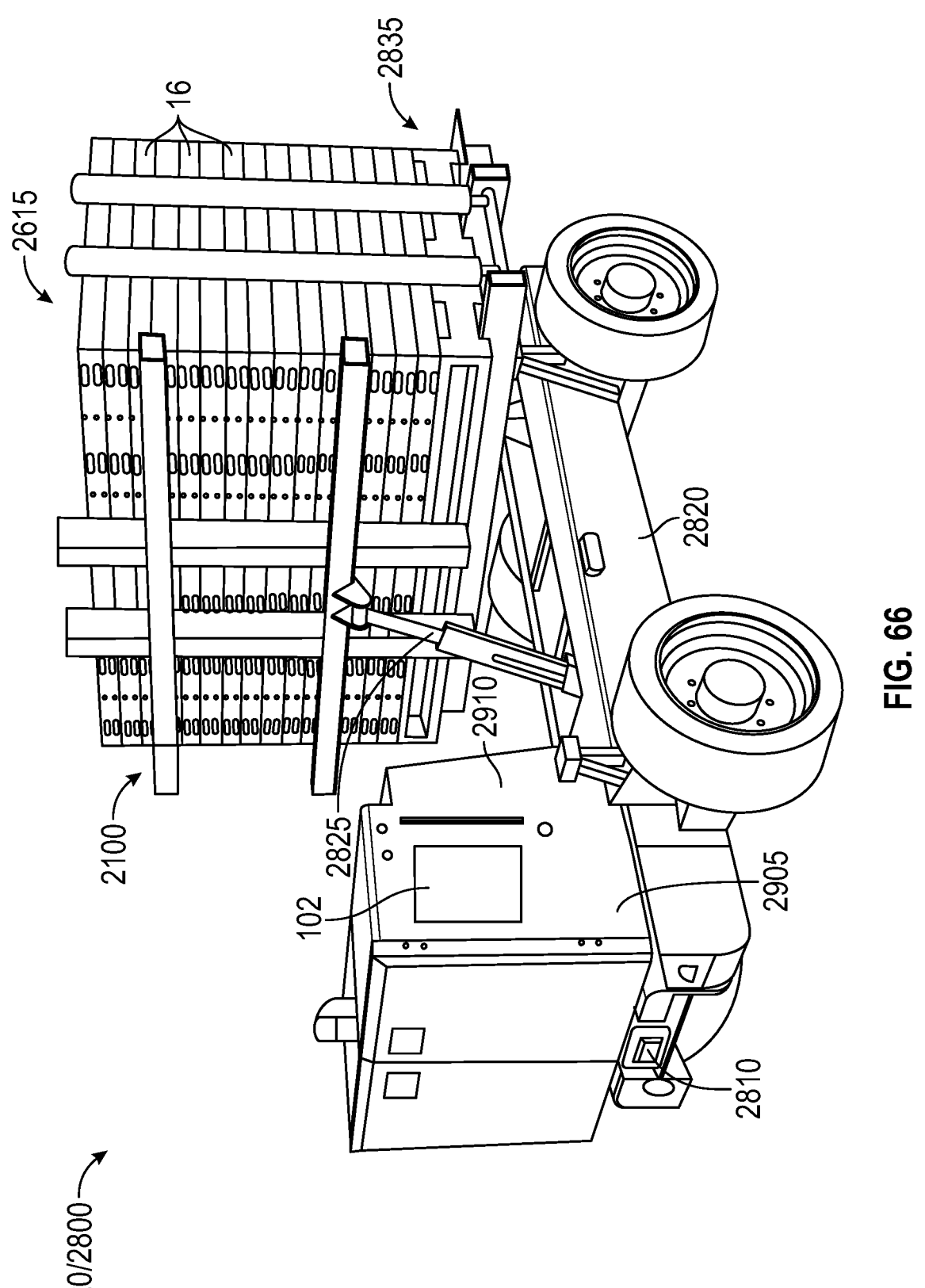
FIG. 66 is a perspective view of the autonomous delivery vehicle illustrated in FIG. 65, according to some embodiment.

The sensors 2810 may be and/or include at least one of a proximity sensor, a camera, an object detection device, an object recognition device, a position sensor, a motion sensor, a gyroscope, and/or among other possible devices. The sensors 2810 may be in communication with the tracking device 2805 and the controller 102. For example, the sensors 2810 may provide positional information of the ADV 2800 to the controller 102. While FIG. 66 depicts an example of the sensors 2810 disposed on the rear of the ADV 2800 (e.g., the back side 2830), the sensors 2810 may be disposed on various portions of the ADV 2800. For example, at least one sensor 2810 may be disposed on each side of the ADV 2800. The sensors 2810 may also be disposed on and/or in communication with various components of the ADV 2800. For example, the sensors 2810 may be disposed on a portion of the carrier 2100 and the sensors 2810 may detect and/or otherwise track the position and/or movement of the carrier 2100.

The actuator 2825 may be coupled with the chassis 2820 at a first interface and the actuator 2825 may be coupled with the carrier 2100 at a second interface. For example, a first end and/or a first point of the actuator 2825 may be coupled with the chassis 2820 and a second end and/or a second point of the actuator 2825 may be coupled with the carrier 2100. The actuator 2825 may be and/or include at least one of a linear actuator, a pneumatic actuator, a hydraulic system, a lift device, and/or among various other possible moveable elements. The actuator 2825 may be in communication with the controller 102. For example, the actuator 2825 may receive, from the controller 102, control signals that cause the actuator 2825 to move (e.g., extend, lengthen, shorten, retract, etc.) from a first location to a second location. The actuator 2825 moving may cause the carrier 2100 to move. For example, the carrier 2100 may have a first orientation and/or a first position and the actuator 2825 may move the carrier 2100 to a second orientation and/or a second position. FIG. 65 depicts an example of the carrier 2100 having a neutral orientation (e.g., the body of the carrier 2100 is substantially parallel to a ground surface in contact with tractive elements (e.g., wheels) of the ADV 2800.

FIG. 66 depicts a perspective of the ADV 2800, according to an exemplary embodiment. The housing 2815 is shown to have been removed (e.g., decoupled) from the ADV 2800. The ADV 2800 may include the controller 102. The ADV 2800 may include at least one primary mover compartment 2905 and at least one resource compartment 2910. The primary mover compartment 2905 may be and/or include at least one of a body, a housing, an assembly, and/or otherwise a receptacle. The primary mover compartment 2905 may store, hold, confine, secure, and/or otherwise house at least one primary mover (e.g., an engine, a motor, a power source (e.g., batteries, fuel cells, etc.) and the primary mover may move the ADV 2800. The primary mover compartment 2905 and/or components thereof (e.g., the primary mover) may be in communication with the controller 102. For example, the controller 102 may transmit control signals that cause the primary mover to move the ADV 2800.

The resource compartment 2910 may be and/or include at least one of a body, a housing, an assembly, and/or otherwise a receptacle. The resource compartment 2910 may store, hold, confine, secure, and/or otherwise house at least one substances and/or fluids that are used by the ADV 2800. For example, the resource compartment 2910 may store hydraulic fluid that may be used by the actuator 2825. The resource compartment 2910 may store various that may be used by various components of the ADV 2800. For example, the ADV 2800 may include a combustion engine and the resource compartment 2910 may store a power source (e.g., gasoline, fuel, etc.) that is used by the combustion engine.

Figure 67:
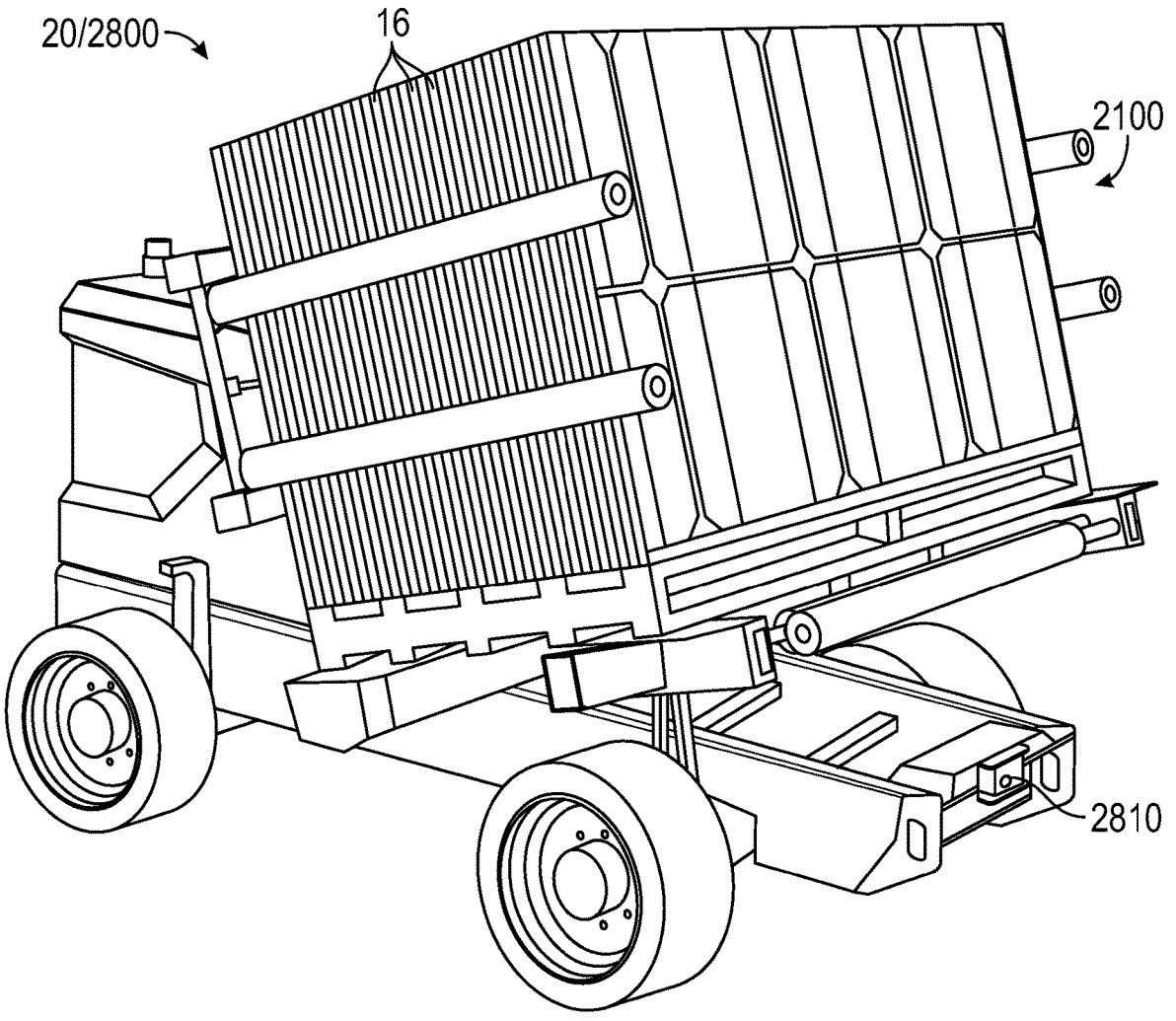
FIG. 67 is a perspective view of the autonomous delivery vehicle illustrated in FIG. 65, according to some embodiment.

FIG. 67 depicts a perspective view of the ADV 2800, according to an exemplary embodiment. The sensors 2810 are shown to be disposed towards the front (e.g., the front side 2835) of the ADV 2800. The carrier 2100 is shown to be in a pitched and/or tilted orientation (e.g., at least a portion of the carrier 2100 is not parallel with a ground surface). In some embodiments, the actuator 2825 may lengthen, extend, retract, and/or shorten to place the carrier in the pitched orientation. For example, a tube of the actuator 2825 may be retracted and the retraction of the tube may cause the carrier 2100 to move from the neutral orientation to the pitched orientation.

FIG. 68 depicts a perspective side view of the ADV 2800, according to an exemplary embodiment. The carrier 2100 and/or a component thereof may define and/or otherwise extend along an axis. FIG. 68 depicts an example of the carrier 2100 extending along an axis 3105. The ADV 2800 is shown defining and/or otherwise extending along an axis 3110. The axis 3110 may correspond to and/or otherwise indicate a given ground surface that the ADV 2800 is in contact with (e.g., wheels of the ADV 2800 in contact with a road). FIG. 68 depicts an example of the axis 3105 being substantially parallel to that of the axis 3110 (e.g., the angle of axis 3105 is substantially similar to the angle of the axis 3110). The angle of the axis 3105 defined by the carrier 2100 may be adjusted, changed, altered, and/or otherwise modified responsive to the actuators 2825 moving the carrier 2100. For example, the actuator 2825 may retract and the retraction may cause the carrier 2100 to tilt and/or otherwise pitch towards the back side 2830 of the ADV 2800 (e.g., switch the carrier 2100 from a neutral orientation to a pitched orientation. The actuator 2825 may also extend and/or lengthen to tilt and/or pitch the carrier 2100 towards the front side 2835.

FIG. 69 depicts a side perspective view of the ADV 2800, according to an exemplary embodiment. The carrier 2100 may have a pitched orientation. For example, the body 2118 of the carrier 2100 may be at least one of slanted, sloped, inclined, declined, and/or otherwise angled. FIG. 69 depicts an example of the carrier 2100 having a forward tilt (e.g., the carrier 2100 is pitched towards the front of the ADV 2800). The carrier 2100 may be moved, placed, positioned, and/or otherwise located in the forward tilt responsive to the controller 102 controlling the actuator 2825. For example, the controller 102 may send signals, to the actuator 2825, that may cause the actuator 2825 to the lengthen and/or extend to move the carrier 2100 from a neutral orientation (e.g., the orientation shown in FIG. 68) to the orientation shown in FIG. 69.

FIG. 70 depicts a side perspective view of the ADV 2800, according to an exemplary embodiment. The carrier 2100 is shown to have a backward tilt (e.g., the carrier 2100 is pitched towards the rear of the ADV 2800). The carrier 2100 may be positioned, located, and/or otherwise moved between orientations. For example, the carrier 2100 may be moved from the backward tilt, as shown in FIG. 70, to the neutral tilt as shown in FIG. 68. The controller 102 may send signals, to the actuator 2825, that may cause the actuator 2825 to the to move the carrier 2100 from a neutral orientation (e.g., the orientation shown in FIG. 68) to the orientation shown in FIG. 70. For example, the actuator 2825 may receive signals, from the controller 102, that causes the actuator 2825 to retract and/or retreat.

Figure 71:
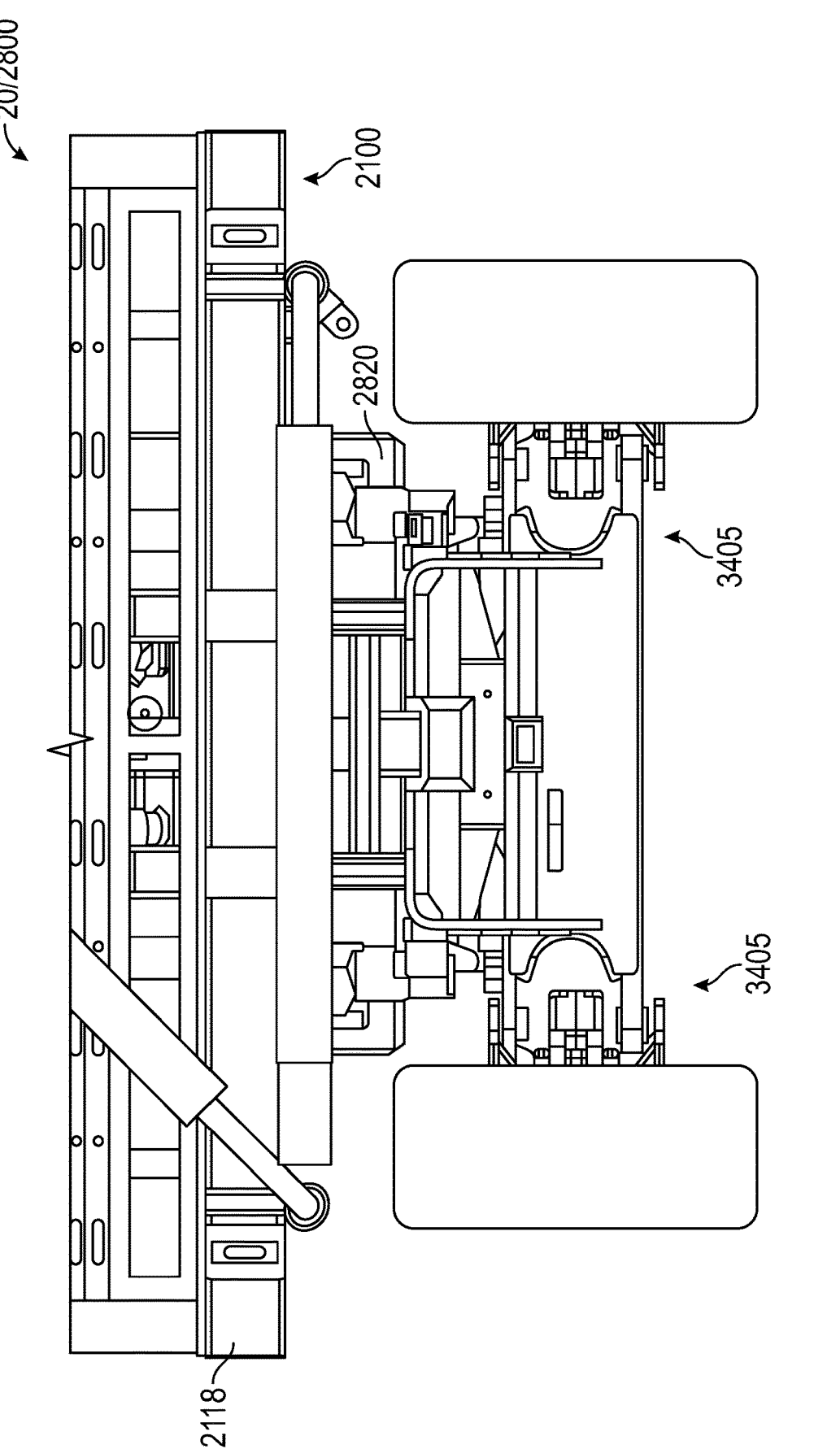
FIG. 71 is a perspective front view of the autonomous delivery vehicle illustrated in FIG. 65, according to some embodiment.

FIG. 71 depicts a perspective front view of the ADV 2800, according to an exemplary embodiment. The ADV 2800 may include at least one axle assembly 3405. The axle assemblies may be coupled with the chassis 2820. The axle assemblies 3405 may be in communication with the controller 102. For example, the controller 102 may transmit control signals to the axle assemblies 3405. The sensors 2810 may monitor, detect, and/or track the position of the axle assemblies 3405. For example, the sensors 2810 may detect a tilt and/or a slope of the axle assemblies 3405. The ADV 2800 may include at least one axle assembly 3405 for each respective tractive element (e.g., wheels, treads, tracks, tires, etc.) and the respective axle assembly 3405 may move separate and/or in isolation to one another. For example, a first axle assembly 3405 may be controllable, via the controller 102, to have the lilt and/or slop of the first axle assembly 3405 be changed. To continue this example, a second axle assembly 3405 may maintain a tilt and/or slop separate from the first axle assembly 3405.

Shipping Container Unloader

Telehandler

Figure 72:
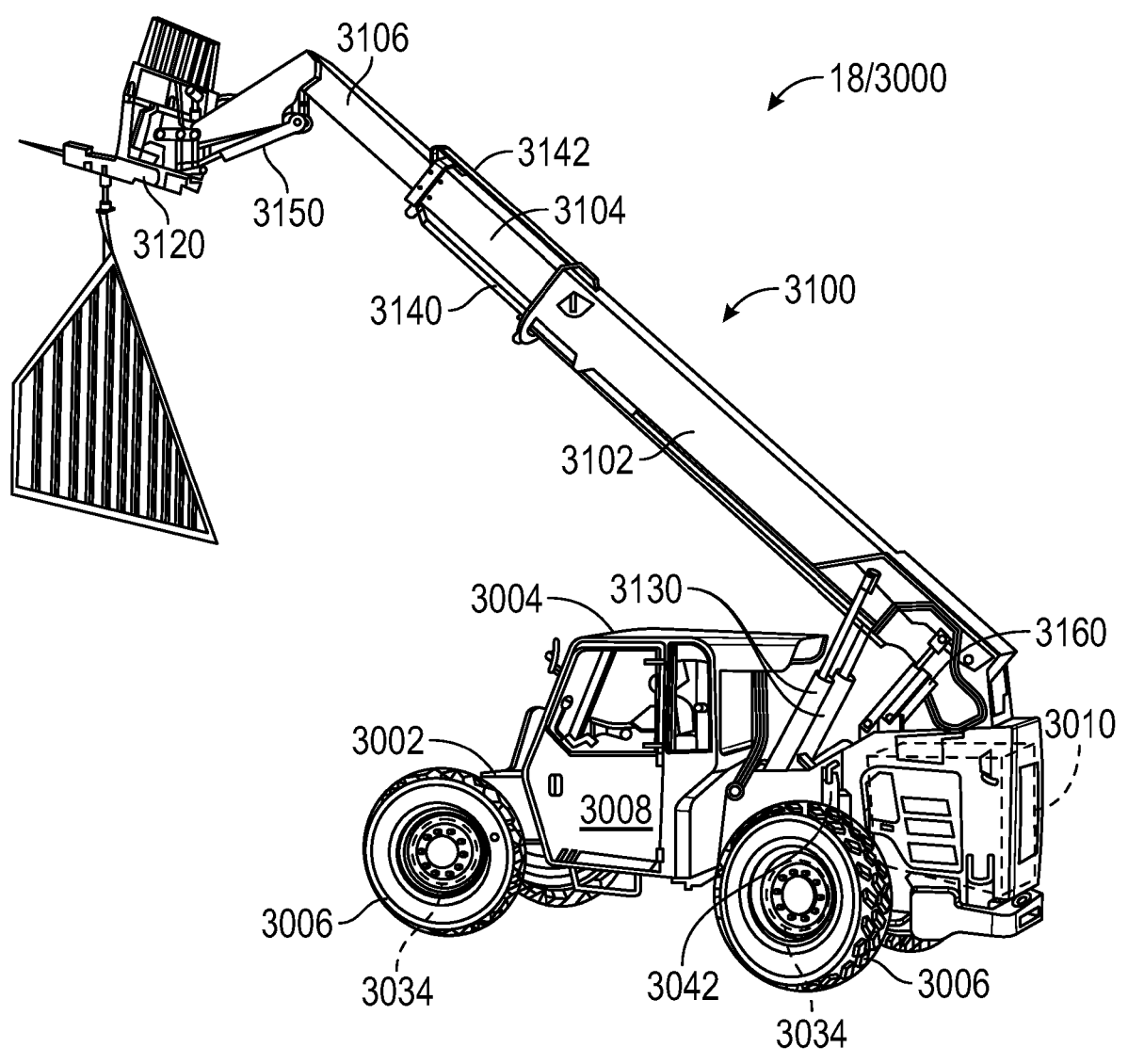
FIG. 72 is a perspective view of a telehandler for unloading the solar panels from the shipping container, according to an exemplary embodiment.

According to the exemplary embodiment shown in FIG. 72, the unloading machinery 18 may be a vehicle or lift device, shown as telehandler 3000. The telehandler 3000 may be configured to remove solar panels 16 from the shipping container 14. By way of example, the telehandler 3000 may be configured to engage with a stack of solar panels 16 (e.g., on a pallet) within the shipping container 14 and remove the solar panels 16 from the shipping container. The telehandler 3000 may then set the solar panels 16 on the ground. Alternatively, the telehandler 3000 may provide the solar panels 16 directly to the transportation vehicle 20 (e.g., by setting the stack of solar panels 16 into the carrier 2100 of the delivery vehicle 2800.

The telehandler 3000 includes a chassis, shown as frame 3002. The frame 3002 supports an enclosure, shown as cabin 3004, that is configured to house an operator of the telehandler 3000. The telehandler 3000 is supported by a series of tractive elements 3006 that are rotatably coupled to the frame 3002. One or more of the tractive elements 3006 are powered to facilitate motion of the telehandler 3000. A manipulator or lift assembly, shown as boom assembly 3100, is pivotally coupled to the telehandler 3000 near a rear end of the frame 3002. The telehandler 3000 is configured such that the operator controls the tractive elements 3006 and the boom assembly 3100 from within the cabin 3004 to manipulate (e.g., move, carry, lift, transfer, etc.) a payload (e.g., pallets, solar panels, building materials, earth, grains, etc.).

Although the vehicle shown and described herein is a telehandler 3000, in other embodiments, the systems and methods described herein are utilized with another type of vehicle. By way of example, the vehicle may be a work platform, a scissor lift, a vertical lift, a boom lift, or another type of lift device.

In some embodiments, the boom assembly 3100 is approximately centered on a longitudinal centerline that extends along a length of the frame 3002. Such a placement may facilitate an even weight distribution between the left and the right sides of the telehandler 3000. The cabin 3004 is laterally offset from the longitudinal centerline and the boom assembly 3100. The cabin 3004 includes a door 3008 configured to facilitate selective access into the cabin 3004. The door 3008 may be located on the lateral side of the cabin 3004 opposite the boom assembly 3100.

Each of the tractive elements 3006 may be powered or unpowered. In some embodiments, the telehandler 3000 includes a powertrain system including a primary driver 3010 (e.g., an engine, an electric motor, etc.). The primary driver 3010 may receive fuel (e.g., gasoline, diesel, natural gas, etc.) from a fuel tank and combust the fuel to generate mechanical energy. According to an exemplary embodiment, the primary driver 3010 is a compression-ignition internal combustion engine that utilizes diesel fuel. In alternative embodiments, the primary driver 3010 is another type of device (e.g., spark-ignition engine, fuel cell, etc.) that is otherwise powered (e.g., with gasoline, compressed natural gas, hydrogen, etc.). Additionally or alternatively, the primary driver 3010 includes an electric motor that receives electrical energy from one or more energy storage devices (e.g., batteries, capacitors, etc.) or an offboard source of electrical energy (e.g., a power grid, a generator, etc.). In some embodiments, one or more pumps receive the mechanical energy from the primary driver 3010 and provide pressurized hydraulic fluid to power the tractive elements 3006 and the other hydraulic components of the telehandler 3000 (e.g., the lift cylinders 3130, the telescoping cylinder 3140, the tilt cylinder 3150, the levelling cylinders 3042, etc.). In the embodiment shown in FIG. 72, the pumps provide pressurized hydraulic fluid to drivers or actuators (e.g., hydraulic motors), shown as drive motors 3034, that are each coupled to one or more of the tractive elements 3006 (e.g., in a hydrostatic transmission arrangement). The drive motors 3034 each provide mechanical energy to one or more of the tractive elements 3006 to propel the telehandler 3000. In other embodiments, one drive motor 3034 drives all of the tractive elements 3006. In other embodiments, the primary driver 3010 provides mechanical energy to the tractive elements 3006 through another type of transmission.

Referring to FIG. 72, the tractive elements 3006 are coupled to the frame 3002 by lateral support members, referred to as axles. Specifically, the two frontmost tractive elements 3006 are coupled to opposite ends of a first axle, and the two rearmost tractive elements 3006 are coupled to opposite ends of a rear axle. The axles are pivotally coupled to the frame 3002 and configured to pivot relative to the frame 3002 about a longitudinal axis, facilitating roll of the frame 3002 about the longitudinal axis. The telehandler 3000 further includes a pair of linear actuators (e.g., hydraulic cylinders), shown as levelling cylinders 3042, that are each coupled to one of the axles and to the frame 3002. The levelling cylinders 3042 are configured to extend and retract to rotate the frame 3002 relative to the axles, causing the frame 3002 to roll. The levelling cylinders 3042 may be controlled to level the frame 3002 on sloped or uneven surfaces. In some embodiments, the levelling cylinders 3042 are independently controlled to permit independent control of the front and rear of the frame 3002.

In some embodiments, one or more of the tractive elements 3006 are configured to be steered to control the movement of the telehandler 3000. The telehandler 3000 includes a pair of steering actuators (e.g., hydraulic cylinders). The front steering cylinder is coupled to the frontmost axle and coupled (e.g., by one or more tie rods) to each of the frontmost tractive elements 3006. The front steering cylinder is configured to translate laterally to rotate each of the front wheels about a corresponding vertical axis. When the front steering cylinder moves in a first direction from a center position, the tractive elements 3006 turn to steer the telehandler 3000 to the left. When the front steering cylinder moves in a second direction opposite the first direction from the center position, the tractive elements 3006 turn to steer the telehandler 3000 to the right. The rear steering cylinder is coupled to the rearmost axle and coupled to each of the rearmost tractive elements 3006. The rear steering cylinder provides steering control of the rearmost tractive elements 3006. In some embodiments, the front steering cylinder and the rear steering cylinder are independently controlled. In some embodiments, the telehandler 3000 utilizes a skidsteer arrangement (e.g., the tractive elements 3006 on the left side of the telehandler 3000 move at a different speed and/or in a different direction than the tractive elements 3006 on the right side of the telehandler 3000 to steer the telehandler 3000).

Referring still to FIG. 72, the boom assembly 3100 is a telescoping assembly having a series of nested members including a proximal or base section 3102, an intermediate or middle section 3104, and a distal or fly section 3106. The base section 3102 is pivotally coupled to the rear end of the frame 3002 such that the boom assembly 3100 is pivotable about a lateral axis. The middle section 3104 is received within the base section 3102 and extends outward beyond the base section 3102. The fly section 3106 is received within the middle section 3104 and extends outward beyond the middle section 3104. In other embodiments, the middle section 3104 is omitted, and the fly section 3106 is received directly within the base section 3102. In yet other embodiments, the boom assembly 3100 includes multiple middle sections 3104. The base section 3102, the middle section 3104, and the fly section 3106 are each slidably coupled to one another to facilitate varying an overall length of the boom assembly 3100. Specifically, the middle section 3104 is slidably coupled to the base section 3102, and the fly section 3106 is slidably coupled to the middle section 3104.

The boom assembly 3100 further includes a tool, manipulator, interface or implement, shown as implement 3120, coupled to a distal end of the fly section 3106. The implement 3120 may be pivotally coupled to the fly section 3106 such that the implement 3120 is pivotable relative to the fly section 3106 about a lateral axis. The implement 3120 may facilitate interfacing the boom assembly 3100 with materials (e.g., wood, hay, building materials, etc.) or one or more operators or users. The implement 3120 may be powered (e.g., by pressurized hydraulic fluid from a hydraulic system) or unpowered. As shown in FIG. 72, the implement 3120 is a fork that handles a truss. In other embodiments, the implement 3120 is a bucket, a material handling arm, a boom, a hook, a hopper, a sweeper, a grapple, or another type of implement configured to handle material. In other embodiments, the implement 3120 is a work platform configured to support one or more operators. In some embodiments, the implement 3120 is selectively coupled to the fly section 3106 such that the implement 3120 is interchangeable with other implements. By way of example, the forks shown in FIG. 72 may be removed and exchanged with a bucket or work platform.

Referring to FIG. 72, the boom assembly 3100 is articulated by a series of actuators. In some embodiments, the actuators are powered by pressurized hydraulic fluid (e.g., from a hydraulic system as controlled by the controller). The telehandler 3000 includes a pair of first linear actuators (e.g., hydraulic cylinders), shown as lift cylinders 3130. A lower end of each lift cylinder 3130 is coupled to the frame 3002, and an upper end of each lift cylinder 3130 is coupled to the base section 3102. The lift cylinders 3130 are positioned on opposing sides of the boom assembly 3100 to facilitate an even distribution of the load of the boom assembly 3100. When the lift cylinders 3130 extend, the boom assembly 3100 is raised. When the lift cylinders 3130 retract, the boom assembly 3100 is lowered. Accordingly, the lift cylinders 3130 raise and lower the implement 3120 relative to the frame 3002.

The telehandler 3000 further includes a second linear actuator (e.g., a hydraulic cylinder), shown as telescoping cylinder 3140. A proximal end of the telescoping cylinder 3140 is coupled to the base section 3102, and a distal end of the telescoping cylinder 3140 is coupled to the middle section 3104. When the telescoping cylinder 3140 is extended, the middle section 3104 moves longitudinally outward from the base section 3102. When the telescoping cylinder 3140 is retracted, the middle section 3104 moves back into the base section 3102. A tensile member (e.g., a rope, a strap, a chain, etc.), shown as cable 3142, includes a first end coupled to the base section 3102 and a second end that is coupled to the fly section 3106. The cable 3142 extends from the base section 3102, around a distal end of the middle section 3104, and attaches to a portion of the fly section 3106 that is received within the middle section 3104. Accordingly, when the telescoping cylinder 3140 extends, moving the middle section 3104 outward, the middle section 3104 applies a tensile force to the cable 3142, which draws the fly section 3106 out of the middle section 3104. A similar cable arrangement may be utilized to retract the fly section 3106 into the middle section 3104 when the middle section 3104 retracts into the base section 3102. Accordingly, the extension of the telescoping cylinder 3140 both (a) extends the middle section 3104 relative to the base section 3102 and (b) extends the fly section 3106 relative to the middle section 3104. Similarly, the retraction of the telescoping cylinder 3140 both (a) retracts the middle section 3104 relative to the base section 3102 and (b) retracts the fly section 3106 relative to the middle section 3104. Accordingly, the telescoping cylinder 3140 extends and retracts the implement 3120 relative to the frame 3002.

The telehandler 3000 further includes a third linear actuator (e.g., a hydraulic cylinder), shown as tilt cylinder 3150. A proximal end of the tilt cylinder 3150 is coupled to the fly section 3106, and a distal end of the tilt cylinder 3150 is coupled to the implement 3120. When the tilt cylinder 3150 is retracted, the implement 3120 rotates in a first direction (e.g., downward) relative to the fly section 3106. When the tilt cylinder 3150 is extended, the implement 3120 rotates in a second direction (e.g., upward) relative to the fly section 3106. Accordingly, the tilt cylinder 3150 rotates the implement 3120 relative to the frame 3002.

The telehandler 3000 further includes a pair of hydraulic cylinders, shown as compensating cylinders 3160. A lower end of each compensating cylinder 3160 is coupled to the frame 3002, and an upper end of each compensating cylinder 3160 is coupled to the base section 3102. The compensating cylinders 3160 are positioned on opposing sides of the boom assembly 3100 to facilitate an even distribution of the load on the boom assembly 3100. When the lift cylinders 3130 extend, the boom assembly 3100 is raised, forcing the compensating cylinders 3160 to extend. This causes the compensating cylinders 3160 to expel hydraulic fluid from a first chamber (e.g., a rod end chamber) and draw hydraulic fluid into a second chamber (e.g., a cap end). When the lift cylinders 3130 retract, the boom assembly 3100 is lowered, forcing the compensating cylinders 3160 to retract. This causes the compensating cylinders 3160 to expel hydraulic fluid from the second chamber and draw hydraulic fluid into the first chamber. The compensating cylinders 3160 are fluidly coupled to the tilt cylinder 3150 such that as the boom assembly 3100 rises, the fluid from the compensating cylinders 3160 is provided to the tilt cylinder 3150, causing the tilt cylinder 3150 to rotate downwards. Similarly, as the boom assembly 3100 is lowered, the fluid from the compensating cylinders 3160 is provided to the tilt cylinder 3150, causing the tilt cylinder 3150 to rotate upwards. This action causes the implement 3120 to passively (e.g., without active intervention from a main control valve or a controller) maintain a consistent orientation relative to the frame 3002 (e.g., and thereby relative to the ground and the direction of gravity).

Attachment with Rollers

Figure 73:
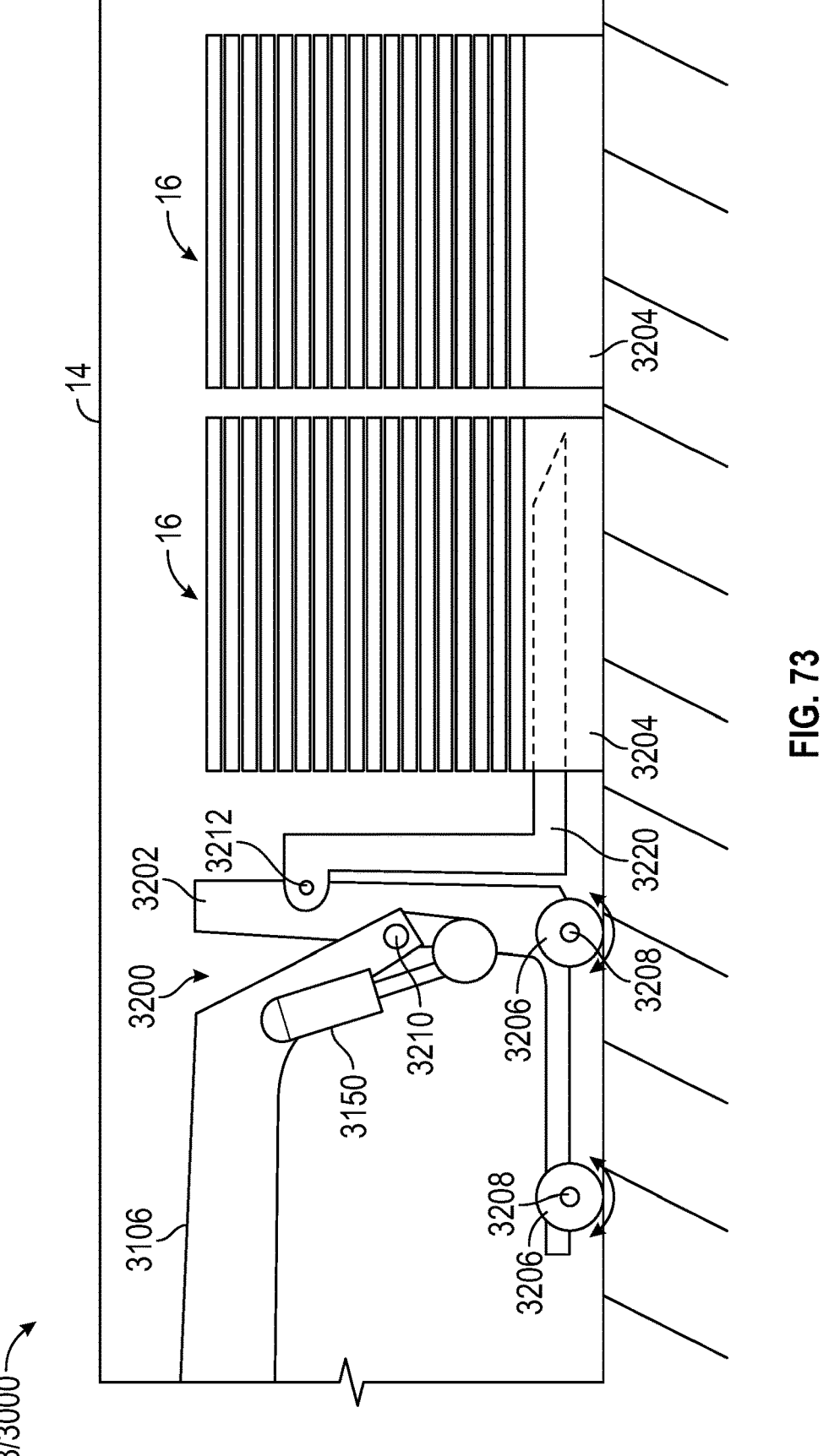
FIG. 73 is a side view of an implement assembly of the telehandler of FIG. 72, according to an exemplary embodiment.
Figure 74:
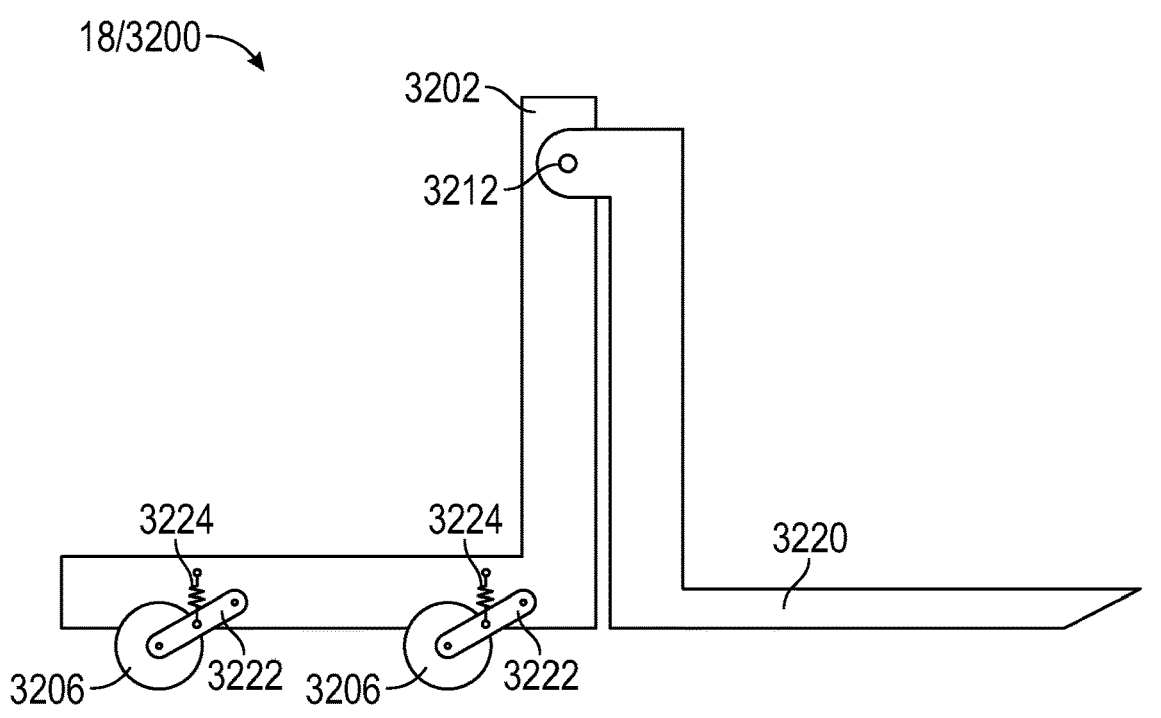
FIG. 74 is a side view of another implement assembly of the telehandler of FIG. 72, according to an exemplary embodiment.
Figure 75:
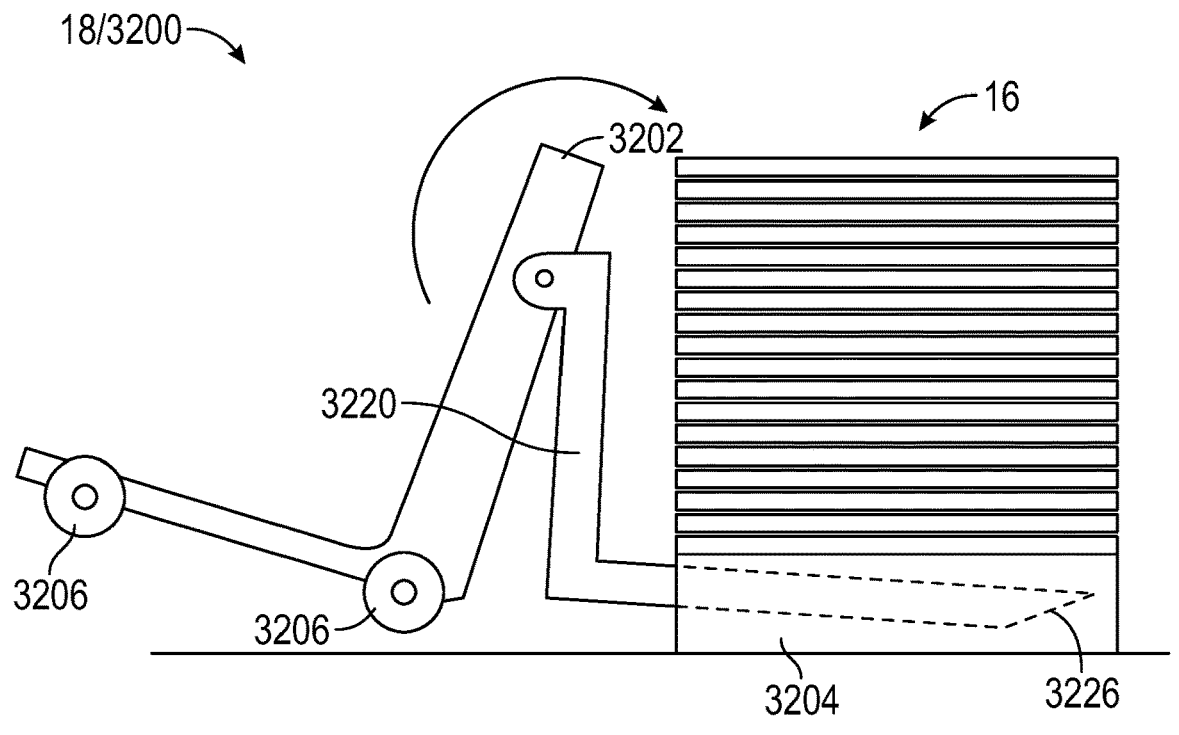
FIG. 75 is another side view of the implement assembly of FIG. 73, according to an exemplary embodiment.

Referring to FIGS. 73-75, the telehandler 3000 may be configured to attach with an implement assembly 3200 that includes the implement 3120, shown as forks 3220, and a carriage 3202. The implement assembly 3200 includes the carriage 3202 as an intermediate member between the fly section 3106 and the forks 3220. The fly section 3106 is pivotally or rotatably coupled with the carriage 3202 at a rotatable coupling 3210. The tilt cylinders 3150 extend between the fly section 3106 and the carriage 3202 and are configured to extend or retract to drive the carriage 3202 to rotate or pivot relative to the rotatable coupling 3210 at the end of the fly section 3106.

The forks 3220 are rotatably or pivotally coupled with the carriage 3202 on a side of the carriage 3202 opposite the rotatable coupling 3210 at rotatable coupling 3212. The forks 3220 are configured to be inserted into pallets 3204 upon which a stack of solar panels 16 rests (e.g., by operating the telehandler 3000 to extend the fly section 3106 or to drive forwards). The forks 3220 facilitate removably coupling the pallet 3204 with the telehandler 3000 so that the telehandler 3000 may remove the pallet 3204 and the stack of solar panels 16 from an interior of the shipping container 14. In some embodiments, the implement assembly 3200 includes one or more actuators that are similar to the tilt cylinders 3150 that extend between the carriage 3202 and the forks 3220 and extend or retract to drive the forks 3220 to rotate relative to the rotatable coupling 3212.

The carriage 3202 includes wheels 3206 (e.g., rollers, tractive elements, etc.) that are positioned on a bottom edge or bottom portion of the carriage 3202. The carriage 3202 may have an L-shape, with a bottom leg of the carriage 3202 extending towards the telehandler 3000. The wheels 3206 are rotatably coupled with the carriage 3202 at couplings 3208 and are configured to facilitate guiding the forks 3220 and the carriage 3202 to ride along the floor of the shipping container 14. The wheels 3206 facilitate proper alignment of the forks 3220 with one or more receiving portions or openings of the pallets 3240, which may be advantageous when visibility into the shipping container 14 is difficult.

Referring particularly to FIG. 74, the implement assembly 3200 may include a pair of springs or hydraulics, shown as suspension members 3224. The wheels 3206 may be pivotally coupled with a first end of elongated members 3222, which are pivotally coupled at an opposite end with the carriage 3202. The elongated members 3222 (e.g., linkages, frame members, etc.) and the suspension members 3224 provide a suspension for the wheels 3206 to allow the wheels 3206 to translate upwards and downwards (e.g., to float). The suspension provided by the suspension members 3224 and the elongated members 3222 may be overridden by operation of the telehandler 3000 to translate the implement assembly 3200 downwards (e.g., towards the floor of the shipping container).

Referring to FIG. 75, the forks 3220 may be inserted into the pallet 3204, and then the carriage 3202 may be rotated clockwise relative to the forks 3220 to facilitate securing the pallet 3204 on the forks 3220. The forks 3220 also includes a chamfered end 3226 to facilitate inserting the forks 3220 into the pallet 3204.

Attachment with Vision System

Figure 76:
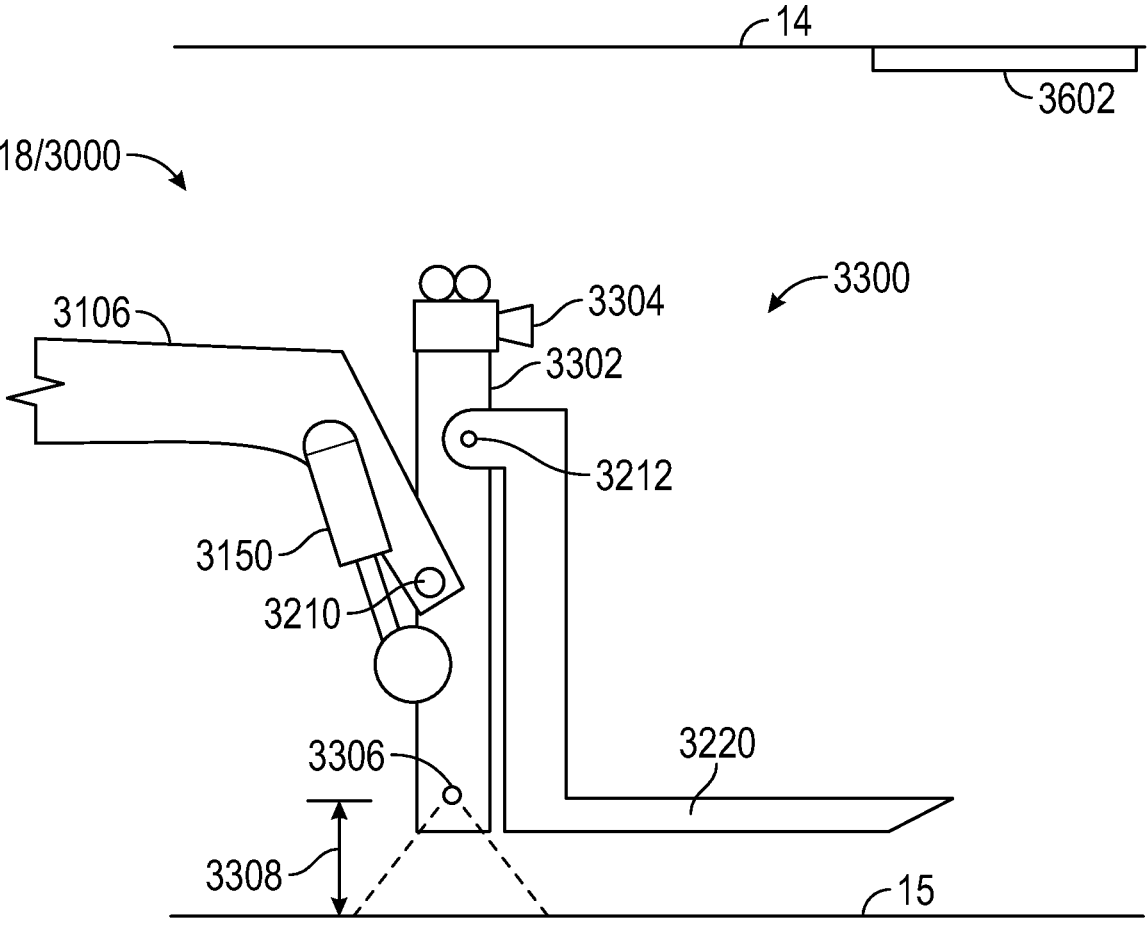
FIG. 76 is a side view of another implement assembly for the telehandler of FIG. 72 including a vision system, according to an exemplary embodiment.

Referring to FIG. 76, another embodiment of the implement assembly 3200, shown as implement assembly 3300 may be similarly coupled with the fly section 3106 of the telehandler 3000 and includes a camera 3304 positioned on top of a carriage 3302. The carriage 3302 may similarly be an intermediate member between the fly section 3106 and the fork 3220. The carriage 3302 includes the camera 3304 on the top, which is configured to obtain visual data (e.g., imaging data, video data, etc.) as the implement assembly 3300 is inserted into the shipping container 14 and provide the visual data to a controller or processing circuit (e.g., controller 3402). In some embodiments, the implement assembly 3300 also includes a ground sensor 3306 that is configured to measure a distance 3308 between a bottom portion of the carriage 3302 and a ground surface, shown as floor 15 of the shipping container 14. The ground sensor 3306 is used to determine height and orientation of the forks 3220 with respect to the floor 15. In some embodiments, data regarding the distance 3308 provided by the ground sensor 3306 is used in closed loop control of the operation of the telehandler 3000 or drive systems or actuators thereof to keep the distance 3308 constant.

It should be understood that the implement assembly 3300 may also include side wall sensors, ceiling sensors, etc., similar to the ground sensor 3306 but configured to measure in multiple directions to identify orientation and/or position of the forks 3220 relative to interior surfaces of the shipping container 14. The visual data or imaging data provided by the camera 3304 and/or the data provided by the ground sensor 3306 may be used to determine a size of the pallet 3204, and to keep the pallet 3204 from striking the ground, sides, ceiling, or other objects inside the shipping container 14 when the pallet 3204 is removed from the shipping container 14.

Figure 77:
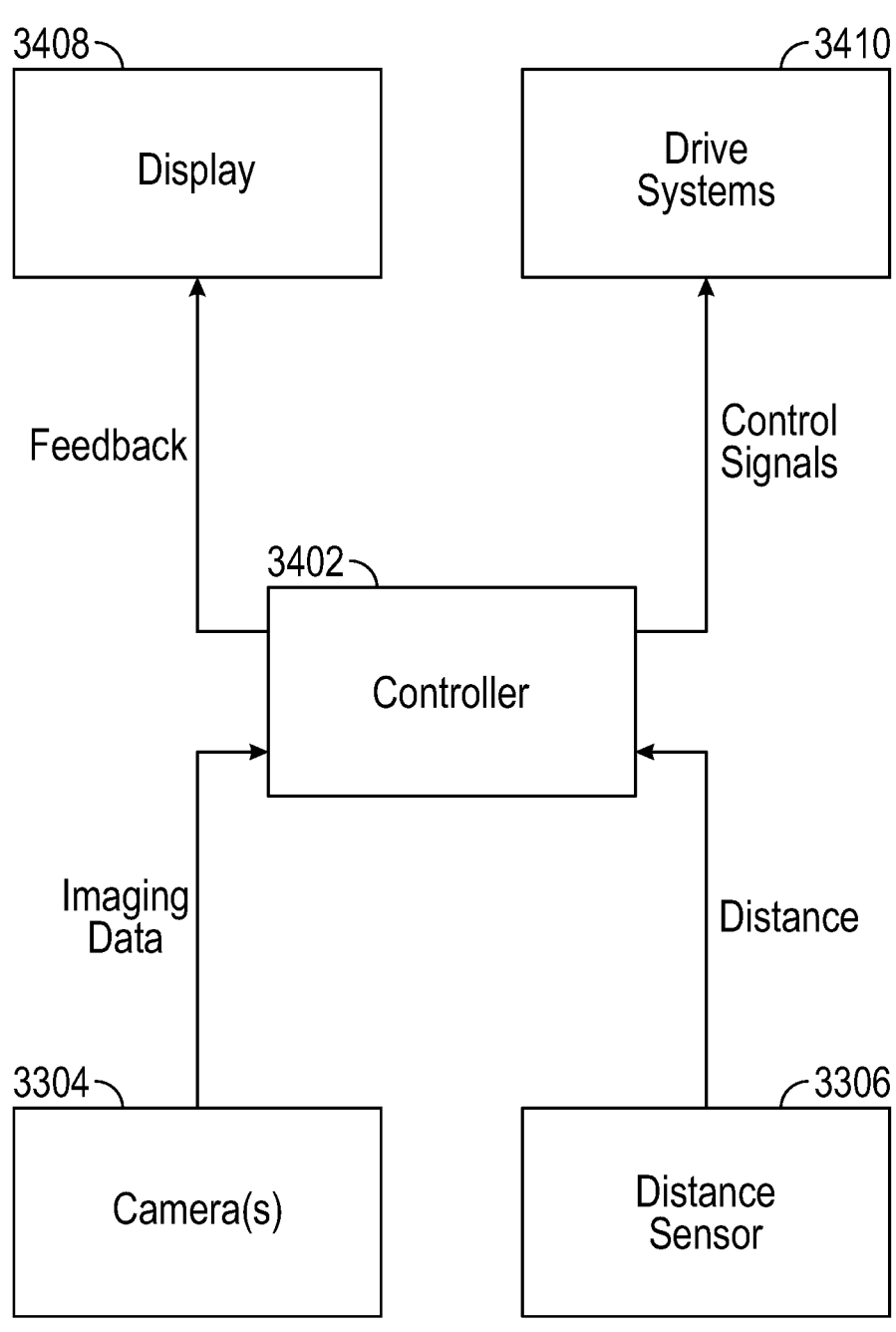
FIG. 77 is a block diagram of a control system for the implement assembly of FIG. 76, according to an exemplary embodiment.

Referring to FIG. 77, a control system 3400 for the implement assembly 3300 includes a controller 3402 that is configured to obtain distance data form the distance sensor 3306 and imaging data from the camera(s). In some embodiments, the controller 3402 is the same as or similar to the controllers 102 as described in greater detail above. The controller 3402 obtains the imaging data and the distance data and provides feedback to a display 3408 (e.g., a display screen of the telehandler 3000) and one or more drive systems 3410 of the telehandler 3000. In some embodiments, the controller 3402 is configured to disable functionality of the telehandler 3000 in order to prevent a collision as predicted or identified by the controller 3402 using the imaging data provided by the cameras 3304.

In some embodiments, the control system 3400 provides closed loop control. The feedback provided to the display 3408 may include a graphical user interface (GUI) to guide an operator to operate the telehandler 3000 to safely pick up pallets 3204 on the forks 3220. The controller 3402 may provide notifications or alerts to the operator including visual or audio feedback. The feedback may include haptic feedback to the operator of the telehandler 3000 or vibrations. The operator may be positioned within the cabin 3004, or may be remote so that the telehandler 3000 may be operated via the cloud computing system 110. In some embodiments, any of the description of the controller 3402 or the control system 3400 may be implemented by the cloud computing system 110 (e.g., remotely). The camera(s) 3304 and the distance sensors 3306 also facilitate proper loading of the pallets 3204 onto the transportation vehicle 20.

Graphical User Interface

Figure 78:
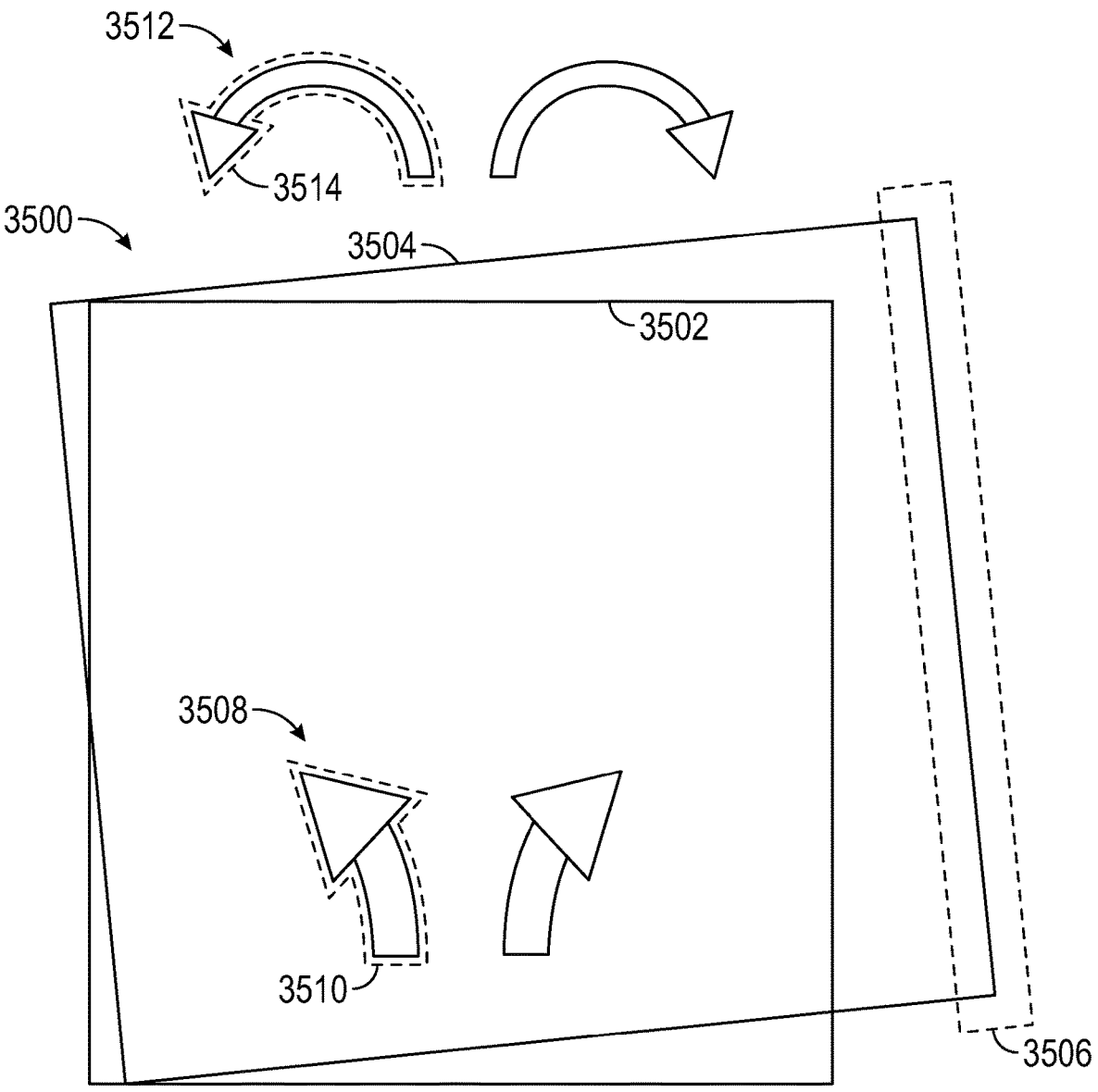
FIG. 78 is a diagram of a graphical user interface that may be presented to an operator to guide proper alignment with forks of the telehandler of FIG. 76 with a target, according to an exemplary embodiment.

Referring to FIG. 78, a diagram 3500 illustrates a GUI that may be presented to the operator of the telehandler 3000 to facilitate proper operation of the telehandler 3000 to align the forks 3220 with the pallets 3204. The diagram 3500 may be presented on the display 3408 (e.g., within the cabin 3004) to facilitate proper relative alignment (e.g., in terms of position and orientation) of the forks 3220 relative to the pallets 3204. The diagram 3500 includes a visualization of an ideal container location (e.g., location of the pallets 3204 or location of the shipping container 14) relative to the telehandler 3000 (or relative to the forks 3220), shown as ideal position 3502. The diagram 3500 also includes a visualization of a current container location (e.g., location of the pallets 3204 or location of the shipping container 14) relative to the telehandler 3000 (or relative to the forks 3220), shown as current position 3504. In some embodiments, the visualizations that are shown as ideal position 3502 and current position 3504 are determined by the controller 3402 based on the imaging data provided by the camera(s) 3304. In some embodiments, the camera(s) 3304 include multiple cameras (e.g., an array of imaging devices) so that depth information of the shipping container 14 may be determined by the controller 3402 (e.g., so that the imaging data may include 3D data or 3D geometry of the shipping container 14). The controller 3402 may analyze the orientation and location of the shipping container 14 or the pallets 3204 relative to the telehandler 3000 or the forks 3220. Misalignment between the current position 3504 and the ideal position 3502 may be highlighted, shown as highlighting 3506 to notify the operator of the telehandler 3000 that the telehandler 3000 is not properly aligned. The highlighting 3506 may be red or orange if the ideal position 3502 and the current position 3504 do not match (e.g., within a range).

The diagram 3500 also includes a pair of roll arrows 3512, one of which is highlighted with highlighting 3514 to indicate which direction the telehandler 3000 should be rolled to facilitate proper alignment of the telehandler 3000 relative to the shipping container 14. The diagram 3500 also includes a pair of steering arrows 3508, one of which is highlighted with highlighting 3510 to indicate which direction the telehandler 3000 should be steered to facilitate proper alignment of the telehandler 3000 relative to the shipping container 14. When the telehandler 3000 and the shipping container 14 are properly aligned, or the forks 3220 are properly aligned with the shipping container 14 or the pallets 3204, all four edges of the current position 3504 and the ideal position 3502 may be highlighted green or turn green to indicate that the telehandler 3000 is properly aligned.

In some embodiments, the telehandler 3000 may be operated manually by the operator based on the diagram 3500 presented to make the telehandler 3000 align with the target (e.g., to make the forks 3220 align with the pallet 3204). In some embodiments, the telehandler 3000 is operated semi-autonomously (e.g., by the controller 3402) to automatically steer, tilt, or lift the implement assembly 3300 as the operator drives forwards or reverse to align with the shipping container 14. In some embodiments, the telehandler 3000 is operated fully autonomously to align and remove the pallets 3204 using inputs from the camera(s) 3304 and/or the distance sensors 3306.

The display 3408 on which the diagram 3500 is presented may be a display screen (e.g., physically positioned within the cabin 3004), an operator worn device, a heads-up display, an augmented reality (AR) device, a virtual reality (VR) device or headset, etc.

Container Fiducials

Referring to FIGS. 76 and 77, the shipping container 14 may include one or more guide members, reference points, visual indicators, etc., shown as fiducials 3602 positioned within the shipping container 14. The camera 3304 may capture image data that includes the fiducials 3602 which may be used by the controller 3402 to determine a relative position and/or orientation of the telehandler 3000 relative to the shipping container 14. In some embodiments, the shipping container 14 includes targets in corners that are standardized and have a known location for surveying using lasers or cameras that are positioned on the implement assembly 3300 (e.g., on the carriage 3302).

Solar Panel Clamping Mechanisms

According to an exemplary embodiment, solar panels may be installed by a vehicle and/or manually at a solar panel installation via a mounting bracket. A solar panel installation generally includes a post supporting a frame member, such as a torque tube, to which the solar panels are coupled by the clamps. The clamps may be positioned near an edge of the solar panel such that the clamps are accessible via gaps between two adjacent solar panels. The clamps may be mounted to panel-mounted supports configured to engage with the clamps to secure the solar panel to the torque tube. According to an exemplary embodiment, during installation a vehicle includes at least one manipulator to position a solar panel and/or a clamp on a torque tube and to interact with the clamp to couple the solar panel to the torque tube. The vehicle may be a semi-autonomous or autonomous vehicle for positioning and mounting the solar panels.

Solar Panel Installation

Figure 79:
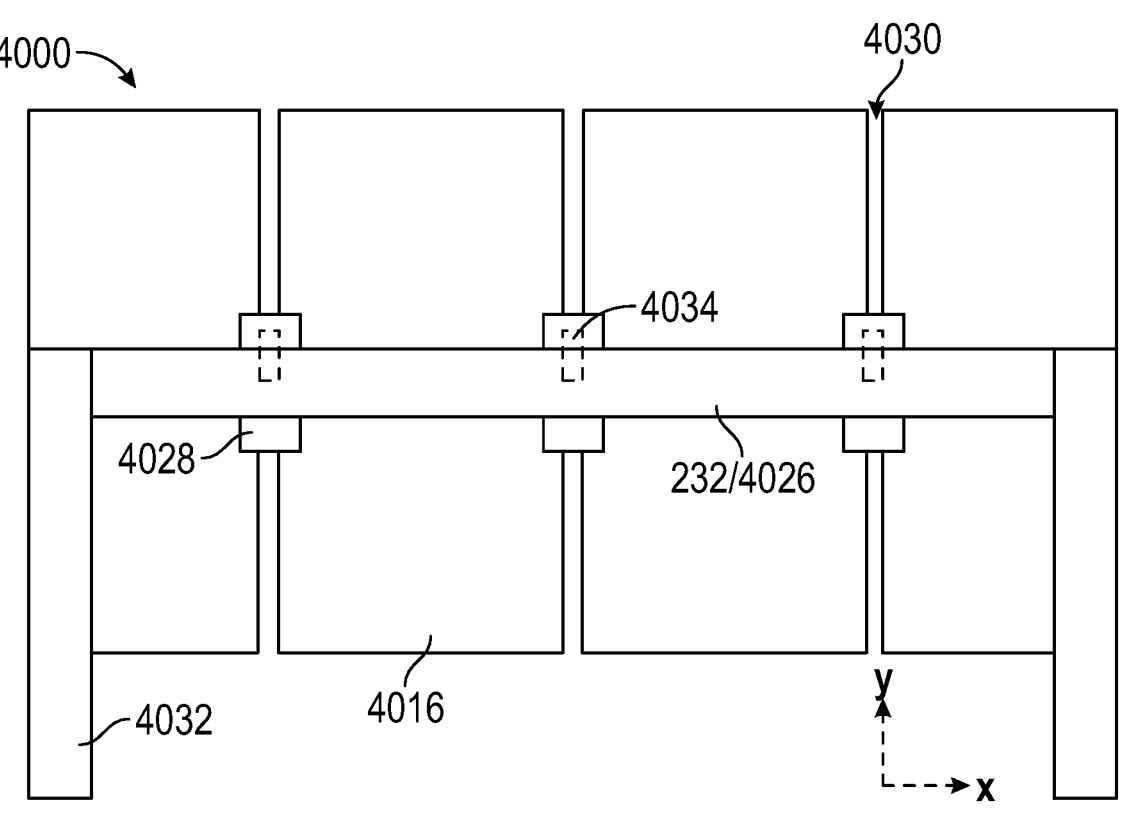
FIG. 79 is a diagram illustrating an underside of a solar panel installation, according to an exemplary embodiment.
Figure 80:
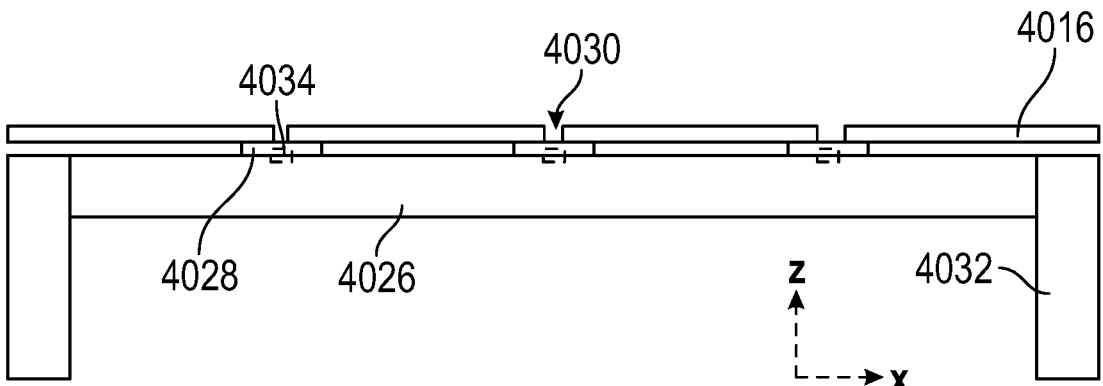
FIG. 80 is a diagram illustrating a front of the solar panel installation of FIG. 79, according to an exemplary embodiment.

Referring to FIGS. 79 and 80, a solar panel installation (e.g., solar panel array, photovoltaic array, etc.) is shown as array 4000, as seen from below and from a side, respectively, according to an exemplary embodiment. As shown, the array 4000 includes multiple photovoltaic (PV) panels (e.g., solar panels, etc.) shown as solar panels 4016, coupled to a support member (e.g., a frame, beam, etc.) shown as torque tube 4026 by an attachment mechanism (e.g., clamp, bracket, clip, connector, etc.) shown as clamp 4028. In some embodiments, the solar panels 4016 are the same as solar panels 16 of FIGS. 1-3. In some embodiments, the torque tube 4026 is the same as frame 26 of FIGS. 1-3 (e.g., the support structures 232). While the clamp 4028 is shown between the solar panel 4016 and the torque tube 4026, in some embodiments the solar panel 4016 rests directly on the torque tube 4026. The clamp 4028 may extend partially into a frame 4018 of the solar panel 4016 and the torque tube 4026 to couple the solar panel 4016 to the torque tube 4026. In some embodiments, spaced along torque tube 4026 are one or more ground support members (e.g., posts, columns, etc.), shown as posts 4032, elevating the torque tube 4026 and the solar panels 4016 off the ground while providing structural support.

In some embodiments, a gap (e.g., access section, uncovered area, etc.) shown as gap 4030 lies between adjacent solar panels 4016. The gap 4030 provides access to the clamps 4028 from above, for example, by a manipulator of an installation vehicle to interact with the clamp 4028 and couple the solar panel 4016 to the torque tube 4026 during installation. Still in other embodiments, the clamp 4028 is accessible from a side or a underneath the solar panels 4016 and there is no gap 4030.

In some embodiments, the array 4000 includes one or more dampers (tethers, actuators, active stabilization systems, etc.) shown as dampers 4034. The dampers 4034 are coupled to the clamp 4028 and the torque tube 4026 to provide passive and/or active stabilization to the array 4000. The dampers 4034 may extend or contract to counteract forces on the solar panels 4016 and/or the torque tube 4026, such as wind and snow, they could otherwise cause the array 4000 to fail. In some embodiments, the clamps 4028 are rotatable around the torque tube 4026, such that the solar panels 4016 may be positioned to track the sun.

In some embodiments, the torque tube may be configured in a non-standard shape such as square tubing, hex tubing, octagon tubing, etc. The torque tubing may be hollow and include mounting holes configured to receive a fastener for coupling the clamp 4028 to the torque tube 4026.

Figure 81:
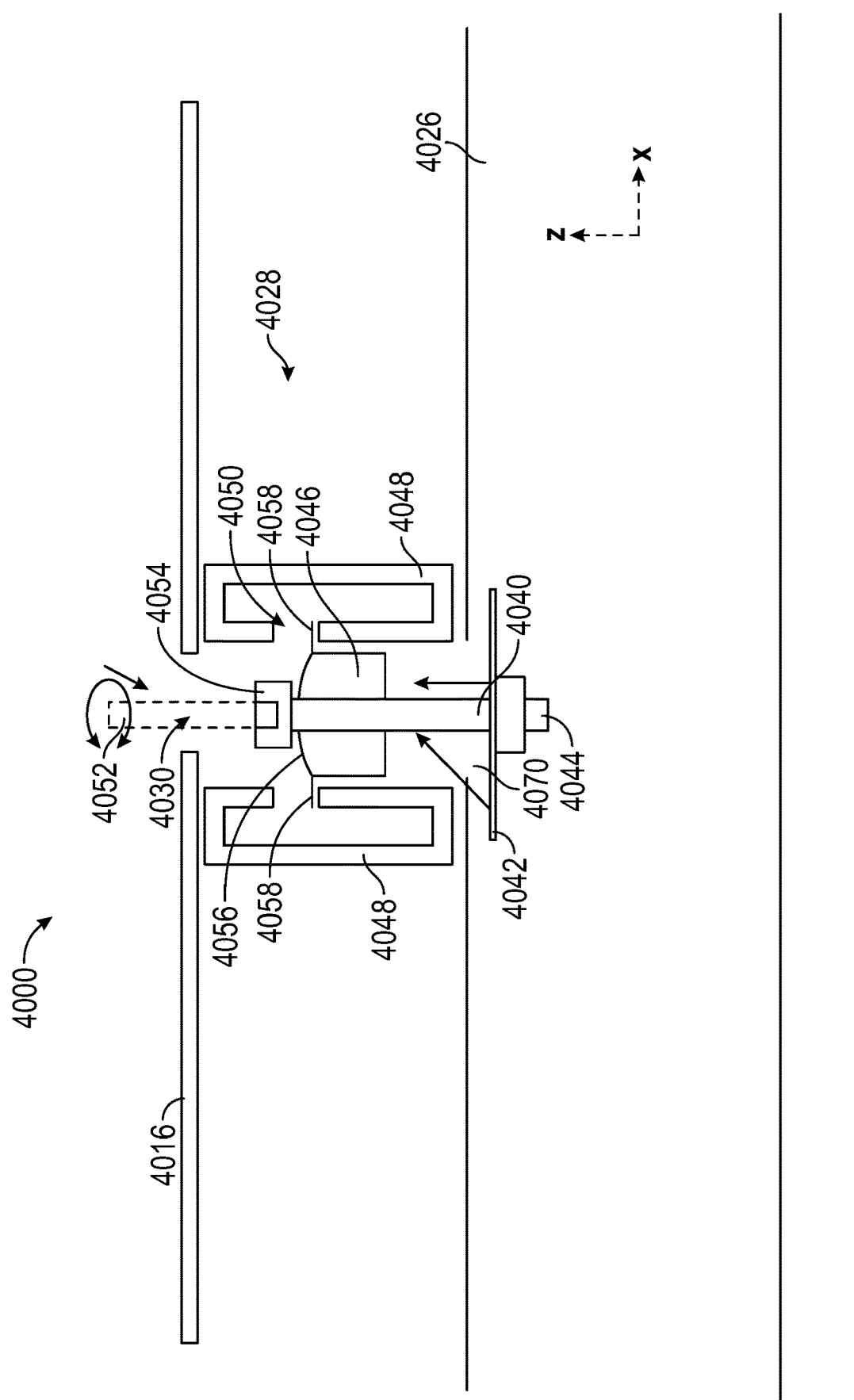
FIG. 81 is a diagram illustrating a cross-section of the solar panel installation of FIG. 79, including a clamp, according to an exemplary embodiment.

Referring now to FIG. 81, a cross-sectional view of array 4000 with a clamp 4028 is shown, according to an exemplary embodiment. As shown, the clamp 4028 includes a central shaft or tension member, shown as clamp bolt 4040. The clamp bolt 4040 is secured in the torque tube 4026 by a washer 4042 and a nut 4044. The clamp bolt 4040 may include a retainer (e.g., lip, protrusion, etc.), shown as retainer 4046 which engages with a portion of a frame supporting the solar panel 4016, shown as frame 4048, via a gap in the frame 4048, shown as gap 4050. The retainer 4046 may be selectively raised and lowered (e.g., by twisting of the clamp bolt 4040 by a manipulator of an installation vehicle) to selectively apply a compressive force to the frame 4048 of the solar panel 4016 and thereby secure the solar panel 4016 to the torque tube 4026. For example, the installation vehicle may include a tool, shown as installation driver 4052, which engages with a head of the clamp bolt, shown as clamp bolt head 4054, to rotate the clamp bolt 4040 in a first direction. The rotation of the clamp bolt 4040 in the first direction pulls the clamp bolt head 4054 towards nut 4044 in the y-direction, and causes the retainer 4046 to engage with the frame 4048 of the solar panel 4016. The clamp bolt 4040 may be installed in the torque tube 4026 prior to the positioning of a solar panel 4016, after the installation of a first solar panel 4016, or after the positioning of both adjacent solar panels 4016. For example, the clamp bolt 4040 may be preinstalled in the torque tube 4026 by a machine (e.g., an installation vehicle) in a first pass prior to the positioning of the solar panels 4016.

In some embodiments, the retainer 4046 includes a central raised portion, shown as center 4056, that transitions to two flat portions at the points the retainer 4046 engages with the frame 4048, shown as engagement sections 4058. The retainer 4046 may be selectively spread in the x-direction by applying a downward force to the central raised portion 4056 of the retainer 4046 in the z-direction to cause the central raised portion 4056 to deform and push the engagement sections 4058 of the retainer 4046 out along the x-direction and into the gap 4050 of the frame 4048. Still in other embodiments, the center 4056 and the engagement sections 4058 of the retainer 4044 are made of a flexible material (e.g., plastic, rubber, etc.) such that they may compress to fit through gap 4030 and then expand into gap 4050.

In some embodiments, one or more components of the clamp 4028 (e.g., clamp bolt 4040, retainer 4046, etc.) may be installed through the gap 4030 between the two adjacent solar panels 4016. For example, the retainer 4046 may be in its natural state narrow enough to fit through the gap 4030 between the solar panels 4016. After installation, the compressive force applied to the center 4056 of the retainer 4046 causes it to expand laterally, and push the engagement sections 4058 into the gaps 4050 of the frame 4048 and thereby securing the solar panels 4016 to the torque tube 4026. Still in other embodiments, the flexible retainer 4046 may be stiff enough to provide compressive force to secure the solar panels 4016 to the torque tube 4026, but flexible enough to be positioned through the gap 4030.

Still in other embodiments, one or more components of the clamp 4028 (e.g., the clamp bolt 4040, the retainer 4046, etc.) are installed prior to the placement of one or more of the solar panels 4016. In such embodiments, the gap 4030 between the solar panels 4016 may be small enough such that only a tool (e.g., a tool of a manipulator of an installation vehicle) may pass through the gap 4030.

In some embodiments, the installation driver 4052 may also be used to install the clamp bolt 4040 into the torque tube 4026. The installation driver 4052 may be engaged with the clamp bolt head 4054 and push the clamp bolt 4040, including the washer 4042 and the nut 4044 through a hole in the torque tube 4026, shown as mounting hole 4070, before tightening the retainer 4046 onto the frames 4048.

Figure 82:
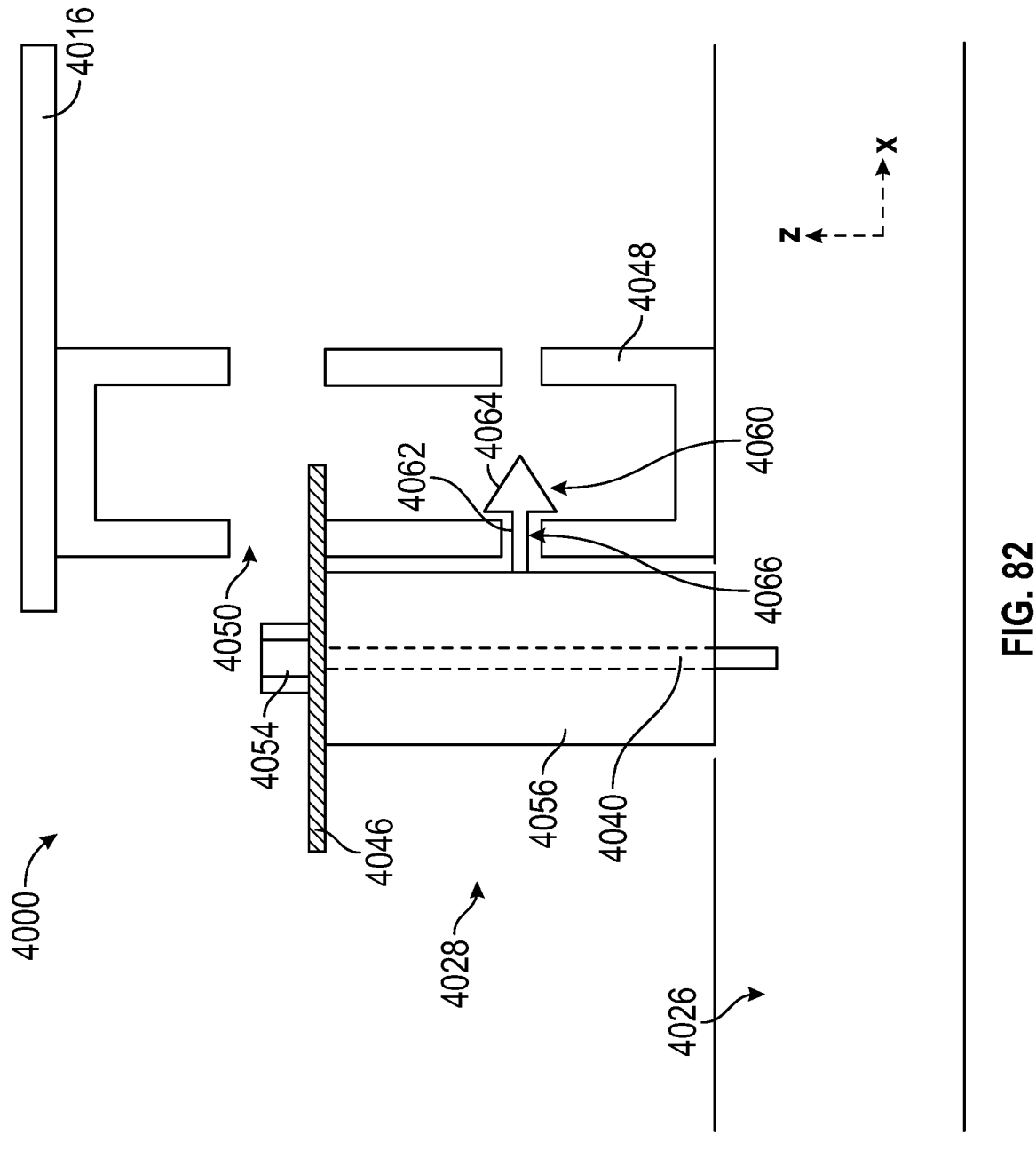
FIG. 82 is a diagram illustrating a cross-section of the solar panel installation of FIG. 79, including a clamp coupled to a solar panel, according to an exemplary embodiment.
Figure 83:
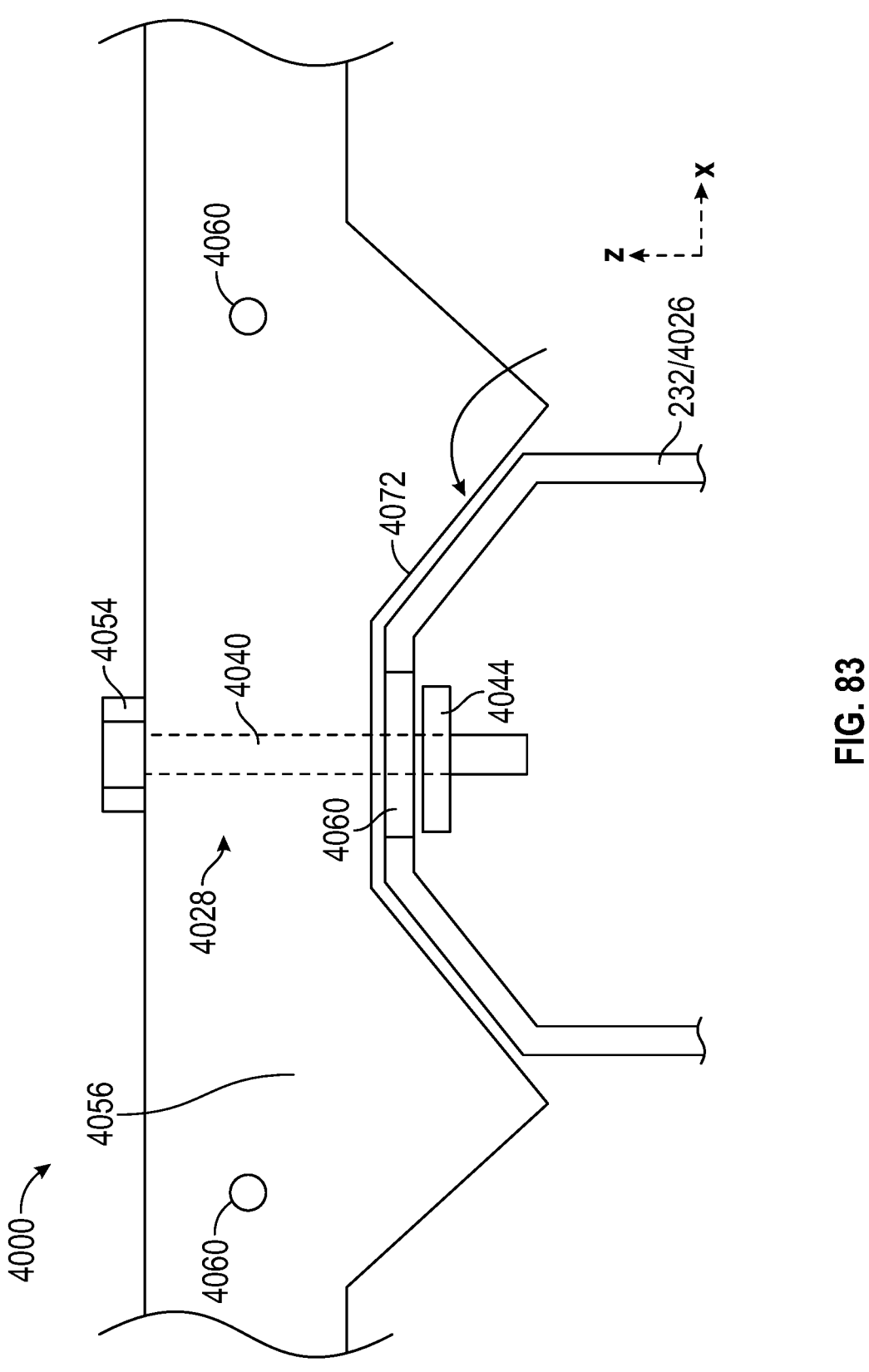
FIG. 83 is a diagram illustrating a side of the clamp of FIG. 81, according to an exemplary embodiment.

FIGS. 82 and 83 illustrates a clamp 4028 of FIG. 3 configured with a self-retaining clip (e.g., Christmas tree clip. mounting clip, etc.), shown as clip 4060. Clip 4060 allows a solar panel to be pre-fitted with clamping mechanism prior to being installed on a torque tube, such that all components may be installed as a single component.

Referring to FIG. 82, the clip 4060 includes a central support, shown as trunk 4062 coupled to a body, shown as body 4068, of the clamp 4028, and a substantially conical shaped, partially-deformable head, shown as cap 4064. In some embodiments, the cap 4064 includes multiple branches like a tree, with each branch being able to flex and bend. The clip 4060 may be installed in a hole, shown as clip hole 4066 in a frame 4048 of a solar panel 4016 to couple the clamp 4028 to the frame 4048. The clip hole 4066 may be narrower than the widest point of the cap 4064. The cap 4064 is positioned with a narrow end of the cap 4064 against the clip hole 4066. When pressed the cap 4064 partially deforms and/or compresses to fit through the clip hole 4066. After passing through the clip hole 4066 the partially-deformable head expands again such that the wider portion of the partially-deformable cap 4064 is adjacent the clip hole 4066 and cannot easily pass through the clip 4060 again, such that the self-retaining clip secures itself to a member. The trunk 4062 extends through the hole and couples to the body 4068. In some embodiments, the body is the same or similar to retainer 4046. In some embodiments, the clip 4060 has a set breaking limit such that the clamp 4028 may be removed by snapping the clip 4060.

Referring to FIG. 83, a cross-section of the torque tube 4026 coupled to a clamp 4028 of FIG. 82 is shown, according to an exemplary embodiment. As shown, the body 4068 of the clamp 4028 includes multiple clips 4066 for coupling the clamp 4028 to a frame 4048 (not shown) of a solar panel 4016. The body 4068 also includes one or more engagement surfaces, shown as mounting surface 4072, positioned above the torque tube 4026 and shaped to mirror the profile of the torque tube 4026. For example, as shown the torque tube 4026 is an octagonal tube, and the mounting surface 4072 of the clamp 4028 includes three faces parallel with three corresponding faces of the octagonal torque tube 4026. While shown as an octagonal tube, the torque tube

4026 may be a pipe, three-sided tube, a square tube, a hex tube, etc., to provide support and engagement surfaces for solar panels 4016 as well as resistance to torsion, and the mounting surface 4072 may contain one or more corresponding faces to match the shape of the torque tube 4026. In some embodiments, the one or more faces of the mounting surface 4072 may extend on at least partially along the sides of the torque tube 4026 and provide lateral strength in the y-direction in addition to supporting strength in the z-direction. Specifically, the faces of the mounting surface 4072 on the side of the torque tube 4026 may resists twisting forces imparted on the clamp 4028 by the solar panels 4016.

As shown in FIG. 83, the clamp 4028 is coupled to the torque tube 4026 by the clamp bolt 4044. The clamp bolt 4044 passes through the mounting hole 4070 and is secured at a tube end by the nut 4044. In some embodiments, between the nut 4044 and the inside of the torque tube 4026 is a washer 4042. The clamp bolt 4044 extends through the clamp 4028 in the z-direction until it terminates at a second end in a clamp bolt head 4054. In some embodiments, rotation of the clamp bolt 4044 tightens the nut 4044 and forces the body 4068 of the clamp 4028 against the torque tube 4026.

Figure 84:
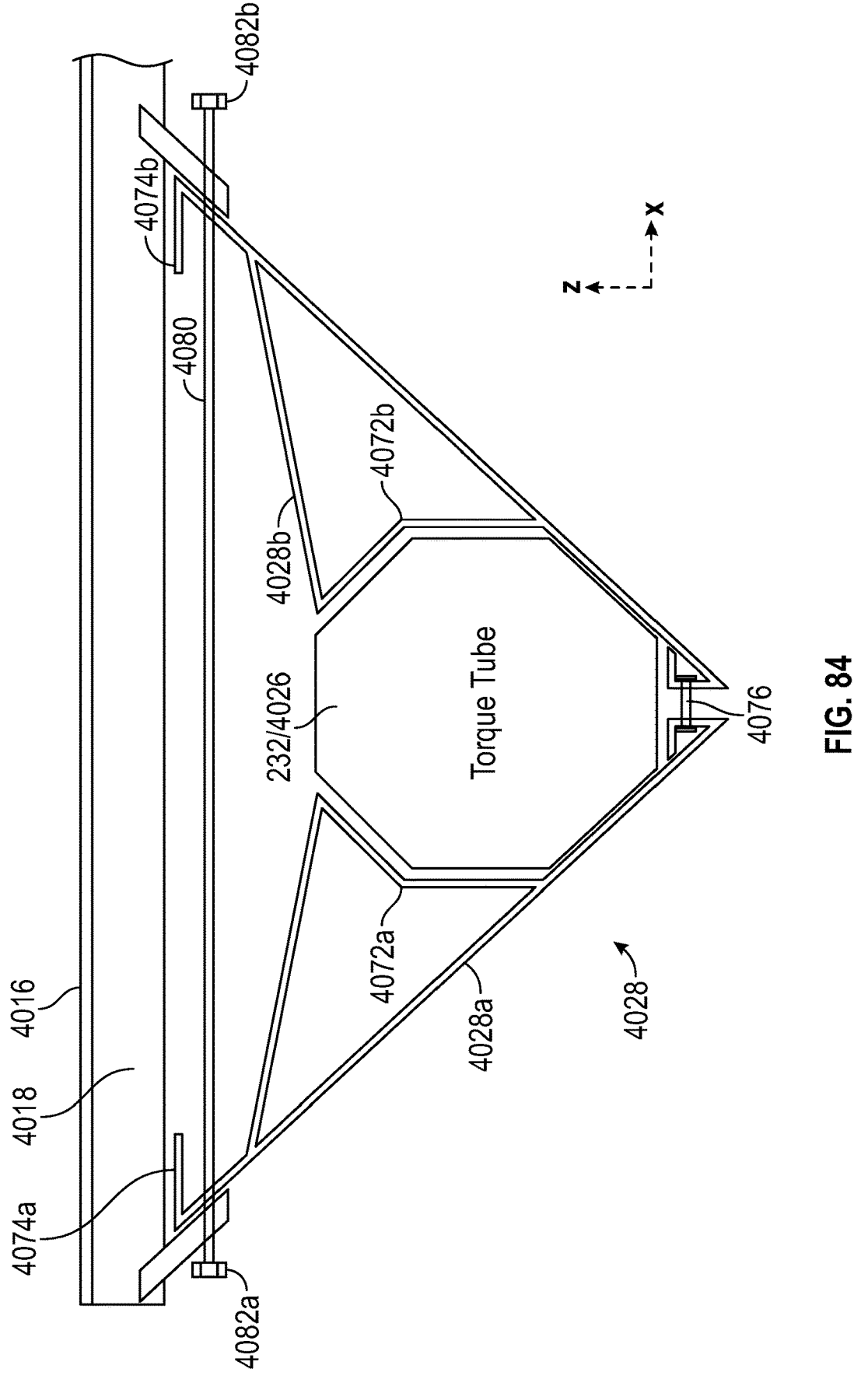
FIG. 84 is a diagram illustrating a cross-section of the solar panel installation of FIG. 79, including a vertically split clamp, according to an exemplary embodiment.

Referring to FIG. 84, a cross-section of the torque tube 4026 is shown with the clamp 4028 divided into a left clamp member 4028a and a right clamp member 4028b, according to an exemplary embodiment. The left clamp member 4028a and the right clamp member 4028b each include a mounting surface 4072a and 4072b respectively for engaging with an outer surface of the torque tube 4026. The left clamp member 4028a and the right clamp member 4028b may be coupled to a supporting frame of the solar panel 4016, shown as frame 4018, at tabs 4074a and 4074b respectively. The left clamp member 4028a and the right clamp member 4028b are coupled together at their respective bottoms by a fastener 4076 (e.g., a bolt, a clip, a tack weld, two "right hands", etc.). As shown the left clamp member 4028a and the right clamp member 4028b at least partially surround the torque tube 4026 and are further held together by a bolt mechanism, which includes a bolt, shown as bolt 4080 and bolt ends 4082a and 4082b. In some embodiments, the bolt 4080 is a threaded or partially-threaded rod that connects the bolt ends 4082a and 4082b. The bolt ends 4082a and 4082b are coupled proximate the tabs 4074a and 4074b respectively and thereby apply a compressive force on the mounting surfaces 4072a and 4072b to grab the torque tube 4026. In some embodiments, the torque tube 4026 includes one or more faces matched by the mounting surfaces 4072a and 4072b that when engaged with by the left clamp member 4028a and the right clamp member 4028b prevent rotation of the clamp 4028 about the torque tube 4026.

According to an exemplary embodiment, the clamp 4028 may be installed in a piece-wise fashion by an autonomous or semi-autonomous installation vehicle. For example. the left clamp member 4028a may be positioned with its mounting surface 4072a against the torque tube first and then the right clamp member 4028b may be positioned with its mounting surface 4072b against the torque tube 4026. The left clamp member 4028a and the right clamp member 4028b may be loosely held together by a bolt 4080 at a top of the left and right clamp members 4028a and 4028b. The fastener 4076 may then connect the left and right clamp members 4028a and 4028b at a bottom of the torque tube 4026. The solar panel 4016 is then placed between the left and right bolt ends 4082a and 4082b and the bolt 4080 is tightened at the left or right bolt end 4082a, 4082b to secure the solar panel 4016 in place relative to the clamp 4028 and the torque tube 4026. The split design of the clamp 4028 allows the clamp 4028 to be installed on the torque tube 4026 after the torque tube 4026 is installed at a location. For example, an autonomous or semi-autonomous installation vehicle may install the clamp 4028 prior to or during the installation of the solar panels 4016.

Figure 85:
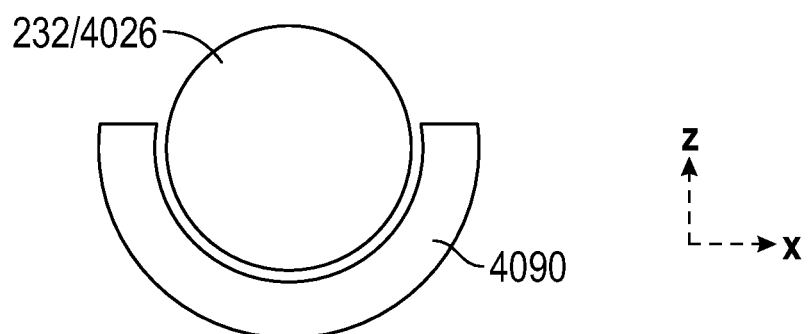
FIGS. 85 and 86 are diagrams illustrating cross-sections of the solar panel installation of FIG. 79, including a horizontally split clamp, according to an exemplary embodiment.
Figure 86:
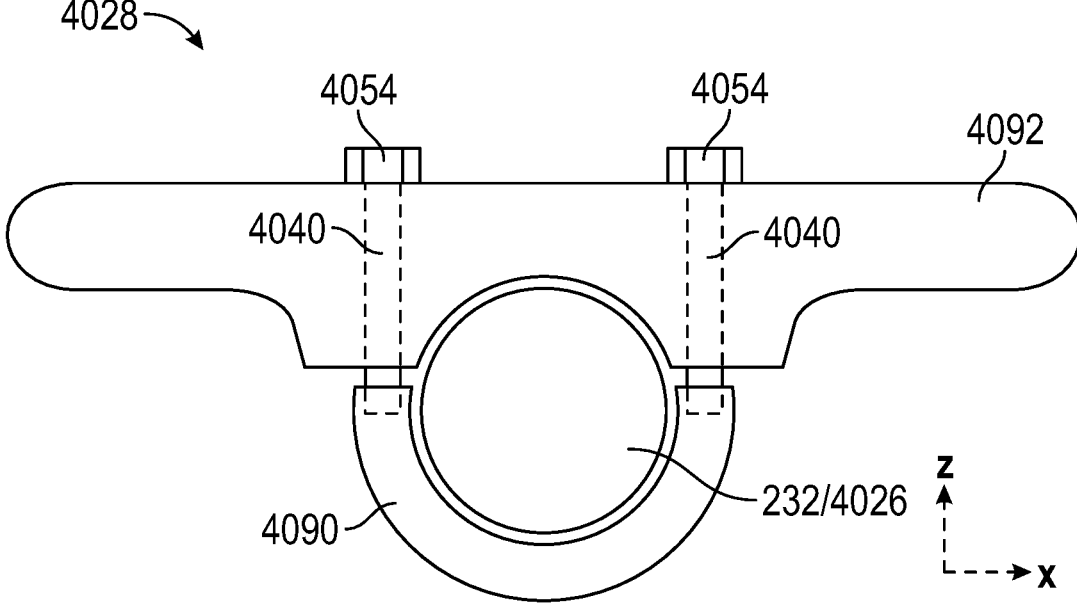

Referring now to FIGS. 85 and 86, a cross-section of the torque tube 4026 is shown with the clamp 4028 divided into an upper clamp member 4092 and a lower clamp member 4090. The upper clamp member 4092 and the lower clamp member 4090 may be placed around the torque tube 4026 to encapsulate the torque tube 4026 and couple the clamp 4028 to the torque tube 4026. In some embodiments, the lower clamp member 4090 is initially attached to a bottom of the torque tube 4026 by one or more temporary attachment mechanisms (e.g., magnets, adhesive, hook and loop, tack weld, etc.). The upper clamp member 4092 may be positioned on the torque tube 4026 above the lower clamp member 4090 and coupled to the lower clamp member 4090 via one or more fasteners, shown as clamp bolts 4040. At a top of the clamp bolts 4040 are clamp bolt heads 4054 which engage with a tool (not shown) to rotate the clamp bolts 4040 and couple the upper clamp member 4092 to the lower clamp member 4090, such that the clamp 4028 at least partially surrounds a circumference of the torque tube 4026. In some embodiments, as the upper clamp member 4092 is fastened to the lower clamp member 4090 the temporary attachment mechanism used to attach the lower clamp member 4090 to the torque tube 4026 breaks away. As shown, in some embodiments the clamp 4028 entirely surrounds the torque tube 4026. The upper clamp member 4092 includes one or more mounting points for a solar panel 4016 (not shown) such that the solar panel is thereby coupled to the torque tube via the top. In such embodiments, once coupled with the top of the clamping mechanism the temporary attachment mechanism holding the bottom to the bottom of the torque tube may detach. In some embodiments, after the lower clamp member 4090 and the upper clamp member 4092 are at least partially coupled together, the position of the clamp 4028 on the torque tube 4026 may be adjusted (e.g., by an autonomous or semi-autonomous vehicle) to position the clamp 4028 as needed to fit a solar panel 4016. In some embodiments, the solar panel 4016 is coupled to the upper clamp member 4092 by one or more fasteners.

Figure 87:
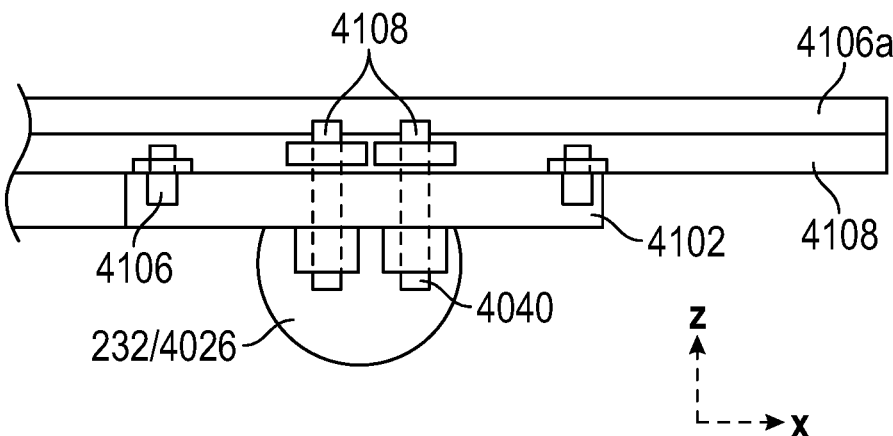
FIGS. 87 and 88 are diagrams illustrating cross-sections of the solar panel installation of FIG. 79, including a clamp including overlapping sections, according to an exemplary embodiment.
Figure 88:
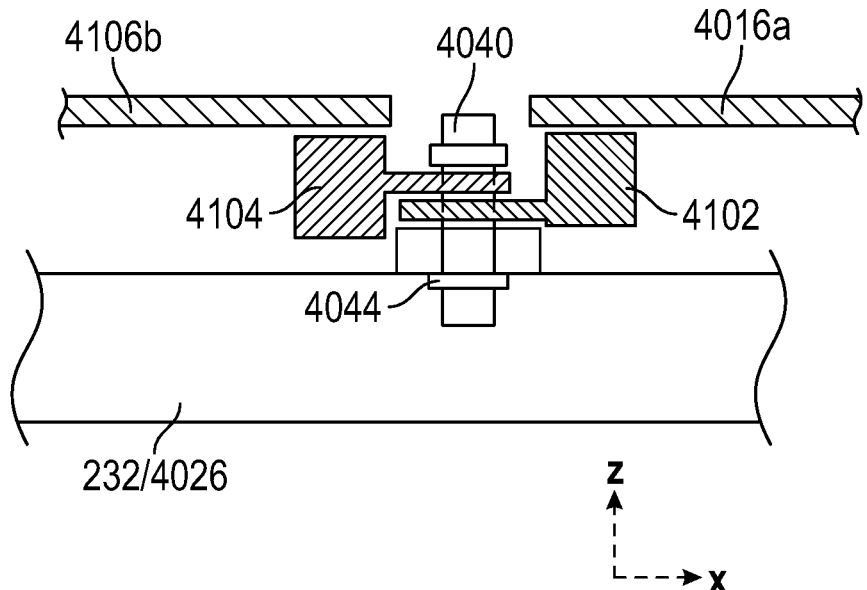

Referring now to FIGS. 87 and 88, the clamp 4028 is configured as an overlapping clamp, including a base clamp member 4102 and a lapping clamp member 4104. The base clamp member 4102 is coupled proximate a first side of a solar panel 4016 and the lapping clamp member 4104 is coupled proximate a second side of solar panel 4016. Therefore, as shown in FIG. 88, at a gap between adjacent solar panels 4016a and 4016b, the base clamp member 4102 is coupled to a first solar panel 4016a via one or more fasteners (e.g., bolts, screws, rivets, welds, clips, etc.) and the lapping clamp member 4014 is coupled to a second solar panel 4016b in the same manner, creating a complete pair and thereby forming clamp 4028. The clamp 4028 is coupled to the torque tube 4026 via one or more studs coupled to the torque tube, shown as bolt 4040. The bolt 4040 may be a blind threaded stud. In some embodiments, the bolt 4040 is coupled (e.g., inserted, welded, etc.) by a machine (e.g., installation vehicle 22) into the torque tube 4026. The clamp 4028 is installed in a step-wise manner. First the base clamp member 4012 is positioned above the bolts 4040 on the torque tube 4026. In some embodiments, the bolts 4040 are positioned before the clamp 4028, in some embodiments, the bolts 4040 are installed after the clamp 4028 is in place. In some embodiments, after the base clamp member 4012 is positioned, the lapping clamp member 4104 is positioned on top of a portion of the base clamp member 4102, and onto the same bolts 4040, thus lapping the base clamp member 4102. In some embodiments, the base clamp member 4102 and the lapping clamp member 4104 are coupled to the solar panels 4016a and 4016b, respectively, prior to being installed on the torque tube 4026. Still in other embodiments, the base clamp member 4102 and the lapping clamp member 4104 are installed before the solar panels 4016a and 4016b are coupled to the completed clamp 4028.

According to an exemplary embodiment, the clamp 4028 may be installed by an autonomous or semi-autonomous vehicle (installation vehicle 22). In some embodiments, the installation vehicle includes a manipulator. The manipulator may install one or more studs (e.g., bolts 4040) to the torque tube 4026. The manipulator may install the base clamp member 4102 on the studs. The solar panel 4016a is then installed on a side of the studs. The manipulator may install another set of bolts 4040 on the torque tube 4026. The manipulator may install the lapping clamp member 4104 on first set of studs. The solar panel 4016b may then be installed, at which point the manipulator may fasten a nut, shown as nut 4108, on the bolts 4040 to secure the base clamp member 4102 and the lapping clamp member 4104 to the torque tube 4026. In some embodiments, base clamp member 4102 and the lapping clamp member 4104 are coupled to the solar panels 4016a and 4016b prior to the base clamp member 4102 or the lapping clamp member 4104 being installed (e.g., via a self-retaining clip). In some embodiments, an installation vehicle may continuously place a solar panel with the base clamp member 4102 on a first side and the lapping clamp member 4104 on a second side so that the lapping clamp member 4104 laps a base clamp member 4102 on a preceding solar panel, while the base clamp member 4102 on the current solar panel is positioned to start a new clamp 4028.

Figure 89:
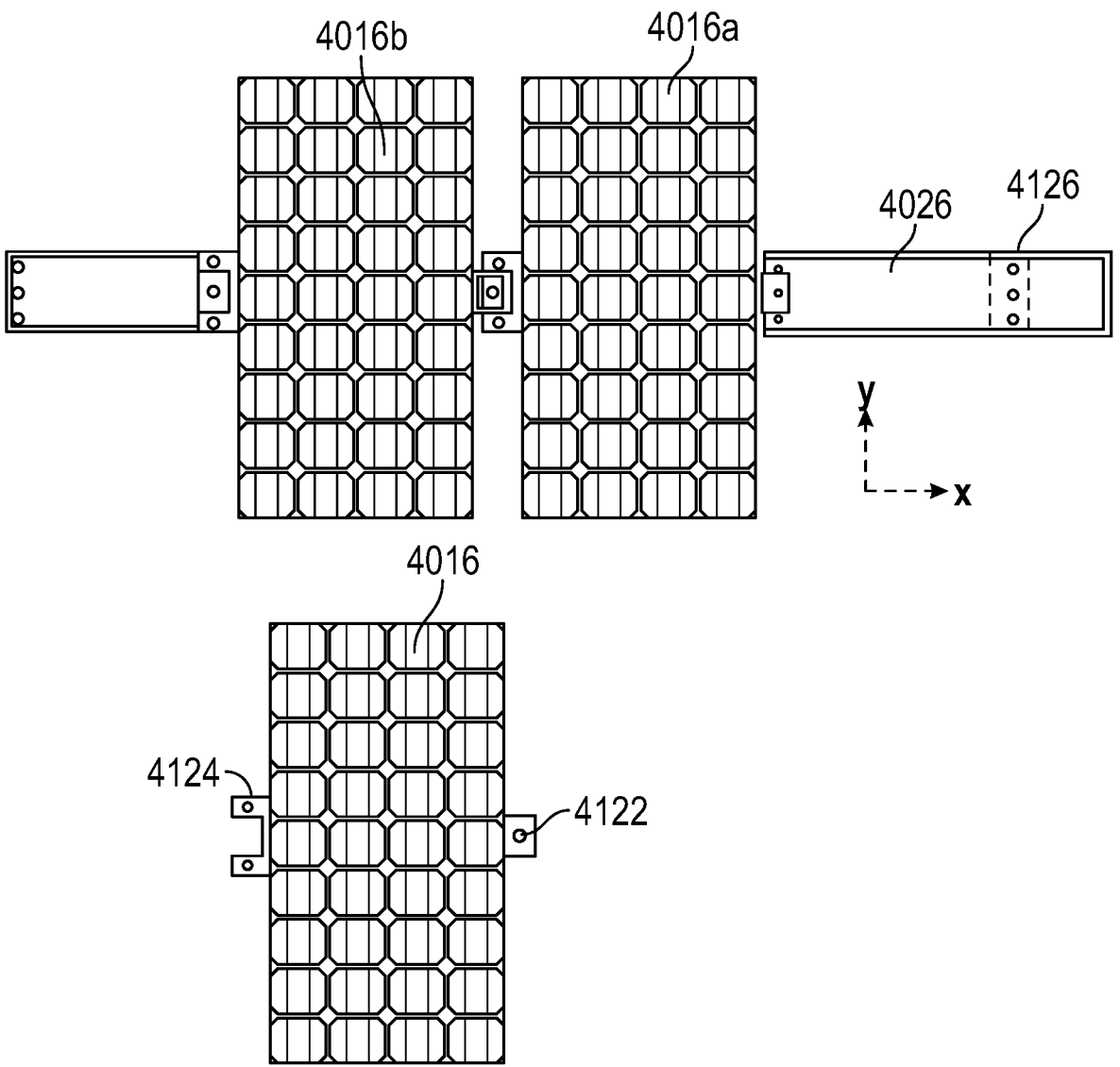
FIG. 89 is a diagram illustrating a top of the solar panel installation of FIG. 79 with a clamp, according to an exemplary embodiment.
Figure 90:
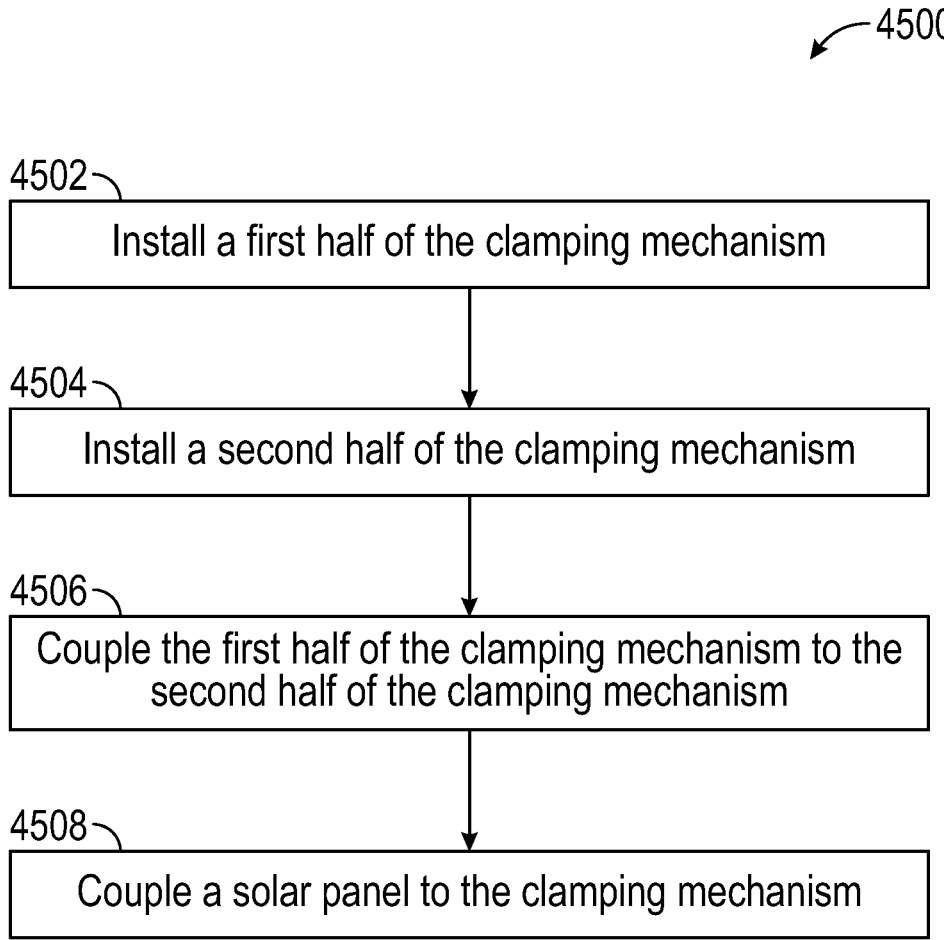
FIG. 90 is a flow diagram of a process for installing solar panels and clamps at an installation site, according to an exemplary embodiment.

Referring now to FIGS. 89 and 90, the clamp 4028 is configured as a split clamp with an inner clamp member 4122 and an outer clamp member 4124. As shown, an individual solar panel 4016 includes an inner clamp member 4122 on a first side and an outer clamp member 4124 on a second side. The outer clamp member 4124 is a c-shaped member with a partially enclosed space configured to receive the inner clamp member 4122. In operation, an outer clamp member 4124 of a first solar panel 4016a is coupled to a torque tube 4026 via fasteners in one or more mounting holes, shown as mounting holes 4126. In some embodiments, the mounting holes 4126 are pre-dilled into the torque tube 4026. In some embodiments, the fasteners are self-tapping screws which form the mounting holes 4126 as the clamp 4028 is installed. In some embodiments, the fasteners are pre-installed rivet nuts. In some embodiments, a manipulator of a vehicle (e.g., installation vehicle 22) installs the rivet nuts prior to the installation of the solar panels. In some embodiments, the fasteners are pre-installed studs on the torque tube 4026.

As shown in FIG. 89, the inner clamp member 4122 and the outer clamp member 4124 are coupled proximate opposing sides of a solar panel 4016. In some embodiments, the inner clamp member 4122 and the outer clamp member 4124 are installed at a factory. Still in other embodiments the inner clamp member 4122 and the outer clamp member 4124 are installed on at installation site.

As shown in FIG. 89 the torque tube 4026 may include a flat upper surface to support the solar panels 4016a and 4016b. As described above in some embodiments the torque tube 4026 is a square tube. However the torque tube 4026 may be other shapes includes a hex tube, an octagonal tube, etc.

Referring to FIG. 90, a flow diagram of a process 4500 for installing solar panels at a location (e.g., a solar installation) includes steps 4502-4508, according to an exemplary embodiment. In some embodiments, the process 4500 may be performed to autonomously or semi-autonomously install solar panels at an installation.

The process 4500 includes installing a first half of a clamping mechanism (e.g., left clamp member 4028a or right clamp member 4028b, lower clamp member 4090 or upper clamp member 4092, an inner clamp member 4122 or outer clamp member 4124 etc.) (step 4502). In some embodiments, the first half is coupled to a support infrastructure (e.g., torque tube 4026) of a solar installation. The process 4500 includes installing a second half of a clamping mechanism (e.g., left clamp member 4028a or right clamp member 4028b, lower clamp member 4090 or upper clamp member 4092, an inner clamp member 4122 or outer clamp member 4124 etc.) (step 4504). In some embodiments, the first half is placed on top of the second half. In some embodiments the first half is placed within the second half. Still in other embodiments the first half is placed adjacent to the second half. The process 4500 includes coupling the first half of the clamping mechanism to the second half of the clamping mechanism (step 4506). In some embodiments, the halves are coupled at a bottom, for example as shown in FIG. 84. In some embodiments, the halves are additionally and/or alternatively coupled at a top, such as for example a bolt 4080 with bolt ends 4082a and 4082b. In some embodiments, the clamping mechanism is a single component (e.g., clamp 4028 of FIGS. 81-83) and steps 4502-4506 are combined. Process 4500 includes coupling a solar panel to the clamping mechanism (step 4508). In some embodiments, a solar panel (e.g., solar panel 4016) is coupled to the clamping mechanism by a retainer of the clamping mechanism (e.g., retainer 4046). In some embodiments, the solar panel is coupled by a self-retaining clip (e.g., clip 4060). In some embodiments, the solar panel is coupled to the clamping mechanism by a bolt mechanism (e.g., bolt 4080 and bolt ends 4082a and 4082b.

In some embodiments, the solar panel is coupled to a first half of the clamping mechanism prior to the second half of the clamping mechanism. For example, the solar panel may be coupled to the first half of the clamping mechanism before the first half of the clamping mechanism is coupled to the torque tube. Still in other embodiments, the solar panels may be positioned first, and the clamping mechanism may be installed after. In some embodiments, prior to step 4508 the clamping mechanism may be repositioned on the torque tube to properly align with the solar panel.

In alternative embodiments, the solar panel installation of the present disclosure includes a clamping mechanism which is divided between adjacent solar panels, and only completed when the both adjacent panels are in position. The clamping mechanism may include a lower clamping mechanism coupled to a leading edge of a first solar panel (or a frame/subframe of the solar panel) and an upper clamping mechanism coupled to a trailing edge of a second solar panel. The first solar panel is positioned first, such that the lower clamping mechanism receives one or more studs coupled to the torque tube. The second solar panel is then positioned such that the upper clamping mechanism receives the same studs as the lower clamping mechanism and is accordingly positioned at least partially on top of the lower clamping mechanism. The overlapping clamping mechanism is then secured to the torque tube by a retaining fastener (e.g., a nut) on the studs extending through both the lower clamping mechanism and the upper clamping mechanism.

In alternative embodiments, the solar panel installation of the present disclosure includes a clamping mechanism divided between adjacent solar panels into an inner clamping mechanism and an outer clamping mechanism at least partially surrounding the inner clamping mechanism when installed. The inner and outer clamping mechanism may be installed individually on respective sides of a solar panel, such that a first solar panel is positioned with one of the inner clamping mechanism or the outer clamping mechanism on its leading edge. The torque tube may include mounting holes aligned with the portion of the clamping mechanism and configured to receive a fastener to secure the first solar panel to the torque tube. A second solar panel is positioned adjacent the first solar panel and includes on its trailing edge the other portion of the clamping mechanism (e.g., the inner clamping mechanism or the outer clamping mechanism) not found on the leading edge of the first solar panel. The inner clamping mechanism and the outer clamping mechanism may be installed on the solar panels prior to installation.

Autonomous Jobsite Control

Figure 91:
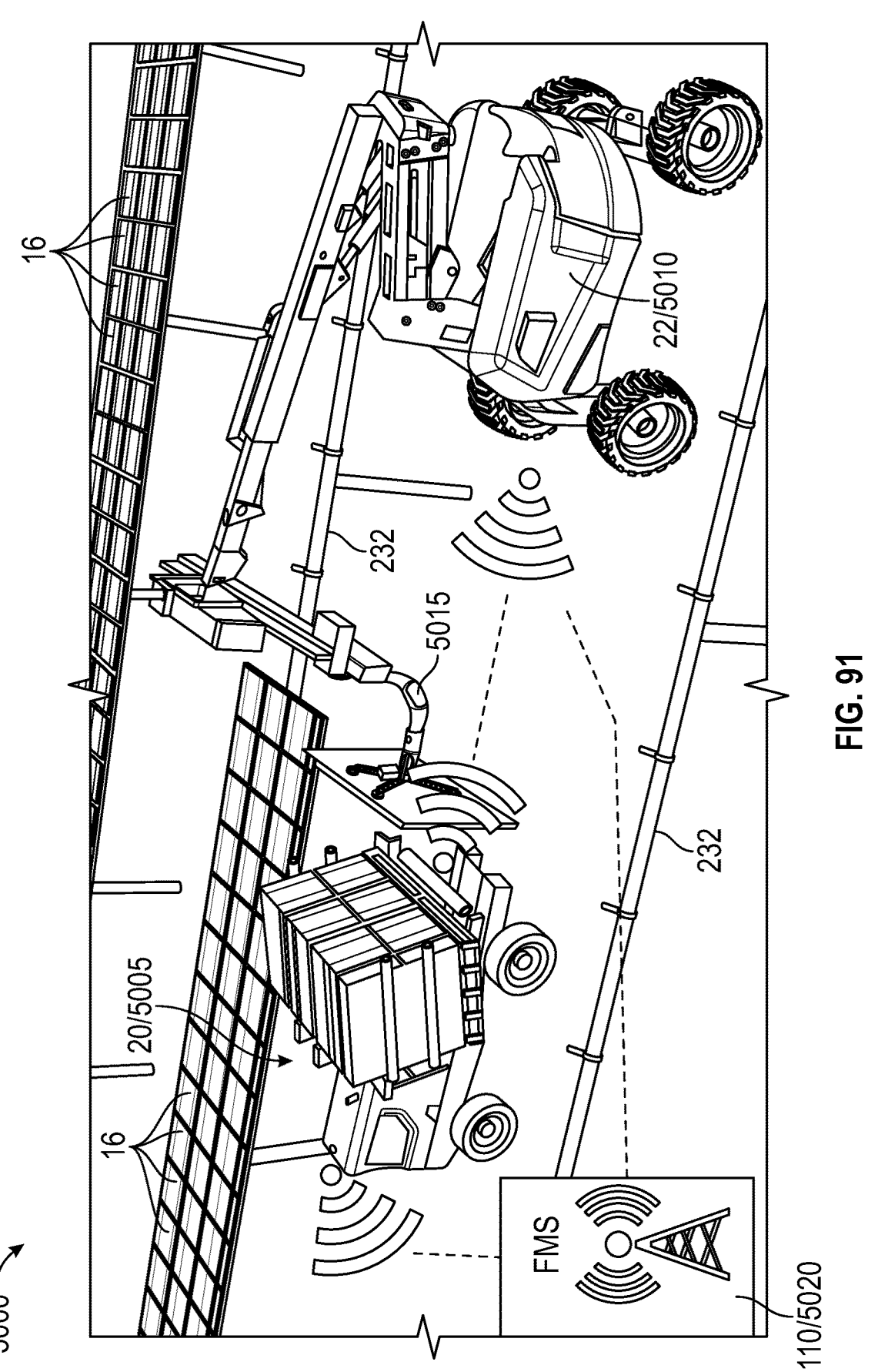
FIG. 91 is a perspective view of an environment including an Autonomous Delivery Vehicle (ADV), an Autonomous Working Vehicle (AWV), and an Autonomous Robotic Arm (ARA), according to an exemplary embodiment.

FIG. 91 depicts a perspective view of an environment 5000, according to an exemplary embodiment. The environment 5000 may include at least one Autonomous Delivery Vehicle (ADV) 5005, at least one Autonomous Working Vehicle (AWV) 5010, at least one Autonomous Robotic Arm (ARA) 5015, and at least one network. The environment 5000 may be and/or include at least one of an installation site, a jobsite, a construction site, a solar panel field, a solar panel farm, and/or among various other possible locations. In some embodiments, at least one of the ADV 5005, the AWV 5010, and/or the ARA 5015 may be and/or include the various vehicles described herein. For example, the ADV 5005 may be or include the transportation vehicle 20, the delivery vehicle 2000, the delivery vehicle 2800, or any of the other delivery vehicles or transportation vehicles described herein. The AWV 5010 may be or include the installation vehicle 22, the AWV 700, or any of the other installation vehicles or working vehicles described herein. The ARA 5015 may be or include the implement 745, the robotic arm 244, the track 482, the grabber assembly 760, or any other implements, robotic arms, tracks, or grabber assemblies described herein. In one embodiment, the ADV 5005 represents the delivery vehicle 2800, the AWV 5010 represents the AWV 700, and the ARA 5015 represents the implement 745.

Accordingly, at least one of the ADV 5005, the AWV 5010, and/or the ARA 5015 may include similar systems, components, and/or devices to that of the various vehicles described herein. For example, the ADV 5005 may include the controller 102. In some embodiments, the ADV 5005, the AWV 5010, and/or the ARA 5015 may communicate with one another similar to the various communication methods described herein. FIG. 91 depicts an example of the ADV 5005 and the AWV 5010 located proximate to another. The location of the ADV 5005 and the location of the AWV 5010, as shown in FIG. 91, depicts an example of the ADV 5005 and the AWV 5010 having established a virtual dock. The virtual dock may be and/or include at least one of a placement, an orientation, an arrangement, and/or otherwise a positioning of the ADV 5005 and the AWV 5010 relative to one another. For example, the virtual dock may include a predetermined position of the AWV 5010 for which the ADV 5005 may then align with such that a solar panel carried by the ADV 5005 is accessible by the ARA 5015.

The ADV 5005 may include at least one carrier (e.g., the carrier 2100), at least one primary mover, and at least one processing circuit (e.g., the controller 102). The carrier may be movably coupled with a chassis of the ADV 5005. For example, the carrier may tilt, rotate, pivot, and/or otherwise adjust a pitch of the carrier relative to the chassis of the ADV 5005. The ADV 5005 may be controllable by the processing circuit. For example, the ADV 5005 may include the controller 102 and the controller 102 may control various components and/or movements of the ADV 5005. In some embodiments, the controller 102 may generate control signals that cause the primary mover (e.g., engine, barrier, motor, etc.) to move the ADV 5005. The processing circuit of the ADV 5005 may determine locations of the ADV 5005. For example, the processing circuit may determine a location of the ADV 5005 relative to a location of the AWV 5010. The processing circuit of the ADV 5005 may control the ADV 5005 to move from a first location to a second location. For example, the processing circuit may move the ADV 5005 from a pick-up site (e.g., a location of solar panels, a location with the unloading machinery 18) to an install site (e.g., a location of the AWV 5010).

The AWV 5010 may include at least one arm or boom, at least one primary mover, and at least one processing circuit. The boom (e.g., the boom assembly 702) may be coupled with a moveable element of the AWV 5010. For example, the AWV 5010 may include a turntable (e.g., a moveable element, the turntable 409, etc.) and the boom may be coupled with the turntable. The boom of the AWV 5010 may move separately from the moveable element. For example, the boom may include a series of elements linked with one another and the elements may articulate, pivot, adjust, and/or otherwise move relative to the moveable element. The processing circuit of the AWV 5010 (e.g., a controller 102) may control the various components of the AWV 5010. For example, the processing circuit may provide control signals to the moveable element that cause the moveable element to rotate about a given axis. The processing circuit may also control the AWV 5010 to move the AWV 5010 from a first location to a second location. For example, the AWV 5010 may move between install sites (e.g., move from the first location to the second location).

The ARA 5015 may include at least one linkage or manipulator (e.g., the track 482, the robotic arm 456, etc.), at least one grabbing mechanism (e.g., the grabber assembly 760), and at least one processing circuit (e.g., the controller 772). The manipulator may couple the ARA 5015 to the AWV 5010. For example, the manipulator may couple the ARA 5015 with the boom of the AWV 5010. The manipulator may move separately from the AWV 5010. For example, the manipulator may rotate, pivot, swivel, and/or other move relative to the boom. The grabbing mechanism may be and/or include at least one of a clasp, a claw, a grabber, a coupling device, and/or among various other possible devices. The grabbing mechanism may selectively couple with at least one solar panel 16. For example, the grabbing mechanism may couple with a solar panel 16 to remove the solar panel 16 from the ADV 5005 and decouple from the solar panel 16 responsive to ARA 5015 and/or an operator installing the solar panel 16. The processing circuit of the ARA 5015 may control the various components of the ARA 5015. For example, the processing circuit may control the linkages of the ARA 5015 to adjust, change, update, and/or alter a position the grabbing mechanism. The processing circuit may also control the ARA 5015.

As shown in FIG. 91, the ADV 5005, the AWV 5010, and the ARA 5015 in communication with a cloud computing system, shown as fleet management service (FMS) 5020. The FMS 5020 may be part of the cloud computing system 110. The FMS 5020 may utilize data provided by the ADV 5005, the AWV 5010, the ARA 5015, and/or one or more users (e.g., through user devices) and develop commands for operating the ADV 5005, the AWV 5010, and the ARA 5015. The FMS 5020 may seek to optimize the flow of the solar panel installation process such that the speed of solar panel installation is maximized. The ADV 5005, the AWV 5010, the ARA 5015, and the FMS 5020 may communicate directly with one another (e.g., through one or more wired or wireless interfaces) and/or indirectly with one another (e.g., forming a mesh communication). Although FIG. 91 shows the environment 5000 as containing one of each of the ADV 5005, the AWV 5010, and the ARA 5015, the environment 5000 may contain one or more of each element.

Figure 92:
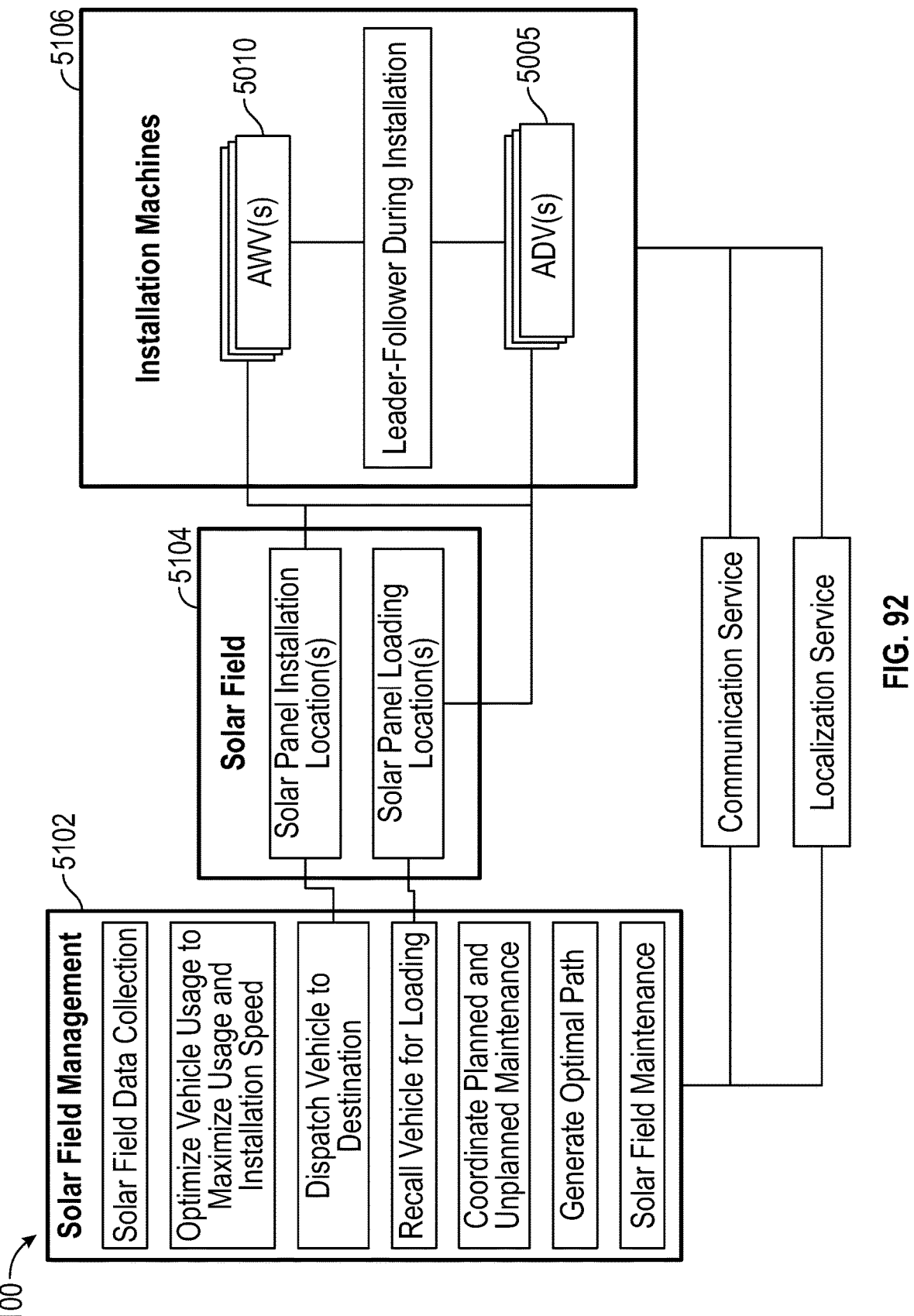
FIG. 92 is a block diagram of a system for use in solar panel installation, according to an exemplary embodiment.

FIG. 92 depicts a block diagram of a system 5100, according to an exemplary embodiment. The system 5100 may include at least one solar field management 5102 (e.g., the FMS 5020), at least one solar field 5104 (e.g., the environment 5000), a series of installation machines 5106 (e.g., the ADVs 5005, the AWVs 5010, the ARAs 5015, etc.), at least one communication service (e.g., a network), and at least one localization service. The solar field management 5102 may be implemented as and/or included in a cloud computer center, a remote server, a remote database, and/or a central hub. For example, the solar field management 5102 may be included in the cloud computing system 110. The solar field management 5102 may receive various inputs from at least one user. For example, the solar field management 5102 may interface with a user device (e.g., a phone, a computer, a tablet, a laptop, an infotainment system, a computing device, etc.) and the user device may provide information to the solar field management 5102. The solar field management 5102 and the installation machines 5106 may communicate via at least one of a communication service and/or a localization service.

The solar field management 5102 may collect data corresponding to the solar field. For example, the solar field management 5102 may obtain information from the installation machines 5106 (e.g., the ADV 5005, the AWV 5010, and the ARA 5015) as tasks are executed and/or completed. For example, the ARA 5015 may provide an indication to the solar field management 5102 responsive to the installation of a solar panel 16 in the solar field. The indication may include a location where the solar panel 16 was installed.

The solar field management 5102 may control vehicle usage. For example, the solar field management 5102 may provide signals (e.g., commands) to the installation machines 5106 to indicate install initiation (e.g., when the installation of a solar panel 16 is initiated), install completion (e.g., when the installation of a solar panel 16 is completed), install location (e.g., the location where the solar panel 16 is installed), and/or install updates (e.g., changes to the planned solar installation timeline). The signals may cause the installation machines 5106 to perform at least one of the various tasks described herein.

The solar field management 5102 may dispatch installation machine 5106 to destinations. For example, the solar field management 5102 may provide a location of an install site (e.g., a site to install a solar panel) to the installation vehicles. The installation vehicles may travel to the install site responsive to receiving the location of the install site.

The solar field management 5102 may recall the installation machines 5106. For example, the solar field management 5102 may provide signals to the installation machines 5106 to indicate that they may return. The signals may be provided upon completion of a given number of installs (e.g., a given number of installed solar panels 16). The signals may also be provided responsive to a change in the solar field. For example, the solar field management 5102 may transmit the signals to the installation machines 5106 after a location of an install site has changed. The solar field management 5102 may also direct the installation machines 5106 to charging stations, refuel stations, equipment pickup sites (e.g., solar panel storage areas, such as the location of a shipping container 14).

The solar field management 5102 may also organize vehicle maintenance. For example, the solar field management 5102 may receive telematics information from the installation machines 5106 (e.g., sensor data indicative of a current status of the vehicle, such as runtime, emissions, current component positions, etc.) and the solar field management 5102 may detect, determine, and/or otherwise identify equipment faults. For example, the solar field management 5102 may detect that the ARA 5015 is no longer responding to requests and the solar field management 5102 may direct the AWV 5010 to return so that the ARA 5015 may undergo maintenance.

The solar field management 5102 may also generate paths. For example, the solar field management 5102 may generate paths for the installation machines 5106 to take. The paths may be and/or include an indication of step-by-step directions, a series of moves to be performed, a route, and/or a series of actions to be performed by the installation machines 5106. The paths may also indicate a location of a subsequent install site upon completion of a solar panel install. For example, the installation machines 5106 may receive paths from a first solar panel install location to a second solar panel location.

The solar field management 5102 may also monitor the solar field. For example, the solar field management 5102 may interface with, interact with, and/or otherwise communicate with the solar panels 16 located in the solar field. The solar field management 5102 may receive operation information form the solar panels 16. For example, the solar field management 5102 may receive information indicating an amount of energy absorbed by the solar panels 16, energy output (e.g., voltage, current) of the solar panels 16, etc.

The movement and/or operations of the installation machines 5106 may be and/or include a leader and a follower. Two or more of the installation machines 5106 may utilize sensor data (e.g., process locally on the processing circuits of the installation machines 5106) to determine a control scheme that maintains a consistent distance between the installation machines 5106. A first vehicle may be assigned the role of leader, and a second vehicle may be assigned the role of follower. The second vehicle may use sensor data (e.g., from sensors onboard the first vehicle or the second vehicle) to determine a movement of first vehicle (e.g., driving forward a distance) and determine a control scheme that causes the second vehicle to mimic the movement of the first vehicle (e.g., driving forward the same distance). For example, the ADV 5005 may be a leader (e.g., a vehicle that moves first) and the AWV 5010 may be the follower (e.g., a vehicle that follows behind the leader). The leader and follower process may also include a first vehicle moving by a first amount and a second vehicle then also moving by the first amount. By constantly maintaining a set distance between the two vehicles, the AWV 5010 can easily and predictably retrieve solar panels 16 from the ADV 5005.

Figure 93:
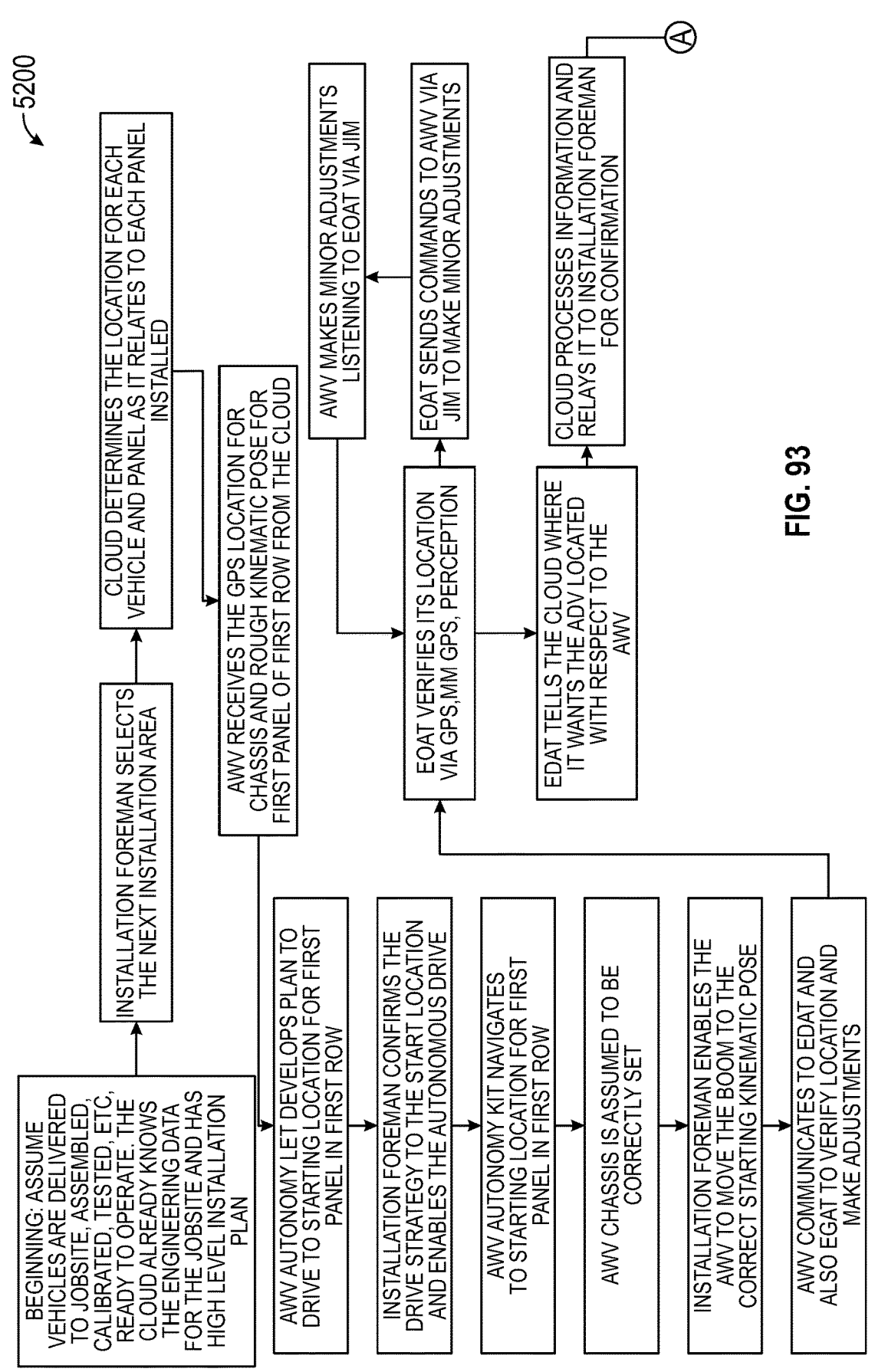
FIG. 93 is a block diagram of a process for communication information between the ADV, the AWV, and the ARA illustrated in FIG. 91, according to an exemplary embodiment.
Figure 93:
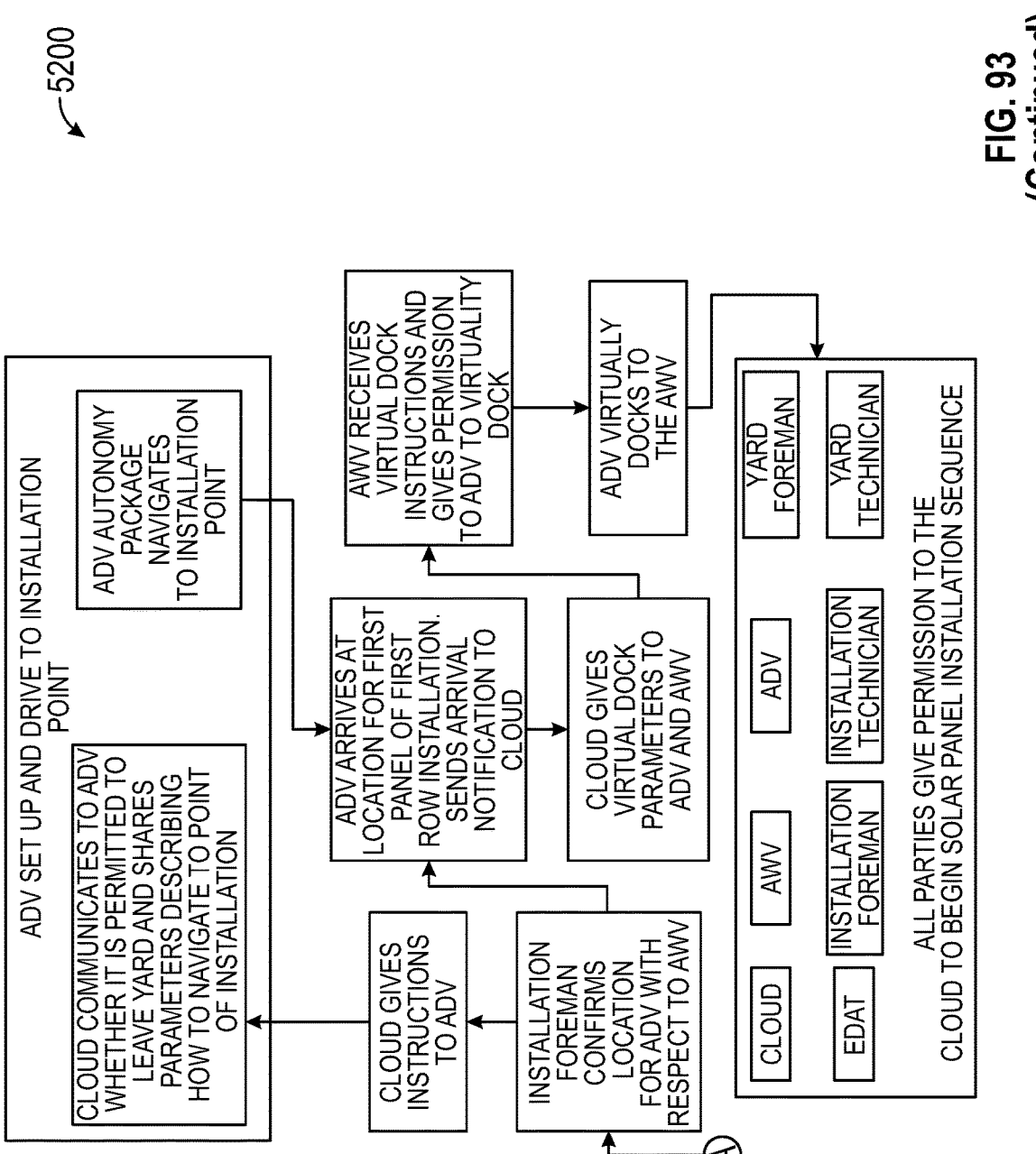

FIG. 93 depicts a flow diagram of a process 5200 or method of communicating information between various vehicles, according to an exemplary embodiment. In some embodiments, at least one step of the process 5200, shown in FIG. 93, may be performed by the various vehicles described herein. For example, the AWV 5010 may perform at least one step of the process 5200 shown in FIG. 93. The various steps of the process 5200 may be adjusted, modified, altered, rearranged, separated, combined, updated, and/or otherwise changed. For example, a given step of the process 5200 may be separated in one or more steps. As another example, a first given step and a second given step may be combined into a single step.

The process 5200 includes an initial setup step, in which the installation machines 5106 are placed within the environment 5000, calibrated, tested, and made ready to operate. The FMS 5020 is provided with data describing the jobsite and a high-level installation plan (e.g., an approximate number of solar panels to be installed and area to be covered).

The process 5200 may include a selection of an install area. For example, a user (e.g., an installation foreman) may interact with the solar field management 5102 (e.g., through a user device such as a smartphone or tablet) to provide an indication of a selection of the install area. The selection of the install area may include the user providing a location, size, and/or shape of the install area, selecting an icon including in an interactive map including a series of install areas, selecting a zone including a series of install sites, and/or among various possible combinations.

The process 5200 involves the FMS 5020 determining the location of each vehicle and each solar panel 16. This may be determined based on sensor data from the vehicle and/or the selection of the install area.

The process 5200 may include a vehicle receiving a location (e.g., a GPS location) from the FMS 5020. For example, the AWV 5010 may receive the location of the install area from the solar field management 5102. In some embodiments, the AWV 5010 may receive the location responsive to the solar field management 5102 determining the location for various installation machines 5106.

The process 5200 may include a development of a path for one or more vehicles. For example, the processing circuit of the AWV 5010 may generate a path that the AWV 5010 may travel from a first location to the location that was received from the solar field management 5102. The AWV 5010 may determine the path based on the location of the AWV 5010 and the location of the install area. For example, the AWV 5010 may determine a series of movements that the AWV 5010 may perform to move to the install area.

The process 5200 may include a confirmation of a strategy (e.g., a path or movement strategy). For example, the AWV 5010 may provide, to the solar field management, the generated path to the install area. The solar field management 5102 may receive, from a user device, confirmation (e.g., acceptance) of the strategy. For example, the user interacting with the solar field management 5102 may accept a prompt including the generated path. The AWV 5010 may receive an indication that the generate path has been accepted from the solar field management.

The process 5200 may include a vehicle navigating. For example, the AWV 5010 may navigate from a first location (e.g., a current location of the AWV 5010) to the install area. The AWV 5010 may navigate from the first location to the install area based on the generated path. The AWV 5010 may provide, to the solar field management, an indication that the AWV 5010 is navigating towards the install area.

The process 5200 may include a determination of an orientation of a vehicle. For example, the AWV 5010 may determine, based on information generated by one or more sensors disposed on the AWV 5010, a placement and/or an orientation of the AWV 5010 relative to the install area. The placement of the AWV 5010 may include a location of at least one component of the AWV 5010. For example, the placement may include a position of the arm of the AWV 5010. The placement of the AWV 5010 may also include an orientation of a chassis of the AWV 5010.

The process 5200 may include receiving a signal to indicate that the AWV 5010 may move. For example, the solar field management 5102 may provide a signal to the AWV 5010 to indicate that the arm of the AWV 5010 may move from a retracted position to an extending position. The AWV 5010 receiving the signal may cause the AWV 5010 to control and/or otherwise move the arm of the AWV 5010 in accordance to a position that was indicated in the signal.

The process 5200 may include the AWV 5010 communicating with the ARA 5015 and/or another End of Arm Tooling (EOAT) device coupled to the AWV 5010. The EOAT may be any type of implement coupled to the AWV 5010. The EOAT and the AWV 5010 may have separate controllers that communicate with one another. For example, the AWV 5010 may provide a request of a location of the ARA 5015 relative to the AWV 5010. The AWV 5010 may provide the request responsive the AWV 5010 moving a given component. For example, the AWV 5010 may provide the request responsive to the turntable of the AWV 5010 moving.

The process 5200 may include a verification of a location. For example, the ARA 5015 may verify its location based on information that may be generated by one or more sensors disposed on the ARA 5015. To continue this example, the ARA 5015 may receive GPS information from the sensors and the ARA 5015 may use the GPS information to verify a location of the ARA 5015.

The process 5200 may include a position verification loop. The position verification loop may include the ARA 5015 sending signals to the AWV 5010 to have the AWV 5010 perform a given movement. For example, the ARA 5015 may send a signal, to the AWV 5010, to request that the AWV 5010 move in a given direction. The position verification loop may also include the AWV 5010 moving based on the request provided by the ARA 5015. For example, the AWV 5010 may move forward responsive to the ARA 5015 requesting that the AWV 5010 move forward.

The process 5200 may include a location request. For example, the ARA 5015 may provide a request, to the solar field management 5102, for the ADV 5005 to travel to a given location. The request may include a location for the ADV 5005 to travel relative to the ARA 5015. For example, the request may include the ARA 5015 asking that the ADV 5005 travel to a given location proximate to the ARA 5015.

The process 5200 may include a confirmation of the location request. For example, the solar field management 5102 may receive the location request from the ARA 5015 and the solar field management 5102 may accept the location request. By way of example, a user may confirm the location request through a user device. The solar field management 5102 accepting the request may include the confirmation of the location request.

The process 5200 may include a transmission of the location request. For example, the solar field management 5102 may transmit the location request to ADV 5005. The solar field management 5102 manage may transmit the location request responsive to the confirming the location request. The solar field management 5102 may provide a location of the AWV 5010 and/or the ARA 5015 to the ADV 5005. Along with the location, the solar field management 5102 may provide instructions for the ADV 5005 to navigate to the ARA 5015. For example, the solar field management 5102 may provide the location of the ARA 5015 that was previously determined.

The process 5200 may include a vehicle traveling to a site. For example, the ADV 5005 may travel to the location of the AWV 5010 responsive to the ADV 5005 receiving the location request from the solar field management. The ADV 5005 may generate and/or determine a path to take to reach the location of the AWV 5010.

The process 5200 may include a vehicle arriving at a site. For example, the ADV 5005 may travel from a first location to the location of the AWV 5010. The ADV 5005 may arrive at the site (e.g., the location of the AWV 5010) responsive to the ADV 5005 traveling along the path generated by the ADV 5005.

The process may include establishing a virtual dock. For example, the ADV 5005 and/or the AWV 5010 may perform one or more movements and/or one or more actions to position, situate, and/or otherwise place one another in a predefined relative orientation similar to the one shown in FIG. 91. Once in the virtual dock configuration, the ADV 5005 may perform the leader-follower process described herein to maintain the relative distance and orientation of the ADV 5005 and the AWV 5010.

Figure 94:
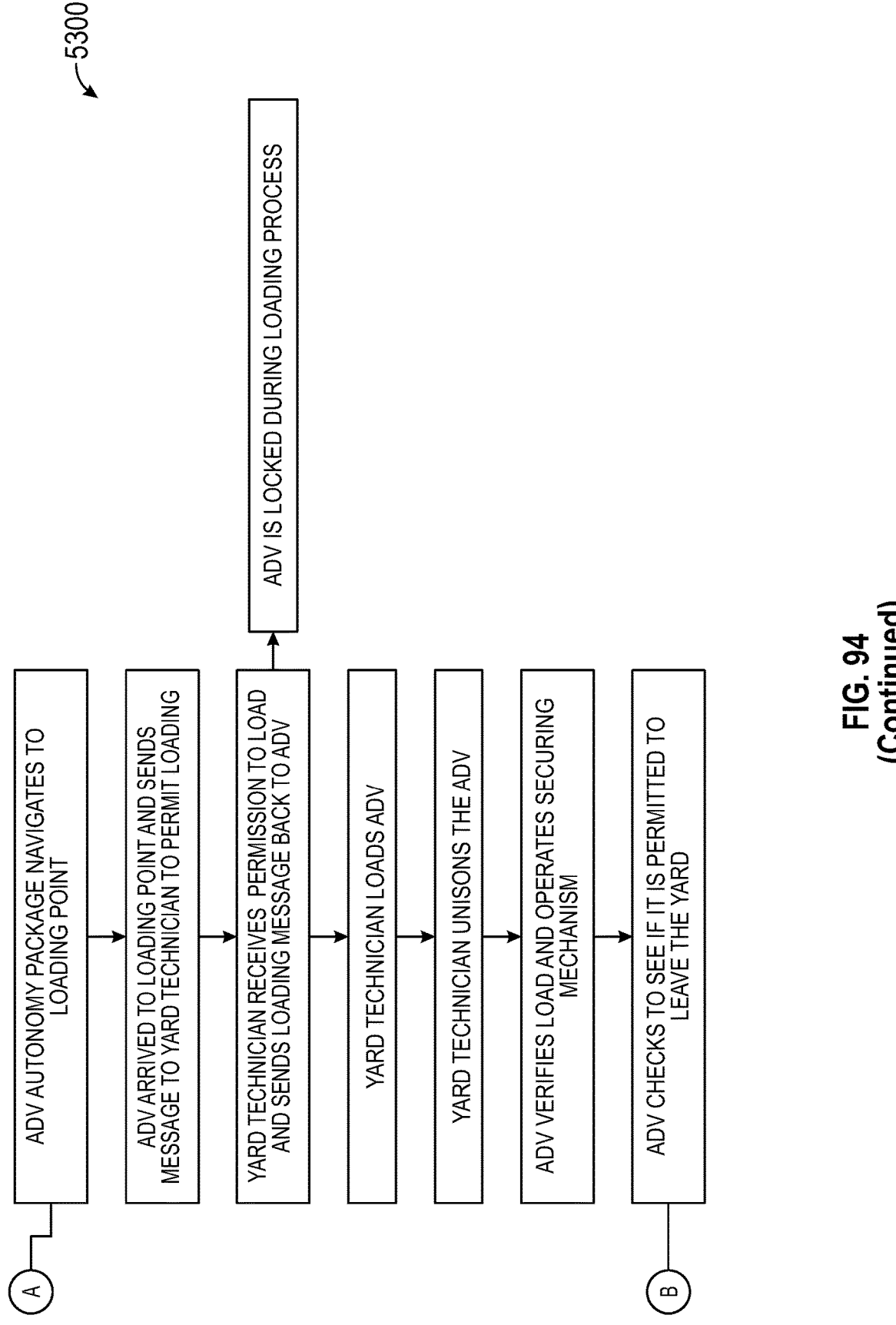
FIG. 94 is a block diagram of a process for communication information between the ADV, the AWV, and the ARA illustrated in FIG. 91, according to an exemplary embodiment.

FIG. 94 depicts a flow diagram of a process 5300 or method of communicating information between various vehicles, according to an exemplary embodiment. In some embodiments, at least one step of the process 5300, shown in FIG. 94, may be performed by the various vehicles described herein. For example, the AWV 5010 (e.g., processing circuitry thereof) may perform at least one step of the process shown in FIG. 94. In some embodiments, the various steps shown in FIG. 94 may be performed in conjunction with and/or in combination with various steps described herein. For example, the various steps shown in FIG. 94 may be performed in conjunction with the various steps shown in FIG. 93. The various steps of the process 5300 may be adjusted, modified, altered, rearranged, separated, combined, updated, and/or otherwise changed. For example, a given step of the process 5300 may be separated in one or more steps. As another example, a first given step and a second given step may be combined into a single step.

The process 5300 includes an initial setup step, in which the installation machines 5106 are placed within the environment 5000, calibrated, tested, and made ready to operate. The FMS 5020 is provided with data describing the jobsite and a high-level installation plan (e.g., an approximate number of solar panels to be installed and area to be covered).

The process 5300 may include a selection of a loading point. For example, a user interacting with the solar field management 5102 (e.g., through a user device) may provide a selection of solar panel loading site (e.g., a location to retrieve solar panels from). The user may also provide additional points and/or areas of the solar field. For example, the user may provide, to the solar field management, a list of restricted areas that the ADV 5005 is instructed to avoid, a waiting area where the ADV 5005 is instructed to wait when idle, a list of previously completed areas, a list of occupied areas, and/or various possible combinations and/or alternatives.

The process 5300 may include receiving a parameter. For example, the solar field management 5102 may receive the various information described above responsive to the user interacting with the solar field management. The solar field management 5102 may store, keep, hold, and/or other maintain the parameter that was received. For example, the solar field management 5102 may store the parameter in a data-based.

The process 5300 may include generating a path. For example, the solar field management 5102 may generate at least one path based on the parameters received from the user. The solar field management 5102 may generate a path for a given ADV 5005. For example, the solar field management 5102 may generate a path to a solar panel loading site.

The process 5300 may include a confirmation of a path. For example, the path generated by the solar field management 5102 may be provided to a user and the user may confirm the path (e.g., through an input to a user interface). The user may provide an indication of the selection. For example, the user may select an icon included in a user interface and the selection of the icon may provide the indication to the solar field management.

The process 5300 may include generating a second path. For example, the path previously generated by the solar field management 5102 may be rejected by the user. The solar field management 5102 may generate a second path responsive to receiving the rejection of the previously generated path.

The process 5300 may include confirmation of the second path. For example, the second path generated by the solar field management 5102 may be provided to the user that rejected the previously generated path and the user may confirm the second path (e.g., through the user device).

The process 5300 may include a determination of a vehicle to be loaded. For example, the solar field management 5102 may determine (e.g., identify) a given ADV 5005 to be loaded with solar panels 16. The solar field management 5102 may determine the given ADV 5005 based on a location of one or more ADV 5005. For example, the solar field management 5102 may determine the given ADV 5005 responsive to the solar field management 5102 determining that the given ADV 5005 is closet to a loading site.

The process 5300 may include dispatching a first vehicle. For example, the given ADV 5005 that was selected (e.g., determined by the solar field management) may travel towards the loading site. The given ADV 5005 may travel to the loading site based on at least one of the paths generated by the solar field management. For example, the given ADV 5005 may travel based on the second path.

The process 5300 may include receiving commands. For example, the given ADV 5005 that was selected may receive position commands to indicate a position and/or a placement for the given ADV 5005 to be aligned to receive one or more solar panels. For example, the commands may include and/or identify a given loading dock that the ADV 5005 should be located proximate to.

The process 5300 may include arriving at the loading site. For example, the given ADV 5005 may arrive at the loading dock to receive the solar panels. The given ADV 5005 may also transmit a signal, to the solar field management 5102 (e.g., to a user device associated with a yard technician), to indicate that the given ADV 5005 is ready to receive the solar panels. The signal may also include the location and/or the position of the ADV 5005.

The process 5300 may include sending receiving permission to load equipment. For example, the solar field management 5102 may provide an indication to an operator of a loading vehicle that the solar panels may be loaded onto the ADV 5005. The permission to load the equipment may be received responsive to the solar field management 5102 providing the indication.

The process 5300 may include loading the vehicle. For example, the ADV 5005 may receive and/or otherwise be loaded with the solar panels. The ADV 5005 may include at least one carrier and the carrier may receive, hold, support, and/or otherwise secure the solar panels on the ADV 5005. While the ADV 5005 is loaded with solar panels 16, the ADV 5005 may be locked and prevented from moving (e.g., to facilitate alignment of the solar panels with the ADV 5005).

The process 5300 may include securing equipment to the vehicle. For example, the carrier may include at least one post and the post may be moveably coupled with a body of the carrier. To continue this example, the post may move from a first position to a second position and the post moving to the second position may secure the solar panels to the ADV 5005.

The process 5300 may include receiving confirmation to exit a site. For example, the ADV 5005 may provide, to the solar field management 5102, an indication that the solar panels 16 are loaded and secured to the ADV 5005. The ADV 5005 may receive, responsive to providing the indication, confirmation that the ADV 5005 may exit the loading site. By way of example the solar field management 5102 may send a request for confirmation to a user device associated with a yard technician, and the yard technician may provide an input indicating permission for the ADV 5005 to exit the loading site.

The process 5300 may include traveling to an install site. This portion of the process 5300 may be substantially similar to a corresponding portion of the process 5200. For example, the ADV 5005 may receive, from the solar field management 5102, a location of a AWV 5010, and the ADV 5005 may travel from its current location to the location of the AWV 5010. The location of the AWV 5010 may be and/or include a solar panel install location (e.g., an install site). The ADV 5005 may travel to the location of the install site responsive to the ADV 5005 generating a path to the AWV 5010.

The process 5300 may include arriving at the install site. For example, the ADV 5005 may arrive at the install site responsive to the ADV 5005 performing one or more moves included in the path that was generated by the ADV 5005. The ADV 5005 arriving to the install site may result in the ADV 5005 and the AWV 5010 establishing a virtual dock. The ADV 5005 and/or the AWV 5010 may communicate, responsive to establishing the virtual dock, to the solar field management 5102 that they are ready to install solar panels.

Figure 95:
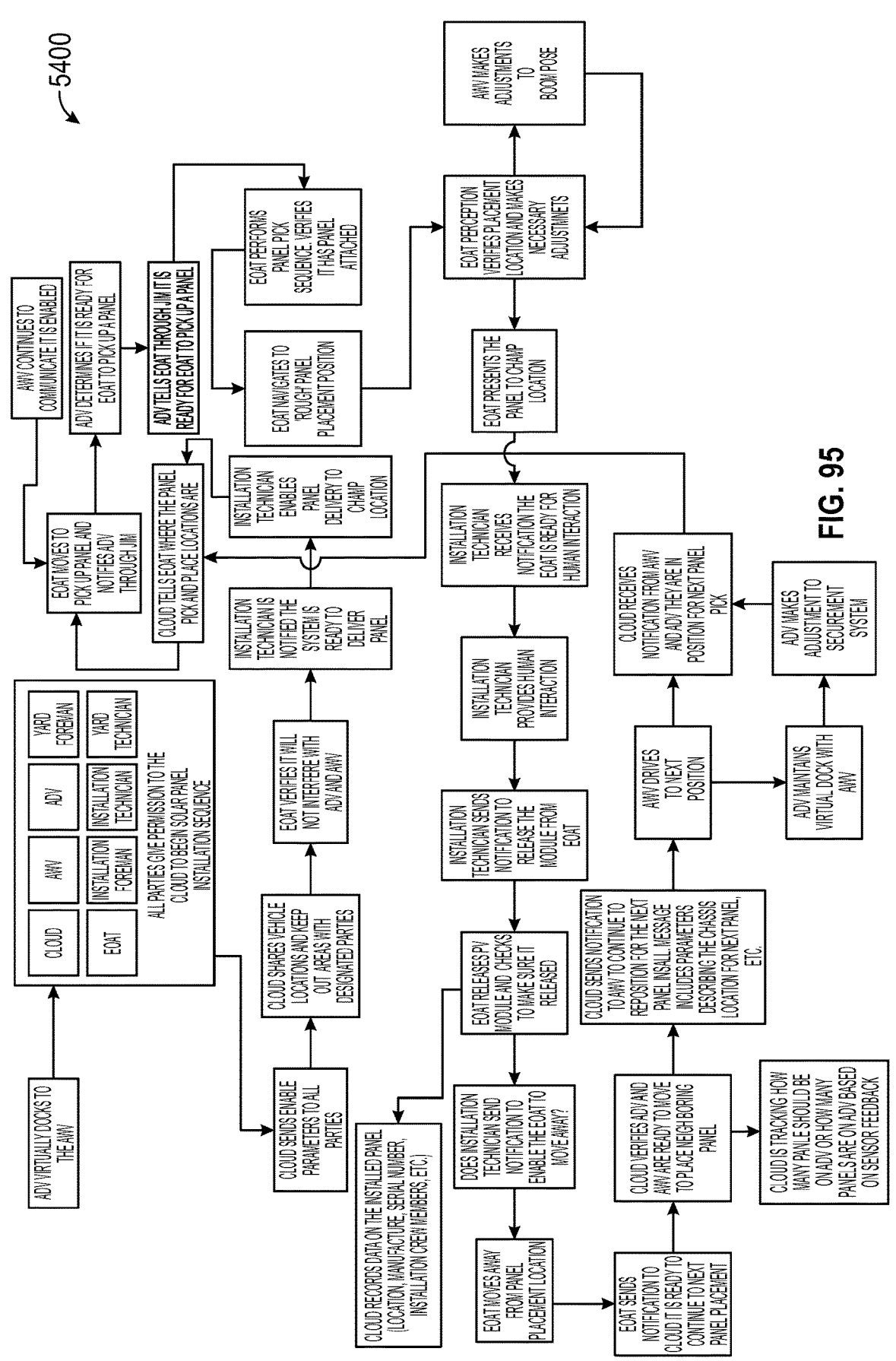
FIG. 95 is a block diagram of a process for communication information between the ADV, the AWV, and the ARA illustrated in FIG. 91, according to an exemplary embodiment.
Figure 95:
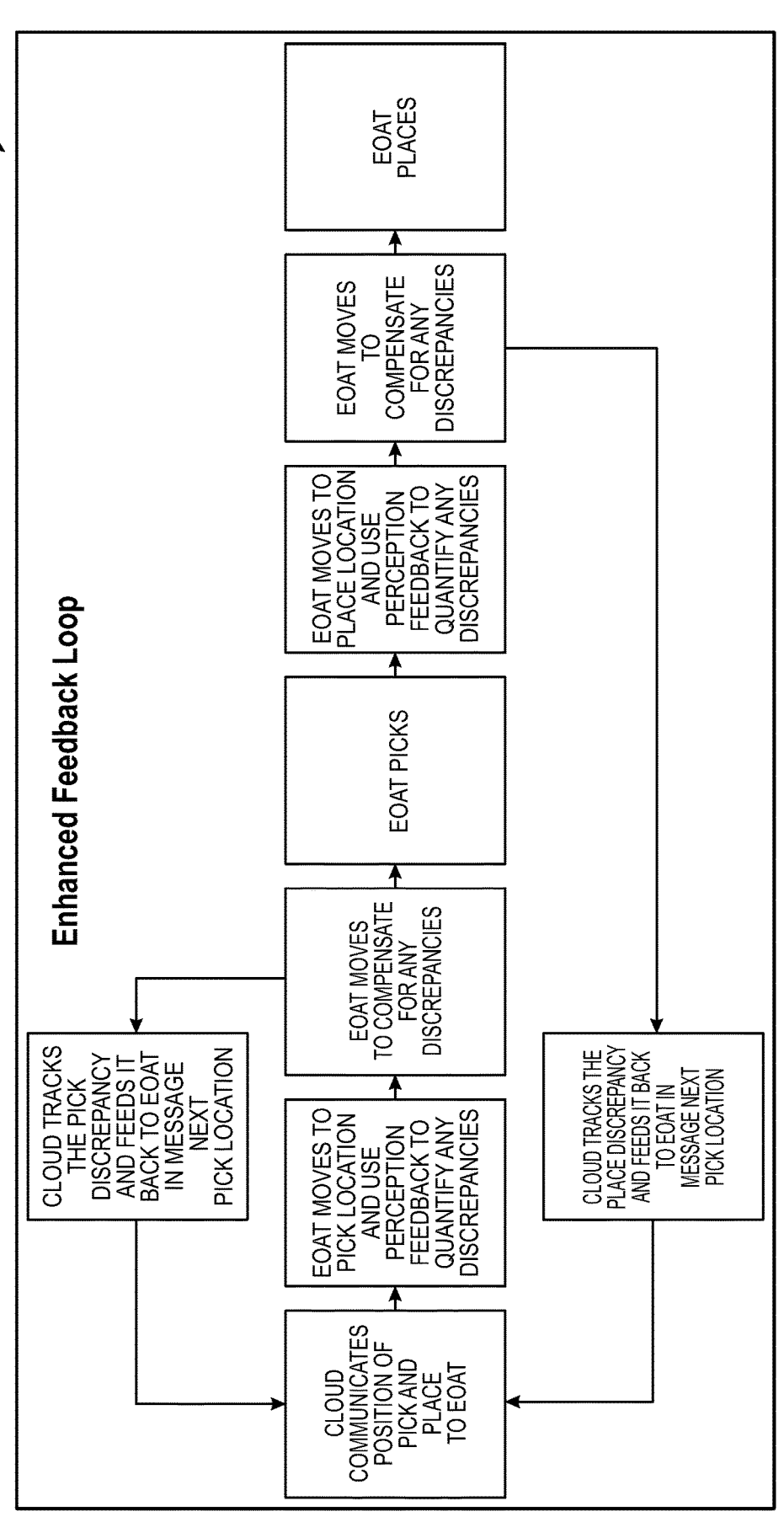

FIG. 95 depicts a flow diagram of a process 5400 or method of communicating information between various vehicles, according to an exemplary embodiment. In some embodiments, at least one step of the process 5400, shown in FIG. 95, may be performed by the various vehicles described herein. For example, the AWV 5010 may perform at least one step of the process 5400 shown in FIG. 95. In some embodiments, the various steps shown in FIG. 95 may be performed in conjunction with and/or in combination with various steps described herein. For example, the various steps shown in FIG. 95 may be performed in conjunction with the various steps shown in FIG. 93. The various steps of the process 5400 may be adjusted, modified, altered, rearranged, separated, combined, updated, and/or otherwise changed. For example, a given step of the process 5400 may be separated in one or more steps. As another example, a first given step and a second given step may be combined into a single step.

The process 5400 may include establishing a virtual dock. For example, the ADV 5005 may arrive a location proximate to the AWV 5010. The ADV 5005 arriving at a location proximate to the AWV 5010 may establish the virtual dock. The ADV 5005 may establish the virtual dock by at least one of situating, positioning, orienting, and/or otherwise aligning with the AWV 5010. The ADV 5005 and/or the AWV 5010 may provide, to the solar field management, an indication that the virtual dock has been established.

The process 5400 may include transmitting parameters. For example, the solar field management 5102 may provide to at least one of the ADV 5005, the AWV 5010, and/or the ARA 5015 operating signals and/or operating parameters. The operating signals may indicate that the vehicles (e.g., the ADV 5005, the AWV 5010, and the ARA 5015) are authorized and/or approved to begin interaction with one another. For example, the solar field management 5102 may provide a signal that indicates that installation of solar panels may begin.

The process 5400 may include sharing location information. For example, the solar field management 5102 may receive location information form the vehicles and the solar field management 5102 may provide the location information to each of the vehicles so that the vehicles are provided with the position of each respective vehicle. The solar field management 5102 may provide signals to the vehicles (e.g., the ADV 5005, the AWV 5010, and the ARA 5015) to indicate one or more movements for the vehicles. For example, the solar field management 5102 may provide a signal to the ADV 5005 to indicate that the ADV 5005 move towards the AWV 5010.

The process 5400 may include verifying information. For example, the ARA 5015 may provide, to the solar field management 5102, an indication that the ARA 5015 with keep, hold, and/or otherwise maintain its current position as the ADV 5005 and/or the AWV 5010 move relative to one another. For example, the ARA 5015 may maintain the location of its various components that were included in the locations provided to the ADV 5005 and the AWV 5010. The ARA 5015 may also verify that the ARA 5015 will not interfere with movement of the ADV 5005 or the AWV 5010.

The process 5400 may include providing and receiving an indication. For example, the solar field management 5102 may provide an indication to the ADV 5005, the AWV 5010, and the ARA 5015 that a first solar panel may be providing to a clamp location (e.g., an install point for the first solar panel). The indication may be received responsive to the ARA 5015 verifying that it will maintain its previous communicated position. The ARA 5015 may also provide the indication to a user device associated with an installation technician. The ARA 5015 may hold position until a confirmation from the installation technician is received by the user device, the confirmation enabling the ARA 5015 to proceed with picking up the solar panel 16.

The process 5400 may include providing equipment install locations. For example, the solar field management 5102 may provide, to the ARA 5015, an indication of a given solar panel 16 to retrieve from the ADV 5005 and an indication of where the solar panel 16 is located. The solar field management 5102 may further provide to the ARA 5015 a location for where the given solar panel 16 may be placed and/or located after the solar panel is retrieved. The indication may include a location and/or an identification of where the ARA 5015 may position the given solar panel for installation.

The process 5400 may include moving towards a piece of equipment. For example, the ARA 5015 may move, relative to the ADV 5005 and/or the AWV 5010, towards and/or proximate to the given solar panel by at least one of pivoting, spinning, rotating, extending, retracting, lengthening, and/or shortening. The ARA 5015 may also provide movement notifications to the ADV 5005. For example, the ARA 5015 may communicate with the ADV 5005 as the ARA 5015 approaches and/or is otherwise positioned proximate to the ADV 5005.

The process 5400 may include receiving confirmation to engage with the piece of equipment. For example, the ADV 5005 may provide, to the ARA 5015, confirmation that the ARA 5015 may retrieve, engage with, and/or otherwise obtain the given solar panel 16 from the ADV 5005. The ADV 5005 may provide the confirmation responsive to the ADV 5005 determining that the ADV 5005 is secured and/or otherwise stable (e.g., as shown in FIG. 40).

The process 5400 may include execution of a maneuver. For example, the ARA 5015 may pivot, swing, rotate, and/or otherwise move to position the grabbing mechanism 760 proximate to the given solar panel 16. If the ARA 5015 determines that the grabbing mechanism 760 is insufficiently close to the solar panel 16 to fully engage, the ARA 5015 may adjust the post of the grabbing mechanism 760 until an acceptable pose is achieved. The grabbing mechanism may, responsive to execution the maneuver, may engage with and/or otherwise grab the given solar panel 16.

The process 5400 may include moving the solar panel 16 to an install location. For example, the ARA 5015 may move from the location proximate to the ADV 5005 (e.g., the initial location of the solar panel 16) to a location of the install site (e.g., a clamp location for the given solar panel). The ARA 5015 may move to the install location responsive to execution of at least one maneuver.

The process 5400 may include receiving confirmation to release the piece of equipment. For example, the ARA 5015 may receive, from the solar field management 5102, an indication that the given solar panel 16 has been installed at the clamp location. By way of example, in response to the ARA 5015 reaching the clamp location, the solar field management 5102 may provide a notification to a user device associated with an installation technician. The installation technician may install the solar panel 16 at the desired location. The installation technician may then interact with the user device to confirm that the solar panel 16 has been successfully installed. The ARA 5015 may receive this indication and determine that the solar panel 16 has been installed.

The process 5400 may include releasing the piece of equipment. For example, the grabbing mechanism 760 may disengage with and/or otherwise release the solar panel 16. The ARA 5015 may release the given solar panel responsive to the ARA 5015 receiving confirmation to release the given solar panel. Using one or more sensors (e.g., a camera), the ARA 5015 may confirm that the solar panel 16 has been successfully released.

The process 5400 may include recording information associated with installation of the piece of equipment. For example, the ARA 5015 may include a camera and the camera may capture and/or otherwise record information associated with installing the solar panel 16. The ARA 5015 may capture at least one of a picture of the install site, a model number of the given solar panel, a communication protocol for the given solar panel, a manufacturer of the given solar panel, performance metrics of the given solar panel, operating parameters of the given solar panel, and/or various other possible information pertaining to the given solar panel. The information captured by the ARA 5015 may be provided to the solar field management 5015 and recorded.

The process 5400 may include reading the ARA 5015 to install another solar panel 16. By way of example, the ARA 50515 may move away from the installation location and provide a notification to the solar filed management 5102 that the ARA 5015 is ready to place another solar panel 16.

The process 5400 includes verifying that the ADV 5005 and the AWV 5010 are ready to install another solar panel 16. The solar filed management 5102 may verify that the ADV 5005 and the AWV 5010 are ready to move (e.g., not currently occupied with another task). The solar panel management 5012 may monitor the amount of solar panels 16 present on the ADV 5005 (e.g., using one or more sensors, such as a camera or scale) and determine if the ADV 5005 has another solar panel 16 ready for installation.

The process 5400 may include repositioning the ADV 5005 and the AWV 5010. The solar panel management 5012 may provide the AWV 5010 with instructions for navigating to the next installation location. The ADV 5005 may maintain the virtual dock with the AWV 5010, such that the ADV 5005 moves with the AWV 5010 to the next installation location. Once in position, the ADV 5005 and the AWV 5010 notify that they are in position to install the next solar panel 16. The process 5400 may then be repeated to install additional solar panels 16.

FIG. 95 further illustrates a process 5500 or method that may be used during the process 5400 to provide a feedback-based retrieval and placement of the solar panels 16 by the ARA 5015. In the process 5500, the solar filed management 5102 provides the ARA 5015 with a pickup position (e.g., a pick location) of a solar panel 16 on the ADV 5005 and a desired installation position (e.g., a place location) of the solar panel 16. The ARA 5015 moves toward the pickup position, tracking any discrepancies between the actual position of the ARA 5015 and the pickup position, and compensating for any such discrepancies. The ARA 5015 supplies a record of any such discrepancies to the solar filed management 5102. When the ARA 5015 has reached the pickup position, the ARA 5015 controls the grabber assembly 760 to engage the solar panel 16 and begins moving toward the installation position. As the ARA 5015 moves toward the installation position, the ARA 5015 tracks any discrepancies between the actual position of the ARA 5015 and the installation position, and compensating for any such discrepancies. The ARA 5015 supplies a record of any such discrepancies to the solar filed management 5102. When the ARA 5015 reaches the installation position, the ARA 5015 places the solar panel 16 in the installation position.

When the process 5500 is repeated, the solar field management 5102 provides both sets of recorded discrepancies to the ARA 5015 along with the pickup position and the desired installation position for the next solar panel 16. Using the recorded discrepancies as feedback, the ARA 5015 modifies the control method to minimize discrepancies when installing the next solar panel 16. Accordingly, the process 5500 facilitates the system learning from past control errors an minimizing future control errors.

Configuration of the Exemplary Embodiments

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a series of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media may be any available media that may be accessed by a general purpose or special purpose computer or other machine with a processor. By way of example, such machine-readable media may comprise RAM, ROM, EPROM, EEPROM, or other optical disk storage, magnetic disk storage or other magnetic storage devices, or any other medium which may be used to carry or store desired program code in the form of machine-executable instructions or data structures and which may be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

What is claimed is:

1. A solar panel installation machine, comprising:
a chassis;
a body coupled to the chassis;
a plurality of tractive elements coupled the chassis;
a boom including a first end and a second end opposite the first end, the boom coupled to the body at the first end; and
an implement coupled to the second end of the boom, the implement including:
a track configured to rotate relative to the chassis;
a robotic arm coupled to and translatable along the track, the robotic arm extending downward from the track and including a plurality of linkages; and a grabber assembly coupled to the robotic arm, the grabber assembly configured to selectively engage with and facilitate picking up a solar panel to provide the solar panel to an installation location where the respective solar panel can be secured to a solar panel support.

2. The solar panel installation machine of claim 1, wherein the grabber assembly includes a plurality of suction interfaces.

3. The solar panel installation machine of claim 1, wherein the boom is a telescoping boom.

4. The solar panel installation machine of claim 1, further comprising a wireless communications interface configured to facilitate wireless communications between the solar panel installation machine and an external device.

5. The solar panel installation machine of claim 4, wherein the external device is a second machine proximate the solar panel installation machine.

6. The solar panel installation machine of claim 5, wherein the wireless communications include leader-follower signals to coordinate motion between the solar panel installation machine and the second machine.

7. The solar panel installation machine of claim 6, wherein the leader follower signals are configured to maintain the solar panel installation machine and the second machine proximate one another so that the solar panel installation machine can pick up solar panels from the second machine and provide each of the solar panels to a corresponding installation location.

8. The solar panel installation machine of claim 6, further comprising a sensor configured to facilitate detecting a location of the second machine.

9. The solar panel installation machine of claim 4, wherein the external device includes a remote server.

10. The solar panel installation machine of claim 1, wherein the body is configured to rotate relative to the chassis via a turntable.

11. The solar panel installation machine of claim 10, wherein the turntable includes two swing drive systems.

12. The solar panel installation machine of claim 10, wherein the turntable includes a friction brake.

13. The solar panel installation machine of claim 10, wherein the turntable includes a mechanical lock positioned to engage with the turntable to prevent rotation of the turntable and, thereby, secure the body relative the chassis.

14. The solar panel installation machine of claim 13, wherein the mechanical lock is configured to secure the body in one of a plurality of positions relative the chassis.

15. A solar panel installation machine comprising:
a chassis;
a body coupled to the chassis and configured to rotate relative the chassis;
a plurality of tractive elements coupled the chassis;
a telescoping boom including a first end and a second end opposite the first end, the telescoping boom coupled to the body at the first end;
an implement coupled to the second end of the telescoping boom, the telescoping boom configured to adjust a height of the implement, the implement including:
a track configured to rotate relative to the chassis;
a robotic arm coupled to and translatable along the track, the robotic arm extending downward from the track and including a plurality of linkages;
a grabber assembly coupled to the robotic arm, the grabber assembly configured to selectively engage with and facilitate picking up a solar panel to provide the solar panel to an installation location where the respective solar panel can be secured to a solar panel support; and a wireless communications interface configured to facilitate wireless communications between (a) the solar panel installation machine and (b) a second machine proximate the solar panel installation machine and a remote server.

16. The solar panel installation machine of claim 15, wherein the wireless communications include leader-follower signals to coordinate motion between the solar panel installation machine and the second machine.

17. The solar panel installation machine of claim 16, wherein the leader-follower signals are configured to maintain the solar panel installation machine and the second machine proximate one another so that the solar panel installation machine can pick up solar panels from the second machine and provide each of the solar panels to a corresponding installation location.

18. A solar panel installation machine comprising:

a chassis;

a body coupled to the chassis via a turntable;

a mechanical lock positioned to engage with the turntable to selectively prevent rotation of the turntable;

a plurality of tractive elements coupled the chassis;

a telescoping boom including a first end and a second end opposite the first end, the telescoping boom coupled to the body at the first end;

an implement coupled to the second end of the telescoping boom, the implement including:

a track configured to rotate relative to the chassis;

a robotic arm coupled to and translatable along the track along, the robotic arm extending downward from the track and including a plurality of linkages;

a grabber assembly coupled to the robotic arm, the grabber assembly configured to selectively engage with and facilitate picking up a solar panel to provide the solar panel to an installation location where the respective solar panel can be secured to a solar panel support; and a wireless communications interface configured to facilitate wireless communications between the solar panel installation machine and a second machine proximate the solar panel installation machine.

19. The solar panel installation machine of claim 18, wherein the mechanical lock is configured to engage with the turntable secure the body relative to the chassis in a fixed number of positions.

20. The solar panel installation machine of claim 18, wherein the turntable includes two swing drive systems.

* * * * *